US009033786B2

(12) United States Patent
Kelly et al.

(10) Patent No.: US 9,033,786 B2
(45) Date of Patent: *May 19, 2015

(54) TOURNAMENT GAMING SYSTEMS AND METHODS

(71) Applicant: Bally Gaming, Inc., Las Vegas, NV (US)

(72) Inventors: Bryan M. Kelly, Alamo, CA (US); Robert W. Crowder, Jr., Las Vegas, NV (US); Pravinkumar Patel, Las Vegas, NV (US); Anthony E. Green, Henderson, NV (US); John E. Link, Manteca, CA (US); Gennady Soliterman, San Ramon, CA (US); Jeffrey L. Allen, Pleasanton, CA (US); Dennis Lockard, Tracy, CA (US); Jeffrey C. Tallcott, Pleasanton, CA (US); Joshua D. Larsen, Las Vegas, NV (US); Thomas Scott, Henderson, NV (US); Christopher D. Barton, Henderson, NV (US); Sudheer Vemuri, Las Vegas, NV (US); Mettu R. Reddy, Marshfield, WI (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,640

(22) Filed: Jul. 9, 2013

(65) Prior Publication Data

US 2013/0337914 A1 Dec. 19, 2013

Related U.S. Application Data

(63) Continuation of application No. 12/268,314, filed on Nov. 10, 2008, now Pat. No. 8,512,119.

(60) Provisional application No. 60/987,062, filed on Nov. 10, 2007.

(51) Int. Cl.
*A63F 13/48* (2014.01)
*G07F 17/32* (2006.01)

(52) U.S. Cl.
CPC ........ *G07F 17/3276* (2013.01); *G07F 17/3267* (2013.01)

(58) Field of Classification Search
CPC ............ G07F 17/3269; G07F 17/3272; G07F 17/3276
USPC ......................................... 463/16, 20, 25, 29
See application file for complete search history.

(56) References Cited

U.S. PATENT DOCUMENTS 5,083,271 A 1/1992 Thacher et al.
5,711,715 A 1/1998 Ringo et al.

(Continued)

*Primary Examiner* — Omkar Deodhar
*Assistant Examiner* — Allen Chan
(74) *Attorney, Agent, or Firm* — Brooke W. Quist; Marvin A. Hein; Philip J. Anderson

(57) ABSTRACT

Various embodiments are directed to gaming systems, gaming devices, and methods for presenting tournament games. Accordingly, one method includes: incrementing tournament entry points based on a predetermined percentage of a player's wager for base game play; presenting the player with two or more tournament games for play, wherein the player selects multiple tournament games from the two or more tournament games for immediate initiation of tournament game play on demand, and wherein the tournament games are separate from the base game; and initiating the tournament games, using a processor, selected by the player on a secondary display of the gaming device, the secondary display using an embedded processor that is separate and distinct from a main processor of the gaming device.

19 Claims, 117 Drawing Sheets

(56) References Cited

U.S. PATENT DOCUMENTS

| | | | |
|---|---|---|---|
| 5,917,725 | A | 6/1999 | Thacher et al. |
| 6,082,887 | A | 7/2000 | Feuer et al. |
| 6,527,641 | B1 | 3/2003 | Sinclair et al. |
| 7,387,572 | B2 | 6/2008 | Hanchar |
| 2002/0039923 | A1 | 4/2002 | Cannon et al. |
| 2002/0119824 | A1 | 8/2002 | Allen |
| 2002/0183105 | A1 | 12/2002 | Cannon et al. |
| 2003/0036429 | A1 | 2/2003 | Witty et al. |
| 2003/0060247 | A1 | 3/2003 | Goldberg et al. |
| 2003/0060264 | A1 | 3/2003 | Chilton et al. |
| 2003/0070178 | A1 | 4/2003 | Boyd et al. |
| 2004/0157663 | A1 | 8/2004 | Gunnar |
| 2004/0204246 | A1 | 10/2004 | Halliburton et al. |
| 2004/0229700 | A1 | 11/2004 | Cannon et al. |
| 2004/0242306 | A1 | 12/2004 | Tarantino |
| 2005/0071024 | A1 | 3/2005 | Henshaw |
| 2006/0030960 | A1 | 2/2006 | Duhamel et al. |
| 2006/0082056 | A1 | 4/2006 | Kane et al. |
| 2006/0287097 | A1 | 12/2006 | Moshal |
| 2007/0167226 | A1 | 7/2007 | Kelly et al. |
| 2007/0293293 | A1 | 12/2007 | Baerlocher et al. |
| 2008/0102916 | A1 * | 5/2008 | Kovacs et al. .................. 463/16 |

* cited by examiner

When all places fill in first tournament then next LE tournament begins automatically Active tourn.

Tournament Parts

Basic Specs for how the tournament runs

- Limited Entry/Time Based/Sprint
- # of entries per player
- Prize list (fixed or Progressive)
- Can a player win once or more

Score Table

| Rank | Name | Score |
|---|---|---|
| 1) | Bryan | 1120 |
| 2) | Bob | 1000 |
| 3) | Jeff | 976 |
| N) | Player X | 763 |

Other Tournament Actions

This list can grow over time as we add new rules.
For each of the actions in this list there will be logic for if/when/what the rule does. Some of these rules will run as each score is posted, some will run only at the end of this tournament.

1) Add player to an invite list on another tournament
2) Change player club status
3) Change player Pyramid rank

Rules for other Tournaments posting to this Tournament

There could be 0 to N rules in the list. The incoming score/player must pass all the requirements for the score to be posted. Each rule will need it's own pass/fail logic.

1) Player on Include list
2) Player Club Level
3) Score value
4) Player has already posted a score

List of Other Tournaments to post the Score To

Each entry in the list will have the following field associated with it:

| Fields | Definition |
|---|---|
| Orig Stid | The STID of the tournament sending a score |
| Dest Stid | The STID of the tournament where the score should be posted (sometimes will be a TID) |
| Add/create Score | Tells the DEST STID whether the score that is being posted adds to a score already posted on the destination STID or create/replace an existing score |
| Processing time I/E | Does the player's score post immediately or when this tournament ends |
| Lowest rank to post | The lowest rank in the score list to post to the DEST Tourn |

FIG.50A

Tournament Logic

Sequence after a score is posted

1) Add score to Score Table (sorted)
2) Post score to other tournaments with Immediate flag
3) Do all immediate Other Tournament Actions

End Tournament Sequence

1) Judge tournament
2) Pay tournament winners
3) Post scores to other tournaments with Tournament End flag
4) Do all End Tournament Other Tournament Actions

FIG.50B

Tournament Architecture

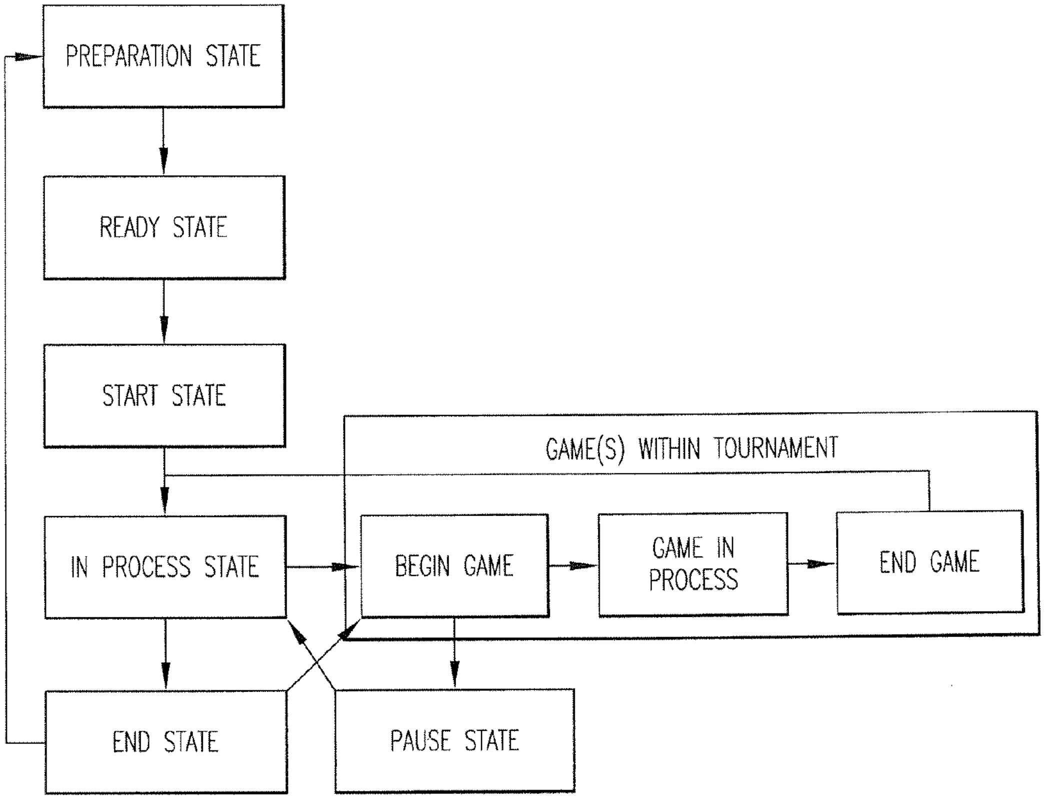

Messages in various states of tournament

PREPARATION:

TM-GD: registerEvents()
TM-GD: getDeviceInfo()
TM-GD: getActiveGameInfo()

READY:

TM-TS: getTournamentConfig()
TM-TS: getPlayerInfo()
NVRAM

START:

TM-TS: canStart()
TM-GD: setConfigData()
TM-GD: getMetersInfo()
TM-GD: setTournState()

IN PROCESS:

Inbuilt logic

BEGIN GAME:
TM-TS: beginGame()
TM-GD: setTournState()- Allow
GAME IN-PROCESS:
TM-TS: intermediateScorePost()
GD-TM: subscribed events
GAME END:
TM-TS: endGame()
TM-GD: setTournGame()-Pause END:
TM-TS: getTournData()
TM-GD: setTournState()- End

FIG.62

CONNECTION SEQUENCE

PLAYER ENROLLMENT SEQUENCE

TOURNAMENT GAMING SYSTEMS AND METHODS

CROSS-REFERENCE TO RELATED APPLICATIONS

This application is a continuation of U.S. patent application Ser. No. 12/268,314, filed Nov. 10, 2008, entitled TOURNAMENT GAMING SYSTEMS AND METHODS, which claims the benefit of U.S. Provisional Application No. 60/987,062, filed Nov. 10, 2007, which are incorporated by reference in their entirety.

This application is related to U.S. patent application Ser. No. 12/268,288, filed Nov. 10, 2007, entitled TOURNAMENT GAMING SYSTEMS, and U.S. patent application Ser. No. 12/268,331, filed Nov. 10, 2007, entitled TOURNAMENT GAMING SYSTEMS, GAMING DEVICES AND METHODS, which are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Tournaments are often arranged at a casino to create an exciting activity to drive attendance and revenue for the casino. A tournament is a group function wherein several players pay a set amount of money to join a tournament. These entry fees are usually manually collected from the players and typically are used to fund a prize pool that is paid out to one or more tournament winners. The casino will usually retain a percentage of the entry fees running the tournament. The gaming devices used for the tournament are those normally used on the casino floor, but those which have been re-configured so that upon the issuance of a "start" command, the devices allow the players to play as fast as they can without requiring any funds to be deposited during tournament play. Percentage options in the re-configured gaming machines are standardized before play of the tournament. Most players start with the same amount of credits. The wins, or "points," are accumulated, held and displayed by each machine. At the end of a specific period of time, a "stop" command is sent to all of the gaming machines participating in the tournament. The gaming machines then become disabled. The winner is usually a person having the highest accumulated score of win points obtained during the tournament session. In most tournaments the winner takes the entire pot.

Currently, tournaments must be run on the aforementioned specially-configured gaming machines, which are required to be located in a special area in a casino floor or a separate room. At least one person is required as a tournament administrator, and/or persons who monitor and run the tournament. The tournament setup is configured, tested, and certified as being equal in every respect on each gaming machine so that all players have an equal chance to win. The gaming machines used for the tournaments are carefully selected from the gaming machines normally used in the casino. The selected gaming machines are then enabled for tournament players to play at a defined "start" time, and they are disabled at a tournament "end" time. A tournament administrator is responsible for acquiring the score from each gaming machine. A winner is orally announced or otherwise shown on a display device.

Thus, in current tournaments, there is a requirement to collect tournament fees manually, dedicate a portion or room in the casino for the tournament location, and select and specially configure gaming machines for re-location to the tournament location. Further, there is a specific start and end time for the tournament, during which all tournament play is required to start and complete. Finally, the tournament scores are fetched manually. All of these requirements limit the opportunity of the general public to access the tournament. Further, they make the tournament costly to conduct on the part of the gaming establishment as it must provide tournament hosts or administrators, dedicate certain machines to tournament use, and provide a suitable casino area or room in order to conduct of the tournament.

Some prior art systems purportedly make tournament play more available, and purportedly simplify the host establishment's monitoring requirements to reduce overhead expense. However, those systems still require participating gaming machines to all be a similar type and have the same win percentage (i.e., have standardized parameters before tournament play). All gaming machines participate in the tournament for the same period of time and must be dedicated to the tournament during the duration of the tournament.

Further, the tournament close rate, the turnover rate, or the tournament velocity rate are all terms describing a problematic area in tournament design. This is a constant issue that needs to be considered by the tournament game administrators. Tournament operators must carefully choose the number and size of tournaments available for a player so as create what is called tournament velocity or turnover rate. If there are too many tournaments for the player community available, then the tournament velocity is too little, and player dissatisfaction occurs. If there are too few tournaments for the players, then a player may post a score in all his desired ones and may not have a place to spend any more tournament entry fees until the tournaments close. An advantage of closing tournaments quickly is that it gives the winning players more money to play even more tournaments or other types of games.

Thus, it would be desirable to provide a tournament system and method without the need to dedicate a separate part of a casino floor, limit the duration of the tournament, specifically configure gaming machines of the same type and move them to the tournament area, and provide the amount of personnel typically needed to conduct a tournament. Accordingly, in light of the discussion above, those skilled in the art would recognize the need for a system that is capable of providing on-going tournament play over a broad area and over a broad spectrum of gaming machine types.

SUMMARY

Briefly, and in general terms, various embodiments are directed to gaming systems, gaming devices, and methods for presenting tournament games. According to one embodiment, a gaming system for presenting tournament games includes a plurality of gaming devices in communication with a tournament server as well as a plurality of tournament displays positioned throughout a gaming establishment. Each gaming device is configured to enable concurrent play of a base game and an on-demand tournament game, in which the on-demand tournament game is player initiated. The tournament server manages play of the on-demand tournament game, and the tournament server determines a location of active and eligible players for the on-demand tournament game. The plurality of tournament displays are positioned throughout a gaming establishment, and the tournament displays are also in communication with the tournament server. The tournament server sends tournament information to the tournament displays near the location of active and eligible players of the tournament game.

In another embodiment, the gaming system includes a tournament gaming server in communication with a plurality of gaming devices and a management console. The tournament gaming server manages and configures the gaming devices for one or more player-initiated tournament games. The management console includes a user display and a user interface having a plurality of fields for an operator to create and configure one or more player-initiated tournament games.

In another embodiment, the gaming system includes a plurality of gaming devices and a tournament server. Each gaming device is configured to enable concurrent play of a base game on a main display of the gaming device and a tournament game on a secondary display of the gaming device. The tournament server is in communication with the plurality of gaming devices, and the tournament server manages the tournament game on the plurality of gaming devices. The tournament server also determines the location of active and eligible players for the tournament game.

In addition to gaming systems, various methods for presenting tournament games are disclosed herein. Accordingly, one method includes: incrementing tournament entry points based on a predetermined percentage of a player's wager for base game play; presenting the player with two or more tournament games for play, wherein the player selects multiple tournament games from the two or more tournament games for immediate initiation of tournament game play on demand, and wherein the tournament games are separate from the base game; initiating the tournament games, using a processor, selected by the player on a secondary display of the gaming device, the secondary display using an embedded processor that is separate and distinct from a main processor of the gaming device, and receiving player input to automatically play the tournament games.

In another embodiment, the method includes: incrementing tournament entry points based on a predetermined percentage of a player's wager for base game play; presenting the player with two or more tournament games for play, wherein the player selects multiple tournament games from the two or more tournament games for immediate initiation of tournament game play on demand, and wherein the tournament games are separate from the base game; initiating the tournament games using a processor in response to player input; and receiving player input continuing play of base game play on a main display of the gaming device while the tournament games are concurrently played on a secondary display of the gaming device, the secondary display using an embedded processor that is separate and distinct from a main processor of the gaming device.

In yet another method, base game play is initiated on a main display of a gaming device, and the player's eligibility to play a tournament game is also determined. An eligible player is prompted to select a tournament game for play, and the tournament game is presented on a secondary display of the gaming device in response to player's selection. In this method, the tournament game and the base game are playable simultaneously.

In one method of presenting a tournament game, a player is registered for a tournament gaming session. A tournament voucher is associated with and issued to the player. The tournament voucher includes entry into the tournament gaming session. The tournament voucher is received at a gaming machine capable of presenting a tournament game. Upon receipt of the tournament voucher, the gaming machine is reconfigured into a tournament mode. Once the gaming machine is reconfigured, the tournament game is initiated and a tournament score is accumulated. At the conclusion of the tournament game, a tournament score receipt is issued to the player.

In addition to presenting games, various methods for configuring a tournament game for play on a plurality of gaming devices are disclosed herein. One method includes: initiating play of a base game using a processor on a main display of a gaming device; prompting a player to select multiple tournament games for play from two or more available tournament games, wherein the player selects multiple tournament games from the two or more tournament games for immediate initiation of tournament game play on demand, and wherein the tournament games are separate from the base game; and presenting the tournament games on a secondary display of the gaming device in response to player input, wherein the tournament games and the base game are playable simultaneously.

Other features and advantages will become apparent from the following detailed description, taken in conjunction with the accompanying drawings, which illustrate by way of example, the features of the various embodiments.

BRIEF DESCRIPTION OF THE DRAWINGS

FIGS. 50A-50B illustrate one embodiment of the various components of a tournament gaming system.

FIG. 62 illustrates the various tournament states of a tournament gaming system according to one embodiment.

DESCRIPTION OF THE EMBODIMENTS

Various embodiments disclosed herein are directed to a tournament gaming system. The tournament gaming system includes a plurality of client side components that are in communication with server side components that manage one or more tournament games on the client side components. According to one embodiment, a tournament server is able to manage base game tournaments on a gaming device, tournament games on mobile devices, dedicated tournament gaming devices, and tournament games presented on an IVIEW device.

In one embodiment, a tournament system is directed towards a system and method that allows competition between players of dissimilar gaming machines for potentially varying periods of time while such players are concurrently playing their gaming machines in a normal fashion or normal mode. In one aspect, the tournaments use gaming machines with non-modified base games located anywhere in the casino, or two or more casinos, while the players of those gaming machines continue to participate in normal play on the plurality of gaming machines.

Figure 1:
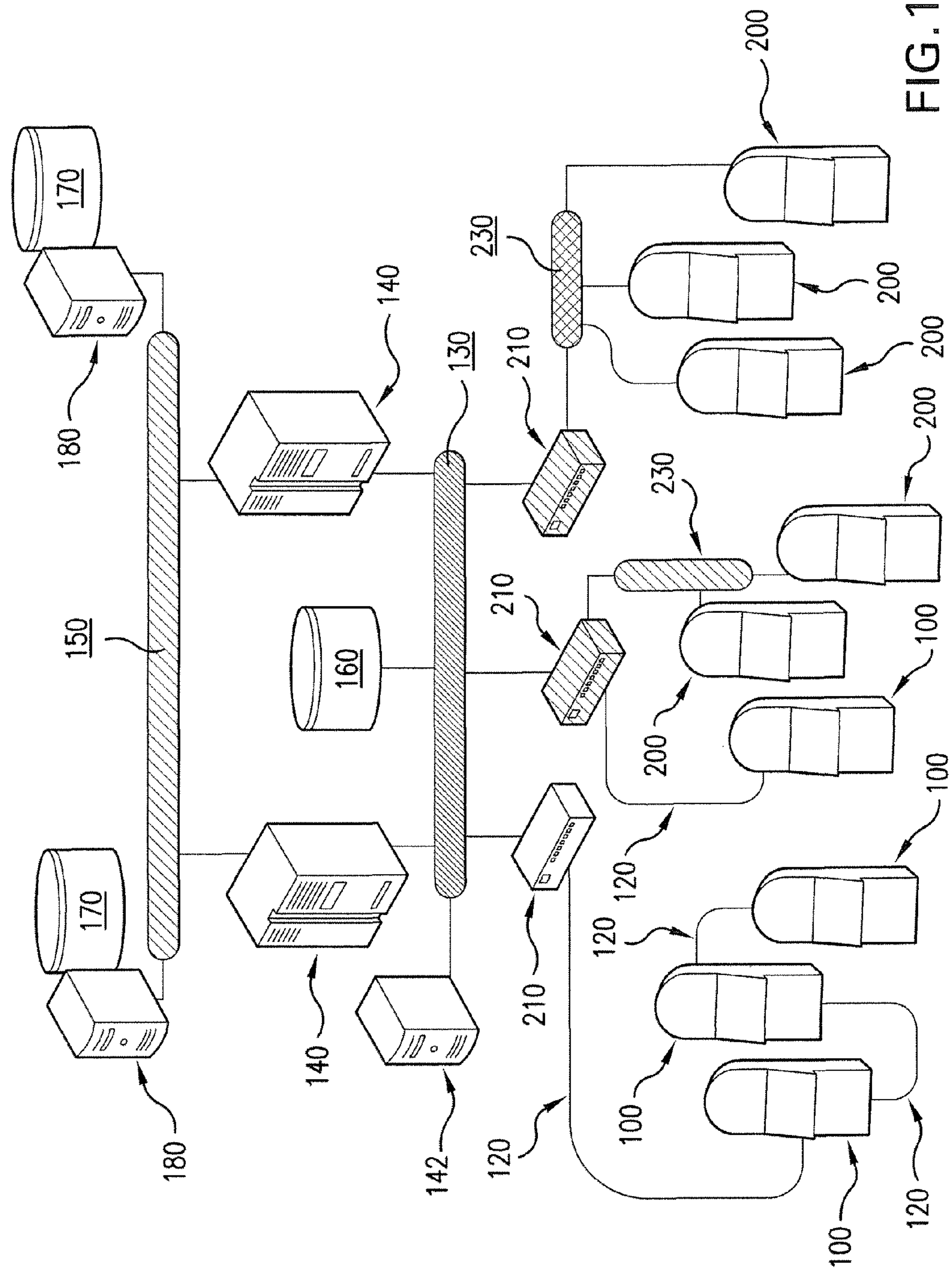
FIG. 1 is a schematic diagram of one embodiment of a tournament gaming system.
Figure 2A:
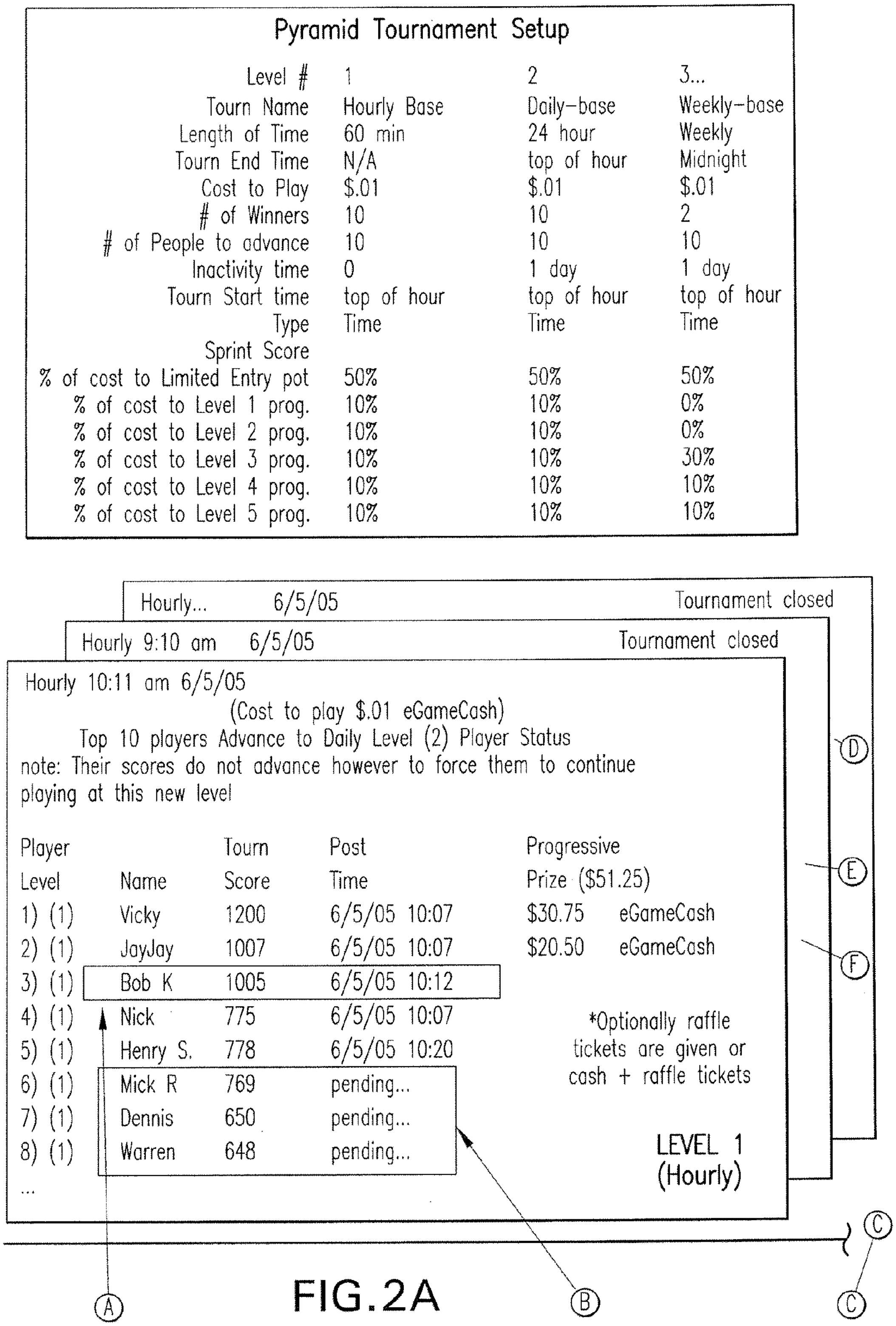
FIGS. 2A-2D are block diagrams illustrating a server side player level advancement process according to one embodiment.
Figure 2B:
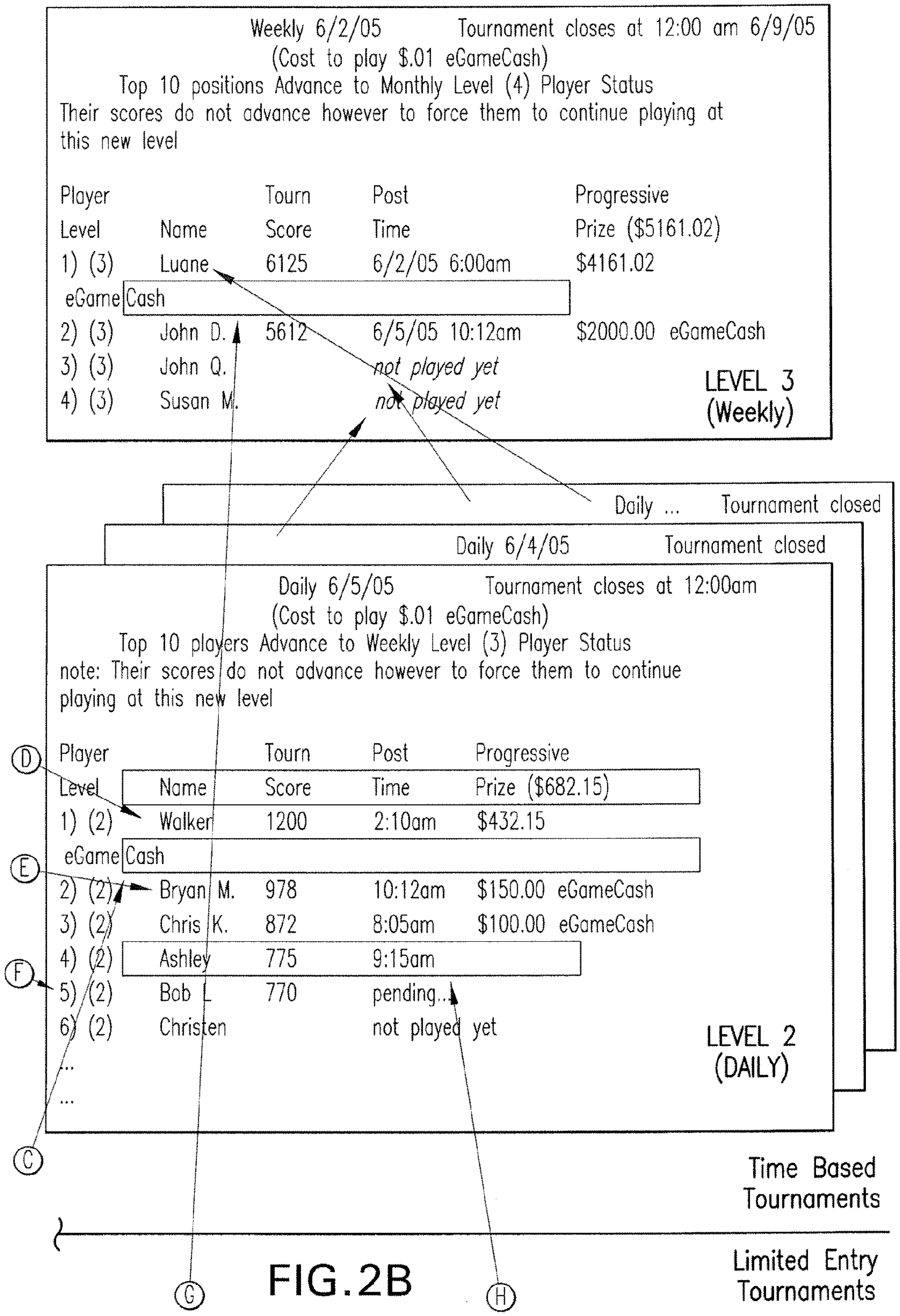
Figure 2C:
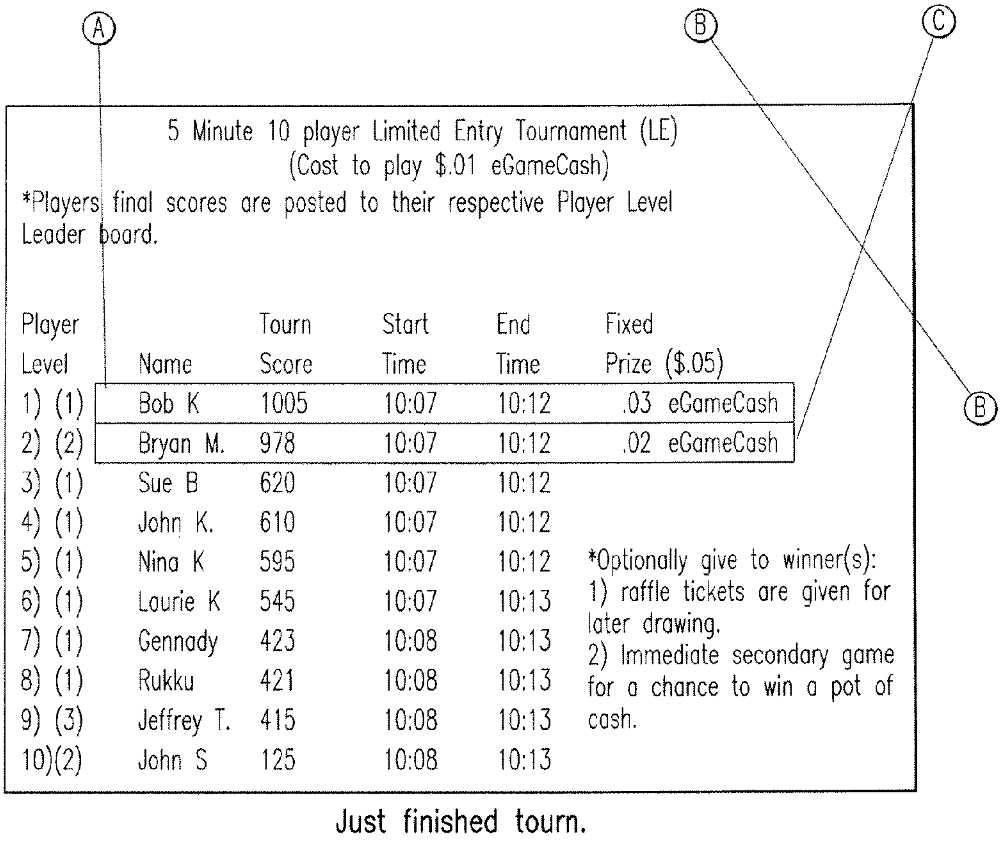
Figure 2D:
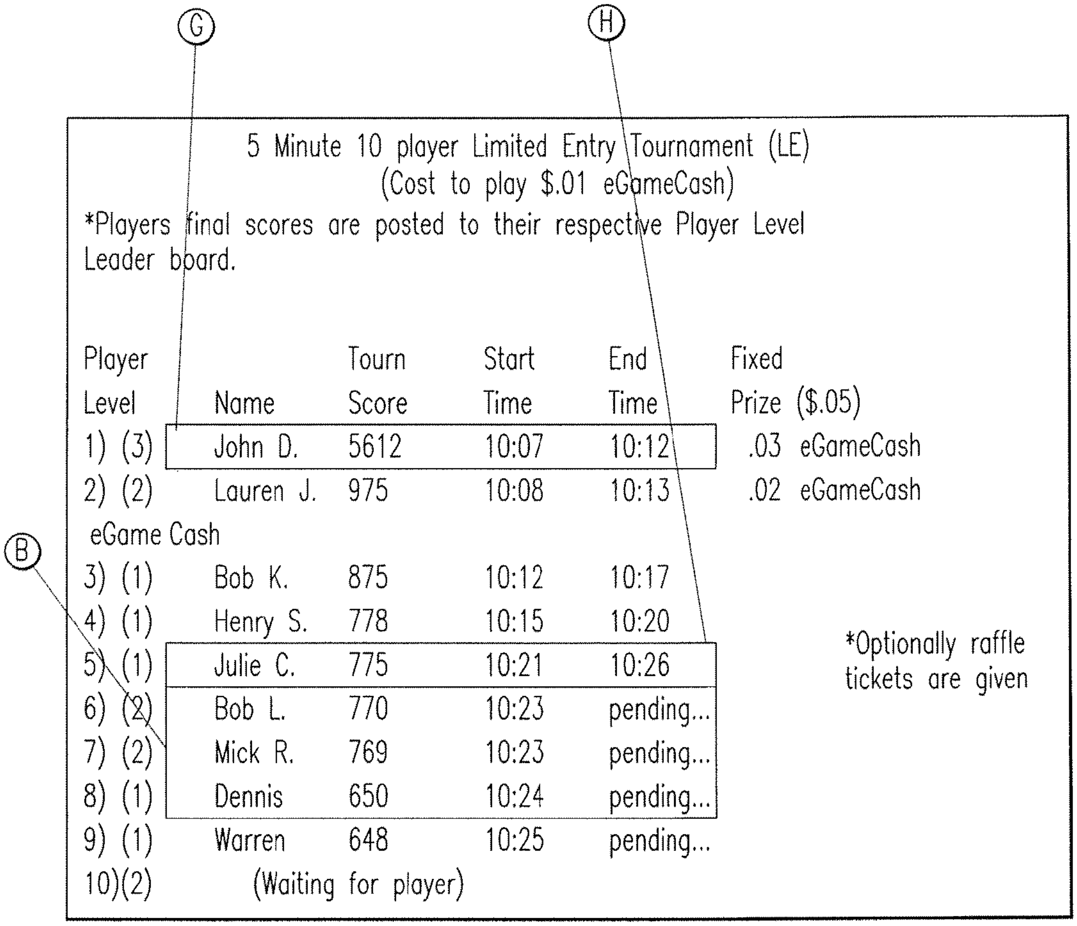

In one embodiment, a gaming server (140 in FIG. 1) performs as a tournament server that automatically communicates with the plurality of the gaming machines 200 to offer the current or potential player of each gaming machine 200 the opportunity to play in a tournament without leaving the gaming machine 200 being played and without having to discontinue regular play of that gaming machine 200. Thus, the offer leads to dual income and/or reward potential from a gaming machine 200 for a given period of time. The player plays his base game 202, and if the player chooses, he can enter a tournament at the same time and compete head to head with other players anywhere in the facility in which they are playing. Or, he can play in competition with players, in any other facility around the world, if the system is configured to do so through, e.g., a wide-area network 150. The players do not have to all start at the same time. Each player plays his base game 202 for a specific amount of time, the amount of money played, or the money won, or combinations thereof in order to generate a tournament score. The tournament servers 140 will group these factors dynamically against other players to create competition for prizes or merely entertainment. The tournaments can be provided for free using promotional funds or pay to play, which provides incremental income per unit time per square foot of the casino floor.

In one embodiment, a method for letting players know that they can, play a base game tournament is by use of the IVIEW interface 216. Alternate display devices can be used including, but not limited to, a second top box monitor on a gaming machine or a second window or frame in the base game display (204 in FIG. 1). The player is enticed to join a tournament using a gaming account by which the player is identified by insertion of a card into the card reader 212. Alternatively, other types of accounts or factors authorize play in a tournament. If the player chooses to enter a tournament by selecting a "begin tournament game" button on the IVIEW interface 216, then the player merely continues to play the base game 202 on the gaming machine 200 normally.

In one embodiment, a fee, if any, for the tournament game is deducted from the player's account. In one aspect of this embodiment, the fee to play a tournament game funds the tournament prize or other prizes as configured by the casino running the tournament. In one embodiment, a percentage of the wager amount is given back to the winners of the tournament, and a portion is kept by the casino as an operational management fee. In one embodiment, a player's tournament score is set to zero after the player begins the tournament.

In one embodiment, the tournament server 140 groups the player with other players automatically. In another embodiment, the player chooses which groups of players against whom to compete by selecting specific tournaments via a selection screen presented on the IVIEW interface 216.

In one embodiment, there is no sectioning off of the casino floor for tournament-enabled gaming machines 200 and non-tournament enabled gaming machines 200. On each gaming machine, a player plays the base game 202, as the player normally plays, by inserting enough money into the gaming machine 200 to begin play of the base game 202. A base game 202 is played, and each win per wager amount is accounted for by the tournament server 104 and/or the IVIEW interface 216 on the gaming machine 200.

In one embodiment, this data is processed into a tournament score by comparing what the player won verses what was expected to win for the machine on which the player was playing. In one example, and not by way of limitation, a base game 202 tournament score is normalized in the calculation that follows:

$1.00 wager on the base game

95% theoretical payout percentage for the base game.

Expected win amount: $0.95

Actual win amount: $1.65

$1.65/$0.95*Scaling factor=Tournament score for this last game.

In one embodiment, multiple scores are combined to a tournament score and relayed to other players in the tournament using a tournament score chat server 142. In one embodiment, the tournament score is relayed to the other participants of the tournament in real-time or periodically updated to create the competitive environment for the players. Each player's tournament score is posted at the end of his tournament time (for example: five minutes of base game play). At the completion of the tournament, the players are notified on their IVIEW interface 216 as to what their ranking is for the tournament and what any potential win may be. Consolation prizes may go to any number of players of the tournaments.

In one embodiment, no base game 202 reconfiguration is needed for a gaming machine 200 to participate in a tournament. There is no requirement that gaming machines 200 are dedicated to tournament use or have special high-return tournament-only pay schedules. In one embodiment, any gaming machine 200 in the casino can be used. In one embodiment, all the gaming machines 200 on the floor are capable of being played in tournament mode, even against other base games 202 with different parameters. These differences in parameters include, by way of example, and not by way of limitation, different theme games with different payout percentages, available denominations, different wager amounts, different pay tables, different volatilities, different bonus rounds, and the like. In one embodiment, the different parameters are normalized for the tournament by the scaling or waiting factor applied to each score described above.

In one embodiment, a player can perpetually play multiple tournament games and continue to post scores under one tournament identifier, which identifies a player in one or more tournaments. Playing in multiple tournament games tends to improve upon the player's standing in what in effect is a longer running tournament for the player. Alternatively, in one embodiment, a player has the option to post tournament scores using two or more completely different tournament identifiers to play as multiple players in multiple tournaments. In some embodiments, all or certain tournaments limit a player to a specific number of score postings in specific tournaments.

In one embodiment, as an alternative to the tournament play starting at the player's choosing, players choose to enter a tournament, and when a specific number of players have also entered the tournament, the tournament then begins. In this embodiment, the players wait until the tournament actually begins to play. However, while the players are waiting, they continue to play their base game 202 on their gaming machine 200 as normal. In one aspect of the embodiment, the tournament server 140 notifies all players automatically once the tournament start criteria (e.g., number of players entered) has been reached. All players then start at the same time. In other embodiments, other criteria for starting a tournament are time based (e.g., a specific start time) versus a fixed number of players.

In one embodiment, all players who have committed to spending money from their player card account for a specific tournament are considered eligible and thereby allowed to play in a tournament that starts at a specific date and time. An announcement is provided that a tournament is to begin at a particular time to those eligible to play on the additional user interface on the game machine 200 that they are playing (e.g., "Fifteen minutes until a new tournament begins"). In one embodiment, the tournament completes at a specific time. However, in another embodiment, the tournament finishes once a player achieves a specific score in what is called a "sprint" tournament.

In other embodiments there are other criteria for ending a tournament. For example, in one embodiment, only a specific amount of money can be played on the base game 202 or other platform, including the IVIEW interface 216, to create a tournament score. As such, in this embodiment, devices force a cash out of all base game 202 credits over a specific amount approved for the specific tournament play. In another embodiment, only a specific amount of credits or dollars can be spent on the base game 202 during a tournament period of time. This way, all players can only spend a specific amount of credits for a specific system tournament game versus an unlimited amount as in the preferred embodiment.

In some embodiments, lower ranking or lower scoring players are automatically eliminated from the tournament, freeing them to join another tournament. In another embodiment, a player is dropped from the tournament if he fails to achieve an intermediate tournament goal or score in a specific amount of time, because the chance that the player can win is negligible because of the tournament design.

In another embodiment, a player drops out of a tournament at the player's choice at any time. The player's points are optionally removed from the rankings entirely at that point or are frozen and retained in the rankings until the tournament period expires and final scores are tabulated. In one embodiment, the player loses his tournament entry fee in this scenario. In one embodiment, there is an optional short transition period at the beginning of the tournament where a player is allowed to leave the tournament without losing money.

In another embodiment, the tournaments are played around the clock with no casino staffing required. Even if a player is the only player, a tournament score accrual engine of the tournament controller server 140 creates a tournament score for the player and posts it to the proper tournament identifier in a table of scores in the database 160. Once a tournament time completes and a threshold number of tournament players are achieved, or other tournament concluding criteria are met, this score is judged against the others for the tournament prize. In one embodiment, using the wide-area network 150, a single player in one casino can compete head-to-head with other players in other casinos to create the sense of a tournament player community.

In one embodiment, tournament winnings are added to a winning player's account to allow replay of the winnings, cashing out, or redeeming for a prize at a later time. In one embodiment, a prize award may be automatically or manually paid by casino personnel who are notified of the win.

In one embodiment, a tournament begins as a "one-time" event. In another embodiment, the tournament is perpetually executed, depending on casino preferences. In one embodiment, tournament completion rate display indicators are provided to the players on the IVIEW interface 216 to project an expected tournament completion time. This is helpful for players in deciding if it is worth waiting for a tournament to close, or whether to return at a later time for tournament play. Players who want completion quickly should choose tournaments that have a short completion time.

In one embodiment, player-specific or group-specific messaging is provided to each player on the IVIEW interface 216, informing the player, for example and not by limitation, that the tournament is a daily tournament, and the player should keep trying to post more tournament scores to improve his chances of winning the tournament.

In one embodiment, hidden tournaments are executed by a tournament controller server 140. The player is offered, or up-sold, to post his score in a tournament he is playing to a hidden or non-hidden tournament after his current one is finished. A single tournament entry fee can allow this tournament score to be posted into several potential tournaments, each with their own prizes associated therewith. For example, a player scores 9,893 for the tournament the player enters. In this particular tournament, it is not a very good score, and the player does not win. In one embodiment, the tournament server 140 also enters the player into a tournament competing for the lowest score of the day tournament. The player could potentially win this tournament if his score is bad enough.

In one embodiment, on the additional user interface, a player is shown a player velocity meter and given a velocity bonus for a tournament score. If the player plays the base game 202 or a game executing on the tournament server 140 at a certain velocity, then a bonus is added. In one embodiment, the velocity is calculated for example, and not by way of limitation as follows: the games per unit time, money per unit time, or maximum bets per unit time.

In one embodiment, a player only wins a prize if the player is in the top few players at the end of the tournament. In another embodiment, the system awards other prizes for any number of players in the tournament. Examples are, and not by way of limitation: raffle and sweepstakes tickets. In another embodiment, a player wins prizes in the middle or at the end of the tournament for reaching certain tournament score thresholds. In an aspect of this embodiment, a tournament score-to-prize award lookup table in the database 160 is used for a different prize for each tournament score achieved. A partial sample record from the score-to-price lookup table is shown in table 12 below.

TABLE 12

Tournament Score to Event ID table: Event ID's will award a list of Prize ID's

| Tournament Score | Prize Award Event ID |
|---|---|
| >1,000 | 186 |
| 800 | 5 |
| 700 | 1 |
| 600 | — |
| . . . | |

In one embodiment, in order for a gaming machine 200 to be eligible for base game tournaments, it needs a player either playing or waiting to play the base game 202. In one aspect of this embodiment, credits are required on the base game 202 of the gaming machine 200. In one embodiment, a base game 202 on a gaming machine 200 is classified as idle based upon several rules, for example, and not by way of limitation: if no player is actively playing a game, if no credits are on the machine, if the gaming machine 200 is presently in "attract" mode providing lights and sounds, for example, in order to attract a player for a threshold number of minutes, and no player has played the base game 202, or of no player card is inserted. In contrast, in one aspect of this embodiment, a player is identified as eligible for the tournament according to rules that suggest a player is either playing or available at the gaming machine 200. For example, and not by way of limitation, the gaming machine 200 is checked for whether credits have been inserted. An announcement of an upcoming tournament is often sent to the gaming machine 200 if found eligible to entice the player to enter the tournament. Optionally, in one embodiment, if a gaming machine 200 is found to be sitting idle, the tournament controller server 140 sends an advertisement that a tournament is about to start to the idle gaming machine 200 in hopes of attracting a new player.

In one embodiment, players that do not have a play card for insertion into the card reader 214 or that do not otherwise have an account with the system (collectively "uncarded" players), are still allowed to play tournaments that will close in a short time, or that the rate of closure is fast enough to make it possible to reward the player at the gaming terminal if that player wins an award. This is because, for a player without an account with the system, his wins cannot be put into an account. In one embodiment, carded players and uncarded players (players who do have an account) are allowed to play free tournaments with or without a tournament prize. This helps encourage or "tease" the player to become a carded player to play for the tournament prizes.

In another embodiment, the casino floor is broken up into groups that can only compete with other groups or base games 202 identically or closely configured. In one aspect of this embodiment and for certain types of tournaments, it is required that in order to join the certain base game tournament, the players should be playing a certain base game 202 with a 94% hold percentage. In another embodiment, all game types that pay 96% or greater can join this tournament. In yet another embodiment, only skill base games 202 (such as, without limitation, "video poker") can join a tournament. In another embodiment, any way of breaking the gaming floor down into denominations, themes, groups of games, types of players, wager amounts, types of games, configurations of games, theoretical win percentages, volatility, and the like, is used to enable or disable different base games from joining a specific tournament. While the breaking down of the floor into smaller groups is not necessarily a preferred embodiment in all cases, however, in some causes, it is preferable to create trust in the player that he is competing on an even playing field with other players who are playing similar base games 202. Also, in one embodiment, casino-run promotions are used to advertise theme tournaments, for example, and not by way of limitation, a "Video Poker" tournament where any video poker game can join a tournament. In one embodiment, enabled machines are physically grouped on the casino floor for marketing and promotional reasons. The tournament servers 140 manage all of the tournaments and which gaming machines 200 and players are eligible to play against which other gaming machines 200 and players, removing the burden from the casino management, except at tournament configuration setup time.

In one embodiment, a player is allowed to buy more tournament time in some tournaments to improve the player's tournament score. By way of example, and not by way of limitation, after a five-minute tournament is completed, the player is provided with the option to purchase one more minute for $1.00 through their account. In one embodiment, maximum up-charges are able to be set for these types of tournaments.

Simulated Tournament Players

In one embodiment, the system simulates a number of players to meet the minimum gaming machine 200 requirement for a tournament. Simulation programs for players of games are known to those skilled in the art. For example, SIM-Earth® by Electronic Arts of Redwood City, Calif. and other popular games, including casino-based games, have used computer logic to simulate humans or game play. In one embodiment, the simulated players of the tournament play on behalf of the house, and should one of the simulated players win the tournament, the winnings are retained by the casino, or, for example, distributed to the top human player, or other distribution rules are used to distribute the winnings. In one embodiment, the simulated players and their scores are based on players who have played at previous times. This is implemented by an "instant close" tournament engine. The simulated players are used to tease a human player to create real time interaction even when the casino floor is very light and no one else is playing tournaments. Simulated players win and lose tournaments to create any desired competitive effect.

Tournament Score Formula Calculation

In one embodiment, each tournament has its own tournament score accrual formula. Also, each player has his own tournament score equation for each tournament he plays. In one embodiment, this formula is downloaded to the gaming machine, or calculated on the gaming server 140. For example, in one tournament, a two-player, ten-minute tournament base game 202 may use a different tournament score calculation than a five-minute, pyramid-style tournament (described below). Alternatively, in another embodiment, the tournament score is calculated based upon different types of players ("gold" and "silver" player club levels, and the like). In one embodiment, this dynamic modification of a tournament score formula occurs in the middle of a running tournament or an individual game in a tournament. The gaming systems auto-tune a tournament score calculation to get the desired entertainment effect. The change is effected between games, during individual games, or after a tournament concludes prior to a tournament of the same type beginning again. In one embodiment, the same game modifications, tournament score formulas, and game variables are given to all players in a specific tournament. In another embodiment, players use different sets of these parameters.

In one embodiment, any variable or meter that can be read from the base game can be used to construct a tournament score. In one embodiment, averages of multiple base game plays are used to smooth out the highs and the lows in a scoring methodology. The higher and lower base game plays are thrown out in order to normalize any statistical effect. In one embodiment, the tournament score formulas are designed to grow only upward to help encourage players to keep playing the base game if they want their tournament score to grow. In another embodiment, a tournament score formula is constructed such that the further the player is away from an expected payout for the player's wager amount and the theoretical win for this wager amount for the gaming machine 200, the larger the tournament score will be. For example, and not by way of limitation; if a player plays 100 base games in a row with no wins whatsoever on a 95% theoretical payout machine, then a tournament score could be very large even as compared to a player that has won more often on the same type of game machine with a 400% actual payout win over the tournament duration. A non-linear curve is shown as a non-limiting example in FIG. 35 that is used in one embodiment to map or normalize a theoretical to actual win ratio to a tournament score.

In other embodiments, other calculation techniques are used. In one example, and not by way of limitation, the player with the highest standard deviation from the expected return is given the highest tournament score. In another example, the score is calculated to give a player the best rate of change (acceleration) of actual vs. theoretical outcome of a higher score. In another embodiment, the tournament score calculation is a simple addition of the win from each game from one base game to the next, with or without a comparison to the expected return.

For some tournaments, the tournament scores are positive or negative for one individual in a group of players. Tournament scores are calculated based upon how a player is doing compared to another player or group of players. The player that does the best at the end of the tournament period of time wins the prize. Any combination of the above-described scoring techniques can be used.

Preferably tournament scores are calculated to maximize the play activity, the wager amount, the time on the machine, the entertainment effect, and to bring new monies into the casino. In one embodiment, the tournament score calculation normalizes the variations in the base game design including, without limitation: the denomination, the wager, the theoretical payout percentage, the game theme, the game win/lose volatility, the skill games vs. the chance games, the pay table variations, the bonus round variations, the wide-area progressive wins, the size of the wide-area progressive wins, and the like. This feature reduces or eliminates the need to section off the game floor to tournaments by the casino with same-type games. Any eligible player can play any base game 202 at anytime, and if the player selects and begins a base game tournament, the player can immediately play a tournament. The player selection to enter a tournament can occur on any display device, for example, the base game display 204. In one embodiment, selection is provided on the IVIEW interface 216 due to its touch screen capabilities.

In another embodiment, players are provided with a tournament score handicap, such as that in the game of golf. This helps to make a fair playing field especially with skill-based games or for low denomination versus high denomination players, since pay tables and theoretically payout percentage are typically higher for the latter of the two. In some embodiments, the handicaps are game, tournament, or player-specific to help create a fair tournament experience.

In one embodiment, a dynamic yield analysis engine in the tournament server 100 finds base games, games that execute on the IVIEW interface 216, or players that should be grouped into new available tournaments to create the optimal player excitement and revenue potential for the casino. In one embodiment, the grouping occurs automatically with no player interactions.

In another embodiment, each gaming machine 200 has a separate tournament point table maintained in the tournament server 140, an IVIEW interfaced 216, by which it evaluates each normal gaming machine wager and win and appropriately calculates tournament points for reporting to the tournament server 140 in a manner that provides an equal opportunity to accumulate tournament points to all tournament participants. In one embodiment, there is a game point to tournament score lookup table associated with each base game 140, so no real-time calculation of the tournament score needs to occur. In one embodiment, different tables are used for different games, themes, denominations, wager amounts, and the like.

In another embodiment, tournaments are formed in the backend server networks with player session data and/or gaming terminal data that is collected in a day in the casino as part of its player promotional processes and slot management processes, executing on the server 140, 180. This data collected is not necessarily real-time data. In one embodiment, it is collected nightly or at some other interval period of time. Players' base game 202 activity on gaming machines 200 is used to create tournament scores that are grouped in the tournament server 140 for competition.

In one embodiment, a tournament consists of a player's best five minute moving window in his entire play session. For example, if a player played for an hour and had a very low payout for most of the hour, but had one good five-minute window where payouts were high, then this slice of time is used for his tournament score post. This embodiment encourages players who just won big to replay much of their money back into the base game to "top off" their tournament score in order to help ensure that no one else can beat him in the tournament. In the player's mind, the player believes the player is playing with the casino's money so the more willing he is to spend a sizeable portion of the recent win to try to win big again.

As stated above, in one embodiment, different types of games, themes of games, denominations, game volatility, skill, chance, pay tables, optionally, each has their own tournaments. So far, in this embodiment, only Poker games compete head-to-head against other poker games due to the skill nature of the game. The negative side of this embodiment is that the size of the group of players shrinks as gaming machines 200 are subdivided into smaller groups. Thus, there is less chance that players compete against each other due to the smaller number of machines allowed to play in each group. Therefore, the tournament in many cases takes longer to complete or close. Accordingly, in one embodiment, it is preferred to have tournaments of fewer quantity, shorter duration, and smaller numbers of players to create a quick turnover.

In another embodiment, simultaneous tournaments execute on the same client or for the same player. For example, and not by way of limitation, in one embodiment, a player posts one base game score to multiple different tournaments at the same time. One option is to provide a player the choice to play in multiple tournaments or to do so without the player's choice. For example, a player plays a limited entry tournament against a small number of players in which the player can win a prize for that tournament. In addition, the player has the same tournament score posted to a daily tournament in an attempt to win another prize. As described above, one form of this embodiment involves entering a player into a tournament to achieve the highest win rate over an expected win rate, and to also enter the player into a tournament in which prizes are awarded to a player with the lowest actual win rate of return versus an expected rate of return. This way, even if the player loses the highest payout rate tournament, the player can still win in the other tournament. The player can pay for both with different wagers, or pay just once to play both tournaments. Alternately, one or more tournaments are paid for, and one or more tournaments are free.

In one embodiment, a tournament score for a period of time is calculated using all or a smaller group of individual wager/outcomes from each base game play. A single base game contribution to an overall tournament score is calculated in this embodiment as follows.

10000*(LastGameCashWON/LastGameCashWAGERED/PaytablePayoutPercent);

wherein "LastGameCashWON" is an amount won in the last game for cash that the player won, the "LastGameCashWAGERED" is the amount wagered in the last cash game, and "PaytablePayoutPercent" is the payout percentage for the player. In one example, with a base game 202 configuration, the following parameters apply:

$0.50 Denomination Machine

92% Theoretical win amount

The expected win can be calculated as follows:

$0.50 play*92%=$0.46 expected win

An example Sequence of base game plays on this base game configuration during a tournament is as follows:

First base game played on this base game configuration $1 wager, 2 credits played $0.50 win The single game tournament score contribution would be:

10,000*($0.50 win/$1 wager/92% theoretical win for this wager=5,385 tournament points.

Second base game played on this base game configuration:

$1 wager, 2 credits played $2.50 win

The single game tournament score contribution would be 10,000*($2.50 win/$1 wager/92% theoretical win for this wager=27,173 tournament points.

In one embodiment, the single game contributions are added to a score of the scores stored in the database 160 throughout the entire tournament time. Table 13 illustrates an example of a part record listing of the score table.

TABLE 13

Base Game # and Tournament Score contribution table.

| Base game # during tourn. | Single game contribution |
|---|---|
| 1 | 5,385 |
| 2 | 27,173 |
| 3 | 0 |
| ... | ... |

In one embodiment, the score table is ranked by sorting from highest score to lowest score. An alternative to storage in the database 160, is that the score table may be stored in the additional user interface 216. In another embodiment, the table is concatenated to a specific number of elements after ranking. For example, and not by limitation, only the top 10 individual scores are summed to build the tournament score shown to the player. In this embodiment, a score can range from 0 to approximately 1,000,000. The score is averaged for all 10 games and stored in the score table. This embodiment has the effect that one good game does not guarantee a top tournament score. A player needs to play many base game plays in order to ensure that the player is able to get 10 good individual base game contributions to the tournament score. In one embodiment, a player's score never goes down and can only improve as the player plays and achieves better wins on the base game 202. A skill-based game 202, such as a video poker game, in one embodiment changes a player's play technique depending upon what the player has achieved so far in the tournament. For example, the player will most likely not hold a pair of jacks if it is not going to improve the player's tournament score. In one embodiment, the tournament score formula is shown to the user in a "help" screen on the additional user interface 216 to help the player determine how to achieve the best possible tournament score.

In another embodiment, the tournament score formula is:

Tournament score=Weighting factor*(totalwager*theoretical hold %)+abs(totalwin−(totalwager*win %))

Wherein the "Weighting factor" is determined based on the skill required to play a base game; the "totalwager" is the total wager placed by a player; the "theoretical hold %" is the theoretical percentage of the player's wagers that should be retained by the house or casino during game play of the base game 202; "totalwin" is the total amount won by the player; and win percentage is the actual percentage won by the player.

In another embodiment, the highest instantaneous tournament score wins the tournament if the tournament score goes up and down throughout the tournament period or game play. The tournament server 140 records the peak tournament score in the score table that was achieved by a player in the tournament period, and this number is used for the competition. Also the player with the most single game tournament contributions over a certain score threshold wins the tournament prize. In another embodiment, the player with the highest sustained average of single game contributions over time wins the tournament.

In one embodiment, maximum threshold values are used in the tournament score calculation for the last base game played. For example, and not by way of limitation, in one embodiment, 100,000 points is the maximum amount of an individual single base game contribution to an overall tournament score. Even if a player had a huge win on a base game 202, it would not guarantee a tournament score that would win at the tournament conclusion time.

Tournament Score Weighting Factors

In some embodiments, other variables are combined with the tournament score calculation. Those other factors include, by way of example, and not by way of limitation, a skill game weighting factor; a number of games played weighting factor; a denomination weighting factor; a maximum bet weighting factor; a wager weighting factor; a player-type weighting factor; a tournament-type weighting factor; a pay table weighting factor; a game volatility weighting factor; the actual lifetime wager/win weighting factors; the progressive win weighting factors; the date/time weighting factors; the game theme weighting factors; a theoretical payout percentage weighting factor; a game location weighting factor; and the like. In one aspect of this embodiment, one or more of these weighting factors are added at any time for any specific tournament to create the fairest playing field as possible for the different types of players playing at different types of base games 202. In some embodiments, these weighting factors are fixed numbers, lookup tables, or formula based, in order to normalize or accentuate any type of gaming activity that the casino desires. For example, and not by way of limitation, a casino can have a tournament that gives a player more points if the player bets a maximum wager than if the player did not. The formulation above tends to normalize the denomination played by a player.

In one embodiment, the casino encourages the player to play $0.25 denomination machines or higher to get the best score. The casino gives a 10% advantage to players that play on those gaming machines 200. In another embodiment, games that have an element of skill use a weighting factor that is specific to the skill game played due to the nature of the skill and the difficulty of generating a fair tournament score against players playing on 100% random chance machines. The weighting factors are inserted into the final tournament score formulation mathematics at several times or locations. For example, and not by way of limitation, the weighting factors are inserted after each base game is played, or after a group of base games have been played, or after all base games have been played in the tournament. In one embodiment, these weighting factors are player specific; base game 202 specific; location specific: device specific; gaming machine 200 configuration specific; and in one embodiment, specific to a game played on the IVIEW interface 216.

In one embodiment, the tournament scores are inserted in real time with each single game contribution or with the combined tournament score calculations. These weighting factors can be added at the conclusion of the player's play or at the conclusion of the entire tournament.

In one embodiment, weighting factors may turn on or off at various times throughout the tournament period or when particular scoring thresholds have been achieved or not achieved. The weighting factors in one embodiment are of fixed value, linearly derived, or non-linear derived formulas or tables.

In one embodiment, the theoretical win percentage is for a maximum bet game only, or it is for each type of win in a pay table for each wager amount and for each denomination. In one embodiment, base games 202 are configured to only give the theoretical win for a maximum bet on a game play. More modern games or server side games can give the GMU 218 the detail required to calculate more accurate and fair tournament scores.

In some embodiments, different tournament calculation techniques include taking individual base game 202 contributions and calculating using different averaging techniques with prior wagers and wins, different summation techniques using probability mathematics, standard deviation/variance mathematics, or remapping them through a tournament score converter engine or look up table. In one embodiment, best and worst individual contributions are thrown out, or best or worst moving cluster if individual base game contributions are thrown out.

In one embodiment, individual base game contributions are not used at all. Alternatively, the entire cumulative wager/win for the entire tournament period is used instead. A goal of the tournament score formulation is to provide many possible scores in a range of for example, and not by way of limitation, 0-10,000,000. This gives fidelity of the number system to ensure everyone has a chance of beating the leader even if only by one point.

In another embodiment, tournament scores are calculated in real-time as the player plays, or after the player finishes playing in a background processing job done on the server or client. In yet another embodiment, tournament scores are pre-calculated prior to playing the actual game by using data collected on previous dates, times, or games played. Tournament scores are generated by combining several individual tournament scores or game scores into one final score for the tournament. Tournament scores from different types of tournaments or games are combined to form tournament scores, such as the Olympic decathlon event.

In another embodiment, each game has its own tournament score calculation formula to normalize it against the others it is playing against in this specific tournament. Alternatively, in another embodiment, each player has their own tournament score calculation for a specific tournament identifier in order to provide a fair playing field for players. For example:

Player #1 or Base game config #1=Use tournament score accrual method #1

Player #2 or Base game config #2=Use tournament score accrual method #2

Player #3 or Base game config #3=Use tournament score accrual method #3

In one embodiment, tournament scores calculation formulas are sent down to the gaming machine 200 for each base game 202 prior to the playing in the tournament or during or after play in the tournament. The formula may either reside in the IVIEW interface 216 or the base game 202.

The advantage of base game tournaments is that the base game code is already certified by regulators and approved for use on the casino floor. By actively monitoring several variables on the base game by the tournament server 140, the system derives a tournament score through mathematical manipulation of these base game wagers and wins. In one embodiment, no random generator is used to calculate the tournament score other than the already certified base game software. Thus, the gaming machine 200 is easier to approve in regulated markets, because there is no chance element in the calculation of the tournament score that is grouped with other tournament scores to determine a tournament winner. Thus, quicker regulatory approval in these jurisdictions can take place. In other embodiments, other game types are designed to calculate a winner using data collected from the base games.

In one embodiment, plasma screens throughout the casino show the current tournament leaders on them for the local facility and inter-site leader boards.

Players on the IVIEW interface 216 are teased with the pending tournament closings to encourage players to currently play in the remaining time of a tournament, the remaining entries, or prior to any other tournament end criteria.

In one embodiment, an alternative method of creating a tournament score for a base game 202 is performed wherein scores are created by a ranked list of recent five minute wagers/wins for that specific gaming machine, or identically configured games. For example, and not by way of limitation, the tournament server 140 keeps the last wins for each five-minute window of play, and sorts them in a ranked list. The score to be inserted has found a position in the ranking list, and the system calculates how far above and below the entry points are to the closest entries. The ratio of the distance between the two scores calculates the "ones" digit of the instantaneous tournament score. The first insertion point generates the rank used in the tournament score calculation. In one embodiment, the system uses a first-in-first-out method to remove old players on the ranked list.

Tournament Rooms

In one embodiment, different tournament rooms, tournament tables, or tournament identifiers are available to allow players to get together and play against a group of their friends if they so choose. In one example, a player sends messages or calls friends to go to the "Solitaire Babes" room so they can compete against each other even though they are not required to sit next to each other on the casino floor. This communal gaming creates a bond between the players, their friends, and the system. In one embodiment, players are able to create their own rooms and even make them access restricted in order to prevent unauthorized players from entering the room. In another embodiment, the casino has restricted rooms set up for specific players, groups of players, or types of players, in order to create a special gaming arena for special players. These rooms or tables for the players are provided for non-tournament games too. Typically the rooms or tables are setup and are game and mode specific. Players are given options for configuring the players that are allowed in their specific tournament rooms.

Types of Tournaments—Dynamic Grouping

As discussed above, several types of grouping takes place for tournaments according to one embodiment. The following list of tournaments and grouping types are used by this embodiment:

- Synchronized Tournament. Waits for five people to join, and then the tournament begins. Top scores wins the pots.
- Team Based Tournaments. Team A with five players plays against Team B with five players. The best, combined team score splits the pot. Teams with different numbers of players are allowed to compete for prizes. The tournament score calculation normalizes out the extra players scores.
- Co-Op tournament. Five people combine their gaming to one tournament score. This score is a house generated score, or the current top Co-Op score
- Conquest Tournament. Five vs. five players. The lowest players score after a round is eliminated. Then it is five vs. four players. Rounds continue until a team is eliminated. The last team standing collects the pot.
- Elimination. 10 players start. At the end of a round, the lowest score is eliminated. Then nine players are playing. The last player collects the pot.
- Time-based tournaments. There are an unlimited number of players for a fixed amount of time. Prizes are fixed or progressive, based upon a percentage of cost to play.
- Limited Entry tournaments. A fixed number of players post scores. Top players win prizes.
- Sprint Tournament. The first player(s) to achieve a specific tournament score wins. Merchandise tournaments—Merchandise or service types of prizes are used verses cash.

Other types of tournaments and player groupings include:

- The largest posted tournament score for a time period wins;
- Most money won or lost by any player in a time period wins;
- Most money played in a time period wins;
- Most or least tournaments won/lost in a day or other time period wins;
- Best cumulative tournament scores or average for a period or number of tournaments wins;
- Largest number of tournament scores of the day wins;
- Largest 10 or lowest 100 individual game tournament score contributions wins;
- Personal best tournament or personal worst tournament wins;
- Groups of players compete against each other for tournament prizes;
- Best number of minutes played in a tournament of the day wins; and
- If players are losing at a certain rate then they are grouped into a tournament automatically.
- Visiting tour group tournaments. A specific trade show group can all compete for a fixed list of prizes. The system monitors their play and performs statistical analysis for them to decide winners in a group.
- Players who play longer are grouped. For example, all players whose session time is over an hour in length are grouped.
- Highest winner of the hour or other time period. This is either the absolute dollar amount, the largest amount over an expected win amount, or the best tournament score achieved in the last hour.
- Players that play maximum bets on their base game 202 for a certain percentage of time are grouped.
- Players that play a specific denomination or average wager size are grouped into tournaments.
- Players that play at a specific rate of play are grouped. For example, fast poker players are grouped, because they are very skilled.
- Grouping players who play specific games titles.
- Grouping players who play certain clusters of games.
- Players who belong to a certain TYPE of group. For example, gold, silver, or platinum players. In one embodiment, this is calculated by player interval or game session ratings.
- Grouping players by skill level, or rank level per game.
- Grouping players automatically by time.
- Grouping players by demographic information provided by players or third parties about players. (e.g., age, race, sex, birthday, spouse name, anniversary date, and the like)
- Grouping players by what services the player likes or use.
- Grouping players by theoretical or actual payout percentage of the machines on which they are playing.
- Grouping by casinos.
- Grouping by types of players.

Grouping players with the most number of tournament score posts over a defined tournament score threshold.

Grouping players by their handicap level.

In one embodiment, a player can use the game play from multiple gaming machines 202 simultaneously contributing to a tournament score. For example, and not by way of limitation, a husband and wife can combine their play into a combined tournament score, or a player can play two or more base game 202 at the same time. The player identifier allows this linking of the two machines into one tournament score. If same card or account number is used on both gaming devices, or a player logs onto both gaming devices, then the player's combined gaming activity is monitored into a single tournament score.

In one embodiment, players are notified in the mail of a promotion for different types of players stating that when the players come to the casino next, they are going to be grouped and presented some type of game mode or tournament unique to them. These groups of players use special game features or different games because of the group to which they belong.

In one embodiment, a multiple overlapping tournament gaming system allows a player to post a score in one tournament, move on and play another, prior to the first one concluding. This way a player has many pending results at one time. The system automatically or manually configures the available tournaments to ensure that the right amount and types of tournaments are available in order to provide a player enough places to play and post a score. If there are too many, the tournament finish rate will not be fast enough. If too few, then there is a risk of a player not playing more if he has scores posted in all available types of tournaments that he likes. Dynamic Yield Analysis (DYA) helps auto-tune this capability in order to provide an optimal tournament velocity, turnover, and money spent playing.

In one embodiment, the tournament relay 140 relays in real-time tournament scores to various players in a particular tournament without burdening a separate system game server 140 with all of the transactions. As a player's score changes, the additional user interface 216 sends to the tournament score server the payer's score, the player's time left to play, the player's status, and other fields for identification and statistics on the player. The tournament score server forwards this information to only the players that are playing against each other, and/or any overhead displays in the casino for presentation to players. This is done by establishing a socket based connection with each particular IVIEW interface 216 in the specific tournament.

In some embodiments, other messaging technologies are used to communicate to the additional user interface and overhead displays, including XML messages, over web services. Periodically, each client sends this tournament data to the database server 140 at end the end of the player's specific game. After the tournament concludes the server 140 judges all of the posted scores and calculates the winners. This same engine can be used for chat and high score leader board capabilities as well as on the client devices.

In one embodiment, a "Chance or Luck Meter" is shown on the additional user interface 216 to indicate that a player can play in tournaments of varying types (e.g., gold players, a large number of players, a small number of players, time-based players, and the like). In one embodiment, a player is eliminated from the tournament and chooses to participate in a different upcoming tournament, wherein the player believes the chances are better. This chance meter provides the player an idea of how lucky the gaming machine 200 currently is. One advantage of this is that when the meter is low, the player can determine that the base game 202 is ready to go "hot," and to keep playing. If the meter is very high, the player can believe the gaming machine 200 is "hot," and he should keep playing. In some embodiments, this meter can take the form of a digital number, a linear gauge, a radial analogue "speedometer," a gauge or other gage that easily conveys the "luckiness" of the gaming machine 200 currently or averaged over several games.

The data used to calculate the Luck Meter is provided by the base game play, or a system game (run off the tournament server 140) played on the IVIEW interface 216. In one embodiment, the data used is the wager amount, the win amount, and the theoretical payout percentage for the entire pay table or each winning combination on a game. This data was collected by the GMU 218 from the base game through standardized protocols (discussed above) supported by gaming machines 200 on the casino floor. Alternatively, this data is collected by the back-end tournament or gaming server 140, accounting servers (shown as 180 in FIG. 1), and player tracking (casino marketing servers shown as 140 in FIG. 1), and calculated in the back end tournament servers 140 for presentation to the IVIEW interfaces 216 of the gaming machines 200.

Further, in one embodiment, a "Win Meter" is shown to the player to denote the player's frequency of winning tournaments.

In one embodiment, the IVIEW interface 216 presents a "pyramid tournament." The tournament includes a five-minute base game tournament played against eight other players. The overall goal of the pyramid tournament system is to encourage players to maintain the tournament level so they can play for increasingly larger prizes. The players want to have competition for a more immediate reward and at the same time post this same tournament score to a longer running tournament for a bigger prize. This technique will force players to keep coming back again if they want to keep moving up the pyramid.

In one embodiment of the pyramid-type tournament, the player has a level associated with their account. For simplification only, and by way of example, and not by way of limitation, in one embodiment, the levels include hourly, daily, weekly, and monthly tournament levels. A new player starts as an hourly tournament player. The overall goal of the pyramid tournament system is to encourage players to maintain their tournament level so they can play for increasingly larger prizes.

In one embodiment, players try to win a spot in the top 10 list of players for an hour's tournament. In order to post a score in the hourly tournament, players enter a five-minute limited mini-tournament. Players do so at any time and instantly begin playing. When a player selects the pyramid tournament game button to join, they are grouped with other players that are also trying to post scores for the multiple levels of tournament prizes. In one embodiment, all of the other scores displayed are players that recently finished their play (making a new player always the last entry or nearly the last player into the tournament). This is called an instant-close tournament engine run by the tournament server.

In another embodiment, 10 spots of a mini-tournament are populated with players as they start in real time, which could leave some tournaments undecided until the needed number of players has entered. In one embodiment, this mini-tournament will have five to ten entrants, and the winner will receive a small award for his play. This prize is, by way of example only, and not by limitation, raffle tickets, cash card reimbursements for further game play, or other prizes. In one embodiment, there is no prize awarded apart from a satisfaction by the player that he is a winner. In addition, in one embodiment, all players entering the mini-tournament have the opportunity to have their score posted into their player level specific tournament leader board. Any player's score that is high enough to make the top ten list for his individual level has his score added to that list.

Once a new player that has been playing for the hourly tournament is in the top 10 when the tournament ends, he is advanced to the next level daily. The players with the highest score win the hourly progressive pot. In one embodiment, this pot is distributed amongst multiple players in the top 10 or given entirely to the highest player only. Once a player has advanced to the daily level he is now able to participate in the daily tournaments, and all of his scores post there and optionally (casino configurable) down to lower levels. In one embodiment, a player remains a daily level player for as long as he continues to post scores in daily tournaments at least once every 365 days (casino configurable). In one embodiment, the player need not win a daily tournament in that time frame. He just has to play a mini-tournament and post a score. Even a losing score would renew the 365-day expiration time limit. If he fails to do this, he would drop back one or more levels and have to win at the lower level again before playing in daily tournaments.

In one embodiment, there are multiple levels for the player to climb through to reach the monthly level. The winners of the monthly level tournaments are invited back for a special yearly tournament with a large grand prize. Players may advance or fall back tournament levels for any marketing or mathematical reason the casino desires.

In one embodiment, a player has the player's five-minute tournament score posted to the current level the player is at as well as any of the levels lower than the current level. This way, a player has a chance to still win the hourly, daily, weekly, and monthly prizes if the player is a yearly level player. In other words, a specific tournament score can post downward as well. In this embodiment, if a player wins a lower level tournament prize even though the player is a higher level player, the player does not advance levels. Other players in the lower level advance however. For example, and not by way of limitation; a level four player with a tournament score of 85,321 posts this score to level one, two and three, as well as level four (the current player level). If the player wins the level one (hourly) then the player can win the level one prize, but the player doesn't advance from level four to level five because the player did not post a level four tournament score high enough to advance yet, or the level four tournament has not concluded yet.

In one embodiment, when players advance from one level to the next, they do not pass their score into that new level. This forces the player to come back again to post a score at that level generating a repeat visit. This prevents a great tournament score in one lower level from winning all levels up from the player's current level.

In one embodiment, a player plays with an alias, for example BK1832 verses the player's username assigned to the player card or account. In one embodiment, this name is randomly chosen. Also, a city, state and casino name are shown on the tournament standings board to create an inter-location or state rivalry. From home, in one embodiment, players create a username/password/pin/alias to access account data including tournament information as well as play from home where allowed by law.

In one embodiment, funding for prizes of the hourly, daily, weekly, and monthly tournaments come from the games played on the additional user interface. A portion of each $0.01 played by a player on a system is distributed to the different prize pots or pools. In one embodiment, other casino promotional funding of the progressive pots occurs.

In one embodiment, the casino is provided with several tools for configuring the pyramid tournament system. The casino is able to set up different levels of play, percentage of tournament entry fees that fund differing levels of tournaments; duration the player stays at a particular level before dropping down; the number of players that advance to the next level; the progressive increment rates for each level's progressive pots and contribution events; the length of time for the tournament; the minimum level of activity by the player; the minimum tournament score achieved at specific times to continue; and whether or not tournament scores post downward as well as to the player's current level.

With reference to FIGS. 2A-2D, block diagram illustrate a server 140 side player level advancement process. In one embodiment, players of different levels compete in limited entry five-minute base games tournaments for a prize. Each player's tournament score is posted to the level of progressive games that he is playing at the time for a chance to win at that prize level.

Figure 3A:
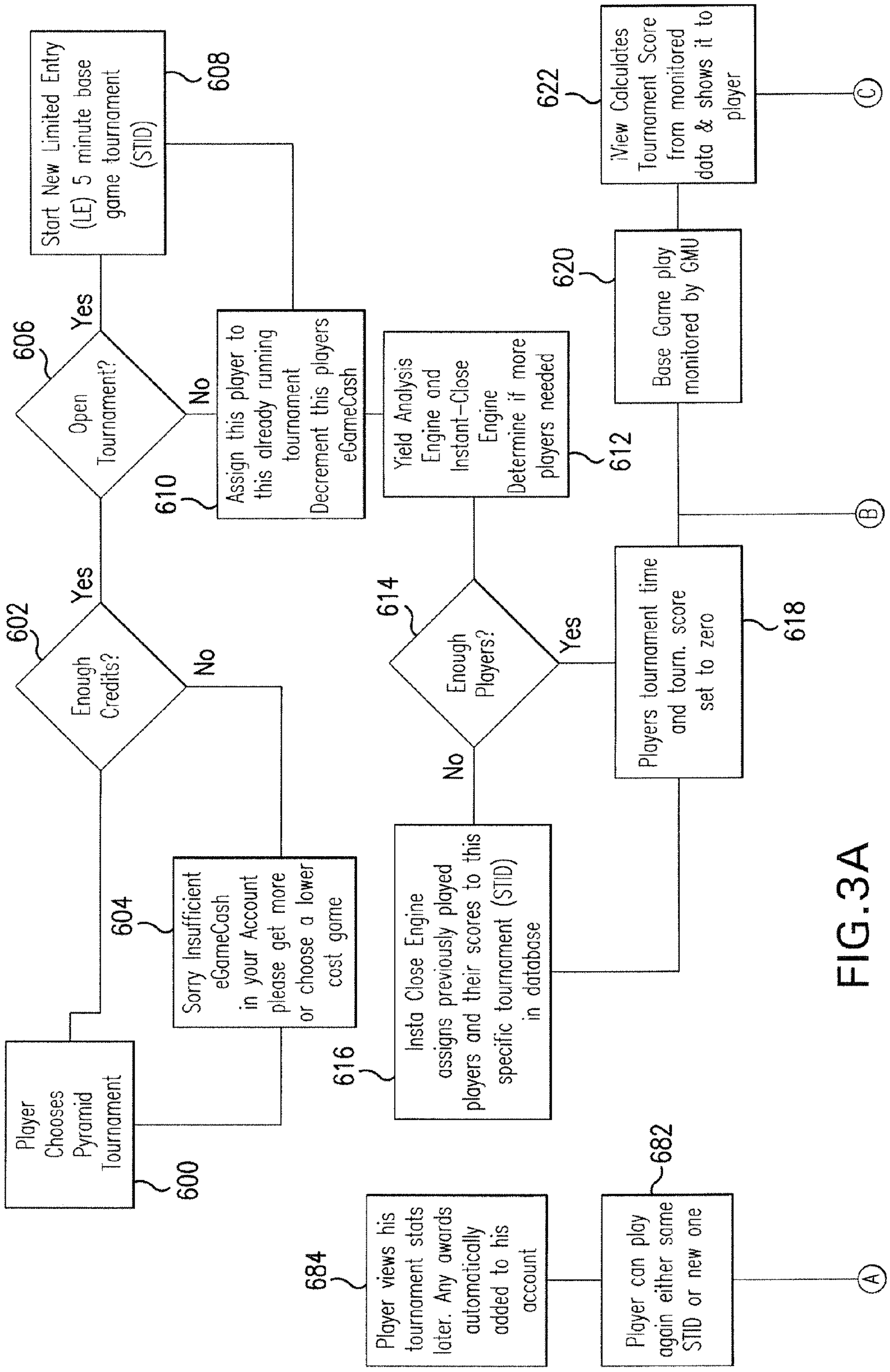
FIGS. 3A-3C are flow diagrams that illustrate the steps performed in the system to conduct a pyramid tournament according to one embodiment.
Figure 3B:
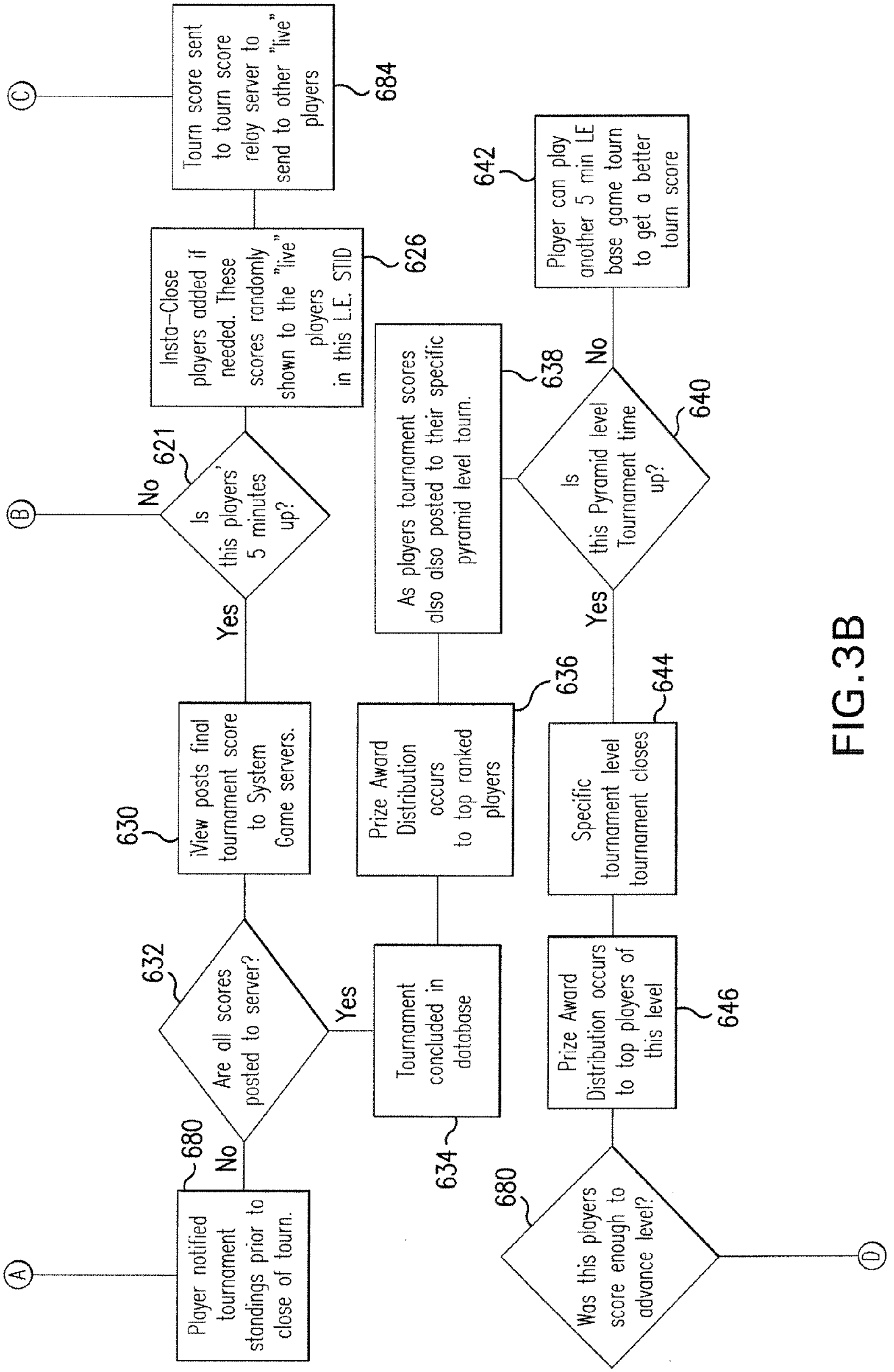
Figure 3C:
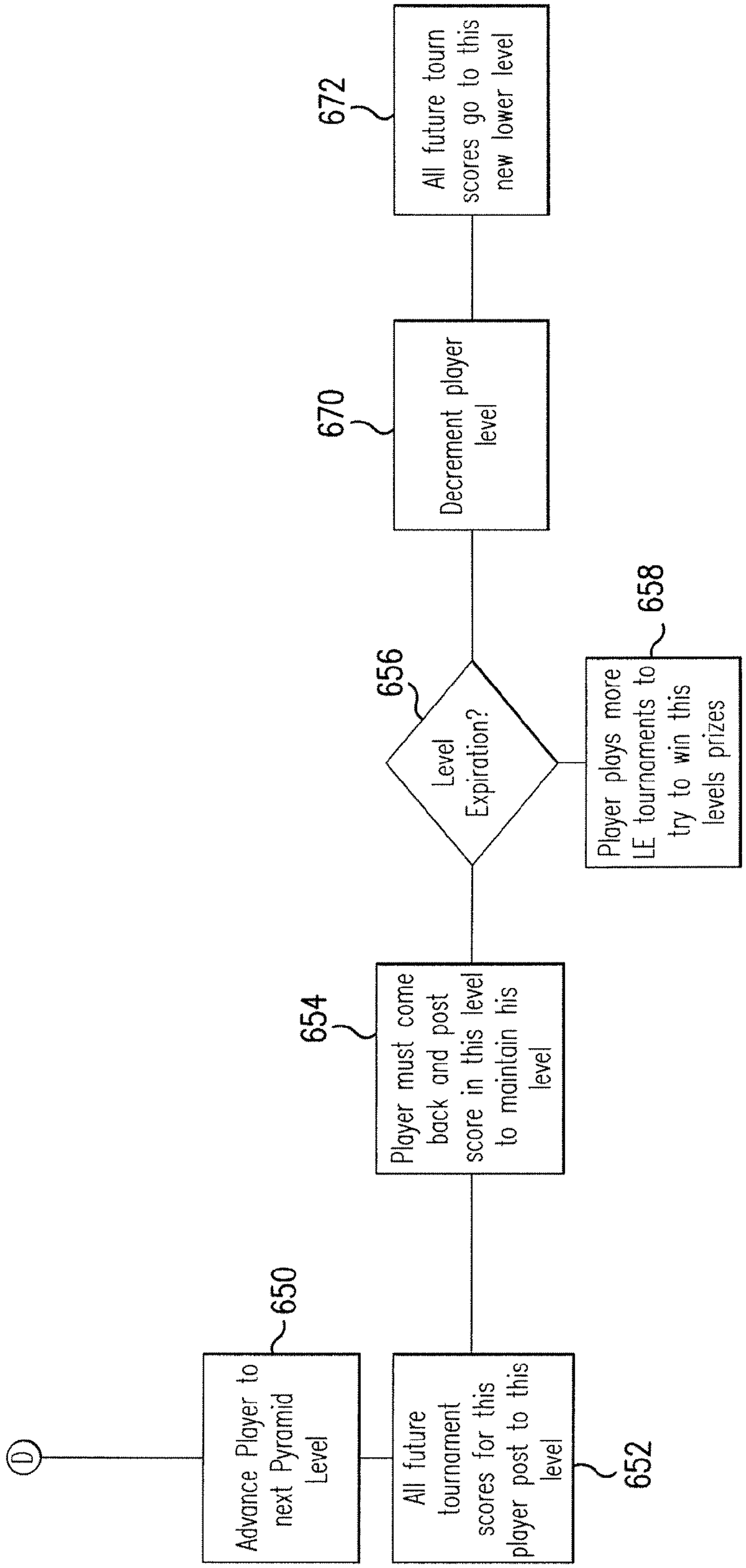

With reference to FIGS. 3A-3C, a flow diagram illustrates the steps performed in the system to conduct the pyramid tournament according to one embodiment. At step 600, a player chooses to play a pyramid tournament. At step 602, the tournament server checks for whether the player has enough credits to play. If not, an "insufficient funds" message is displayed at step 604. Otherwise, in step 606, the player is provided the opportunity to open a new tournament. If the player chooses to do so, then a new limited entry tournament is opened, step 608. Otherwise, the player is assigned to a tournament that is already running, and his account is decremented, step 610. The tournament server determines if more players are needed for the tournament, step 612. If there are not enough players, step 614, then an instant-close-engine in the tournament server assigns simulated players to the tournament, as described below, step 616. The player's time in the tournament and score are set to 0, step 618. Base game play is monitored, step 620, and the score is calculated, step 622. The tournament score is sent to the relay server 142 for forwarding to other players, step 624. If needed, more simulated players are added, step 626, whose scores are shown to all the players along with the human players.

The system checks for whether the player's time in the tournament is up, step 628. If not, the play continues at step 620. If his time is up, the additional user interface posts his final score, step 630. The system checks for whether all scores have been posted, step 632. If so, then the tournament is concluded in the database 160, step 634. A prize award occurs to the top ranked players, step 636. All of the players' tournament scores are posted to their specific pyramid level, step 638.

The system next checks for whether the pyramid tournament time is up for the player's specific tournament level, step 640. If not, then the player can play another 5 minutes to attempt to achieve a better score, step 642. Otherwise, if the time for the specific tournament level is up, then the specific tournament level closes, step 644. A prize award distribution for the specific level occurs, step 646.

Next, in step 648, it is determined whether a player's score was good enough to advance the player to a new level in the pyramid. If so, the player is advanced to the next pyramid level, step 650, and all future scores for the player post at the new level, step 652. In one embodiment, the player is required to return and play at the new level periodically in order to maintain the level, step 654. The system checks for whether the level has expired for that player, step 656. If not, then the player continues to play at the new level, step 658. Otherwise, if the level did expire for the player due to the player's failure to periodically play the tournament, then the player is decremented a level, step 670.

With reference back to step 632, of all of the scores were not posted to the server for the tournament played by the player, the player is notified of tournament standings, step 680, and given the opportunity to play in the same or another tournament, step 682. Later, the player can again view his standings or statistics for the tournament, and any prizes are automatically awarded to the player's account after the tournament ends.

Instant Close Tournaments

In one embodiment, an instant close tournament engine (ICTE) allows for an immediate or near immediate conclusion of a tournament game for a specific player. In one embodiment, this embodiment is used with a limited entry tournament having a fixed number of players playing for a prize, but it can alternatively work on other types of tournaments. Normally when a player starts a limited entry tournament, the player can be anywhere from the first through last player to play up to the maximum allowed number of players for the specific tournament. The player does not necessarily know what number of player he is prior to starting the tournament. For example, when a player is joining a ten-player tournament and he is the first to ninth player to play, the player normally must wait for the last player to post a score in this specific tournament. The time to complete a tournament is unknown by the first through ninth players. No one else may choose to play this specific tournament for another minute, an hour, a day or longer. This uncertainty to the conclusion of the tournament creates player dissatisfaction.

Figure 4:
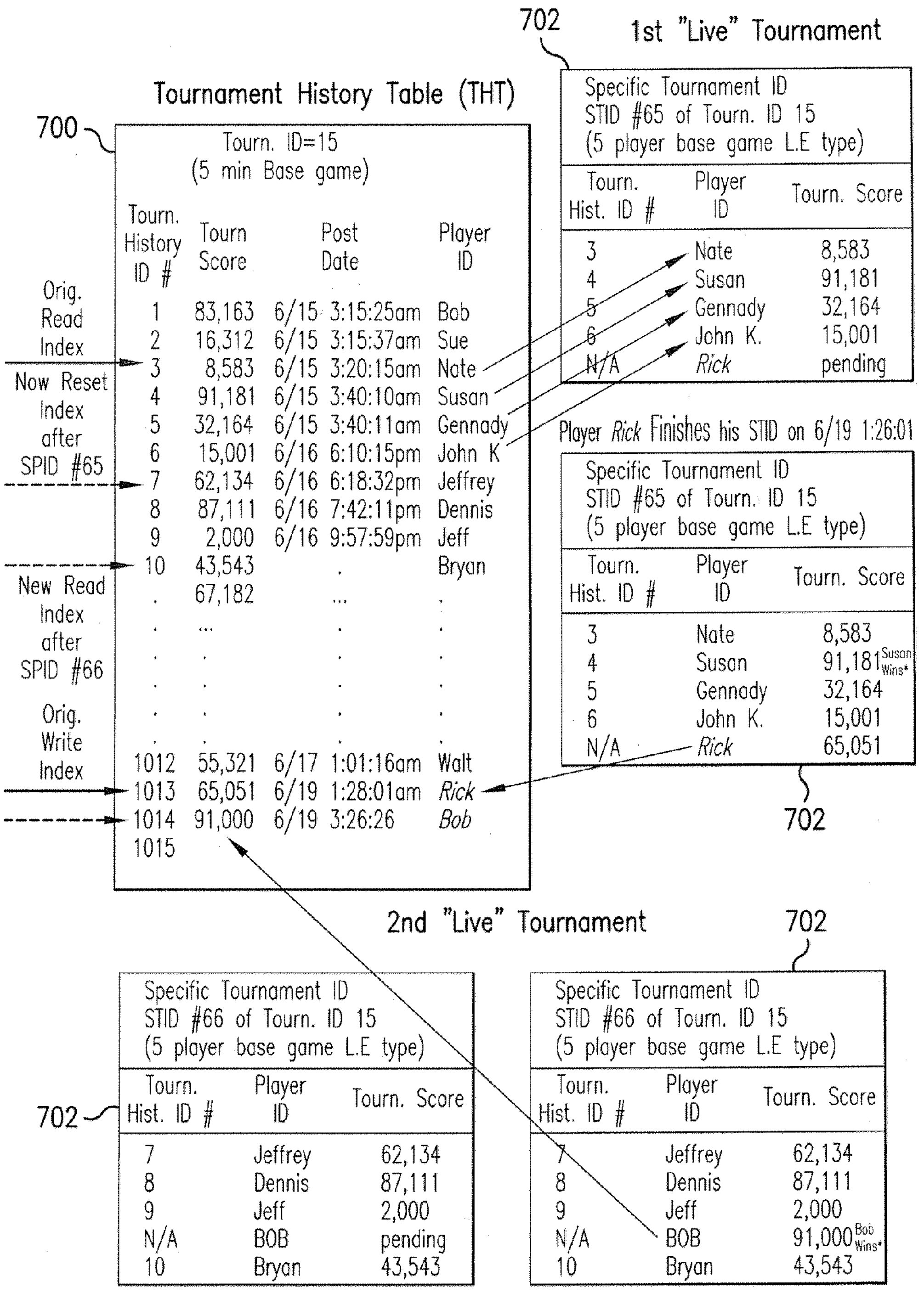
FIG. 4 is a block diagram that illustrates data flow in a method for providing an instant close tournament according to one embodiment.

With reference to FIG. 4, a block diagram illustrates data flow in a method for providing an instant close tournament according to one embodiment. The ICTE executes in the tournament server (140 in FIG. 1) and uses tournament scores posted by other tournament players at an earlier time to more quickly conclude the currently running tournament. In the ten-person limited entry example tournament discussed above, if the player is the tenth player, then the player's score is grouped by the tournament server 140 against nine other players who played previously. The tournament server dynamically groups the player's tournament score against others who are playing identical tournaments. The ICTE keeps track of all tournament scores posted for all tournament games 702 for each specific type of tournament ordered by date played in a tournament history table 700 in the database (160 of FIG. 1). These are the scores that are used by the ICTE to "fill out" the specific tournament to help end the tournament for the player who just started.

This filling out process can take many forms. In one embodiment, the ICTE pre-fills all tournament positions prior to the player seeing his score on the ranked list of tournament scores. This way, the player is always the last one to enter the limited entry tournament 702. Alternatively, in another embodiment, the ICTE fills out the specific tournament 702 randomly or in some order fashion to emulate many players simultaneously playing the specific tournament 702.

There is a scenario where there are so many limited entry tournaments 702 that are started that there are not enough prior tournament scores in the ICTE tournament history database table 700 to complete the newly started L.E. tournament. In one embodiment, the ICTE loops back around in the tournament history table 700 using an index pointer to keep track of tournament scores that are delivered from the ICTE engine to the next specific tournament 702.

In one example according to one embodiment, a player "Rick" starts a new tournament on the date 6/19 at 1:23:01. The casino floor is very light, and very few people are playing tournaments, so the tournament servers 140 or tournament engine pulls names from the tournament history table 700 to help "fill-out" Rick's tournament. The tournament engine uses a current read index associated with the tournament history table 700 and begins drawing names and scores out of the tournament history table 700 in order to assign them to the tournament 702 that Rick had started, as shown by the arrows in FIG. 7. Rick now has players to compare against his score. If during this time a "real" player chooses to play the same tournament as Rick, there will be one less "simulated" player and score to fully fill the tournament.

In one embodiment, the ICTE allows the player to design his own tournament 702. By way of example, and not by way of limitation, options for the player are: How many players he wants to compete against, how much the tournament costs, game specific settings, type of prizes, and the like. Game specific options, include, by way of example, and not by way of limitation, individual base game tournament time or the number of levels or rounds of the game.

In one embodiment, a player's tournament score is grouped and ranked against other players that created similar tournaments 702. When a player who paid for the specific tournament 702 finishes the tournament 702, the score, time, and the player's player identifier are inserted into the tournament history table 700. The player's tournament score is also posted to his specific tournament record in the table 700. If the player wins his tournament, then the player is awarded any associated award. In one embodiment, players from which the ICTE drew scores from the tournament history table 700 do not win a prize even if their scores win the current tournament 702.

In one embodiment, the ICTE alternatively executes in the IVIEW interface 216. A list of recent scores and player names stored in the IVIEW interface 216 is used. In one embodiment, the names of players used by the ICTE are blocked and/or replaced with alternate names drawn from a list of names, or randomly chosen names. This is to prevent players from seeing the name of a friend or family member during the tournament. Scores and locations are used in one embodiment instead of names and scores.

In one embodiment, a player is shown an indicator on the IVIEW interface 216 that tells the approximate time left until the tournament concludes. In one embodiment, the display is calculated by the tournament servers 140 by analyzing the current closure rate of the tournaments 702. Various other data from a yield analysis or player marketing databases is used to approximate the time until each tournament 702 will close. This gives the player some guidance as to whether or not to wait to see the close of the tournament 702 or return at a later time. Also, the player can use this information to decide whether this is a tournament 702 the player would like to enter now or choose another that may close sooner. In one embodiment, each tournament 702 has an associated tournament velocity indicator to let the player choose an appropriate one for him.

Plasma Sign Messaging for Tournament Leaders

In one embodiment, there are at least four messages that are sent to a plasma display controller for a casino plasma display for a tournament. These messages allow the plasma signs to show tournament leaders, and prizes for the tournaments. Message protocols for display controllers or other servers are used as necessary for the particular casino's requirements. The messages used in this embodiment are:

1) TournamentWinStartNoStopNeeded.xml;
2) TournamentWinStop.xml;
3) TournamentLeaderboardUpdate.xml; and
4) TournamentWinStart.xml.

In one embodiment, the TournamentWinStartNoStopNeeded.xml message has the following structure:

```
<?xml version="1.0" encoding="UTF-8"?>
<Signage xmlns:xsi="http://www.w3.org/2001/XMLSchema-instance" xsi:noNamespaceSchemaLocation="BGSSignMessage.xsd"
Checksum="0000">
    <Envelope>
        <Source MessageID="151" Name="Tournament Win" LocationID="TOURN100"/>
        <TimeStamp SourceTimeUTC="2005-04-21T16:18:00Z"/>
        <Delivery DeliveryReceipt="false" SecureLog="true"/>
    </Envelope>
```

-continued

```
<Payload>
        <Target Name=“TOURN001WIN” Type=“OneShotTrigger”/>
        <Command Name=“Start” DataAction=“Overwrite”/>
        <Records FieldCount=“8”>
                <FieldDefs Name=“TournamentID” KeyField=“false” Type=“Text” MaxLen=“10” />
                <FieldDefs Name=“TournamentName” KeyField=“false” Type=“Text” MaxLen=“50”/>
                <FieldDefs Name=“CurrentPot” KeyField=“false” Type=“Text” MaxLen=“20”/>
                <FieldDefs Name=“TournamentClosingDateTime” KeyField=“false” Type=“Text” MaxLen=“20”/>
                <FieldDefs Name=“EntryNumber” KeyField=“true” Type=“Number” MaxLen=“4” DefaultVal=“0”/>
                <FieldDefs Name=“Name” KeyField=“false” Type=“Text” MaxLen=“10”/>
                <FieldDefs Name=“Score” KeyField=“false” Type=“Number” MaxLen=“9”/>
                <FieldDefs Name=“Win” KeyField=“false” Type=“Text” MaxLen=“20”/>
                <Record>
                        <Field Name=“TournamentID” Value=“100”/>
                        <Field Name=“TournamentName” Value=“Hourly Pyramid Tournament”/>
                        <Field Name=“CurrentPot” Value=“150.50”/>
                        <Field Name=“TournamentClosingDateTime” Value=“2005-09-21T16:00:00Z”/>
                        <Field Name=“EntryNumber” Value=“1”/>
                        <Field Name=“Name” Value=“Player1”/>
                        <Field Name=“Score” Value=“235000”/>
                        <Field Name=“Win” Value=“10,000”/>
                </Record>
        </Records>
<Payload>
</Signage>
```

In one embodiment, the TournarnentWinStop.xml message has the following structure:

```
<?xml version=“1.0” encoding=“UTF-8”?>
<Signage xmlns:xsi=“http://www.w3.org/2001/XMLSchema-instance”
xsi:noNamespaceSchemaLocation=“BGSSignMessage.xsd”
Checksum=“0000”>
        <Envelope>
                <Source MessageID=“151” Name=“Tournament Win”
                LocationID=“TOURN100”/>
                <TimeStamp SourceTimeUTC=
                “2005-04-21T16:18:00Z”/>
                <Delivery DeliveryReceipt=“false”
```

-continued

```
                SecureLog=“true”/>
        </Envelope>
        <Payload>
                <Target Name=“TOURN001WWIN”
                Type=“RecurringTrigger”/>
                <Command Name=“Stop”
                DataAction=“Overwrite”/>
        </Payload>
</Signage>
```

In one embodiment, the TournamentLeaderboardUpdate.xml message has the following structure:

```
<?xml version=“1.0” encoding=“UTF-8”?>
<!-- edited with XMLSpy v2005 rel. 3 U (http://www.altova.com) by lan P Finnimore (Bally Gaming + Systems) -->
<Signage xmlns:xsi=“http://www.w3.org/2001/XMLSchema-instance” xsi:noNamespaceSchemaLocation=“BGSSignMessage.xsd”
Checksum=“0000”>
        <Envelope>
                <Source MessageID=“150” Name=“Tournament Leader Board Update” LocationID=“TOURN100”/>
                <TimeStamp SourceTimeUTC=“2005-04-21T16:18:00Z”/>
                <Delivery DeliveryReceipt=“false” SecureLog=“true”/>
        </Envelope>
        <Payload>
                <Target Name=“TOURN001LEADER” Type=“DataTable”/>
                <Command Name=“Update” DataAction=“Overwrite”/>
                <Records FieldCount=“7”>
                        <FieldDefs Name=“TournamentID” KeyField=“false” Type=“Text” MaxLen=“10”/>
                        <FieldDefs Name=“TournamentName” KeyField=“false” Type=“Text” MaxLen=“50”/>
                        <FieldDefs Name=“CurrentPot” KeyField=“false” Type=“Text” MaxLen=“20”/>
                        <FieldDefs Name=“TournamentClosingDateTime” KeyField=“false” Type=“Text” MaxLen=“20”/>
                        <FieldDefs Name=“EntryNumber” KeyField=“true” Type=“Number” MaxLen=“4” DefaultVal=“0”/>
                        <FieldDefs Name=“Name” KeyField=“false” Type=“Text” MaxLen=“10”/>
                        <FieldDefs Name=“Score” KeyField=“false” Type=“Number” MaxLen=“9”/>
                        <Record>
                                <Field Name=“TournamentID” Value=“100”/>
                                <Field Name=“TournamentName” Value=“Hourly Pyramid Tournament”/>
                                <Field Name=“CurrentPot” Value=“150.50”/>
                                <Field Name=“TournamentClosingDateTime” Value=“2005-09-21T16:00:00Z”/>
                                <Field Name=“EntryNumber” Value=“1”/>
                                <Field Name=“Name” Value=“Player1”/>
                                <Field Name=“Score” Value=“235000”/>
                        </Record>
                        <Record>
                                <Field Name=“TournamentID” Value=“100”/>
                                <Field Name=“TournamentName” Value=“Hourly Pyramid Tournament”/>
                                <Field Name=“CurrentPot” Value=“150.50”/>
```

-continued

```
                    <Field Name="TournamentClosingDateTime" Value="2005-09-21T16:00:00Z"/>
                    <Field Name="EntryNumber" Value="2"/>
                    <Field Name="Name" Value="Player2"/>
                    <Field Name="Score" Value="205000"/>
                </Record>
                <Record>
                    <Field Name="TournamentID" Value="100"/>
                    <Field Name="TournamentName" Value="Hourly Pyramid Tournament"/>
                    <Field Name="CurrentPot" Value="150.50"/>
                    <Field Name="TournamentClosingDateTime" Value="2005-09-21T16:00:00Z"/>
                    <Field Name="EntryNumber" Value="3"/>
                    <Field Name="Name" Value="Player3"/>
                    <Field Name="Score" Value="185000"/>
                </Record>
                <Record>
                    <Field Name="TournamentID" Value="100"/>
                    <Field Name="TournamentName" Value="Hourly Pyramid Tournament"/>
                    <Field Name="CurrentPot" Value="150.50"/>
                    <Field Name="TournamentClosingDateTime" Value="2005-09-21T16:00:00Z"/>
                    <Field Name="EntryNumber" Value="4"/>
                    <Field Name="Name" Value="Player4"/>
                    <Field Name="Score" Value="87000"/>
                </Record>
                <Record>
                    <Field Name="TournamentID" Value="100"/>
                    <Field Name="TournamentName" Value="Hourly Pyramid Tournament"/>
                    <Field Name="CurrentPot" Value="150.50"/>
                    <Field Name="TournamentClosingDateTime" Value="2005-09-21T16:00:00Z"/>
                    <Field Name="EntryNumber" Value="5"/>
                    <Field Name="Name" Value="Player5"/>
                    <Field Name="Score" Value="108000"/>
                </Record>
            </Records>
        </Payload>
</Signage>
```

In one embodiment, the TournamentWinStart.xml message has the following structure:

```
<?xml version="1.0" encoding="UTF-8"?>
<Signage xmlns:xsi="http://www.w3.org/2001/XMLSchema-instance" xsi:noNamespaceSchemaLocation="BGSSignMessage.xsd"
Checksum="0000">
        <Envelope>
            <Source MessageID="151" Name="Tournament Win" LocationID="TOURN100"/>
            <TimeStamp SourceTimeUTC="2005-04-21T16:18:00Z"/>
            <Delivery DeliveryReceipt="false" SecureLog="true"/>
        </Envelope>
        <Payload>
            <Target Name="TOURN001WWIN" Type="RecurringTrigger"/>
            <Command Name="Start" DataAction="Overwrite"/>
            <Records FieldCount="8">
                <FieldDefs Name="TournamentID" KeyField="false" Type="Text" MaxLen="10" />
                <FieldDefs Name="TournamentName" KeyField="false" Type="Text" MaxLen="50"/>
                <FieldDefs Name="CurrentPot" KeyField="false" Type="Text" MaxLen="20"/>
                <FieldDefs Name="TournamentClosingDateTime" KeyField="false" Type="Text" MaxLen="20"/>
                <FieldDefs Name="EntryNumber" KeyField="true" Type="Number" MaxLen="4" DefaultVal="0"/>
                <FieldDefs Name="Name" KeyField="false" Type="Text" MaxLen="10"/>
                <FieldDefs Name="Score" KeyField="false" Type="Number" MaxLen="9"/>
                <FieldDefs Name="Win" KeyField="false" Type="Text" MaxLen="20"/>
                <Record>
                    <Field Name="TournamentID" Value="100"/>
                    <Field Name="TournamentName" Value="Hourly Pyramid Tournament"/>
                    <Field Name="CurrentPot" Value="150.50"/>
                    <Field Name="TournamentClosingDateTime" Value="2005-09-21T16:00:00Z"/>
                    <Field Name="EntryNumber" Value="1"/>
                    <Field Name="Name" Value="Player1"/>
                    <Field Name="Score" Value="235000"/>
                    <Field Name="Win" Value="10,000"/>
                </Record>
            </Records>
        </Payload>
</Signage>
```

IVIEW Interface System Gaming Platform

Figure 5A:
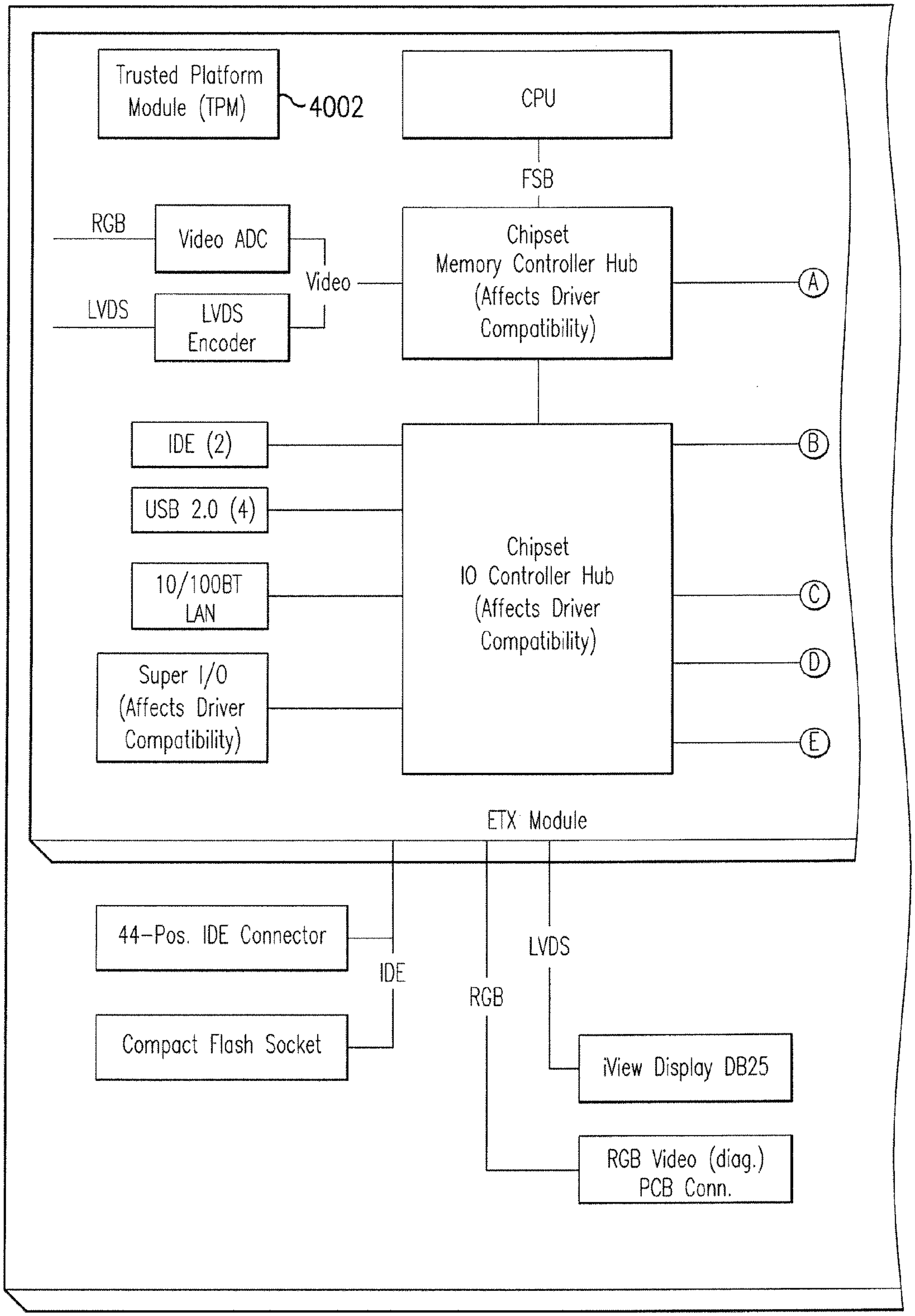
FIGS. 5A-5C are block diagrams illustrating components of a circuit board containing a unified additional user interface and game monitoring unit for a gaming machine according to one embodiment.
Figure 5B:
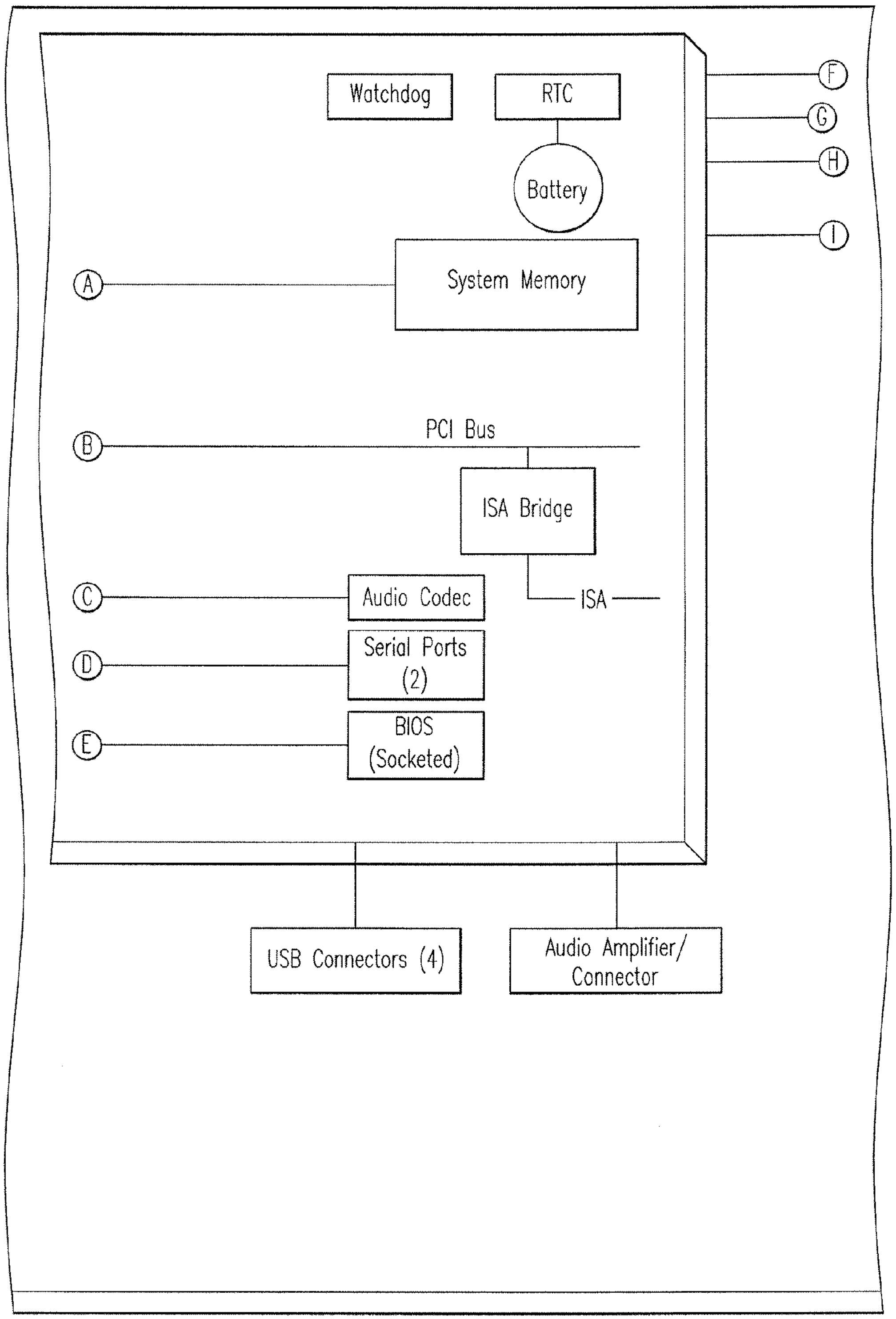
Figure 5C:
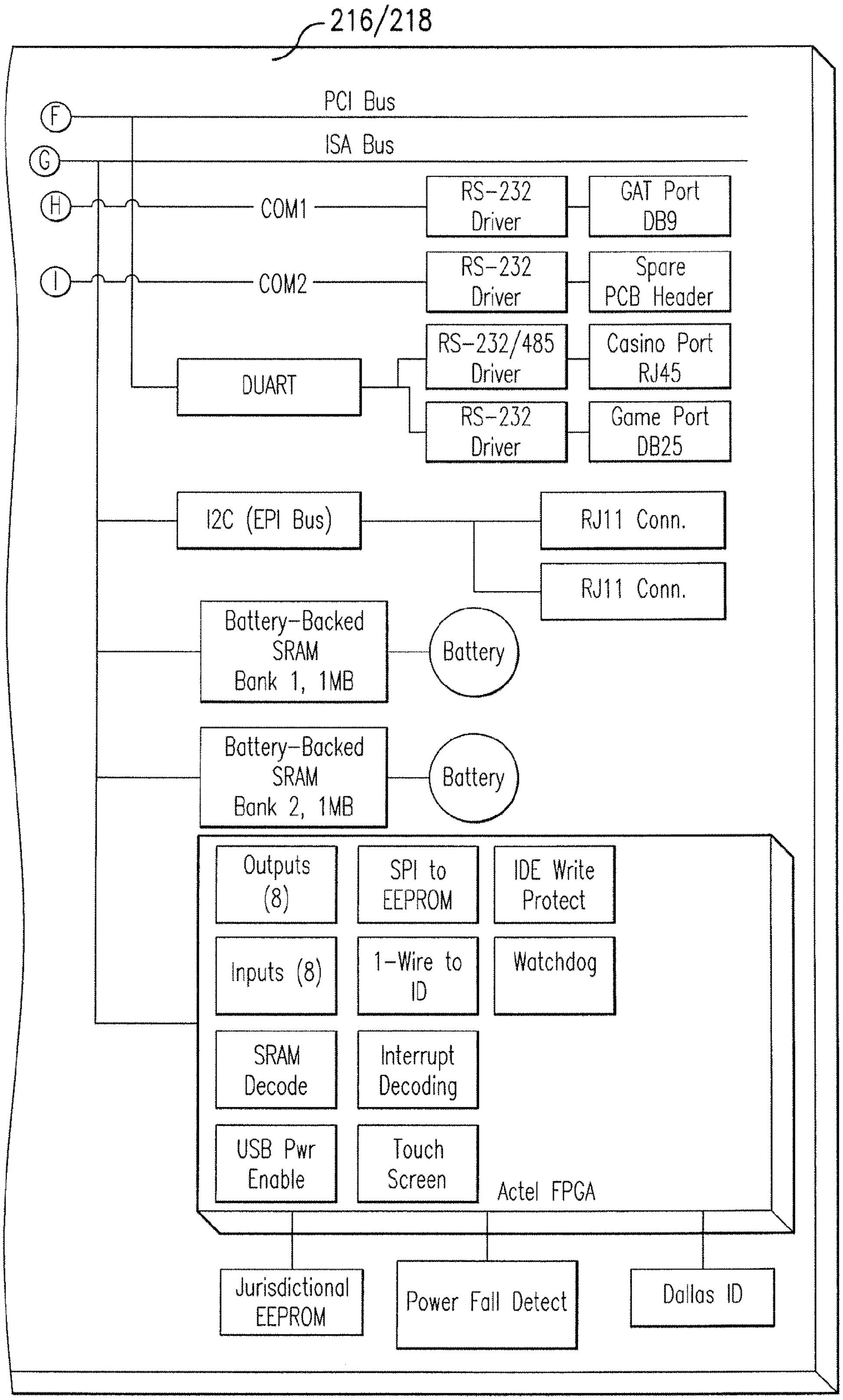

With reference to FIGS. 5A-5C, a block diagram illustrating components of a circuit board containing a unified IVIEW interface 216 and GMU (or player tracking user interface), according to one embodiment, is shown. The board of this embodiment has all of the hardware features to function as an electronic gaming device. In one embodiment, an external pointer/navigation device and/or pin pad is used in lieu of a touch screen input device.

In one embodiment, a trusted platform module (TPM) 4002 is used as an extra security chip based on industry standards, which enables users to store digital signatures, passwords, software authentications and encryption data in one secure repository. Endorsed by the Trusted Computing Group standards organization, the TPM 4002 provides businesses with protection for sensitive information. The TPM 4002 ensures that the gaming software has not been tampered with. An advantage of this is that gaming outcomes can be determined on IVIEW interface 216, or other client device using a TPM 4002, to reduce the load on system gaming servers 140. This means a random number generator (RNG) can reside on the IVIEW interface 216 verses the servers.

Figure 6:
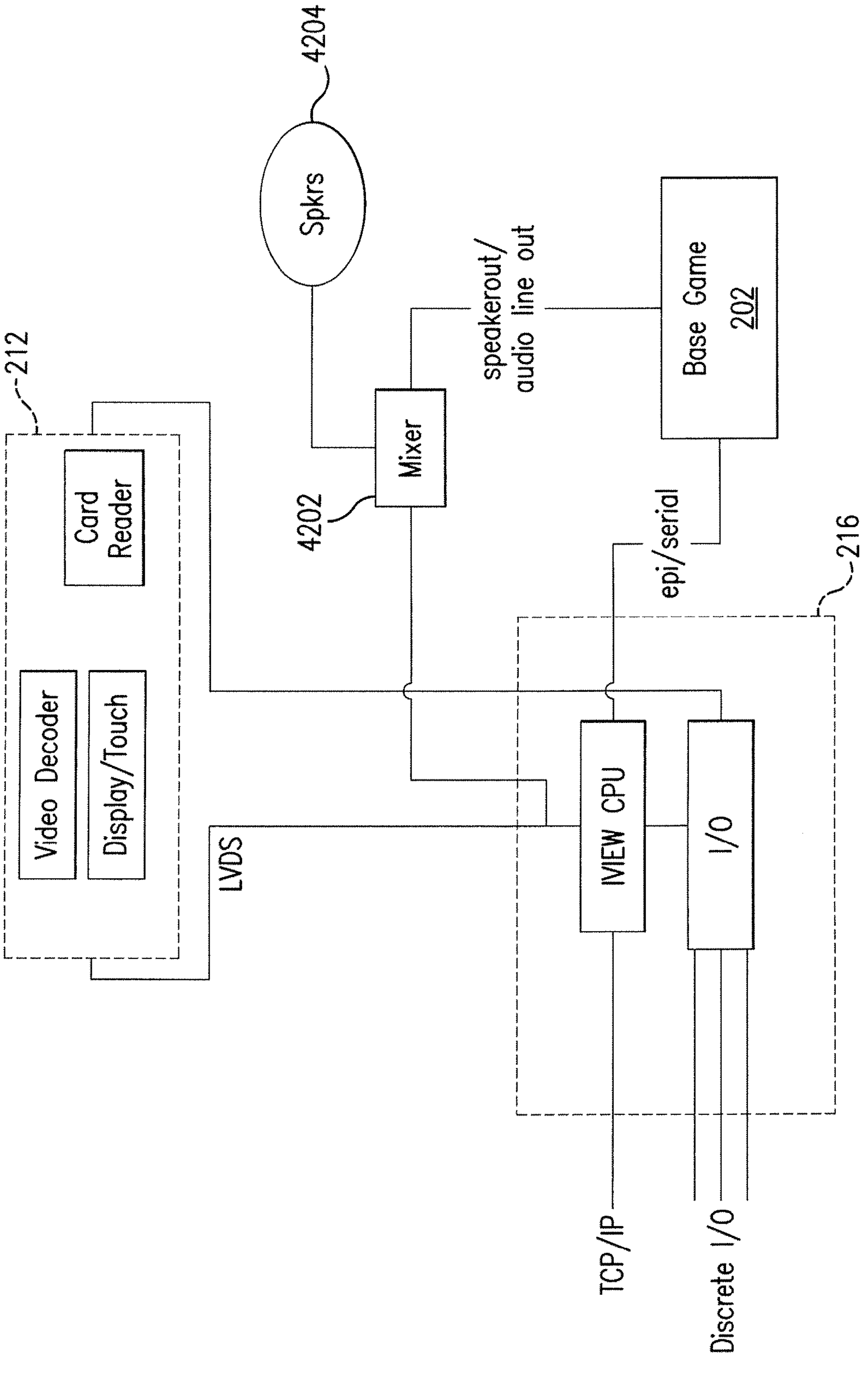
FIG. 6 is a block diagram that illustrates components of one embodiment of an additional user interface with game management unit functions merged into the additional user interface.

With reference to FIG. 6, a block diagram illustrates components of one embodiment of an IVIEW interface 216 with GMU functions merged into IVIEW interface 216, thereby obviating the need for a separate GMU 218. In one embodiment, Ethernet-IP based card reader 212 can be used in lieu of serial or USB card reader 212. In one embodiment, the card reader 212 can be a magnetic strip or smart card type. In one embodiment, a sound mixer 4202 is included to mix sound signals from both the IVIEW interface 216 and the base game 202 for a set of speakers 4204. In an alternative embodiment, the sound mixer 4202 is not needed if the IVIEW interface 216 has its own speakers.

Figure 7:
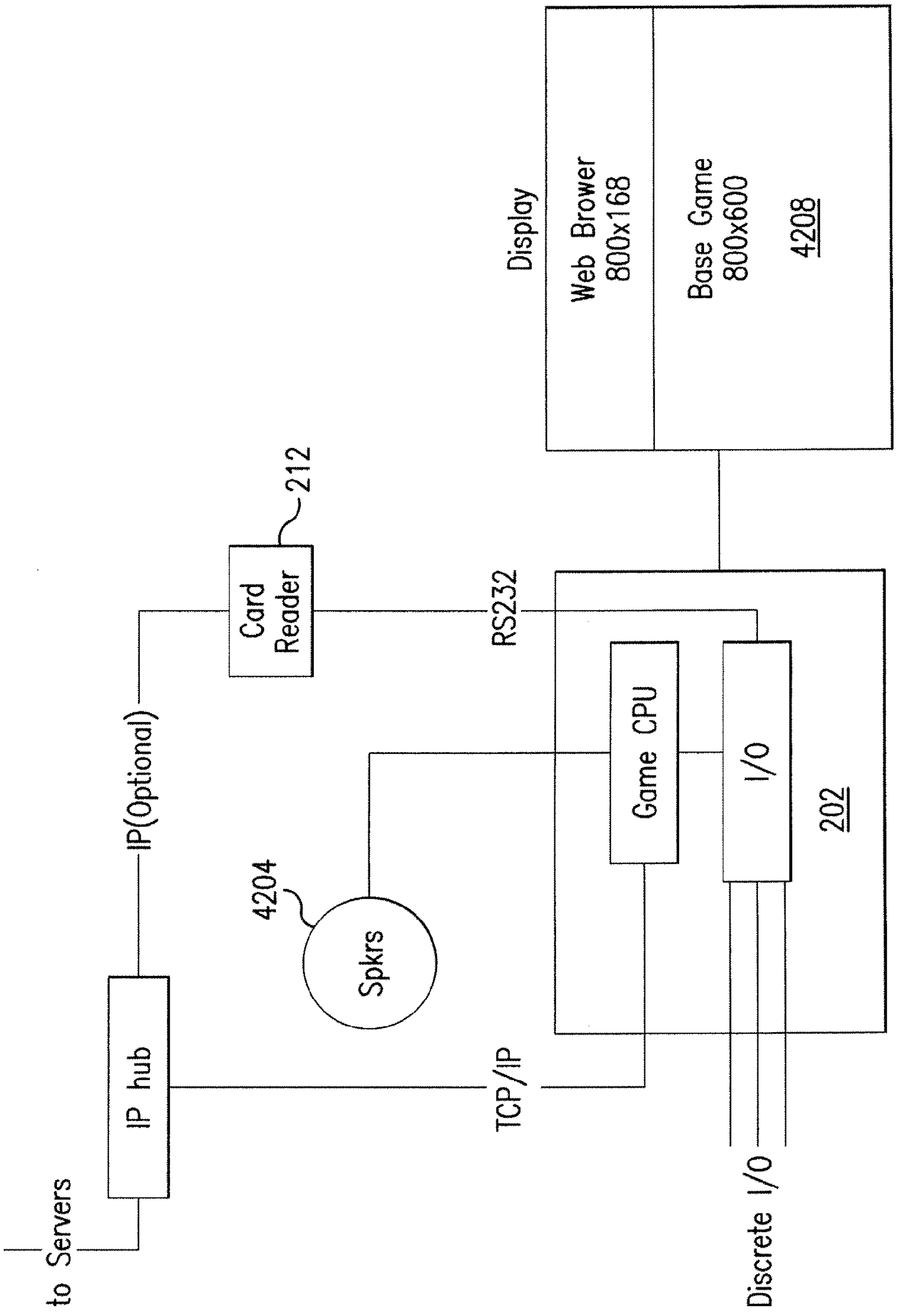
FIG. 7 is a block diagram that illustrates components of a base game according to one embodiment.

With reference to FIG. 7, a block diagram illustrates components of a base game 202 according to another embodiment in which the base game 202 includes functionality of both the IVIEW interface 216 and the GMU 218, thereby obviating the need for a separate IVIEW interface 216 and GMU 218. A combination base game display and web protocol browser 4208 is included in order to display both base game 202 play, and system game play (in the browser portion).

Figure 8:
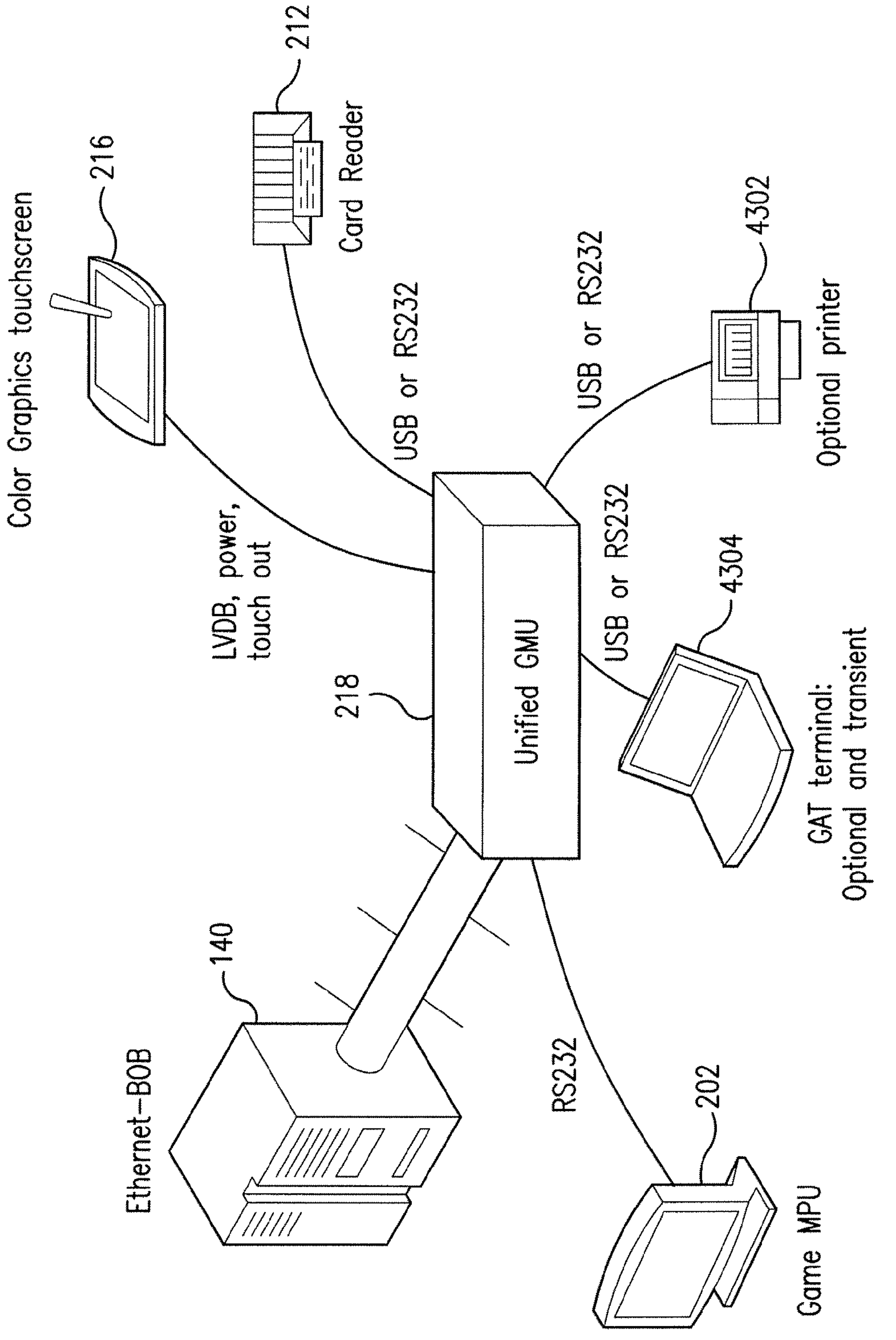
FIG. 8 is a block diagram that illustrates components of a client gaming system according to one embodiment.

With reference to FIG. 8, a block diagram illustrates components of a client system that is GMU 218 based. All functions of the client system are centered around the GMU 218 which functions as a hub for the components of the client system. The base game 202, IVIEW interface 216, card reader 212, and the like, are controlled by the GMU 218 to which these components connect directly. An Ethernet connection connects directly to the system gaming server 140. A printer 4302 is further included to print tickets, vouchers, and the like. Further, in one embodiment, a game administration computer or terminal 4304 is directly connectable to the GMU 218, by way of example, and not by way of limitation, a serial or USB connection.

Table 13, by way of example, and not by way of limitation, lists some messages that are exchanged between the IVIEW interface 216 and system gaming server 140 according to one embodiment.

TABLE 13

Sample Messages Exchanged Between The iVIEW Interface And System Gaming Servers

| Ver | Name | Purpose | Parameters | Return |
|---|---|---|---|---|
| 1.0<br>2.0 | SGS_PlayerCardInserted | Checks to see if player has won any tournaments and has any eGameCash. Returns Player Id, Level Id, Tournament Id, Scheduled Tournament Id. EGameCredits are moved to the IVIEW. | PlayerCardId | HasCash<br>PlayerNickname<br>Pid<br>LevelId<br>Tid<br>STId<br>eGameCredits<br>Status Code |
| 1.0<br>2.0 | SGS_PlayerCardRemoved | EGameCredits are added back to the player account | PlayerCardId<br>EGameCredits | Status Code |
| XX | SGS_GameOver | Returns player score and amount of eGameCash played. Tournaments are funded from eGameCash played. | PlayerCardId<br>GameId<br>PlayerScore<br>Amount Played | HasCash<br>Status Code |
| 1.0 | SGS_eGameCashOut | Allow player to cashout his eGameCash. EGameCash will be transferred to the Base Game. Note, only the eGameCash won from tournaments will be sent. EGameCash on the IVIEW will remain. | PlayerCardId | ServerAmount |
| 1.0<br>2.0 | SGS_Init | Casino Console should try to connect to the Game Server on startup and returns initialization settings | | Status Code |
| 2.0 | SGS_RegisterGMU | Once a connection is established with the GMU, GMU registration data is sent to the Game Server | Casino Id<br>Game Serial #<br>Game Id<br>Pay Table Id<br>Base %<br>GMU Time<br>GMU Id | Site Id<br>Status Code |
| 2.0 | SGS_PlayerLogin | Player Tracking card is inserted. Returns player specific settings. Url to show the player his available games to play. Url to show player his results. | Player Card Number | Player Id<br>Player Status<br>eGameCredits<br>Game Results url<br>Games url |

TABLE 13-continued

Sample Messages Exchanged Between The iVIEW Interface And System Gaming Servers

| Ver | Name | Purpose | Parameters | Return |
|---|---|---|---|---|
| 2.0 | SGS_PlayerAuthentication | Player keys in his pin number. The player needs to authorize to play a System Game. | Player Id<br>Player Pin number | Status Code |
| 2.0 | SGS_LoadGame | Game to load, get its settings, pay table, denoms available. | Site Id<br>Game Id<br>Player Id | Pay Table<br>Denom Table<br>Max Bet Table<br>Game Settings |
| 2.0 | SGS_BaseGmAmountPlayed | Once the Base Game Handle breaks the threshold, handle amount is sent. Player eGameCash is returned. | Player Id<br>Amount played | Player<br>eGameCash<br>Status Code |
| 1.0<br>2.0 | SGS_BeginGame | System Game is to begin. | Site Id<br>Game Id<br>Player Id<br>Tournament Id<br>Tournament Type Id<br>eGameCredits<br>Played<br>Denom Played<br>STId | History Id<br>eGameCredits<br>Used<br>STId |
| 1.0<br>2.0 | SGS_EndGame | Game has finished so report score. | Score<br>HistoryId<br>Site Id<br>Game Id<br>Player Id<br>Scheduled Tourn Id<br>?Amount Won? | url for show<br>results<br>Player buckets |
| 2.0 | SGS_XFromEGameCredits | Convert eGameCredits to eCash or cash. | | |
| 2.0 | SGS_XToEGameCredits | Convert eCash or cash to eGameCredits. | | |
| 2.0 | SGS_GetGameSettings | This method allows any game played to get specific configuration data from the server prior or during play. | Site Id<br>IVIEWID,<br>Game Id,<br>Mode Id,<br>Player Id | XML string of all game specific configuration data for the particular chosen game. |
| 1.0 | CM_SaveGameState | Allows game to save state | Any string | |
| 1.0 | CM_RestoreGameState | Allows game to restore a saved game state | GameID | Saved string |
| 1.0 | CM_Message | Message Event<br>CMGDKGameMessages:<br>(messages from game)<br>GetSystemSettings,<br>GetGameSettings,<br>GetPayTable,<br>GameBegin,<br>GameEnd,<br>ShowResults,<br>MenuPressed<br>GetGameOutcome ( );<br>GetRandom ( )<br>CMGDKSystemMessages<br>(messages to Game)<br>PrimaryGameStart,<br>PrimaryGameEnd,<br>GameBeginResponse,<br>GameEndResponse,<br>BalanceUpdate,<br>TakeScore,<br>Load,<br>Show,<br>Hide,<br>Exit,<br>Pause,<br>GetGameSettingsResponse,<br>GetSystemSettingsResponse,<br>GetPayTableResponse, | | |
| 1.0 | CM_MessageHandler | Message delegate. | | |
| 1.0<br>2.0 | CM_GetProperty | Retrieves a property | String property tag | |

Player Login

In one embodiment, complete user registration occurs at the IVIEW interface 216, a web portal, kiosk, casino registration desk, electronic transfer from third party authorized sites. The PIN and/or username and password are created at this time to authorize transactions to the player's account. In one embodiment, player demographic information is collected at registration time to help target the player with advertisements, mailings, game recommendations, promotions, and the like.

As discussed above, playing system games can be for registered or unregistered players (carded and uncarded, or players with or without usernames/passwords). In one embodiment, uncarded or unregistered players have fewer features available to them. For example, and not by way of limitation, the player is able to accrue eGameCash on the IVIEW interface 218, but is not able to save the earned eGameCash to an account for later access unless an account is created at the IVIEW interface 218 device. In another embodiment, a ticket can be printed with temporary account information to allow the uncarded player to save earned eGameCash, cash winnings, and a game state regarding a game the player was playing. In one embodiment, any account meters for uncarded players are able to play subsequent players whether carded or not. In yet another embodiment, the uncarded player's account meters are automatically decremented to zero after a period of time of inactivity by a user, or base game cash out. In another embodiment, the uncarded player's account meters can be given to carded players in the form of eGameCash as described herein with respect to the eGameCash accrual engine.

A player can login into the system gaming server 140 in several ways. In one embodiment, access is prohibited to certain activities unless the proper player can be authenticated so the player's gaming activity can be tracked. In one embodiment, the login process requires something the player has in his possession and something he knows. In one embodiment, the player is able to browse the games and rules without a player card inserted as an inducement to become a carded player by seeing the exciting gaming products available. Some system games are playable by registered players, but games that award their prizes at a later date are blocked for unregistered players according to one embodiment (e.g., tournaments, raffles, and sweepstakes). This is because winnings in this embodiment are awarded to a specific player or player's accounts, and these accounts do not exist for unregistered players.

In one embodiment, when a carded or registered player wants to play, the player is asked to insert their magnetic card or smart card into the card reader 212. After successful PIN entry, or biometric entry, the player is authorized against casino market place and system gaming servers 140 and 180, and if the account is valid, the player is authorized to begin playing at the system gaming site. Inactive accounts are terminated by the casino after some period of time in one embodiment. In one embodiment, accounts are put on hold until the user consults with an attendant or customer service agent as an aide in getting players attention and action regarding some issue. Players can also enter a username or alias and password by which to gain access without the magnetic card or smart card. In one embodiment, biometric devices are used in combination with a username and/or password to gain access to a player account at an IVIEW interface 216 or other system gaming client devices, or web portals.

In one embodiment, temporary cards are freely given to uncarded players for the player to accrue eGameCash and bonus points, even though the player has not gone through the registration process at a web portal or registration desk. In one embodiment, a player is asked to enter a PIN or password at card insertion time, or prior to system game play. In one embodiment, the unregistered players are not able to cash out any system game winnings until a full registration takes place. This rule is casino configurable. These temporary accounts accrue eGameCash to play system games. In one embodiment, a player is able to cash-out their winnings with temporary cards if the system allows. Cash-outs can transfer credits to the base game and/or special tickets can be printed describing the cash or prize ticket. In one embodiment, the printing of tickets is supported by system printers attached to the GMU 218, or printers attached to the base game 202. The SAS 6.0 or BOB Protocol support printing cash vouchers to enable print outs that do not originate from the base game 202 themselves.

In one embodiment, temporary accounts can be given to a player by the use of a ticket that is printed with a code number that references a specific unnamed account in the system gaming server 140. This ticket is reinserted into bill acceptors on the gaming devices 200, scanned with an optical scanner at gaming device 200, or manually entered into the IVIEW interface 218 to gain access to this account.

Several different methods can be used to allow an uncarded casino player account-based access to system gaming features. Current systems typically require each player to have an account on the system for players to take advantage of club membership. This account is used for individual identification and accrual of points, awards, or other incentive or loyalty program items.

There is difficulty in offering these programs to players who have not been registered or enrolled in these programs prior to their playing slots. In one embodiment, the system detects the uncarded player who has been given a temporary account, identification number, and instrument for notifying the system of their presence at a game machine 200.

In one embodiment, the uncarded player is asked by the IVIEW 216 if they would like to play these system games and if they are willing to have a temporary account created for them. Upon acceptance, the system uses a ticket printer to print a bar-coded ticket having an identifier denoting the ticket as a player ID ticket (and not a ticket redeemable for cash), along with the player's newly generated ID number.

The player can then identify themselves by inserting this ID ticket into a slot's bar-code enabled bill acceptor which will notify the slot system of the player being present at the game (via the player ID on the ticket bar-code). At this point, the system may reject the ticket from the bill acceptor for the player to reuse at another gaming machine 200. In this case, the player's session is closed based on either a lack of play on the gaming machine 200 for a predetermined period, or, the player can close the session by pressing a button on the IVIEW interface 218.

In one embodiment, the ticket is stacked in the bill acceptor stacker and a copy is printed by a game ticket printer at the time the player wishes to leave the game (as signalled by their pressing a button on the IVIEW interface 218). One additional feature in this embodiment is that a message is sent to an employee notification system (i.e., slot host pager), telling the host to retrieve the automatically printed magnetic strip card (magcard) from the promotions booth to give to the player at the requested slot for a more convenient identification method. In this embodiment, the player may still use their printed ticket while waiting. Alternatively, the player is instructed on where to pick-up their automatically generated magcard. In one embodiment, the player is also given a password or PIN for use at a kiosk used for printing magcards.

Figure 9:
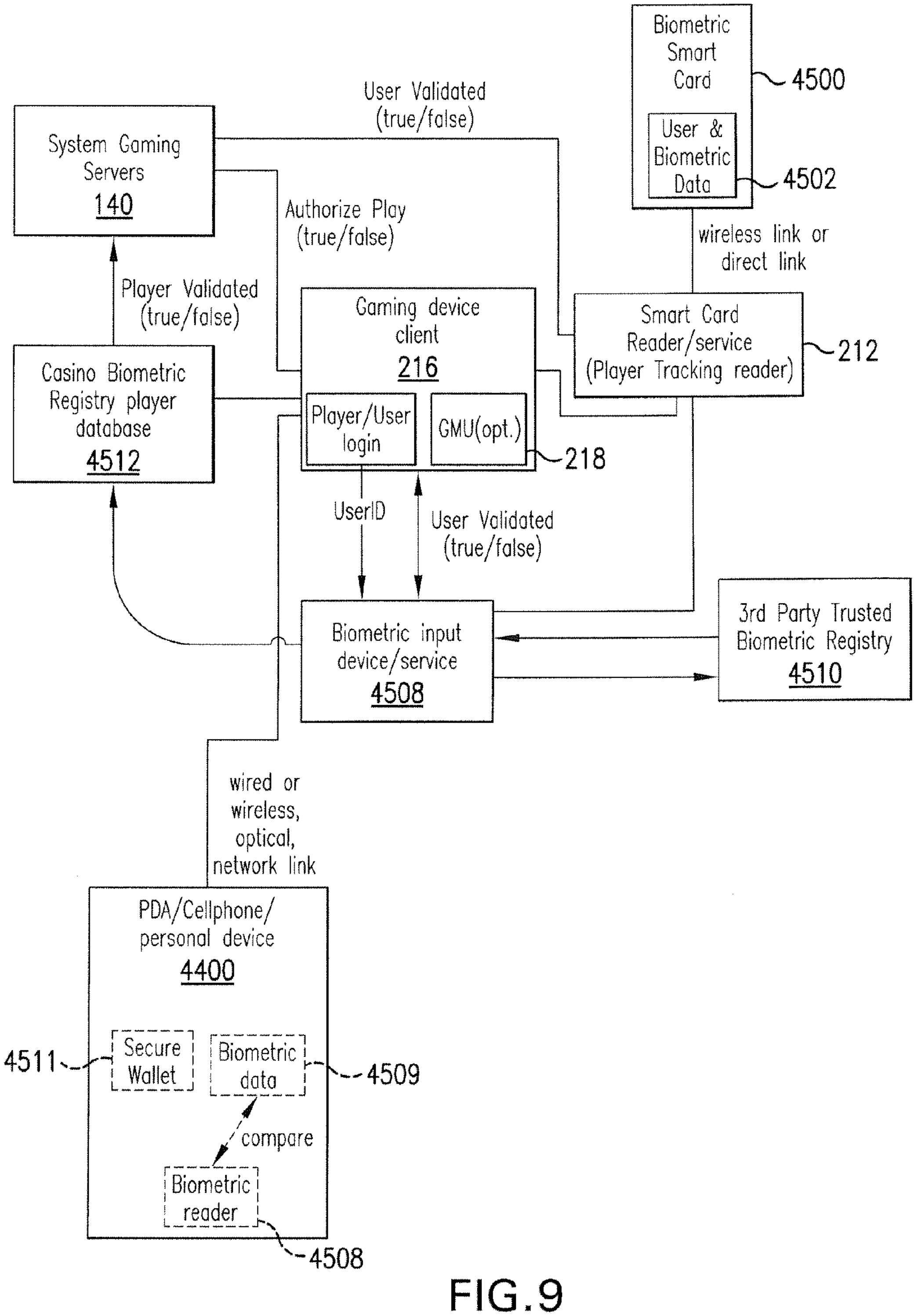
FIG. 9 is a component and data flow diagram that illustrates data flow in a system for biometric authentication of a player according to one embodiment.

With reference to FIG. 9, a component and data flow diagram illustrates the data flow in the system for biometric authentication of a player. In one embodiment, biometric devices are used in addition to, or in lieu of any tangible item that the player has or is given to uniquely identify that person. Biometric devices include, by way of example, and not by way of limitation, fingerprint devices, handprint devices, voice recognition, handwriting analysis, facial recognition, retinal scan, DNA scan, thermal scans, and the like. In the embodiment, of FIG. 44, a smart card 4500 also has the biometric input device included with the card. Biometric data 4502 stored in the card itself is compared with the input from the biometric input device when inserted or connected wirelessly to the card reader 212 for the gaming device client 4400.

In another embodiment, the biometric input device (e.g., fingerprint, eye, or image scanner) is part of, or connected to the gaming device (which in some embodiments comprises an IVIEW interface 216), player tracking unit 212, or separate device 4508. In one embodiment, the biometric data to which the biometric input is compared is a remote third party trusted biometric registry, such as Verisign®, a bank, or the U.S. Government, 4510. The input is sent to the trusted registry 4510, along with a user ID, and for example, a password, and the trusted registry sends back an answer as to whether the biometric data matches. Biometric is digitally encrypted with a public/private key cryptographic process prior to sending to any remote server. In one embodiment, the biometric data is sent as hash or other encrypted data that uniquely identifies the raw biometric data. In another embodiment, instead of using a third party trusted registry 4510, the casino has its own biometric database 4512.

In another embodiment, a personal computing device 4400 includes the biometric reader 4508 that compares biometric input against a local biometric database 4509, or a remote biometric registry 4510 to approve gaming activity. Further, in one embodiment, electronic funds are transferred into the gaming device 4400 or gaming server 140 using a secure wallet 4511 to allow game wagers or credit purchases to occur.

Biometrics are helpful at remote gaming locations and with wireless devices to help with the age and person identification of the player for regulated gaming markets and products. Periodic biometric scans are required in some embodiments during play of a game to ensure the authorized person is actually playing, and not another substituted person. At registration time a biometric scan takes place for an individual, and the data representative of the biometric scan is to be stored in a secure database associated with the player account. User age or birth date is entered into the database so as to create a jurisdictionally compliant gaming system per player and per access point to the system gaming server 140. In one embodiment, this registration takes place at any casino or government approved registration location. Casino personnel or government-approved personnel take the registration data from the player and authenticate the player's various forms of identification. Age and/or biometrics are checked for whether they are associated to the one person. In one embodiment, registration kiosks are used in combination with or alone without extra personnel required in the process.

In one embodiment, a temporary carded player is allowed to accrue eGameCash and play. A cash-out by these players is not allowed until full registration is performed by the player. These cards are freely handed out on the casino floor for players allowing them to play anonymously until they want to cash-out. The goal is to tease the player into becoming a carded player.

Simultaneous play by family or group members using the same card number or player account is allowed by the casino in one embodiment. These accounts all accrue eGameCash to the same account, and these players can play as a group against other groups.

Figure 10:
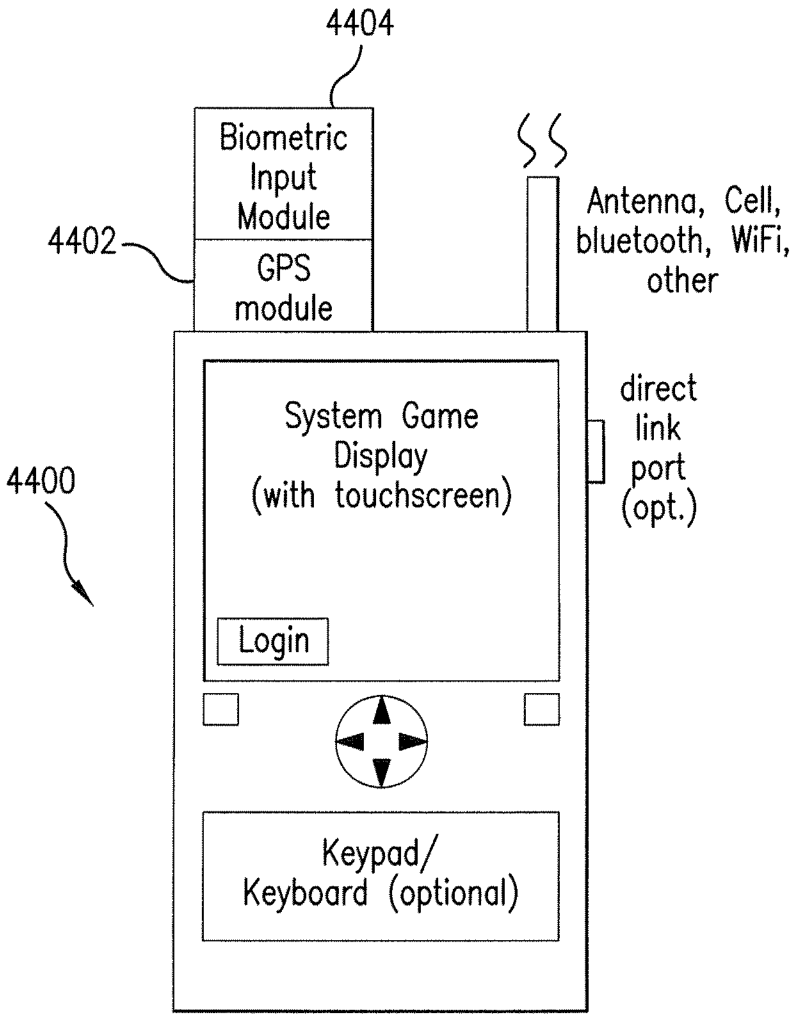
FIG. 10 is a block diagram that illustrates components of one embodiment of a client gaming device.
Figure 11A:
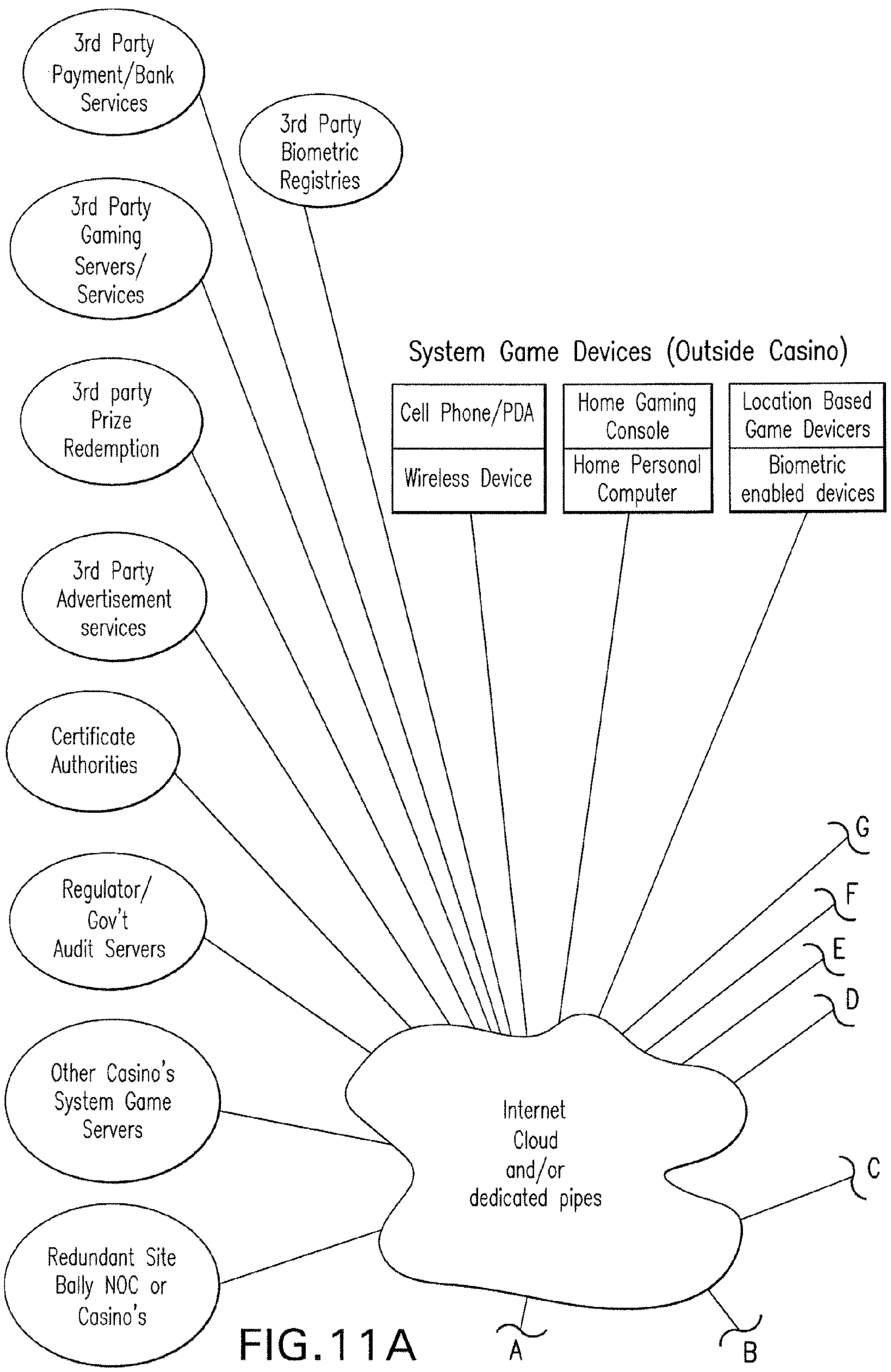
FIGS. 11A-11F are block diagrams illustrating components of one embodiment of a system game network.
Figure 11B:
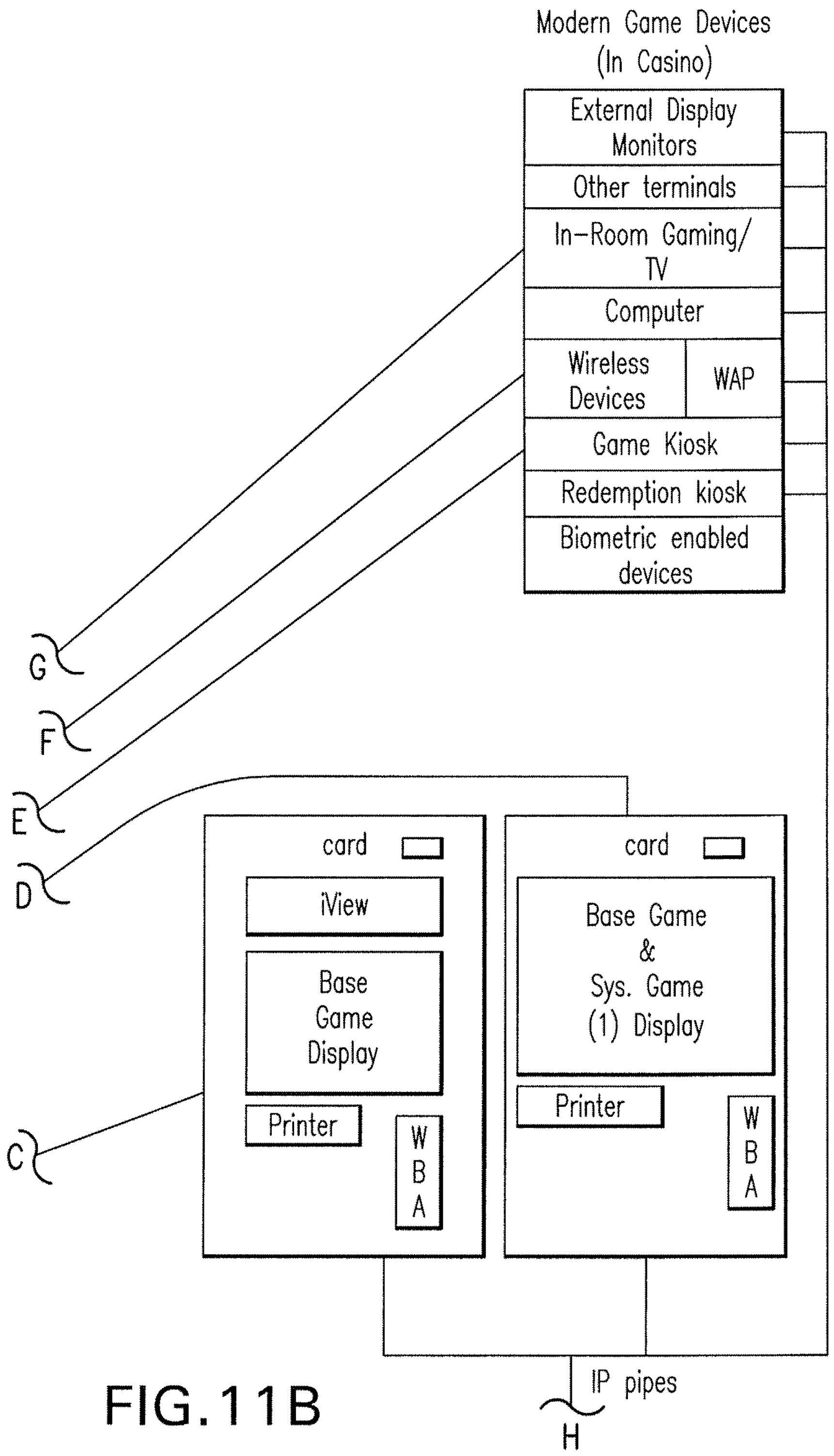
Figure 11C:
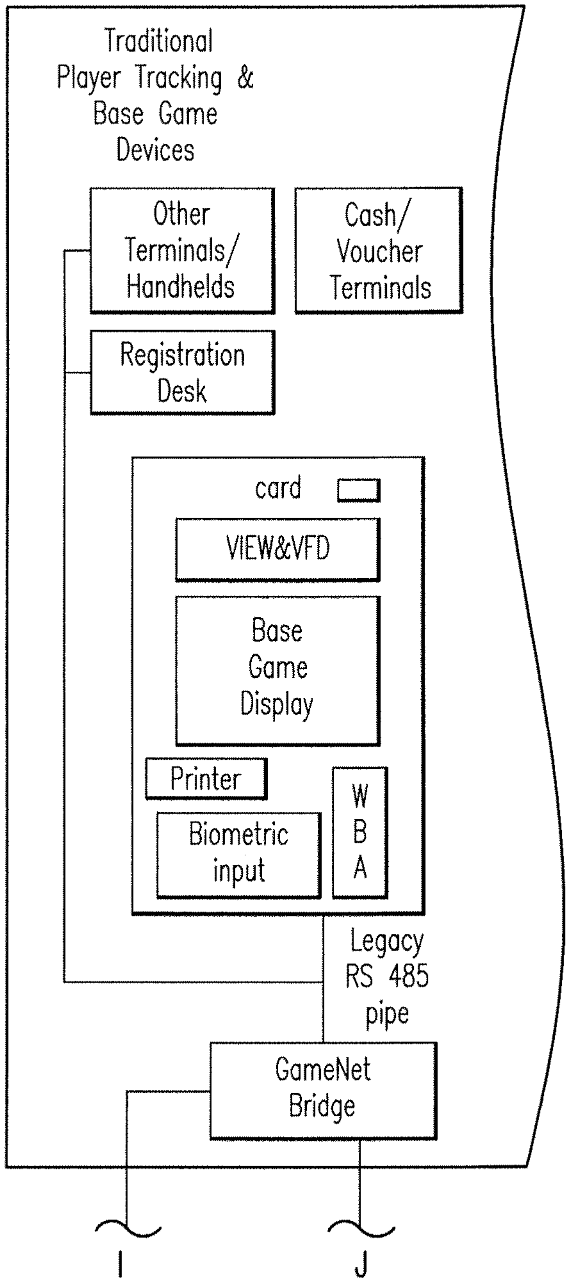
Figure 11D:
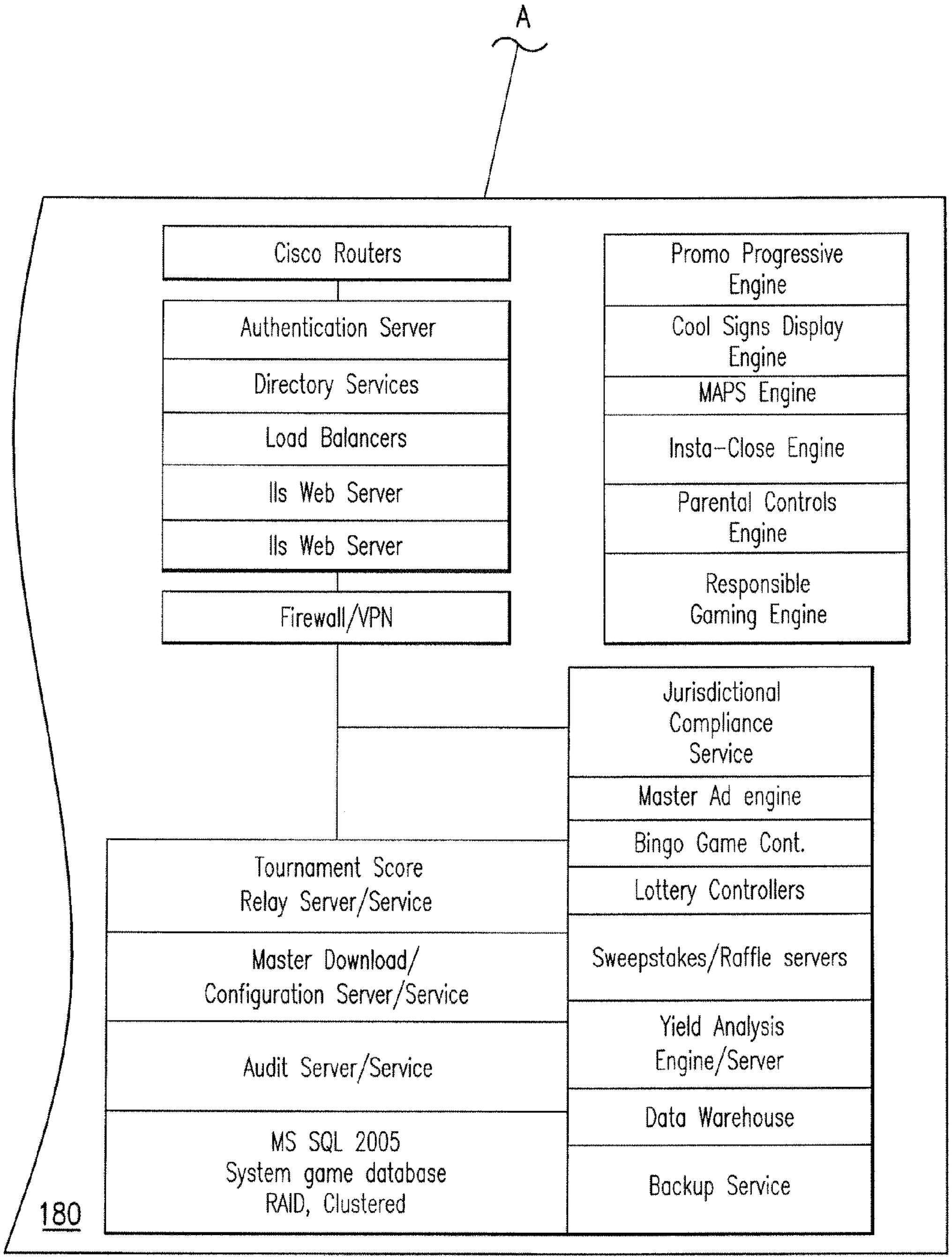
Figure 11E:
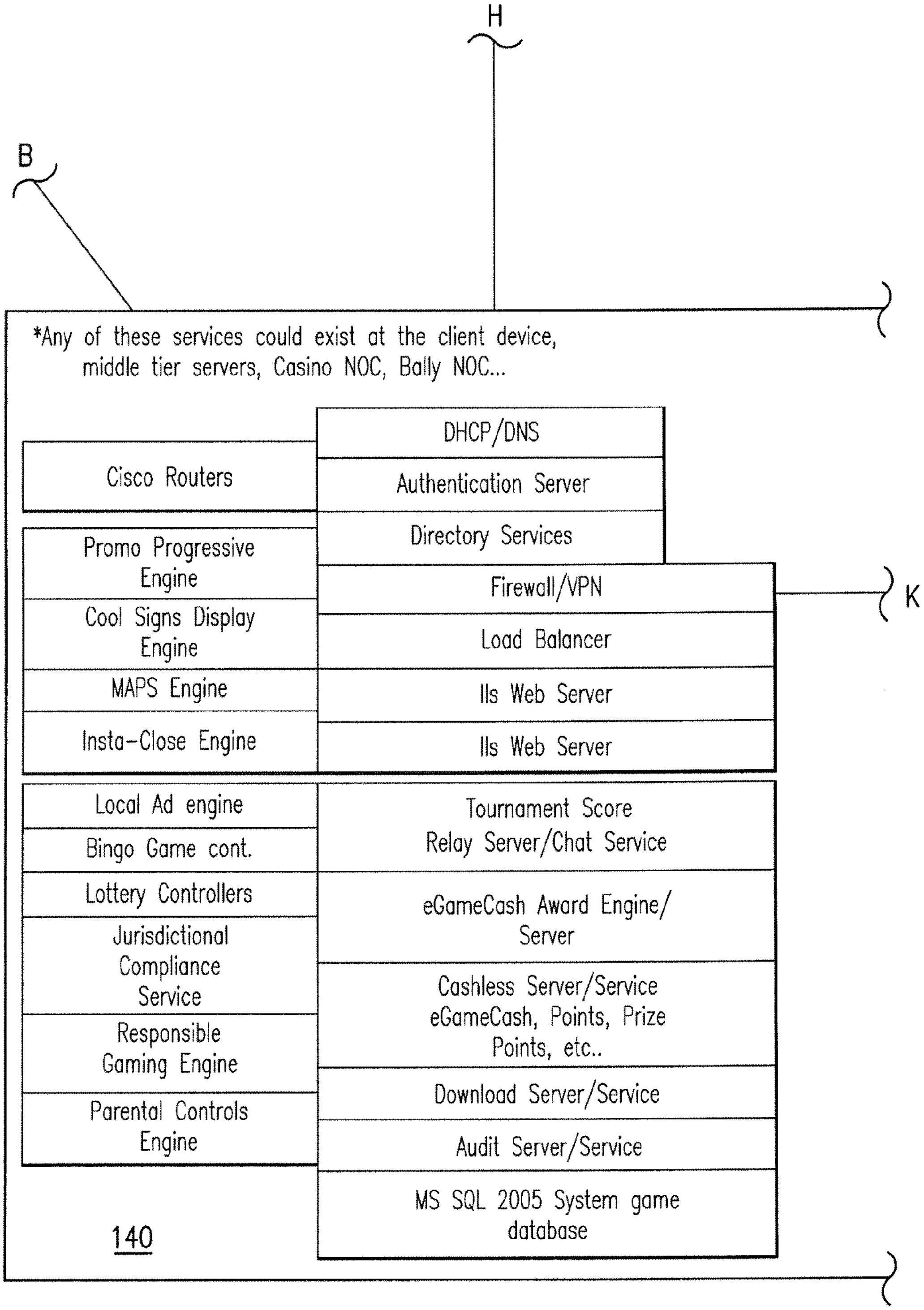
Figure 11F:
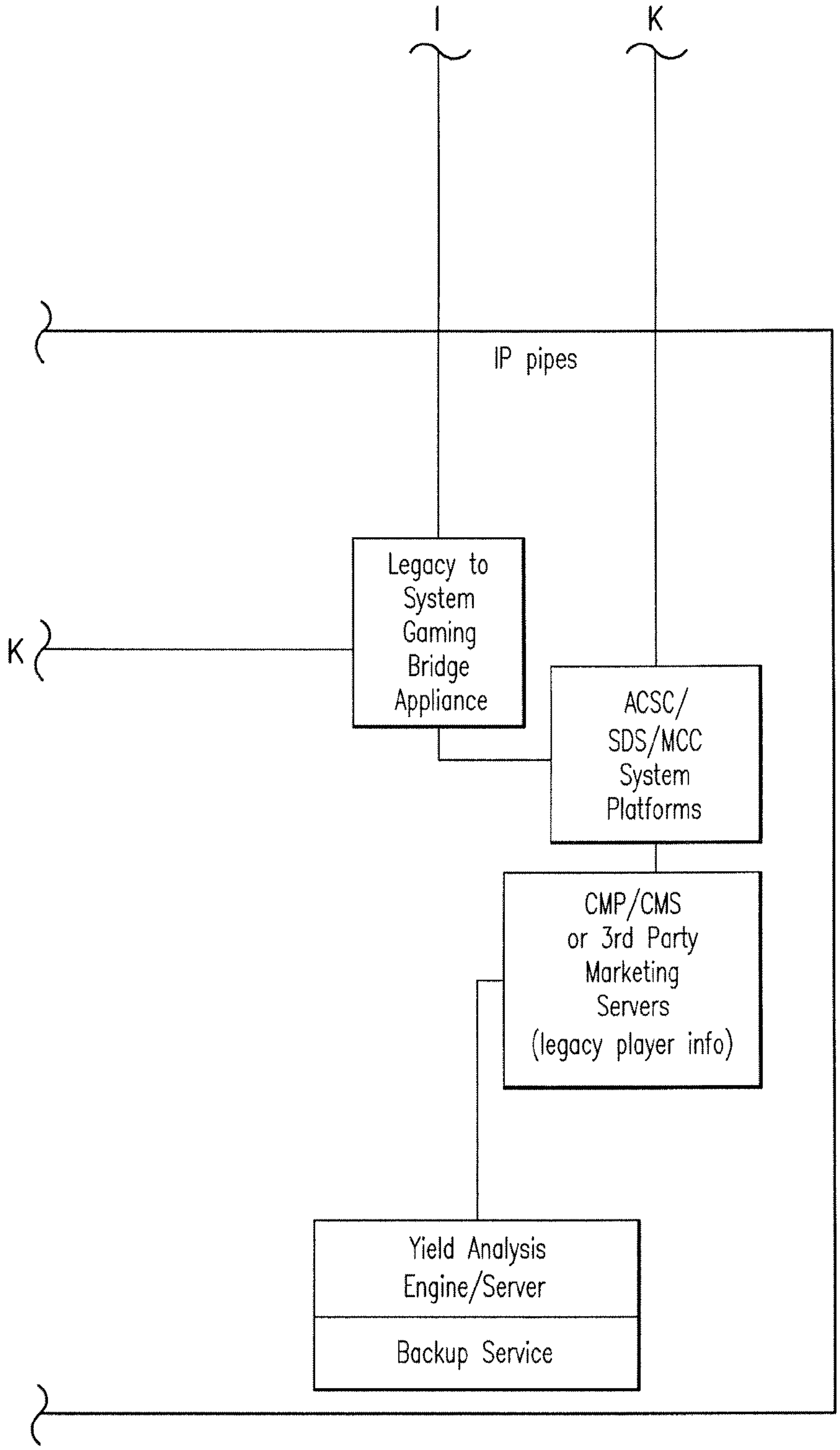

With reference to FIG. 10, a block diagram illustrates components of an alternative embodiment for a client gaming device 4400 to play system games. In this embodiment, a geo-location device 4402 is used to locate a specific player for regulatory and other purposes. Geo-location techniques that can be used include by way of example, and not by way of limitation, IP address lookup, GPS, cell phone tower location, cell ID, known Wireless Access Point location, Wi-Fi connection used, phone number, physical wire or port on client device, or by middle tier or backend server 180 accessed. In one embodiment, GPS 4402 and biometric 4404 devices are built within a player's client device 4400, which in one embodiment, comprises a player's own personal computing device 4400, or provided by the casino as an add-on device using USB, Bluetooth, IRDA, serial or other interface to the hardware to enable jurisdictionally compliant gaming, ensuring the location of play and the identity of the player. In another embodiment, the casino provides an entire personal computing device 4400 with these devices built in, such as a tablet type computing device, PDA, cell phone or other type of computing device capable of playing system games.

In one embodiment, different features of the system game are enabled or disabled depending on the jurisdiction and/or the identity of the player who is accessing the system. For example, skill games only may be played in some jurisdictions for any person. Or skill predominate games are available for minor players in other jurisdictions.

Other jurisdictions limit the types of prizes that can be won. For example, a jurisdiction does not allow gift certificates. The system game servers have the capability to prevent these types of awards and provide alternate awards that are compliant with local, state, federal, and international law.

Other jurisdictions require prizes not to be shipped into their jurisdiction. The system game server prevents prizes from being mailed into these jurisdictions. Further, various wager/payout restrictions are enforced in specific jurisdictions, such as Texas, where the player can only play for prizes and cannot win in excess of $5 or 10 times the wager amount whichever is less. Some jurisdictions limit the size of wager for a game. Other jurisdictions limit the amount of win per game or payline. The system game server 140 manages this regulatory compliance, including by using the above-mentioned geo-location techniques to determine the location and identity of a player.

New wagers or game plays are blocked by the system game server 140 under certain circumstances according to one embodiment. By way of example, and not by way of limitation, an individual game will not provide the option for the player to bet more than the maximum number of credits or cash allowed. In another embodiment, a maximum wager is set for a player per gaming session, or for a specific time period. In another embodiment, the list of available games is modified. In another embodiment, credit purchases are blocked at certain times, or after certain limits have been reached. In another embodiment, the number of games played in a time period is controlled. In another embodiment, the player is stopped after reaching a threshold for losses in a period of time. Player demographics, such as age, sex, and player group can block new credit wagers. Further, parental or master account restrictions on a child or sub-account can block wagers.

Further, in one embodiment, the system gaming server 140 automatically reconfigures for a certain player in a certain jurisdiction on a specific type of gaming device. Content and game server 140 modifications can include, by way of example, and not by way of limitation, modifications made to currency converters, currency purchase options, game selection options, game configurations, skill or chance game options, denominations of play, size of wins allowed per jurisdiction, maximum credits allowed, minimum cost to play, cost of credits, advertisements seen, third party services available, third party gaming sites available, speed of play for games, bonus rounds available, bonus games available, progressives available, available promotions, available prizes, and prize types.

In one embodiment, player registration occurs at a web site or a physical site or registration terminal (username, password, PIN, player card, and the like, and other player or group specific information created at this time). In one embodiment, this registration occurs at a casino's player club registration desk, but can occur using any gaming or non-gaming device capable of collecting registration data with or without operator assistance.

In one embodiment, responsible gaming limits setup is performed during registration. (A player and/or casino associates one or more of the above discussed responsible gaming limits with this registered account.)

In one embodiment, parental controls are entered for the account. If the account is for a child, child account limits are setup. In one embodiment, by way of example, and not by way of limitation, these rules limit the types of games, amount of money spent playing games, amount of purchases, time spent playing or doing other activities in a system game, what services are available for the player, and which currency conversions are available by the player. Parental controls can be entered at any time during or after registration.

In one embodiment, if player desires to play regulated games on non-regulated gaming devices, in non-monitored locations, and/or at Internet accessible web portals, then the player provides biometric data at a government or casino approved biometric registration site that requires the player to be physically present. Identity of the player is checked by approved personnel with one or more photo identifications proving age, name, and address of the player. The player's biometric identity is maintained in the database 160 associated with the player's birthday, name, and other demographic or address information. If registration is performed at a casino, then this biometric data can be directly associated against the unique player identifier that includes, for example, username or player club card number, and the like. If the biometric registration occurs at a third party registration site, the data is associated with a unique user identifier (user ID). In one embodiment, a biometrically registered user is provided a new government issued or approved card, or a casino approved smart card ID capable of storing all types of data including biometric data in secure memory within the card. Other smart cards can be used as long as they contain biometric data, or authorize secure access to a recognized database containing biometric data. In another embodiment, the IVIEW interface 216, or other client gaming device, has a secure biometric repository contained within it, such that, at any time the gaming software executing therein can authenticate the player against this local biometric repository. For example, in one embodiment, a cell phone carrier registers and manages the biometric data, either in a remote database or in the cell phone's secure memory. In one embodiment, the smart card used is the national Biometric ID smart card authorized by the U.S. Congress in 2005.

In another embodiment, a player accesses an approved gaming portal on an approved or non-approved gaming device. For example, and not by way of limitation, an example of an improved gaming portal is www.games.harrahs.com.

In one embodiment, the system logs the IP address and other geo-location specific data for client gaming devices. As discussed with respect to FIG. 9, geo-location is accomplished in one embodiment by a GPS device 4402 that is provided to the player by the casino, or by a third party regulatory agency. In another embodiment, the GPS device 4402 is embedded in the gaming client device 4400 as provided by the manufacturer. In one embodiment, geo-location is gathered by detecting the cell phone tower used by a wireless-type gaming device client 4400. The system gaming server 140, or third party cellular location service, uses the cellular tower location being used by the wireless device to determine the location of the device 4400. In one embodiment, geo-location of the gaming device client 4400 can also be accomplished by detecting for known wireless access points (WAPs) being used, or if a wireless device uses a certain wireless protocol and frequency then the system can determine the location of the player due to the limited range of certain types of wireless protocols at certain locations. For example, a Bluetooth connection has a 30-foot range from client device being used by the wireless client 4400, or, 802.1A/B/G networks have approximately a 300-foot range. In one embodiment, the geo-location method uses the dialup access number and a caller ID reader to determine the area code and phone number from which a player is playing. This area code can provide the graphic location of the gaming device. The geo-location data is associated with the specific player for the specific gaming session on the specific gaming device 4400 for a determination of options, or whether the player is allowed to play a system game at all.

In one embodiment, gaming content and configurations are dynamically modified depending upon the web portal, wireless access point, and/or device used, to gain access to the system gaming server 140. Modifications include, for example, not by way of limitation, the different games available. In one embodiment, non-approved gaming device 4400 requires gaming outcomes to be determined on the server 140 for chance based games, while approved secure devices allow gaming outcomes to be determined on the client device 4400.

In another embodiment, skill-based game outcomes can be determined on the client device 4400. These game outcomes are securely sent to the system gaming server 140 using HTTP protocol. Digital Certificate authentication by third party certificate authorities, for example, and not by way of limitation. Verisign®, or local casino-based certificate authorities, can ensure the client device is communicating to the proper system gaming server 140. In another embodiment, the gaming content is automatically localized for the appropriate language used after used the above described geo-location techniques.

In another embodiment, game parameters are modified based upon player specific attributes, which include, by way of example, and not by way of limitation, the player's demographic information, player club level, or other player specific or group specific data. In another embodiment, data collected by the yield analysis engine is used. Game server site parameter modifications include actual reconfiguration of the system gaming servers. For example, and not by way of limitation, in one embodiment, the player is pointed to a different web location managed by the system gaming server 140, and/or reconfiguration data is moved to the client gaming device 4400 so that reconfiguration occurs in the client-by-client side software.

Figure 12A:
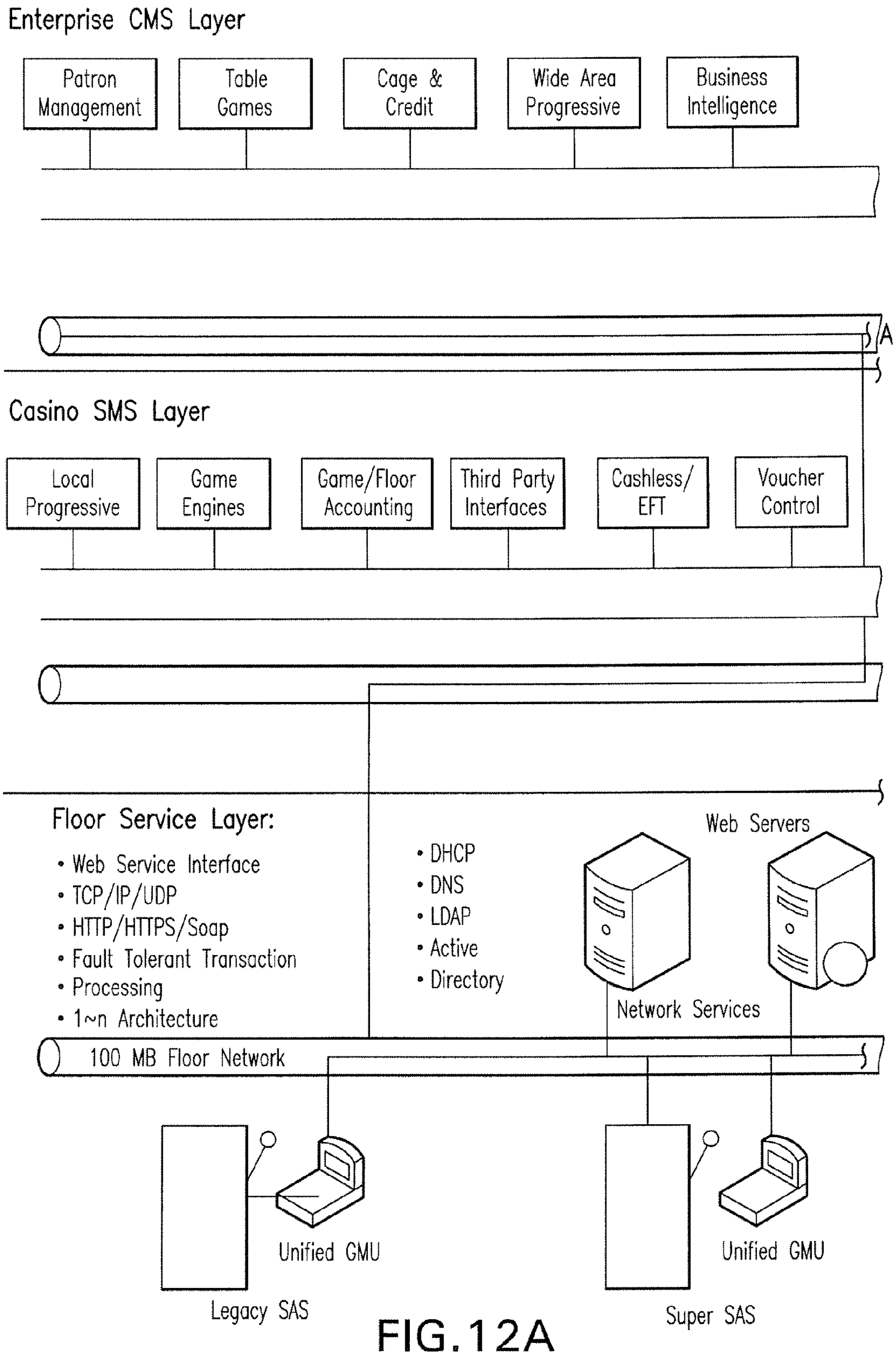
FIGS. 12A-12B are block diagrams illustrating components of an embodiment of a multi-layer system game network.
Figure 12B:
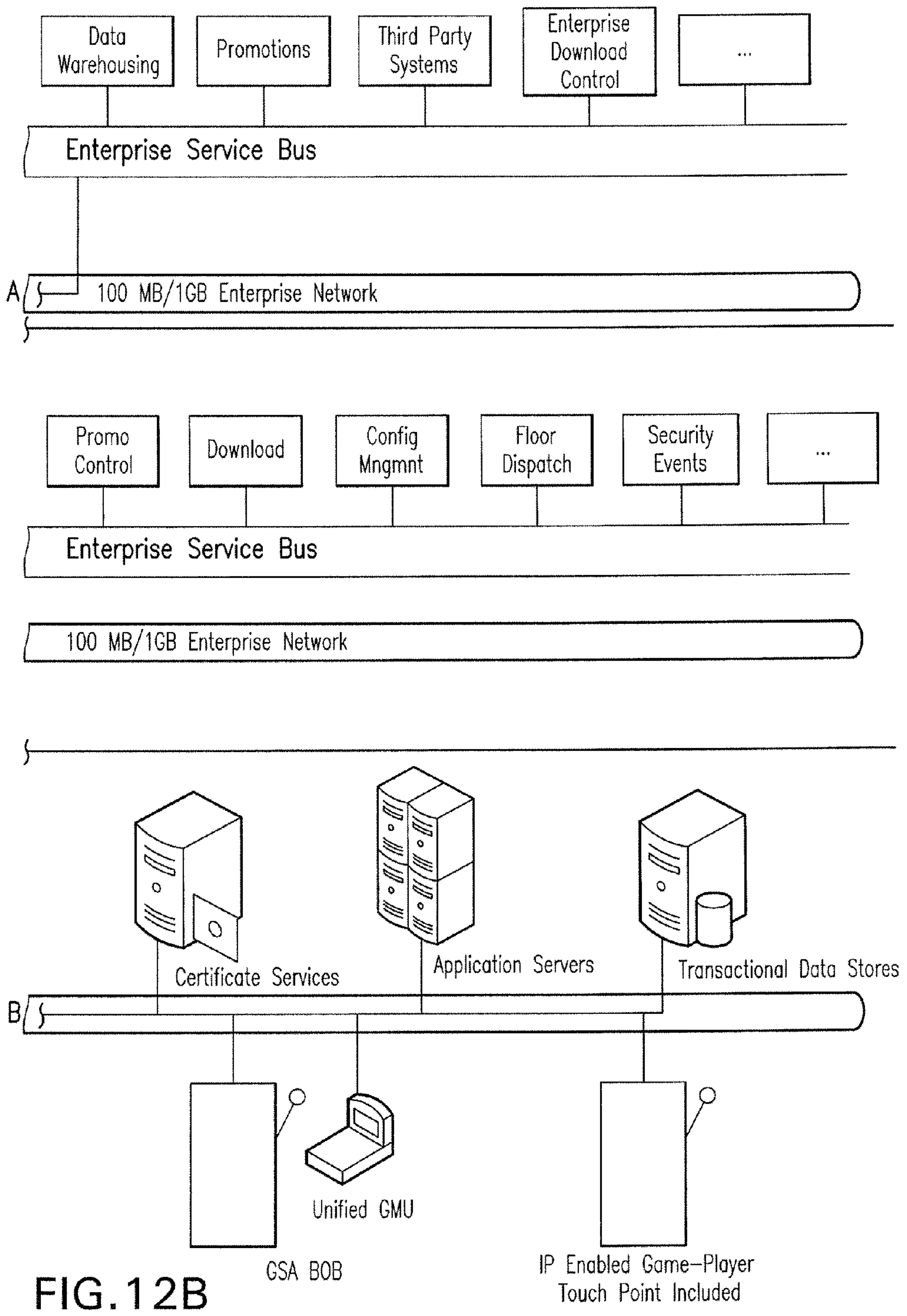

With reference to FIGS. 11A-11F, in one embodiment, a network diagram illustrating components of the system game network illustrates in which system game servers 140 and 180, have multi-site with multi-sub-site capability. In one embodiment, each site is assigned a specific currency. With reference to FIGS. 12A-12B, in one embodiment, the casino system gaming network is a multi-level casino network design, with the bottom layer including casino floor gaming machines, and the middle level including a casino service layer, and a top layer including an enterprise server layer.

IVIEW Interface Software and Hardware

Figure 13A:
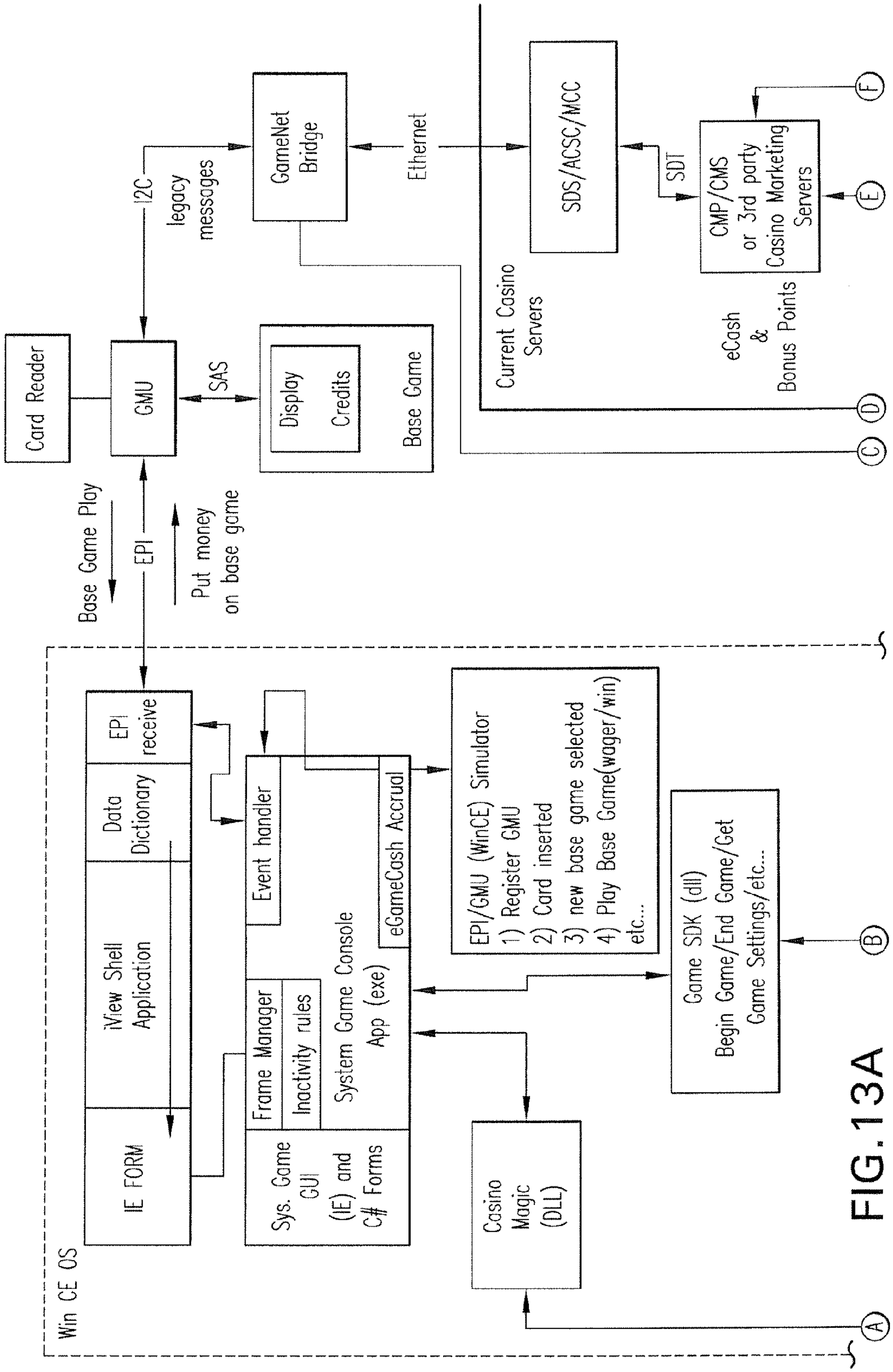
FIGS. 13A-13B are block diagrams that illustrate the relationship between client hardware and software and system gaming servers according to one embodiment.
Figure 13B:
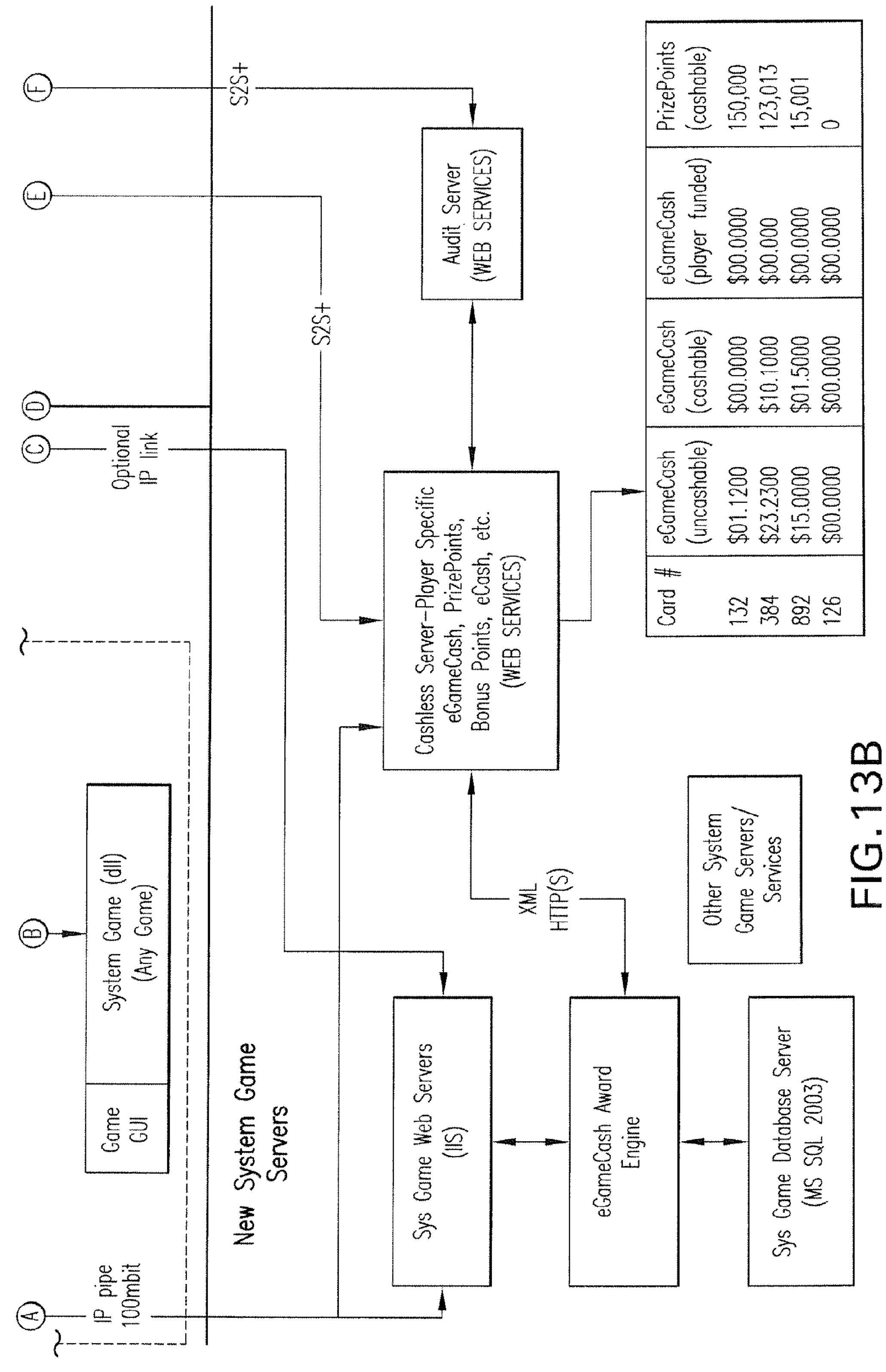
Figure 14A:
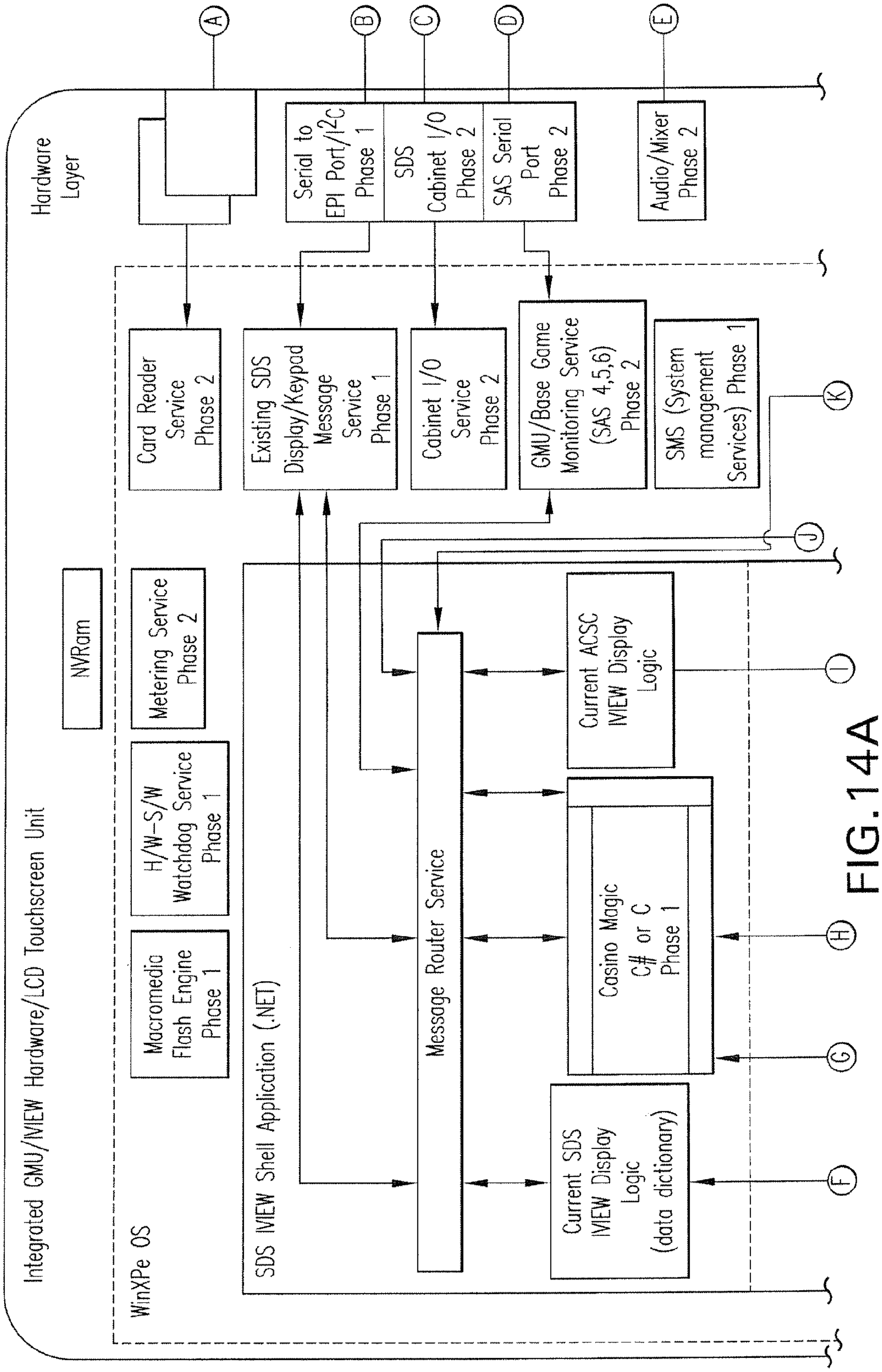
FIGS. 14A-14D are block diagrams illustrating components of a unified additional user interface and game monitoring unit board and software according to one embodiment.
Figure 14B:
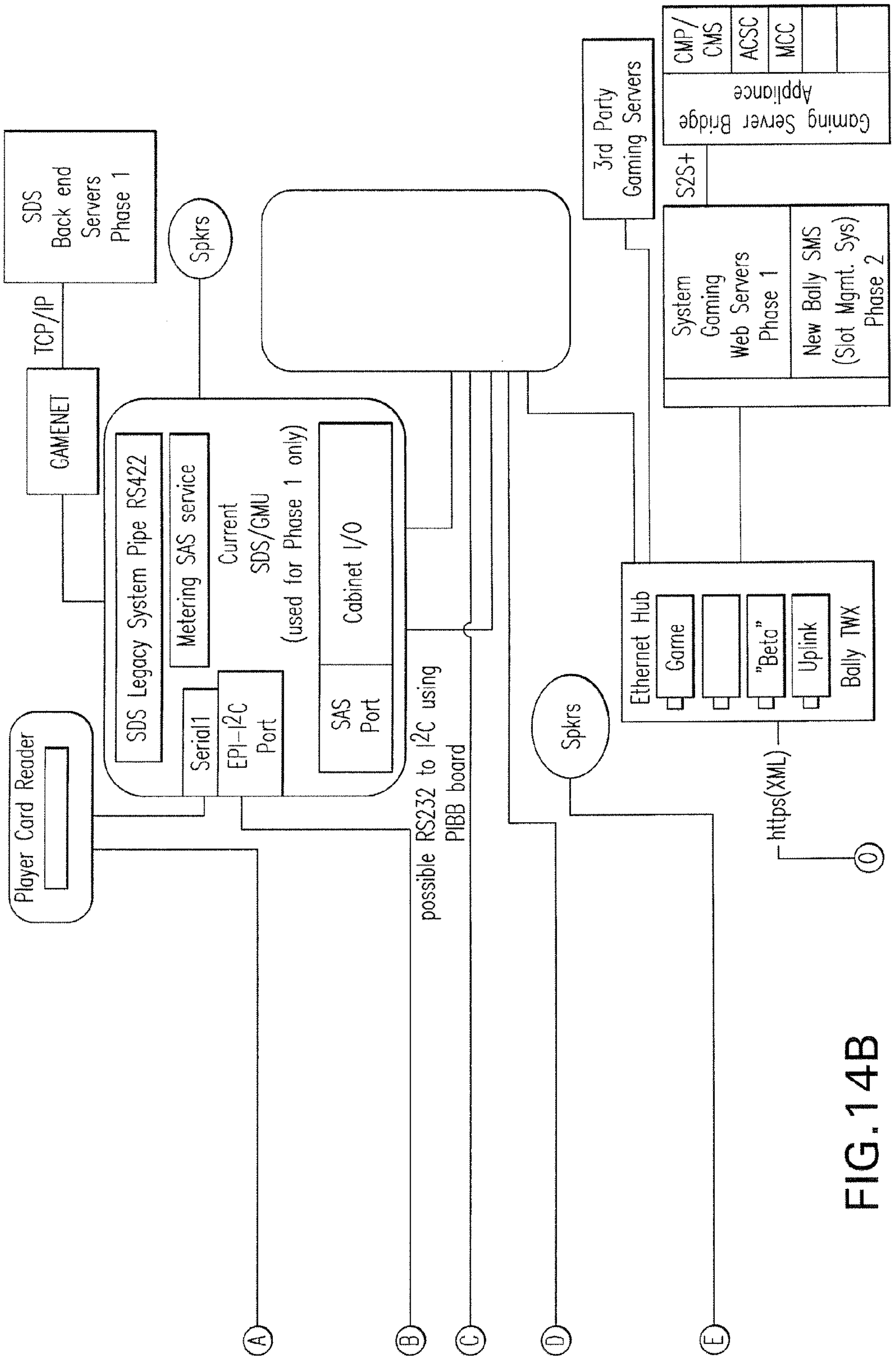
Figure 14C:
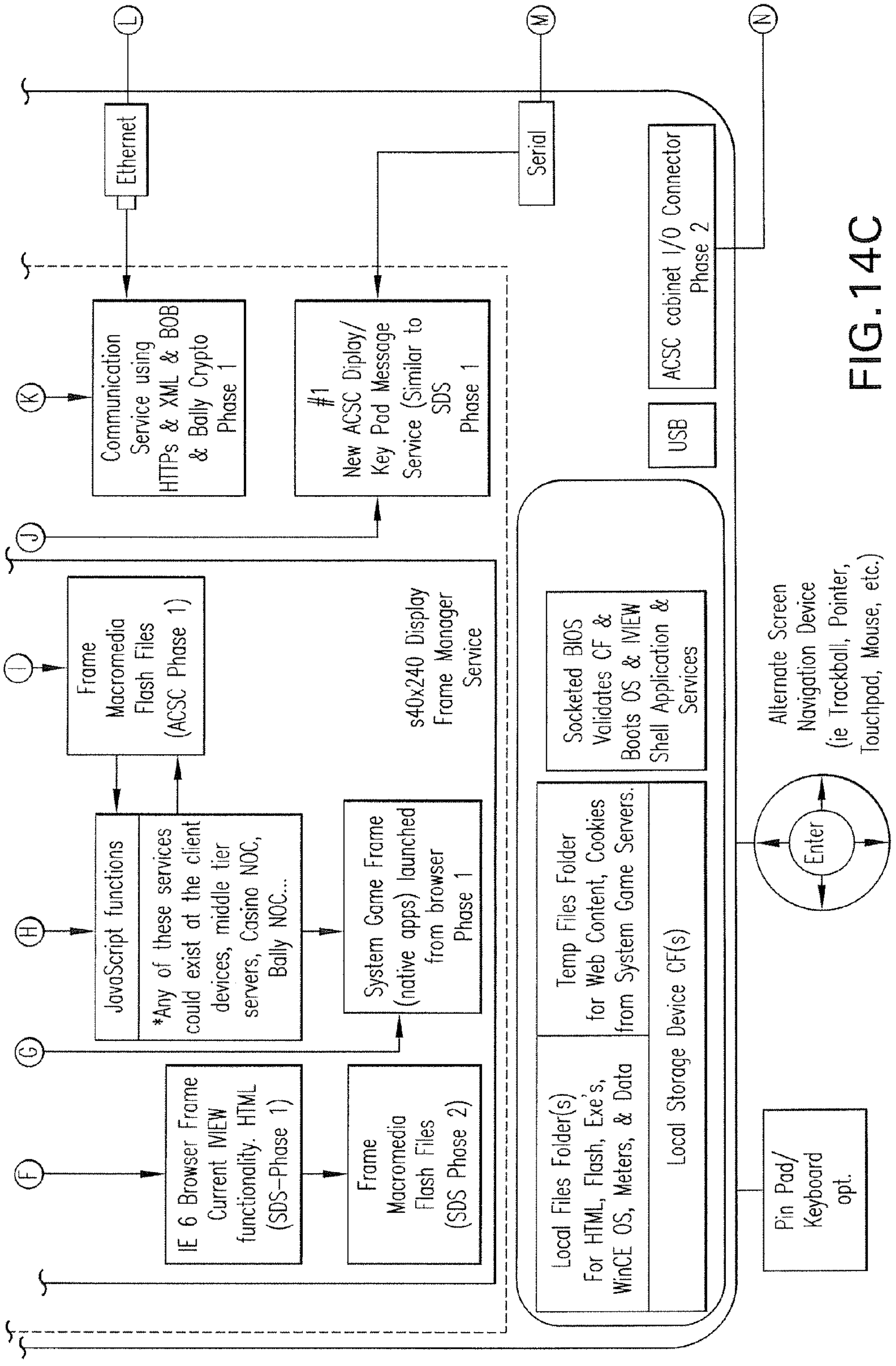
Figure 14D:
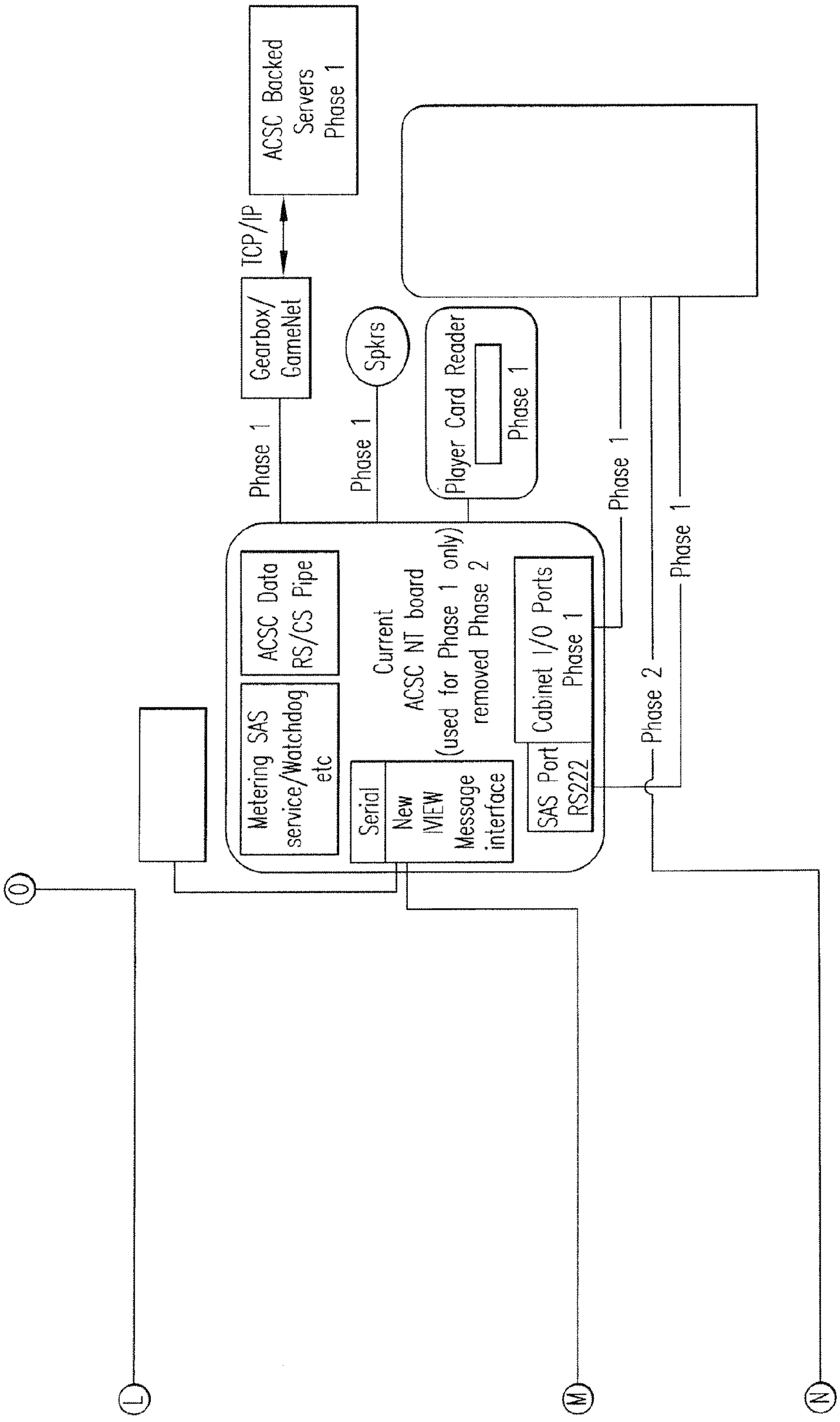

In one embodiment, the software and media types on the IVIEW interface 216 include but are not limited to the following: Windows CE® or Windows XP® embedded software, Dot Net Compact Framework® 2.0 or higher, Java® applets, Java® Applications, Java® Midlets, HTML, DHTML, JavaScript®, Macromedia® Flash®, animated GIF, JPEG, BMP, PNG, C# applications, Visual Basic.Net® applications, Internet Explorer®, XML, ASPX, ASP. Shockwave®, and VBScript®, Windows® Forms. The client side game system on the IVIEW interface 216 is capable of playing, for example, and not by way of limitation, Java®, Shockwave®, Flash®, C#, C++, Visual Basic® games. With reference to FIGS. 13A-13B, block diagrams illustrate the relationship between client hardware and software, and the system gaming servers according to one embodiment.

FIGS. 14A-14D are block diagrams illustrating components of a unified IVIEW/GMU board and software according to one embodiment. In the embodiment of FIGS. 14A-14D, the Integrated GMU/IVIEW board is provided in addition to their NT board and a System Data Service 250 board. This board serves as the Display Processor and PIN pad interface. All of the GMU 218 functionality is moved into the Integrated GMU/IVIEW board of FIGS. 14A-14D, including the function of monitoring the base game 202, meters, and the like.

Figure 15:
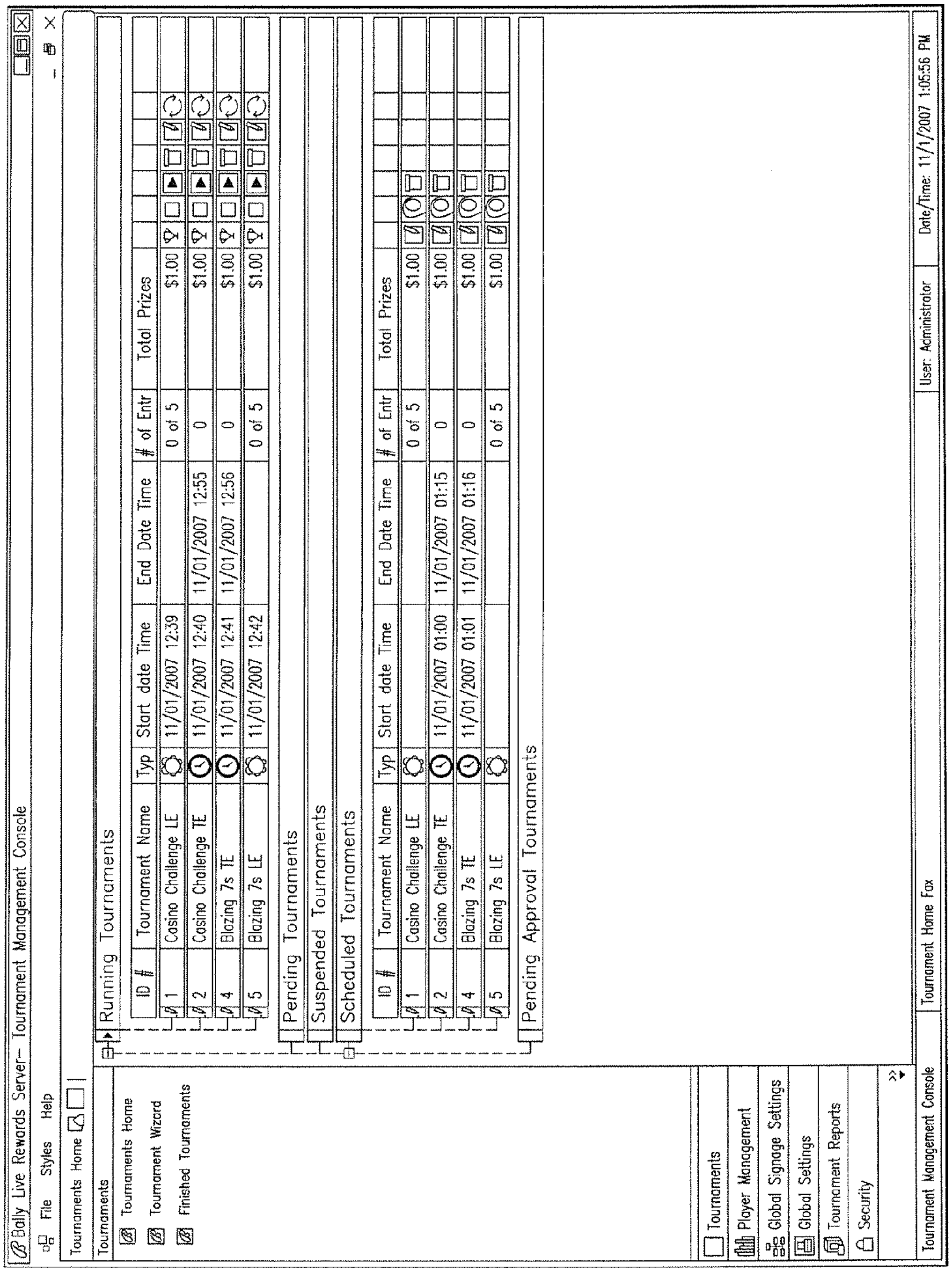
FIGS. 15-29 are sample screen shots from one embodiment of a tournament management console.

According to one embodiment, the tournament gaming system includes a management console. In various embodiments, the management console is a computer, laptop, or other player terminal that is in communication with a tournament gaming server. FIGS. 15-29 illustrate various screenshots of the management console. The management console provides a user display and user interface to configure, manage one or more tournament games. For example, FIG. 15 illustrates a screenshot of a home page of the management console presenting listings of all the running tournaments, pending tournaments, suspended tournaments, scheduled tournaments, and tournaments pending approval. Each of the listed tournaments includes further information such as, but not limited to, a tournament name, type of tournament (e.g., time based or fixed number of players), start time (e.g., date and time), end time, number of entrants into the tournament, and total prizes. Additionally, from the home page, the user may navigate to other pages such as, but not limited to, a tournament wizard page (to configure a tournament game) or a finished tournaments page, player management page, global signage settings page, global settings page, tournament reports page, or a security page.

Figure 16:
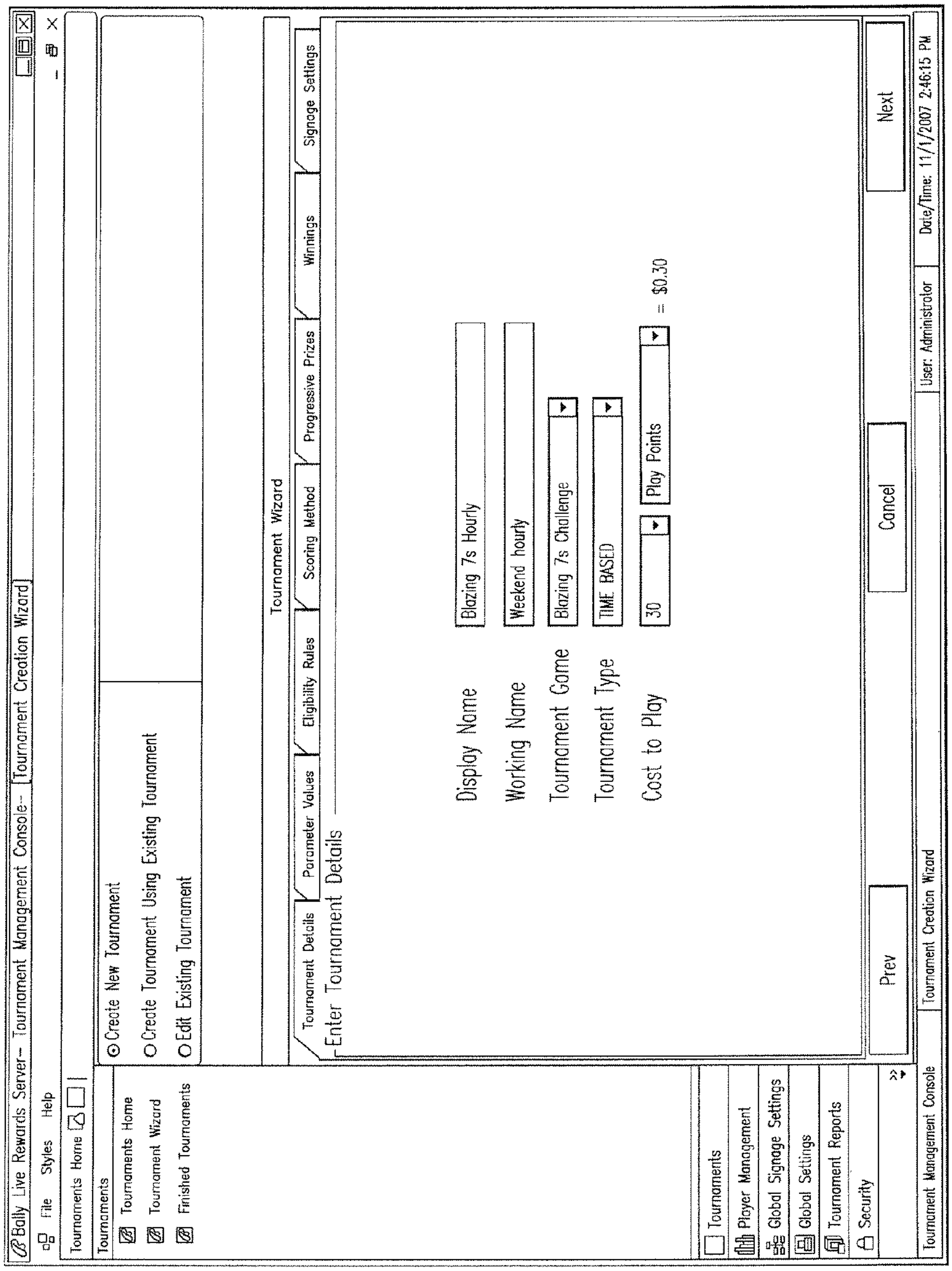

FIG. 16 is a screenshot of a tournament creation wizard, specifically a "tournament details" page of the tournament creation wizard. The tournament creation wizard page allows a casino administrator to create a new tournament, create a tournament using an existing tournament, and edit an existing tournament. The tournament creation wizard page also includes the following tabs to pages that allow a casino administrators access tournament details, parameter values, eligibility rules, scoring methods, progressive prizes, winnings, and signage settings.

As shown in FIG. 16, the "tournament details" page is shown. The "tournament details" page provides a plurality of fields that allows a casino administrator to create or modify the display name of the tournament game, working name, tournament game, tournament type, and cost to play the tournament game. The "display name" field represents the name of the tournament game shown to users on the IVIEW display, gaming machine, and signage. The "working name" field presents a tournament name that is used internally (i.e., a name for casino administrator to use for configuration and reporting reasons). The "tournament game" field represents the specific tournament game that will be presented to the player. In one embodiment, the field is includes a drop down menu of all the possible games that can be presented as a tournament game. As shown in FIG. 16, the "Blazing 7s Challenge" is selected). In another embodiment, the casino operator may select a "Casino Challenge" game. As those skilled in the art will appreciate, any type of casino game may be presented as a tournament game. In one embodiment, the game selected in the tournament game field is presented on the IVIEW display of a gaming machine. Alternatively, the tournament game is presented on a main or secondary display of the gaming machine. The "tournament type" field allows a casino operator to configure the type of tournament game. For example, the tournament game may be a time based (e.g., specific duration) or limited entry (i.e., fixed number of players). In one embodiment, the field is includes a drop down menu of all possible tournament games types as disclosed herein. The "cost to play" field allows a casino operator to establish the number of "play points" (e.g., a play point or entry point is a percentage of the money wagered on the gaming machine) or cash equivalent required for a player to earn in order to qualify for the tournament game.

Figure 17:
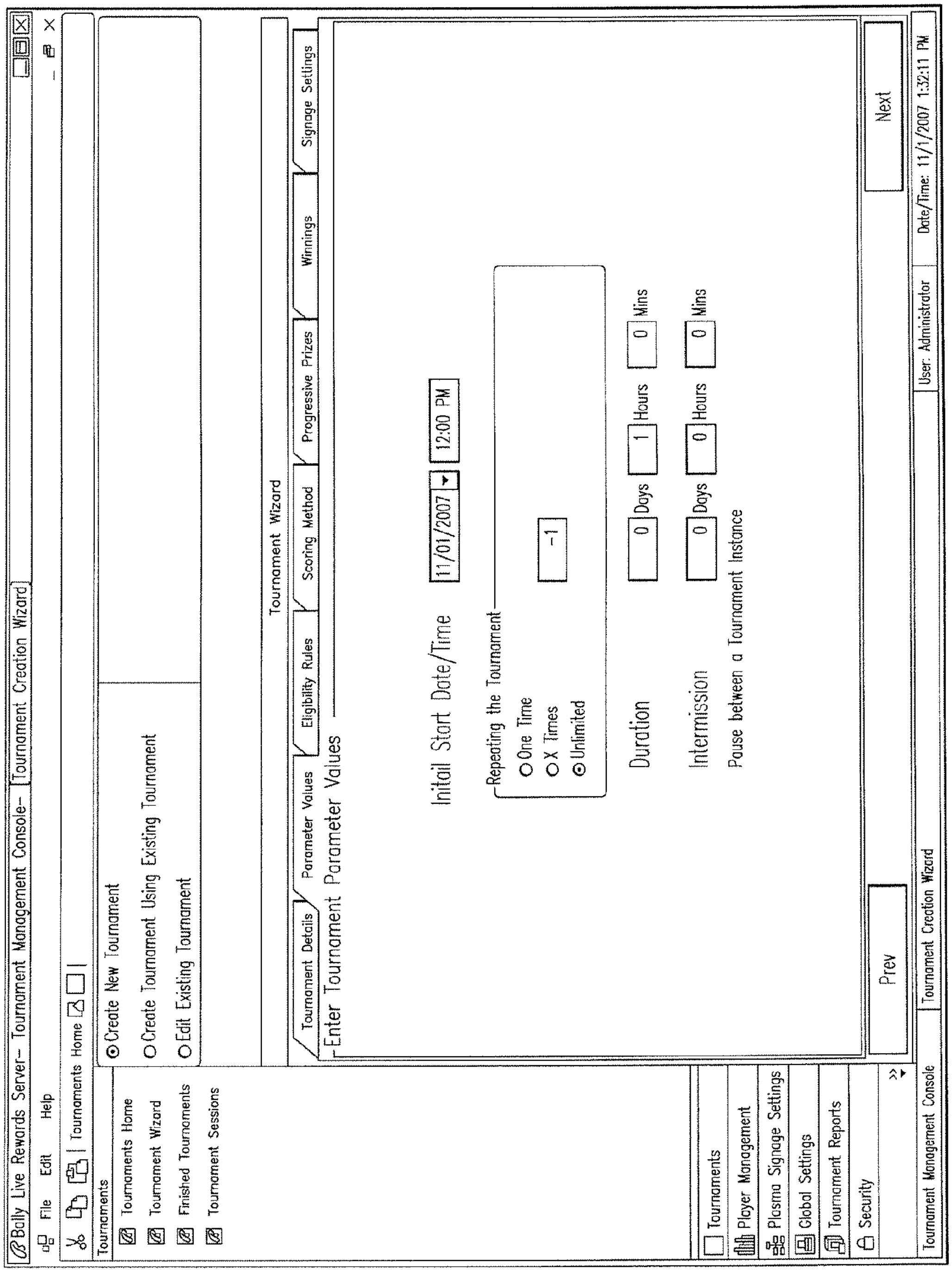

FIG. 17 is a screenshot of the "parameter values" page in the tournament creation wizard. The "parameter values" page includes fields for configuring the start date of the tournament, the number of times the tournament is repeated (e.g., one time, X number of times, or an unlimited number of times), the duration for each tournament (e.g., in days, hours, minutes, or a combination thereof), and the duration of any intermission (e.g., in days, hours, minutes, or a combination thereof) between starting up subsequent repeat tournaments.

Figure 18:
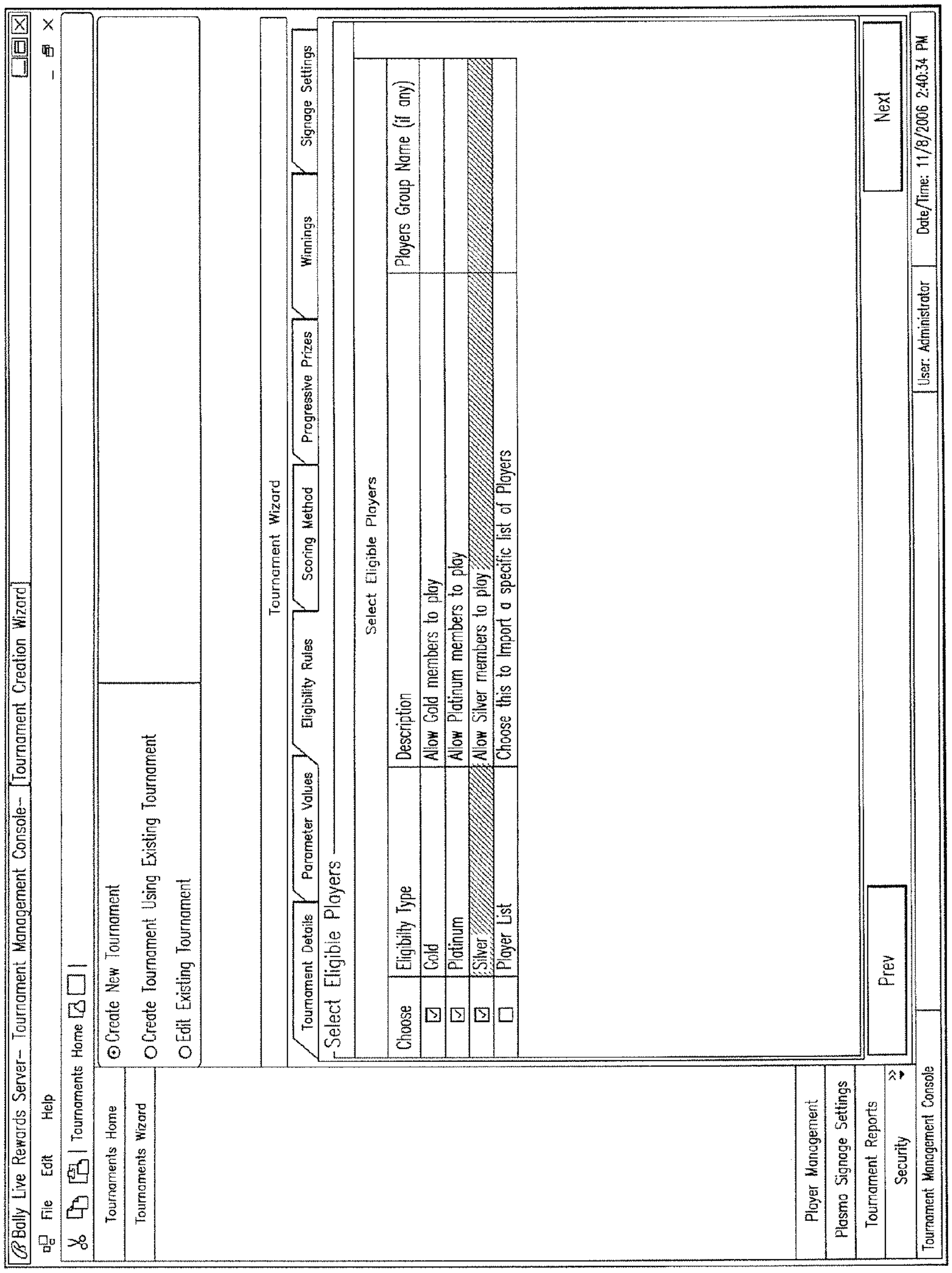

FIG. 18 is a screenshot of the "eligibility" page in the tournament creation wizard. The eligibility page allows the casino administrator to establish which casino player types (i.e., player card holders) are allowed to play any tournament game. As shown in FIG. 18, Silver, Gold, or Platinum level members may be eligible to play a tournament game. Additionally, a player list (e.g., group of players) may be imported into this application. According to one embodiment, if a player has been assigned to be able to play a specific tournament, the tournament will be selectable on the iVIEW for this player after they have carded into the device. Alternatively, an eligible player (e.g., gold, silver, platinum, or player list) will be allowed to play a tournament game if they earn a sufficient number of tournament entry points.

In addition to setting eligibility requirements, other events may be used to initiate a tournament game. In one embodiment, the triggering event is a computer or system generated response such as, but not limited to, a message from a system host, a message from another networked gaming machine, or a winning outcome in a primary game. For example, the triggering event may be a symbol combination of "cherry-cherry-cherry" for a slots-type game. In a poker game, the triggering event may be a pair of jacks or better. In other embodiments, the triggering event may be any winning outcome having a low or high probability. In those embodiments where a gaming machine presents both a primary game and a secondary game, the triggering event may be an outcome in either the primary or the secondary game. The primary game and/or the secondary game may be a video game or a mechanical game (e.g., a game having one or more reels or wheels). As those skilled in the art will appreciate, the triggering event may be any possible game outcome and does not necessarily have to be a winning outcome.

Additionally, triggering events (or eligibility requirements) may be based upon player activity/actions. For example, the triggering event may be based upon player performance such as, but not limited to, time of play, frequency of play (i.e., number of games played in a particular period of time), number of maximum bets, number of player points earned, or a combination thereof. Additionally, a triggering event may be the player possessing a radiofrequency identification (RFID) tag while playing a gaming machine or walking by one or more gaming machines to trigger an attract mode of a game. In these embodiments, a random performance characteristic may be selected to initiate a tournament game. For example, a tournament game may be triggered when a player has played the game for 30 minutes. Alternatively, achieving a predetermined performance threshold for a particular performance characteristic may be required to initiate the tournament game. For example, a tournament game may be initiated when a player has made twelve maximum bets. In another embodiment, the triggering event may be based upon the number of credits on the gaming machine. That is, a random or predetermined number of credits will trigger the bonus period.

Figure 19:
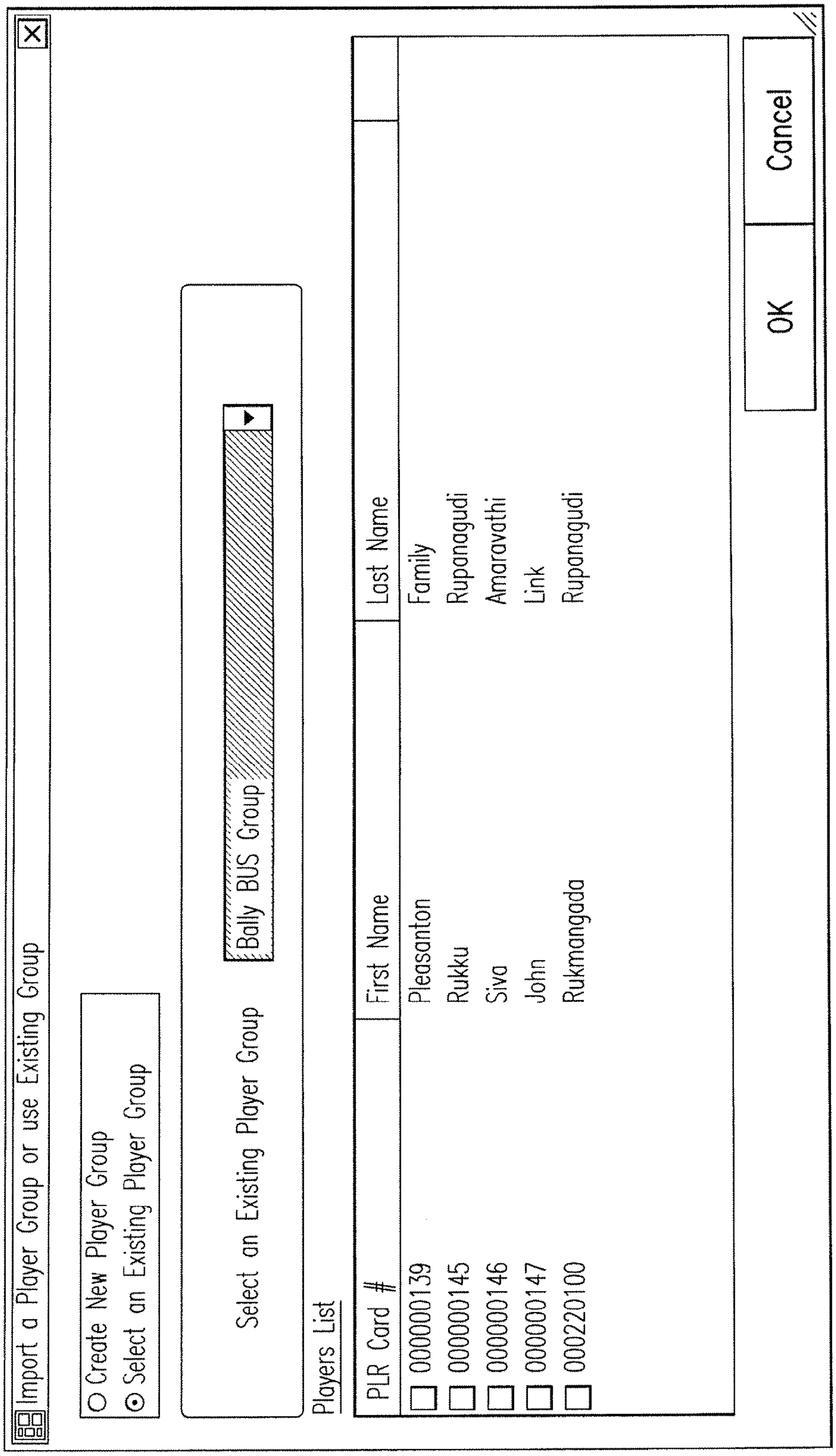

FIG. 19 is a screenshot of the "import a player group or use existing group" page in the tournament creation wizard. This page allows a casino administrator to generate a specific list of players eligible to play a tournament game. For example, a list of players that consist of a special group of visitors, such as a bus group, may be eligible to play a tournament game. The defined list of patrons and their player card numbers can be imported into the application. As shown in FIG. 19, a drop down menu allows a casino administrator to select existing player groups or the administrator can create a new player group by adding individual players or merging different groups together.

Figure 20:
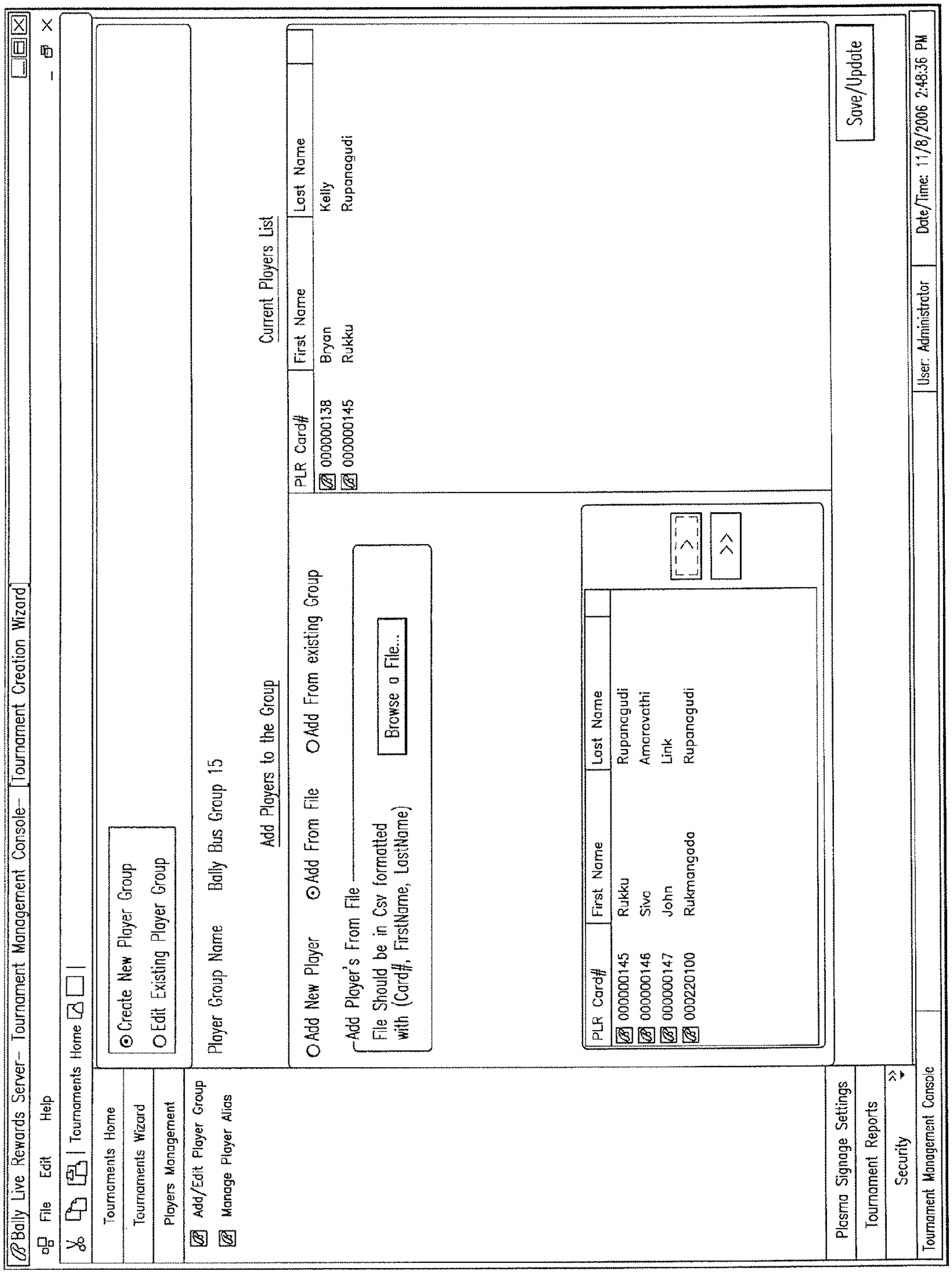

FIG. 20 is a screenshot of the "Add/Edit Player Group" page in the tournament creation wizard. On this page, one or more players may be added to a new or an existing player group. The specific group of players may be defined, imported, and linked into a new player group. The group may be assigned to any tournament (existing or currently being configured). As shown in FIG. 20, players may be added from a file that is a list of each player's first name, last name, and player card number. The list of available players that may be used to form a new group or added to an existing group is shown at the bottom of the screen. The current player shows the individual players that are part of the group (e.g., Bally BUS Group 15).

Figure 21:
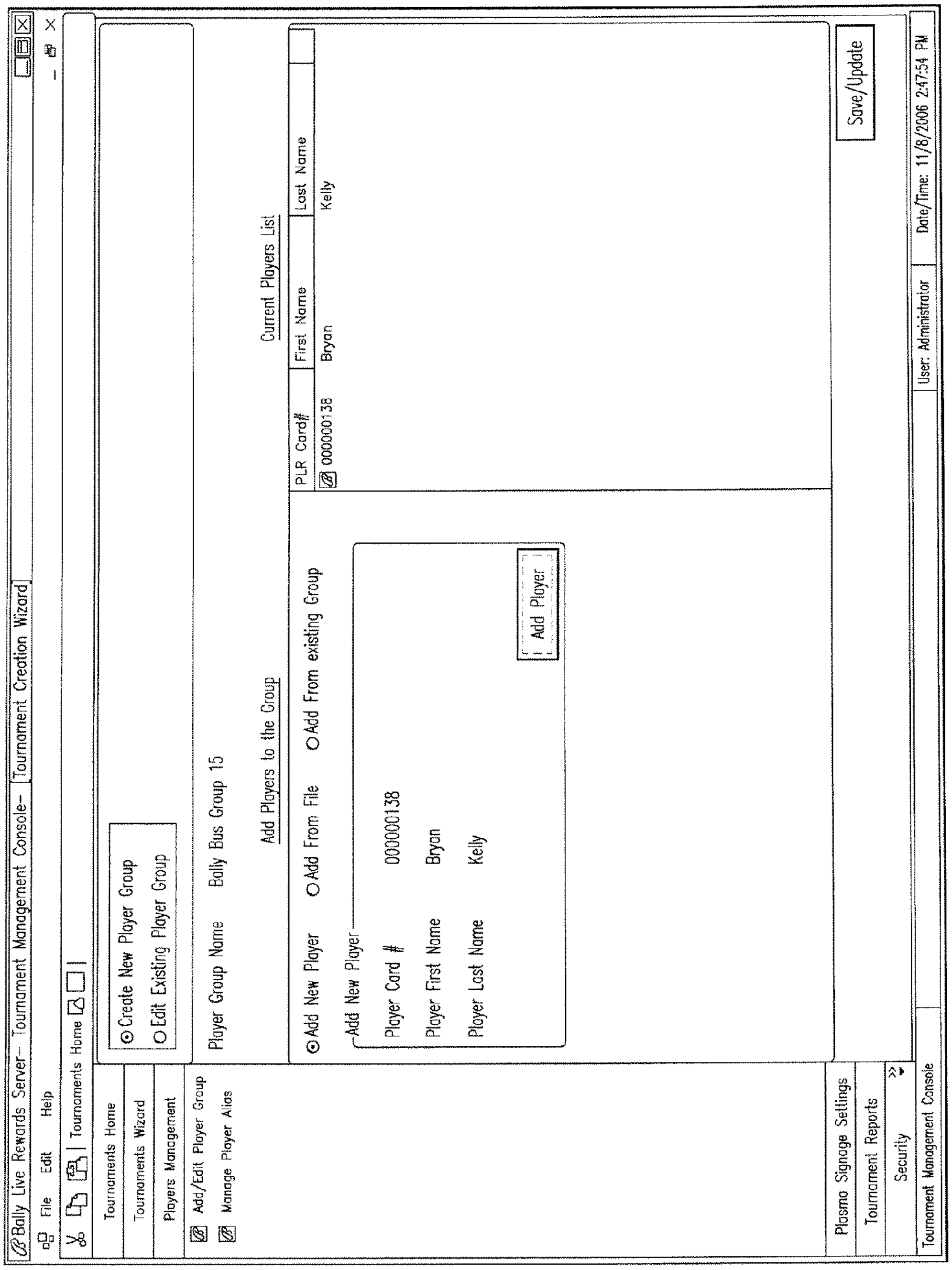

FIG. 21 is a screenshot of "Add/Edit Player Group" page in the tournament creation wizard. In this page, a specific individual player may be added to a running tournament or an existing group (e.g., Bally Bus Group 15).

Figure 22:
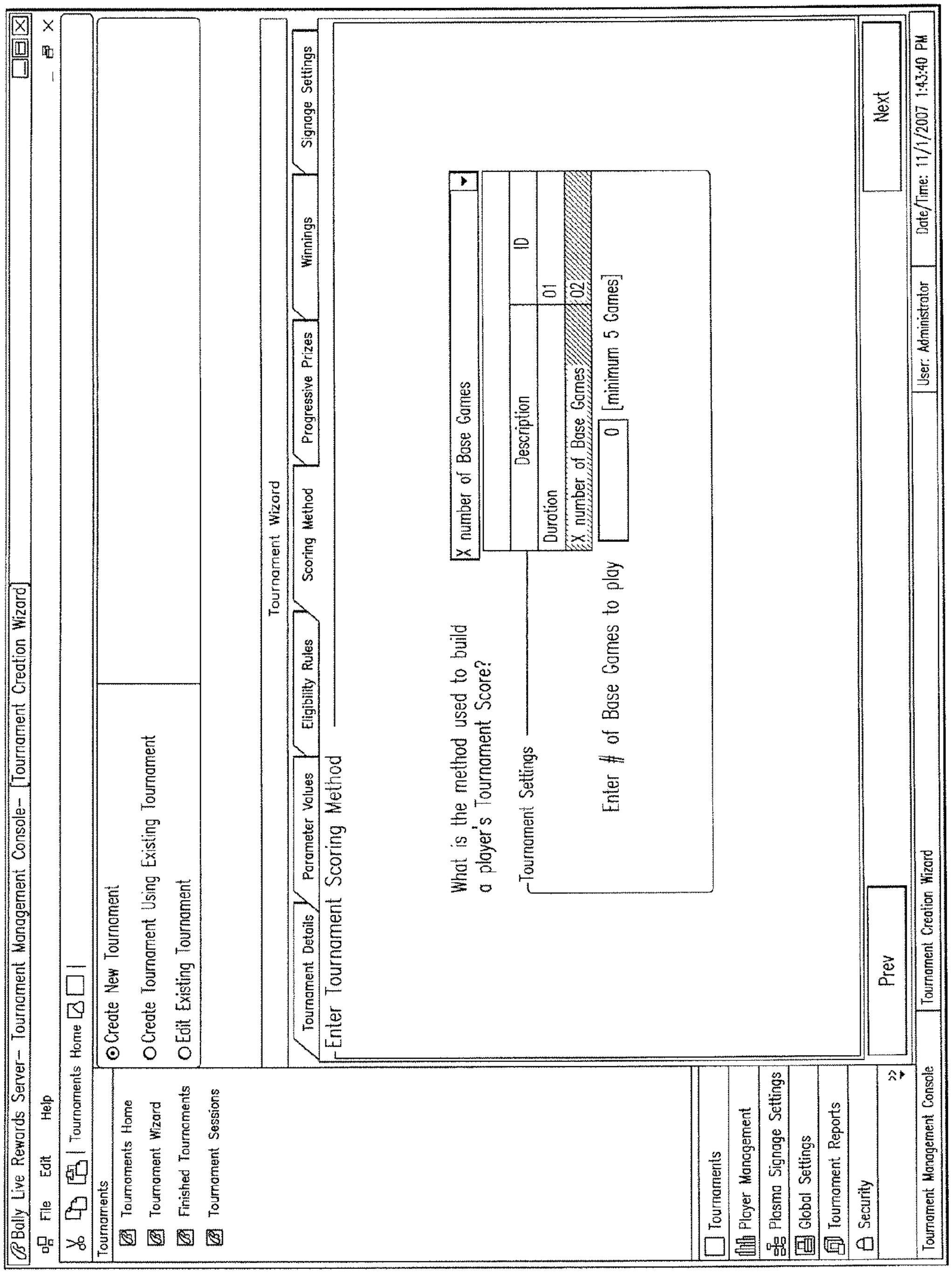

FIG. 22 is a screenshot of the "Scoring method" page in the tournament creation wizard. The fields in this page allow a casino administrator to define the scoring methodology for a tournament game. The player's score may be based upon the score the player achieves after playing the tournament game for a defined period of time or after a certain number of games. If the player's score is based upon the number of games, a field on this page allows a casino administrator to define the number of base games to play. As shown in FIG. 22, a casino operator needs to select a minimum of five games. However, those skilled in the art will appreciate that any minimum number of games may be required. Once the tournament "conclude rule" (i.e., playing a defined number of games or for a particular duration) is satisfied, the player's tournament score is frozen and his/her tournament score entry is complete. The tournament score is then judged for prizes at the conclusion of the tournament.

Figure 23:
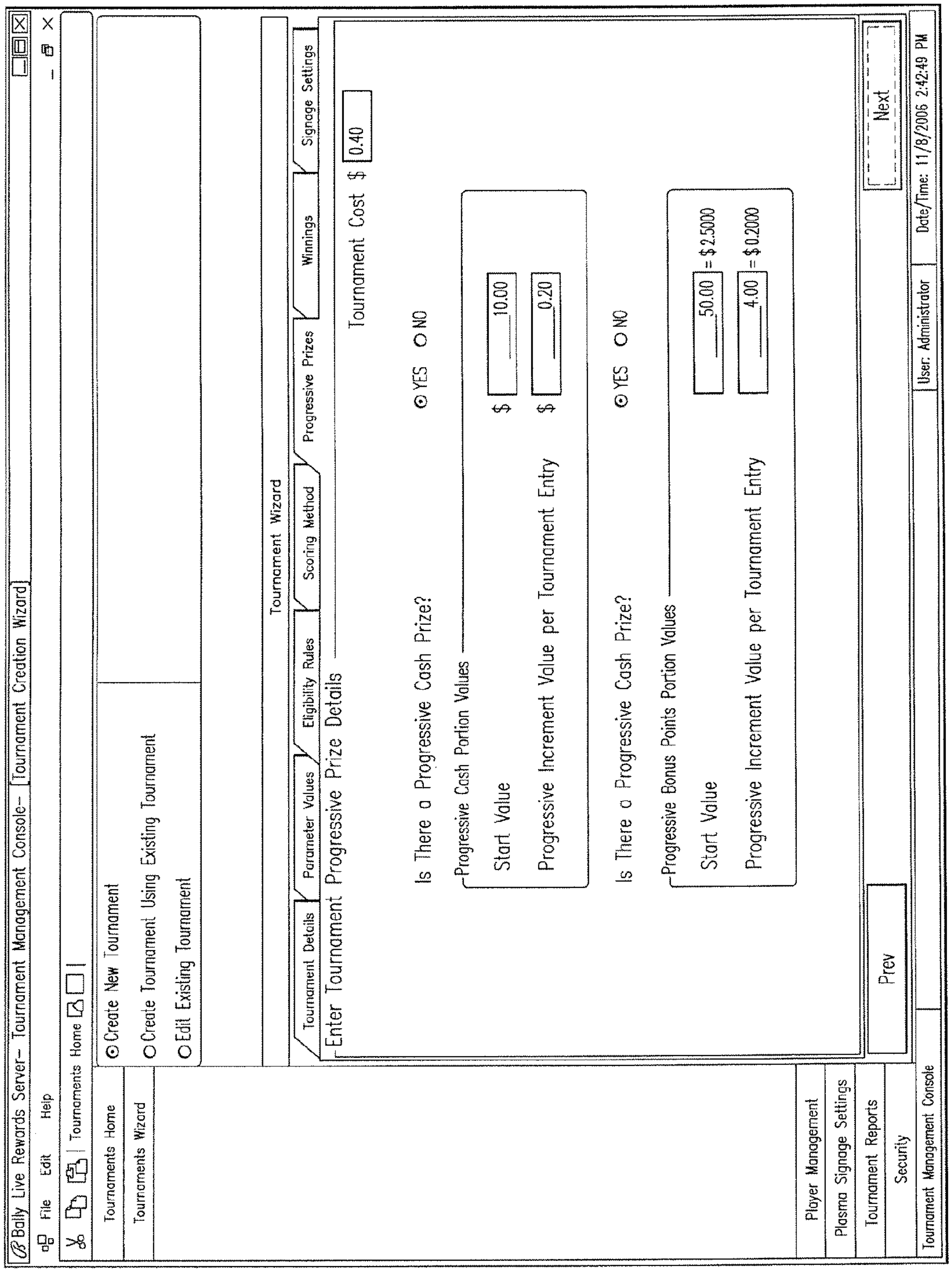

FIG. 23 is a screenshot of the "Progressive Prizes" page in the tournament creation wizard. The "Progressive Prizes" page includes one or more fields that allow a casino administrator to configure progressive prizes for the tournament game. The progressive prize may be a progressive cash prize, a progressive bonus point prize, or a combination of both a cash and bonus point prize. The progressive cash prize component includes fields for a start value and a progressive increment value per tournament game entry. Likewise, the progressive bonus point prize component includes fields for a start value and a progressive increment value per tournament game entry. These progressive prizes would be shown to the player on the iVIEW and on overhead signage throughout the casino properties.

Figure 24:
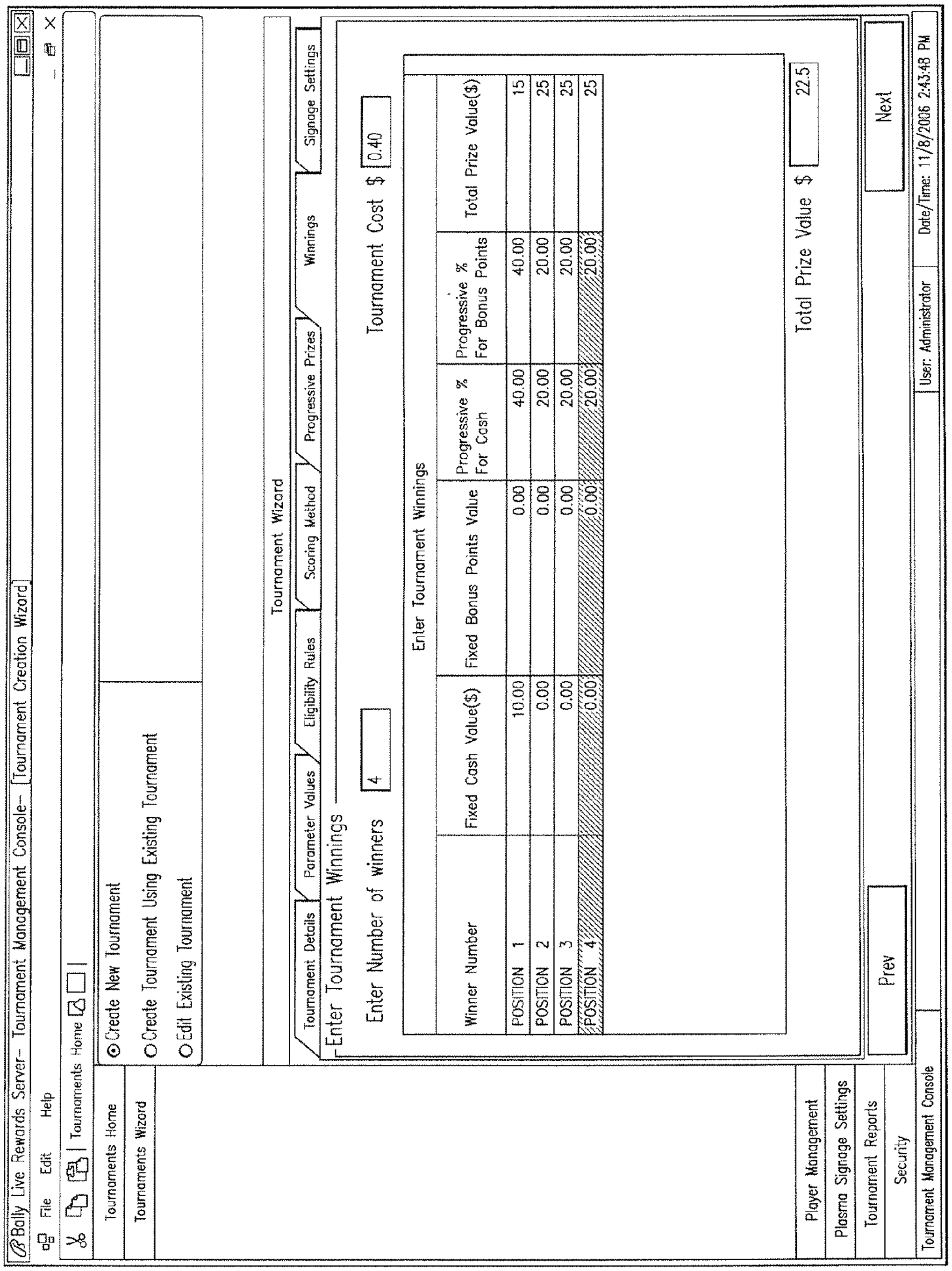

FIG. 24 is a screenshot of the "Winnings" in the tournament creation wizard. The "Winnings" page includes a plurality of fields for configuring prize allocation to the winners of a tournament game. The fields define the prize allocation by the number of winners (i.e., winning positions) and the allocation of cash and bonus points for each winning position. The cash component of a winning position may include a fixed cash value and/or a percentage of a progressive cash pool. Likewise, the bonus point component of a winning composition may include a fixed bonus point value and/or a percentage of a progressive bonus point pool. As shown in FIG. 24, winning position 1 would receive a fixed cash award of $10, 40% of the cash progressive pool, and 40% of the bonus point progressive pool) for a total prize value of $15, and winning positions 2-4 would each receive 20% of the cash progressive pool and 20% of the bonus point progressive pool for a total prize value of $2.50.

Figure 25:
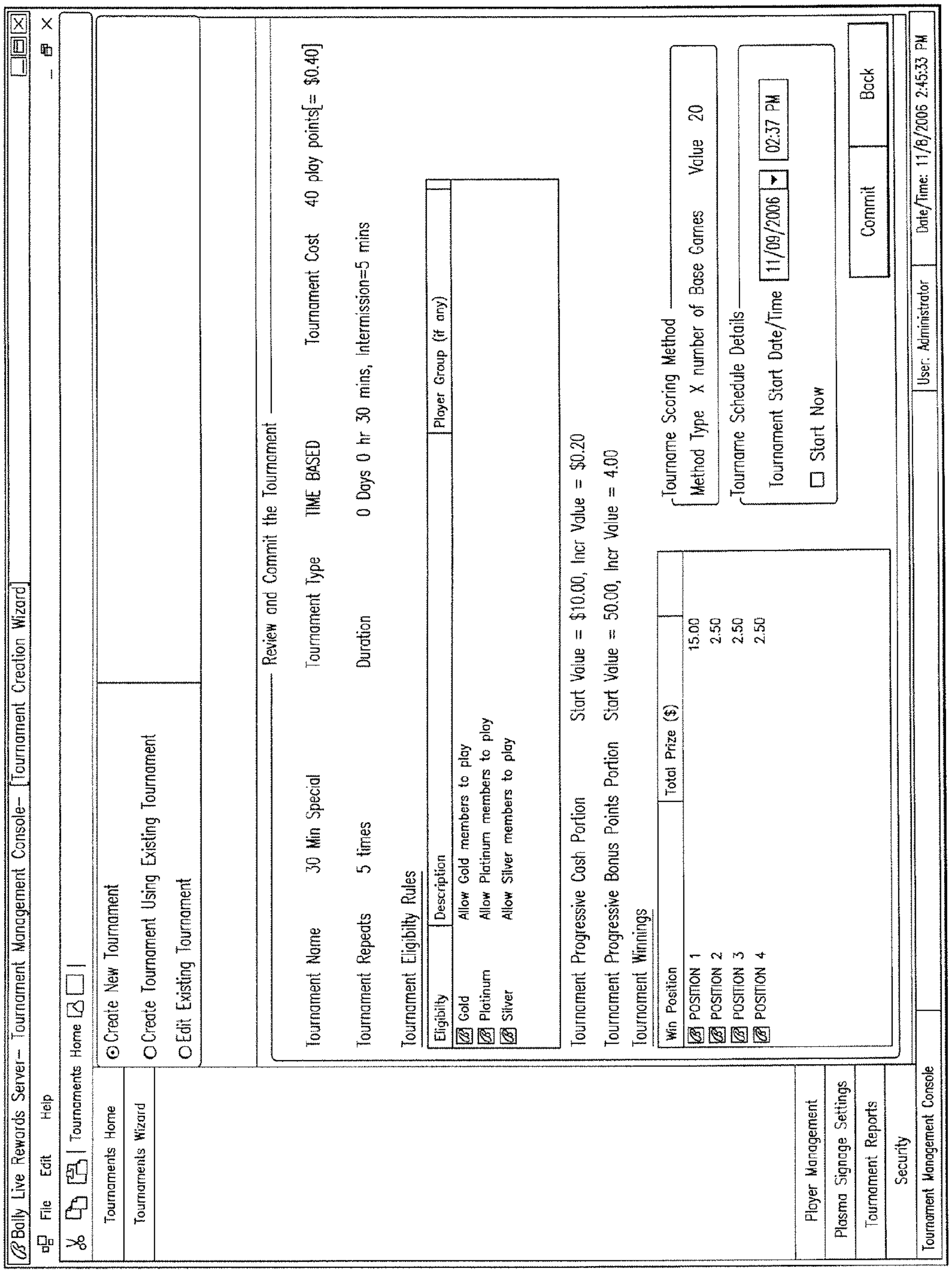

FIG. 25 is a screenshot of the "Review and Commit" page in the tournament creation wizard. This page summarizes all the configurations established for the tournament game prior to committing this tournament game to the database. As shown in FIG. 25, the "Review and Commit" page includes the following: tournament name, tournament type, tournament cost (i.e., cost to player to play the tournament game), tournament repeats, duration, tournament eligibility rules, tournament progressive cash portion, tournament progressive bonus points portion, tournament winnings, tournament scoring method, and tournament schedule details. The tournament game has multiple signoff authorizations by casino administrators that have the proper level of access. Once these signoffs are complete, the tournament can go live to the casino floor. Additionally, this page provides the option for the casino administrator to go back and edit the created tournament game.

Figure 26:
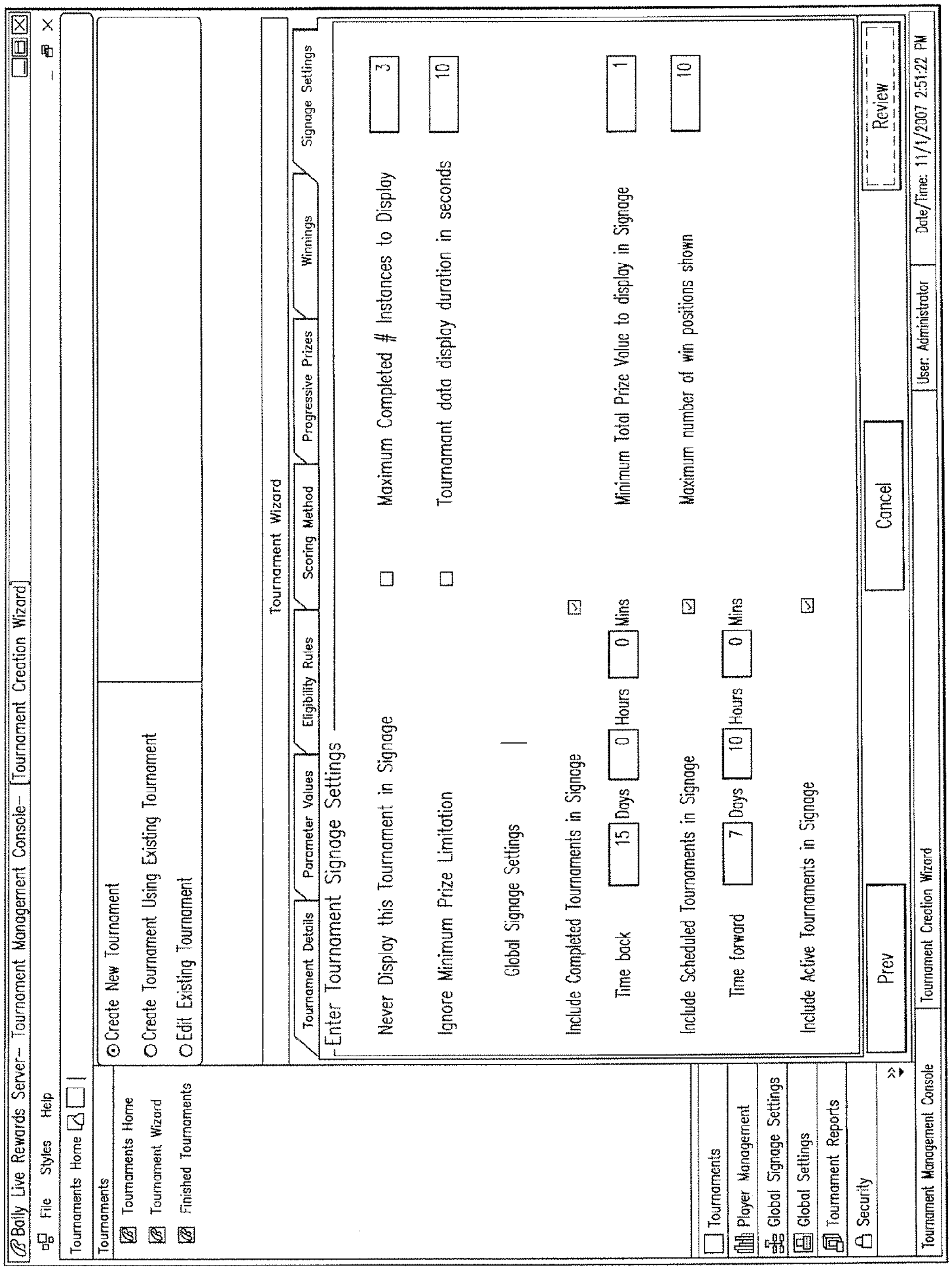

FIG. 26 is a screenshot of the "Signage Settings" page in the tournament creation wizard. This page includes a plurality of fields to configure presentation of tournament game information on an establishment's overhead signage or other signage located through the establishment. The tournament game information includes, but is not limited to, a leader board including the title of the tournament game, the prizes available for winning positions, rank of players (i.e., leader board), time remaining in the tournament game, number of entries remaining, or a combination thereof.

As shown in FIG. 26, a check box field provides a casino administrator with the option to never display a tournament game on the signage. For example, tournament game information would not be broadcast throughout a casino if the tournament game is limited to a few players or the prize values are deemed too low. Additionally, a check box field entitled "Ignore Minimum Prize Limitation" will override the minimum prize size rule. The minimum prize rule establishes that tournaments having a prize value under a predefined amount of total prizes will not be shown on signage throughout the property. As shown in FIG. 26, the "minimum total prize value" is shown under the "Global Signage Settings" tab and is defined as a total of 1 unit.

The "Maximum Completed # Instances to Display" field allows a casino administrator to define the maximum number of tournament games that may be presented on the signage at one time. As shown in FIG. 26, for example, the casino administrator has elected to show a maximum of three tournaments at a given time on the signage even though there may be more than three tournaments running at the time.

The "Signage Settings" page also includes a "tournament data display duration in seconds" field that defines the length of time any given display is presented on the signage. As shown in FIG. 26, the casino administrator may enter a duration in seconds. Alternatively, the duration may be selected via a drop down menu or by selecting a check box associated with a particular duration (e.g., 30 seconds, 60 seconds, or 90 seconds).

Additionally, the "Signage Settings" page provides data fields to make changes to "Global Signage Settings." For example, the results of completed tournament games may still be presented for a period of time. As shown in FIG. 26, the "Time Back" field allows the signage to display results of tournament games from the last 15 days. The "Time Forward" field allows the casino administrator to present tournament information for upcoming tournament games that have yet to start. Both the "Time Back" and "Time Forward" fields may configure in days, hours, minutes or a combination thereof.

Under the "Global Signage Settings" portion of the "Signage Settings" page, the casino administrator establishes whether completed tournaments, scheduled tournaments, and active tournaments are displayed on the signage. Additionally, the "minimum total prize value" and "maximum number of winning positions" may also be defined.

In yet another embodiment, the signage settings allow for the assignment of specific tournament game information to be presented on certain signs on the casino floor. For example, tournament game information is shown on signage in proximity to certain players actively playing tournament eligible games. That is, the display content presented on the signage throughout a casino establishment may be targeted to active players, eligible players, or uncarded players with the desired result of generating player interest or increasing player awareness of tournament games in which the player is/was a participant or an eligible participant.

Figure 27:
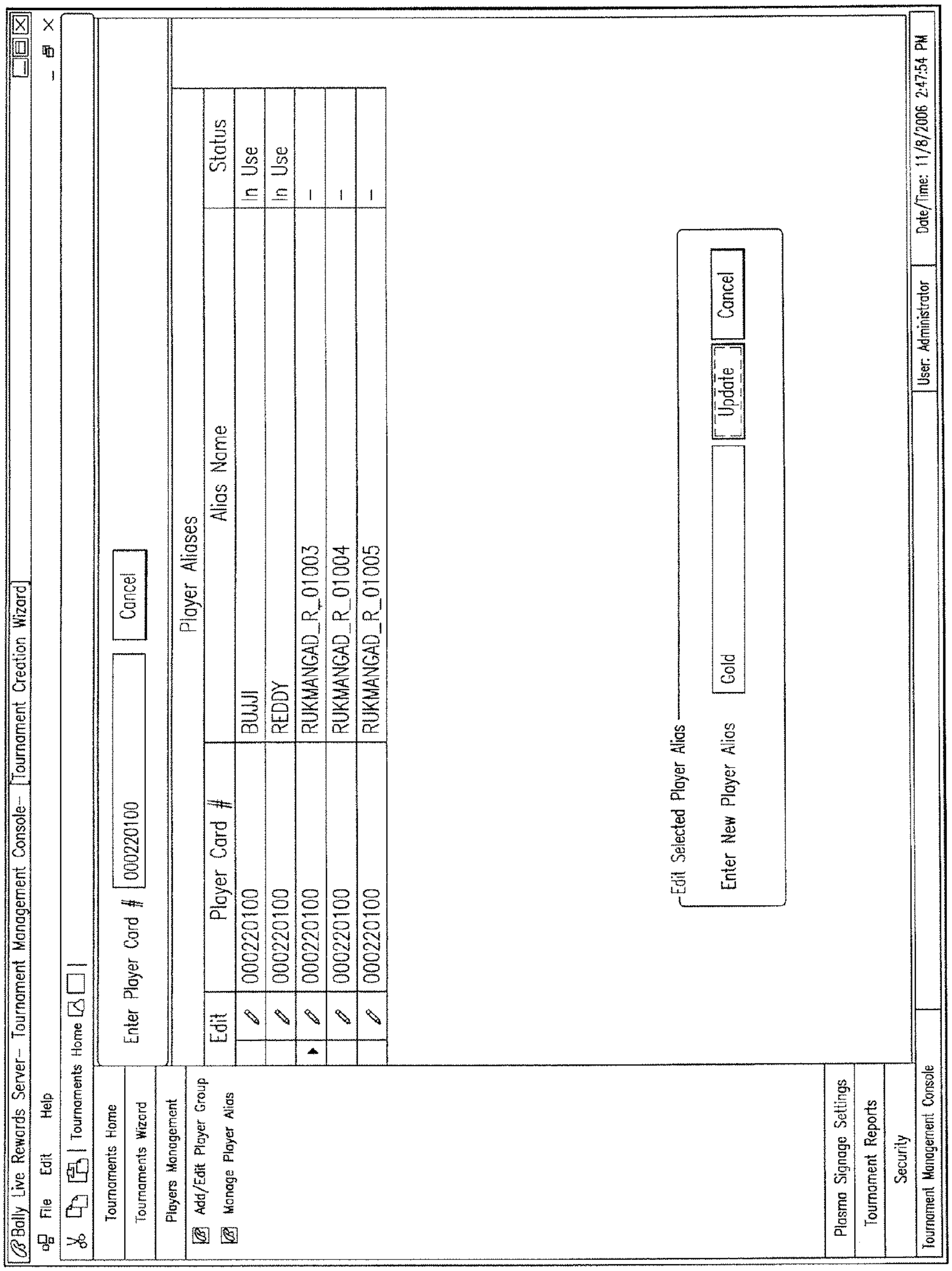

FIG. 27 is a screenshot of the "Player Alias Setup" page of the Player Management section of the Tournament Management Console. In the Player Management section, the casino administrator is able to add/edit a player group, setup player aliases (as shown in FIG. 27), and manage player aliases. On the "Player Alias Setup" page, a casino administrator may establish a player alias for a particular player card. The player alias is displayed on the overhead signage (e.g., on a leader board) and/or the iVIEW device in lieu of the player's real name. The player alias setup page allows a casino administrator to find a player account (via a player card number) and lists all the player aliases associated with the player card number. Additionally, the status of the alias is provided. As shown in FIG. 27, the player card number may be associated with five aliases. The aliases may be created by the player or selected by the player (i.e., selecting an alias from a list of default aliases). In FIG. 27, the player has created two alias names and has selected three default aliases. The default aliases consist of portions of their last name (up to 6 letters), first name (up to 4 letters), and player card number (last 4 #s), and a counter from 1 through 5. The default format for the aliases is as follows: last6_first4_card#last4_counter(1-5). The default alias provides a completely unique alias that is easily identifiable by the player yet the player remains anonymous. On the player alias setup page, aliases for a player card may also be edited. For example, as shown in FIG. 27, the player's third alias has been modified from a default alias to a new alias "Gold."

In one embodiment, the setup of the player alias may be done at a casino club desk. The player is asked for an alias which is associated with the player account. Alternatively, the player may input an alias at the gaming device (e.g., via an iVIEW device) or select an alias from a list of default aliases. According to one embodiment, the player is able to use different aliases for different gaming sessions (e.g., a first alias for the first gaming session, second alias for the second gaming session). In this embodiment, the player is able to play multiple tournament games (on different slot machines) and use the same player card and uniquely identify him/her on the leader boards of the tournament games. Additionally, with multiple player aliases, the player may compete against his previous score in the same tournament.

Figure 28:
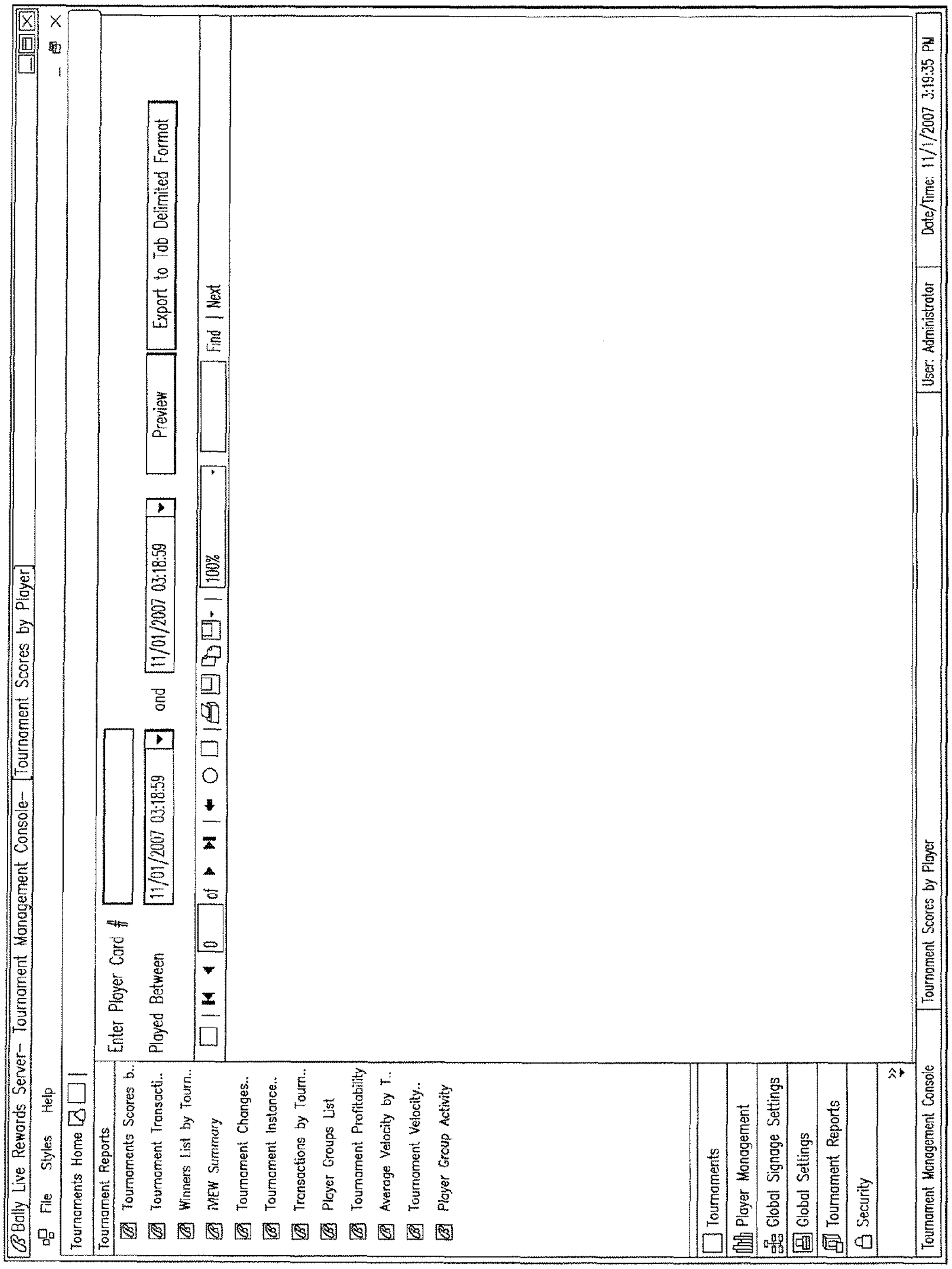

FIG. 28 is a screenshot of the "Tournament Scores by Player" page in the Tournament Reports section of the Tournament Management Console. On the "Tournament Scores by Player" page, a report for a player may be generated by entering a player card number and defining a time in which the tournaments may have been played. Additionally, other types of tournament reports may be generated. These reports include Tournament Reports by Player, Tournament Transactions by Player, Winners List by Player, iVIEW summary, Tournament Change History, Tournament Instance Change History, Transactions by Tournament Instance, Player Groups List, Tournament Profitability, Average Velocity by Tournament (i.e., how quick the tournament turns over), Tournament Velocity by Tournament Instance, and Player Group Activity.

Figure 29:
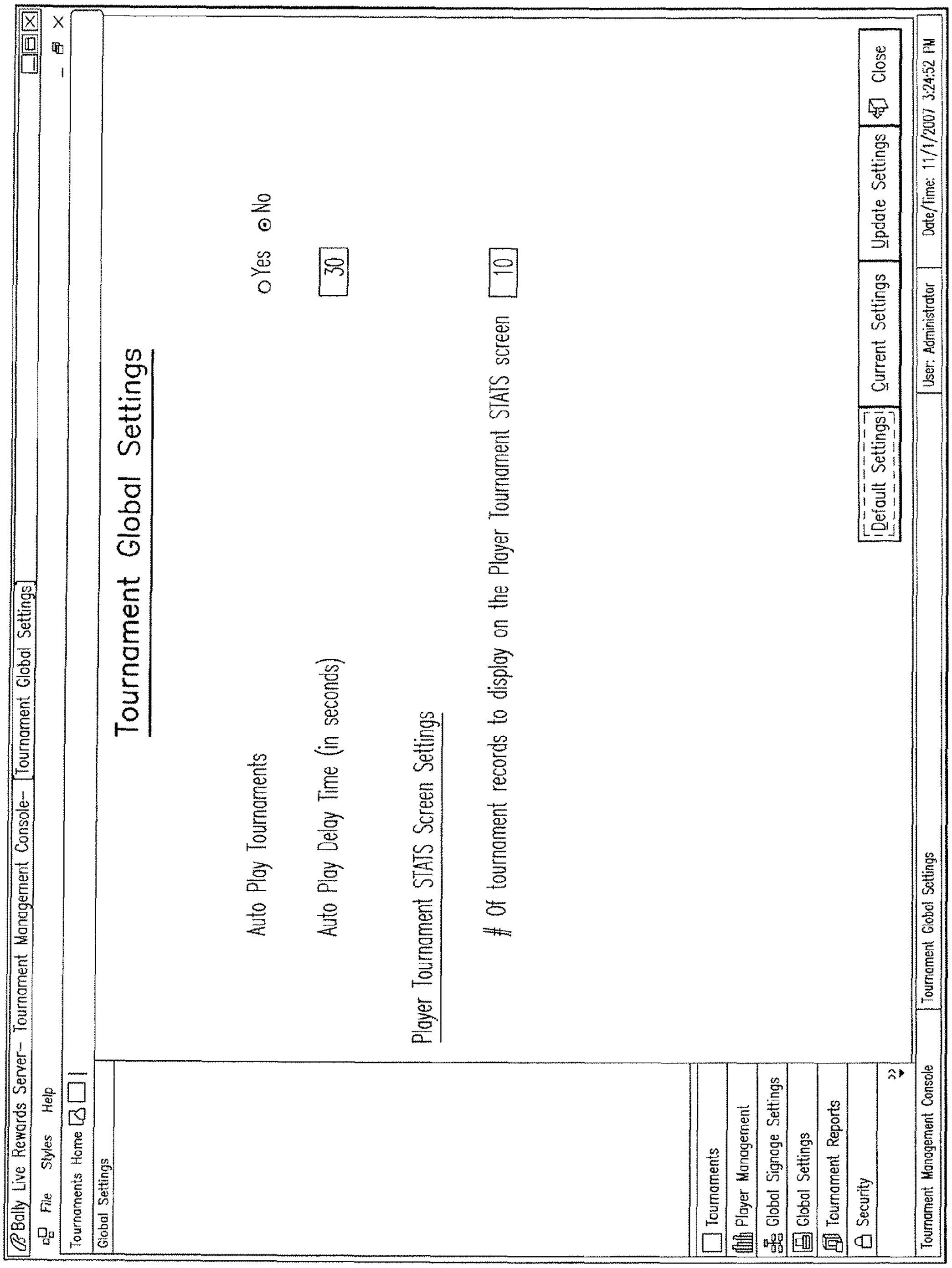

FIG. 29 is a screenshot of the "Tournaments Global Settings" page that provides default settings, current settings, and updates of the settings. One global setting is configuring tournament games for automatic play. In the automatic play setting, the tournament automatically starts when the player has achieved a sufficient number of play points to qualify for the tournament game. Another global setting is setting a delay duration (in seconds or any other time unit) prior to automatically starting the tournament game. Yet another global setting is establishing the number of tournament records to display on the statistics (stats) page for each tournament. According to one embodiment, the stats are presented on the iVIEW display. In other embodiments, the stats are presented on a main, secondary, or dedicated display of the gaming machine. As shown in FIG. 29, a player will be able to review the last ten tournaments in which the player was a participant.

Figure 30:
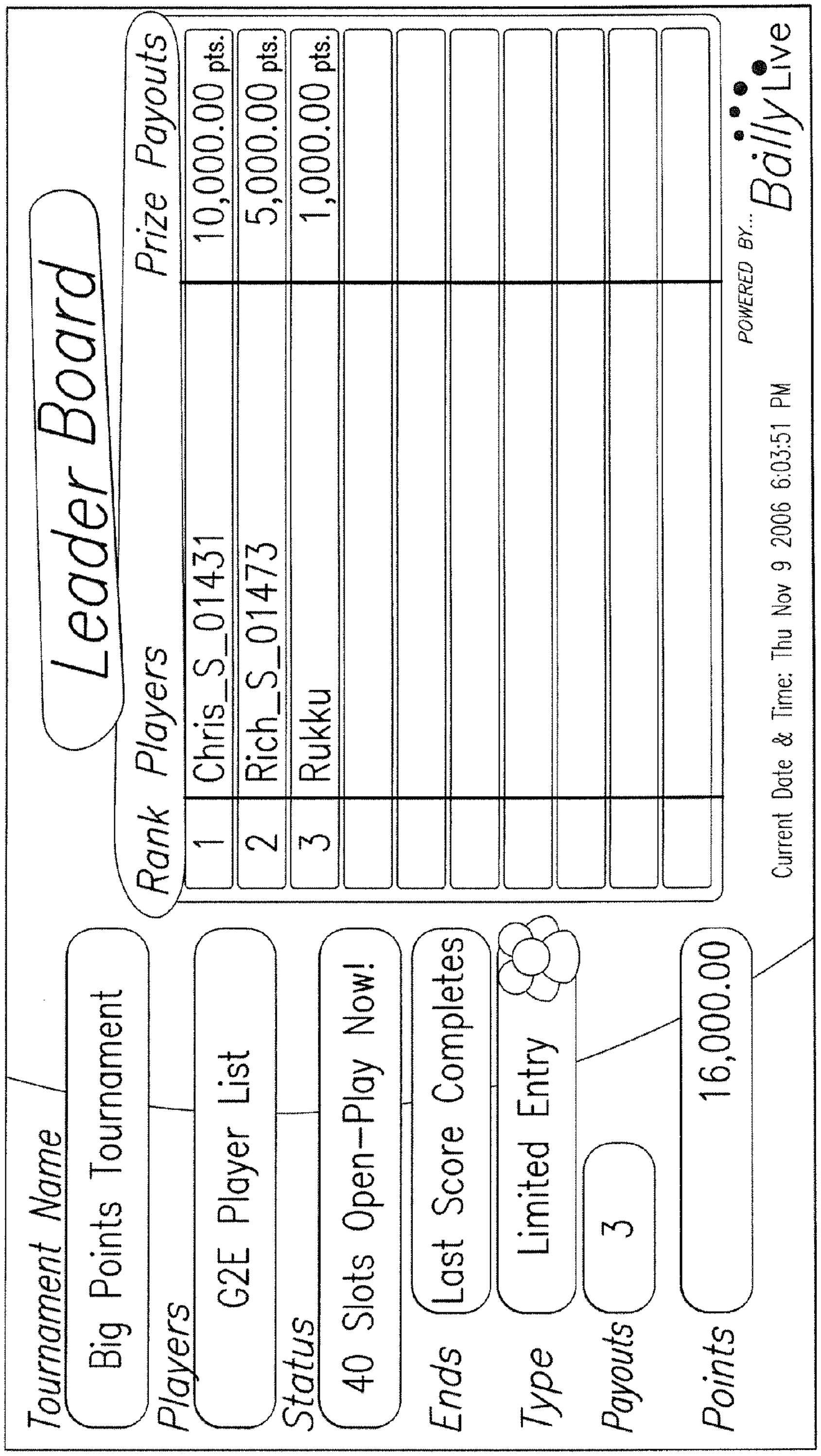
FIGS. 30-32 are sample screen shots from one embodiment of tournament signage.

FIG. 30 is a screenshot of tournament game information for a "Big Points Tournament" that is presented on one or more signs located throughout a gaming floor. The screenshot includes a leader board for a limited entry tournament game (i.e., fixed number of people). On the leader board, the top three scores are identified by the player alias. As shown, the first and second place players are identified by their default player alias and the third place player is identified by a unique alias provided by the player. As additional "Big Points Tournament" games are played, the leader board may be further populated and the rank may also change. Additionally, the first three places are awarded player club points in the amount of 10,000, 5,000, and 1,000 points. Additionally, the leader board provides additional information about the "Big Points Tournament." For example, players on the G2E player list are eligible to qualify for the "Big Points Tournament." That is, player eligibility is limited to an invited group of players rather than all the players from a traditional player's club groups. Under the "Status" field, the number of available entries (i.e., slots) into the tournament game is presented. As shown in FIG. 30, there are forty slots available to play the "Big Points Tournament," and as additional players qualify and play the tournament, this number will decrease. The "End" field discloses the event that completes the tournament game. In the "Big Points Tournament," the tournament ends when the fortieth player completes the tournament game. Once the tournament closes, the top 3 players in the "Big Points Tournament" split the total of the club point prize (of 16,000 points) according to their rank.

Figure 31:
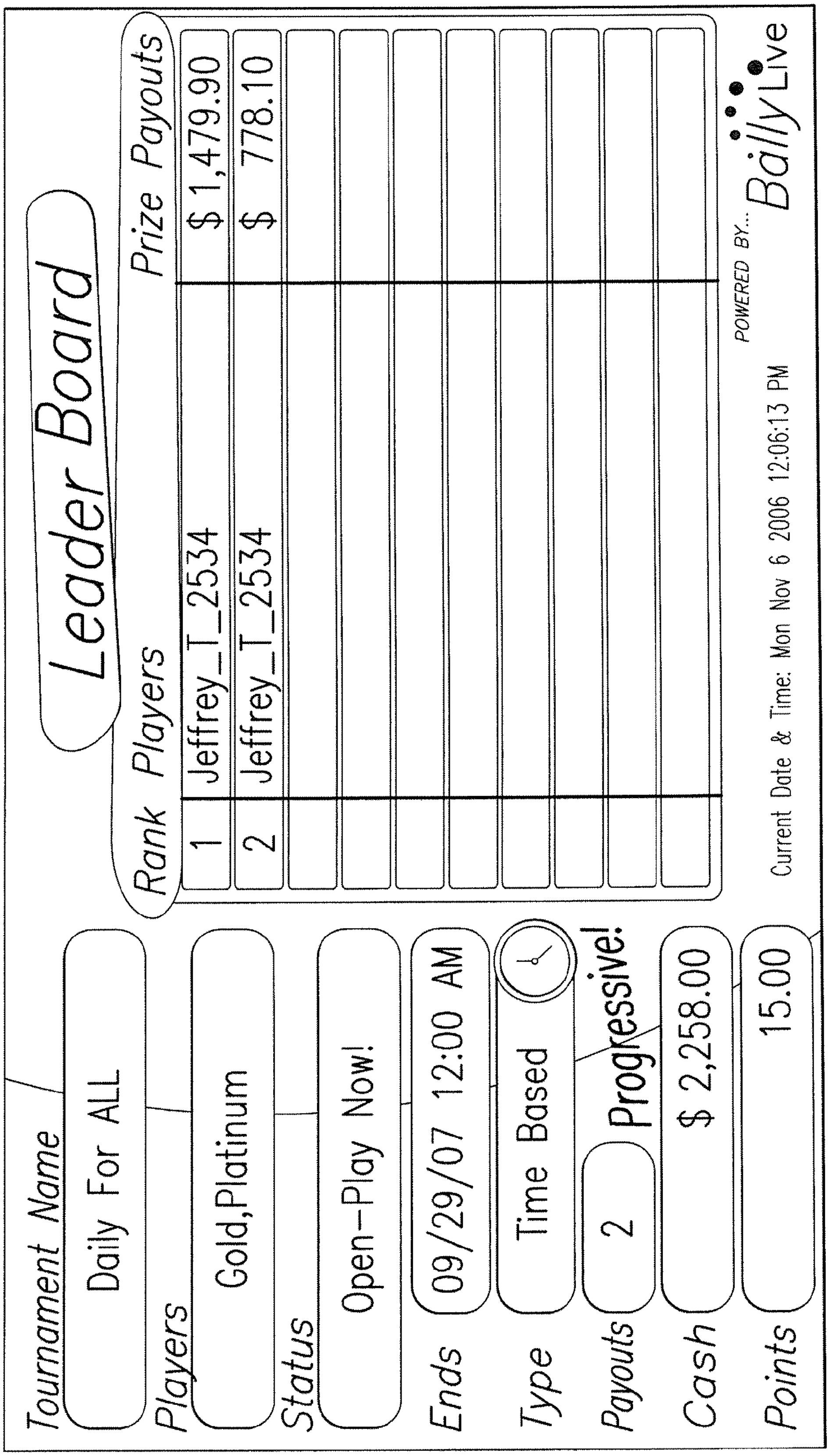

FIG. 31 is a screenshot of tournament game information shown on signage located on a casino floor. Like the screenshot shown in FIG. 30, the tournament information includes a leader board, tournament name (Daily for All), eligible players (Gold and Platinum player club cardholders), status (open), end time, type of tournament game (time based), number of winners (2), total amount of cash and points awarded at the conclusion of the tournament ($2,258.00 and 15 points, respectively). Additionally, the tournament information includes notice that the payouts are progressive. Accordingly, at the conclusion of the "Daily for All" tournament, the top two players win and split the total prizes weighted to their rank. As shown in FIG. 31, the player identified as "Jeffrey_T__2534" is winning both prizes, but the tournament is still open and this player may lose one or both rank positions by the end of the tournament.

Figure 32:
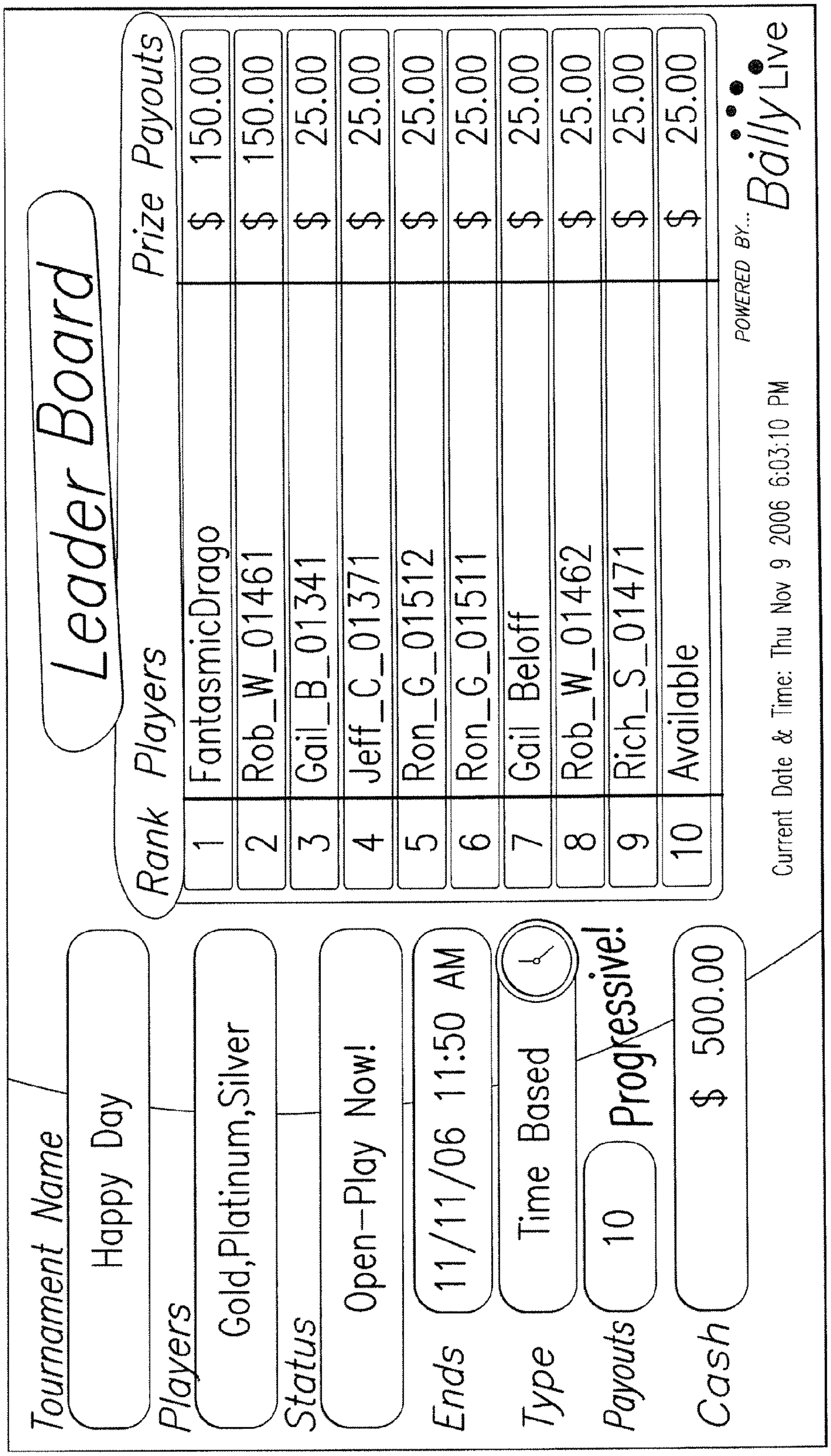

FIG. 32 illustrates another screenshot of tournament game information shown on signage located on a casino floor. The "Happy Day" tournament is a day long tournament for 3 player club levels (Gold, Platinum, and Silver). The tournament has a total progressive cash prize of $500 that is divided amongst 10 winning scores (i.e., a fixed cash prize with the top two players getting $150 each and the remaining 8 top ranked players get a fixed $25 each).

Figure 33:
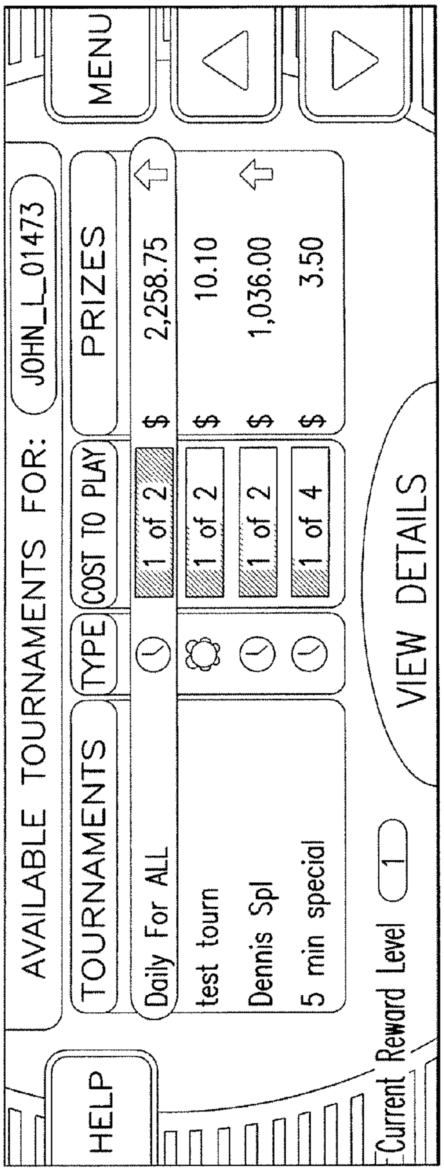
FIGS. 33-47 are sample screen shots from tournament games presented on an embedded user interface on a gaming machine.

FIG. 33 is a screenshot of the iVIEW tournament selection page for a specific player. When a player inserts a player tracking card, enters a PIN number identifying a player club account, or the player places a personalized RFID tag near the gaming machine, the tournament selection page is presented to the player on the iVIEW display. Once the player is identified, the player alias, John_L__01473, is presented on the iVIEW display. On the iVIEW tournament selection page, a list of active tournament games are available to the active player. Each tournament listed on the display is identified by the tournament type (time based or limited entry). Additionally, the selection display includes a "cost to play" field that identifies the required player reward level to play one or more of the listed tournament games. As shown in FIG. 33, the player is at reward level 1, and the player is eligible to play the "Daily for All" tournament. Alternatively, the player may play the base game and earn higher reward levels to play the other active tournament games. Additionally, the iVIEW selection page presents the associated prizes for each of the active tournament games. Furthermore, the "Daily for All" and the "Dennis Spl" include arrows next to the prize amount which signify that there is a progressive associated with these two tournaments. As those skilled in the art will appreciate, different symbols may be used to signify a progressive. The absence of the arrow for the "test tourn" and the "5 min special" tournament games signify that the prizes are fixed prizes.

The iVIEW selection page includes arrows on the side of the display that allows a player to navigate up and down the list of available tournaments. The display also includes a "help," "menu," and a "view details" buttons. These buttons and arrows may be touch screen, touch glass buttons. As those skilled in the art will appreciate, other input means may be coupled to the display to actuate the functions of the buttons (e.g., soft key buttons provide around the periphery of the display).

Figure 34:
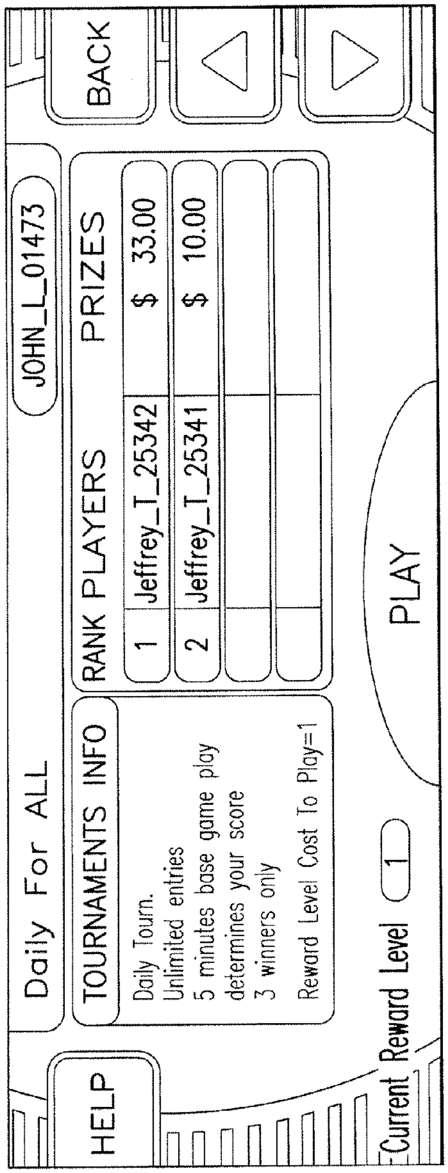

As shown in FIG. 33, the "Daily for All" tournament is highlighted. The player may select the "Daily for All" tournament by pressing the "view details" button which provides additional details on the highlighted tournament. FIG. 34 illustrates the details of the "Daily for All" tournament. The "view details" page provides the following information: the number of entries into the game (e.g., unlimited or fixed quantity); scoring rules (i.e., how your tournament score is determined); number of winners that will be awarded prizes (e.g., top three players); the cost to play the tournament game in the form of play points or reward levels; and the current leader board.

As shown in FIG. 34, the current leader board provided on the "view details" page does not display the scores of the ranked players until the tournament game is actually played by the player. The score is not presented to the player because the gaming establishment does not want to discourage the prospective player from playing the tournament game. According to one embodiment, the "play" button will illuminate when the player has a sufficient amount of Play Points to qualify for play of the tournament game. The player is able to play the tournament game so long as the tournament has not expired or concluded.

Figure 35:
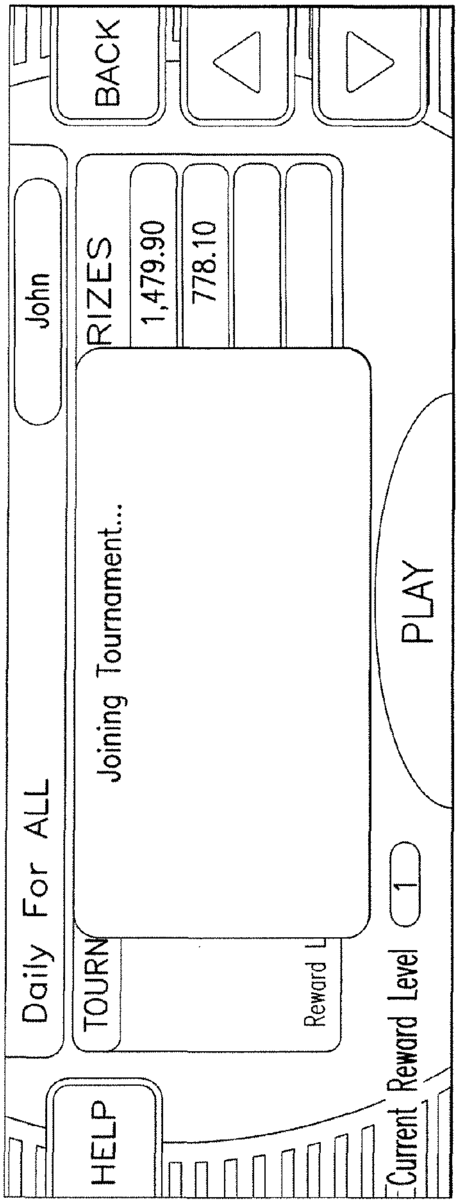

FIG. 35 is a screenshot of the iVIEW tournament screen after the player presses the "Play" Button on the tournament details page. A "Joining Tournament" message is presented to the player and an "initiate tournament" is sent from the iVIEW processor to the tournament server. If entries remain in a limited entry tournament (or the tournament has yet to expire for a time-based tournament) and the player has enough play points his player account, the player is allowed to play the selected tournament. Otherwise, the player is notified that he will not play the tournament game because the tournament is closed (e.g., no available entries, tournament has expired) or the player does not have a sufficient number of play points to qualify for the tournament. Additionally, a message may be presented to the player to seek another tournament game. Alternatively, other tournament games may be suggested to the player having similar profile to the tournament the player selected to play.

Figure 36:
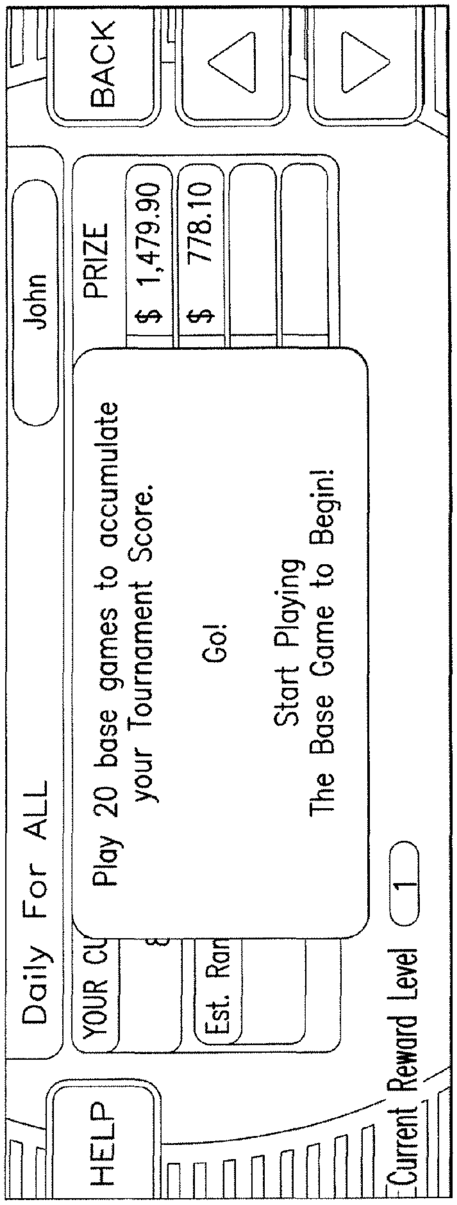

FIG. 36 is a screenshot of the iVIEW tournament screen when the player is successfully entered into the selected tournament game. The player is presented with instructions (e.g. Play 20 base games to accumulate their tournament score).

Figure 37:
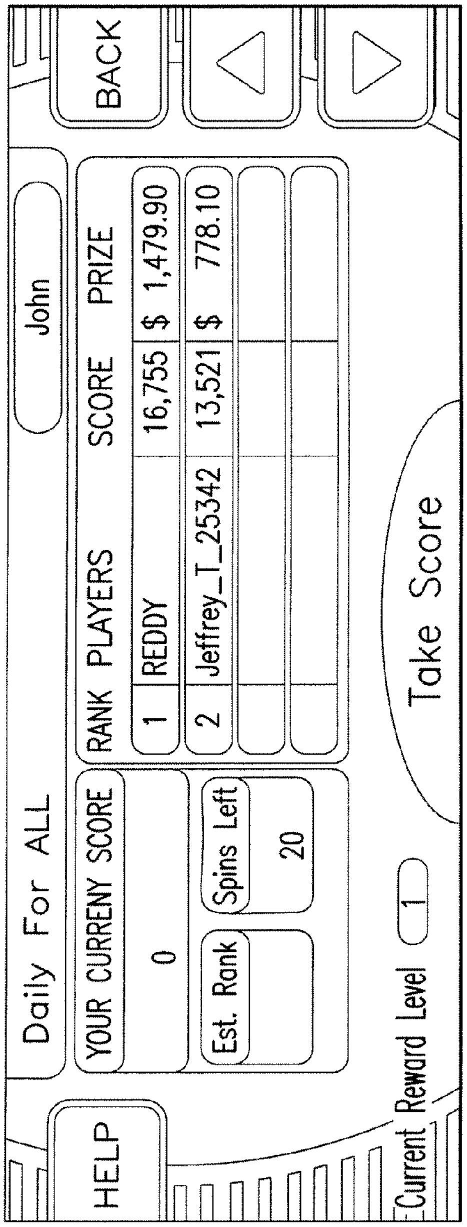

Once the play begins play of the base game, the iVIEW display presents a screenshot of the iVIEW tournament game play screen as shown in FIG. 37. The title of the tournament game the player alias is provided at the top of the tournament game display screen. The iVIEW display also presents the player's score, estimated rank, and remaining spins (i.e., the tournament conclude rule). The leader board of the tournament game is also displayed. The current leader board is presented with rank, player alias, player posted score, and the current prize allocation.

In alternate embodiments, the player may be instructed to play the base or secondary game for a certain period of time. Once tournament game play is initiated, the iVIEW display presents the player's score, estimated rank, the leader board (including player aliases, scores, and prize for each rank position), and a clock or a countdown meter showing the remaining time for play of the tournament game.

Referring back to FIG. 37, a "take score" button is also provided which allows the player the option to terminate play of the tournament game. This allows the player to prematurely end the tournament game and post the score at the time the "take score" button is activated. Alternately, removal of the player tracking card during play of the tournament game has the same effect as activating the "take score" button. In some embodiments, play for the tournament game will automatically continue even though the player card is removed. In any of these previously embodiments or at the conclusion of the tournament game, the player's tournament score is posted (i.e., transmitted and stored) to the tournament server.

Figure 38:
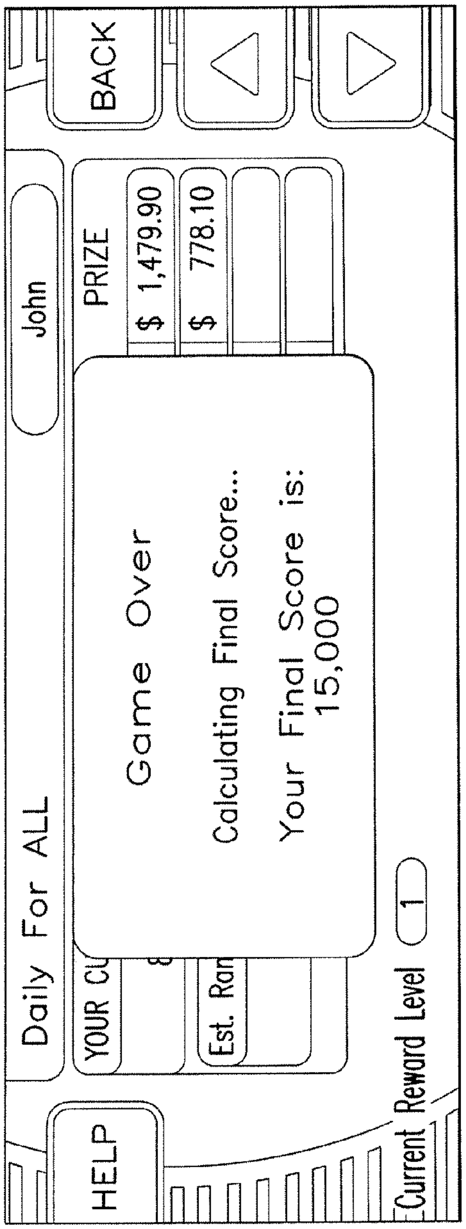

Turning now to FIG. 38, a screenshot of the "Game Over" screen for an iVIEW tournament game is shown. The player has completed play of the tournament game, and the final tournament score entry is displayed to the player. The tournament score is posted to the server for this particular tournament (i.e., Daily for All). If the player's score is large enough, the score is also presented on the leader board. At the conclusion of the tournament, the awards are automatically placed into the winning players' account.

Figure 39:
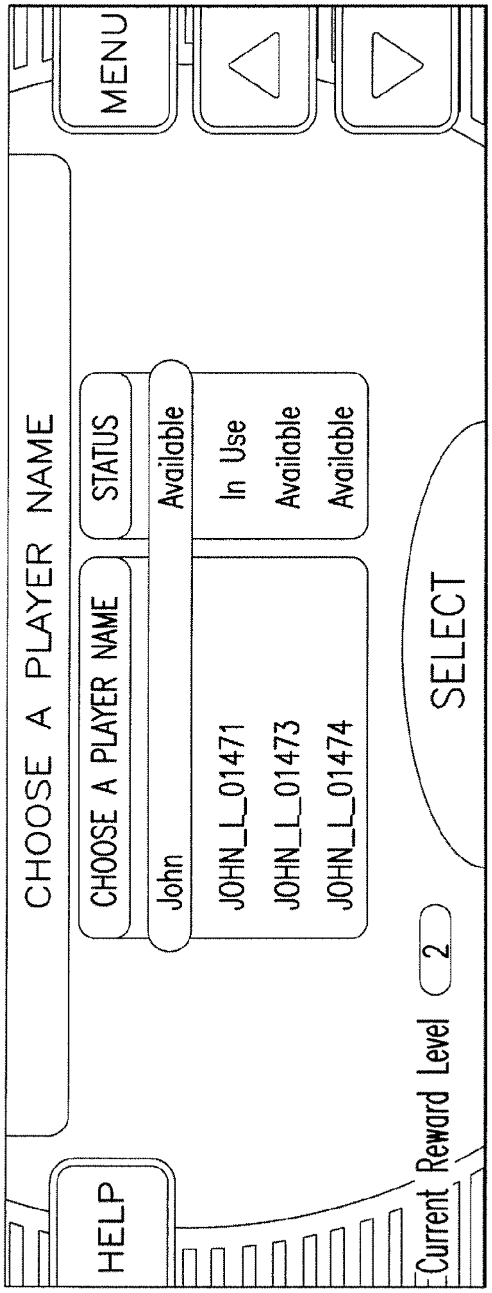
Figure 40:
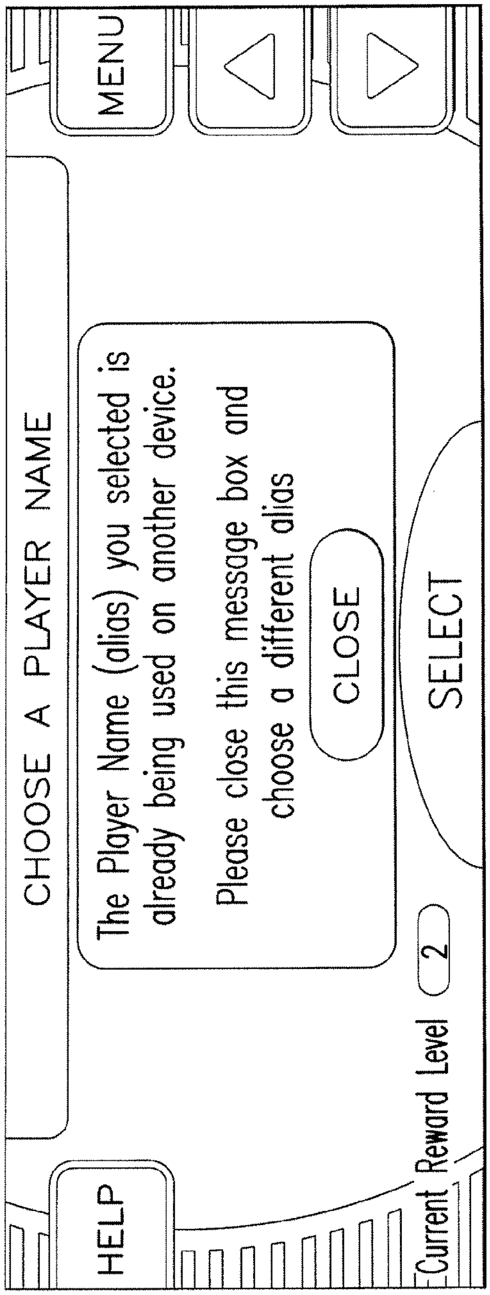

FIG. 39 is directed to screenshots of the iVIEW tournament Choose Player Alias screen. This user interface allows a player to select one of either his default (i.e., automatically generated) alias names or an alias that is uniquely created by the player at the club desk or a web portal. Any active alias names in use on the casino floor (i.e., players playing with the same player card number) are shown to this player. The active aliases that are associated with the same player card number are blocked from being selected at this instance because unique aliases must be used for multiple people playing tournaments at the same time on the floor with the same player card number. A player uses the "up" and "down" arrows to scroll through the list of aliases. An alias is assigned to the player for the current gaming session when the desired alias name is highlighted and the "select" button is activated. If successful, all remaining tournaments played this gaming session will use the selected alias. If the player is unsuccessful in selecting a player alias, a failure message is presented on the "choose a player name" screen as shown in FIG. 40. Otherwise, if a player does not select a player alias, the first available alias will be automatically chosen for the player for the remainder of his gaming session.

Figure 41:
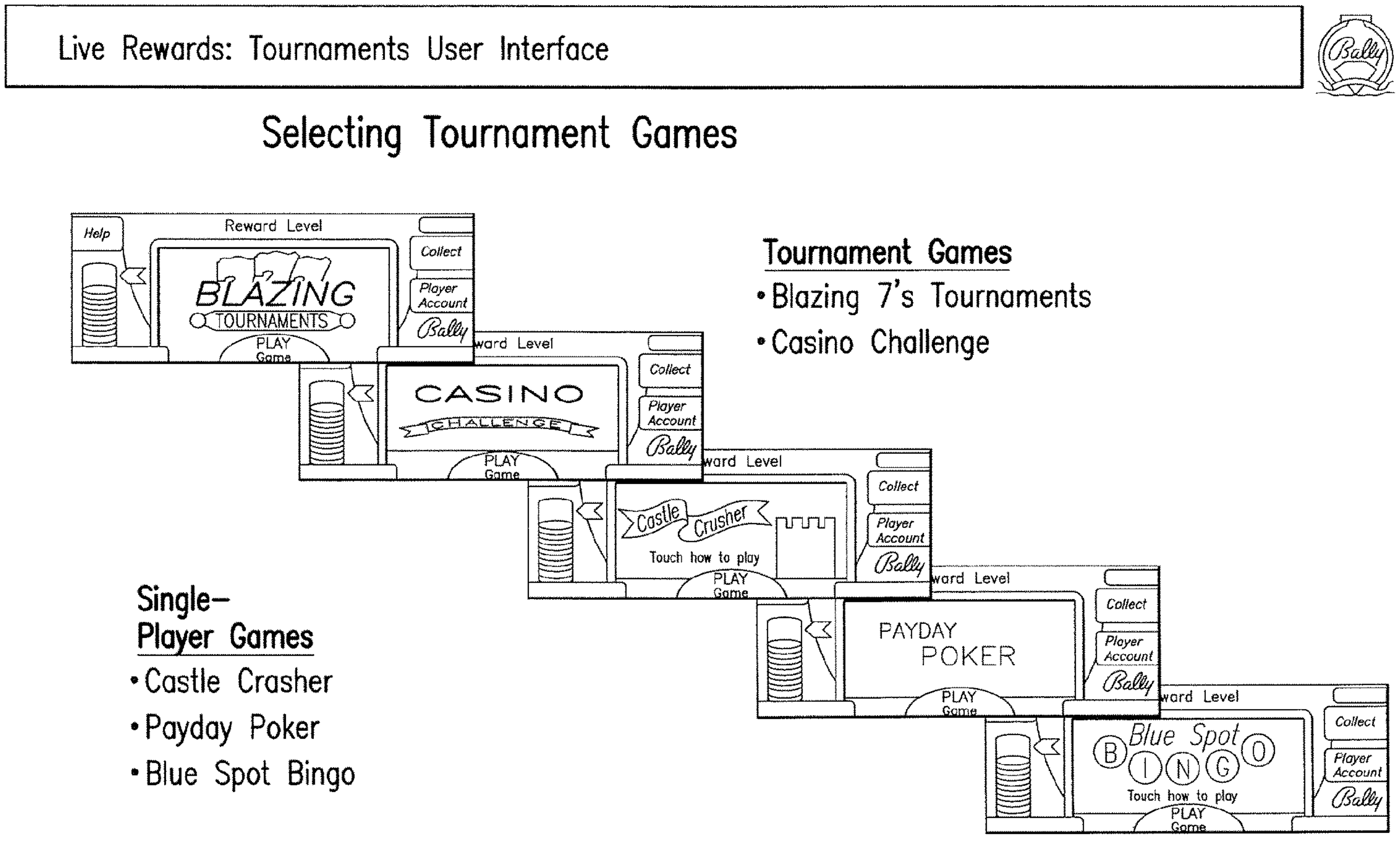
Figure 76:
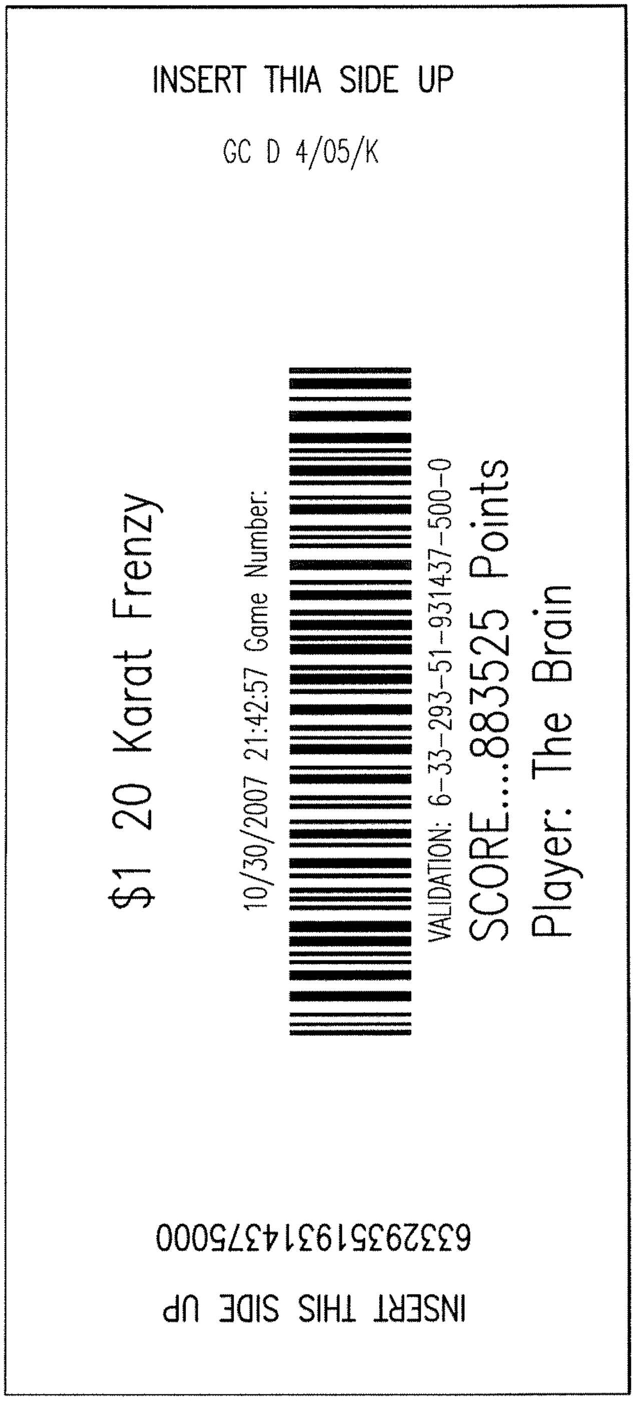
FIG. 76 illustrates another embodiment of a tournament voucher.

Turning now to FIG. 41, a series of screenshots of the multiple types of system games are presented to the player on the iVIEW display. The player is given the option to select one or more of these games for play when the player has earned a sufficient number of player points or has achieved a particular player reward level. As shown in FIG. 76, the player is presented with two tournament games (i.e., Blazing Seven's and Casino Challenge). Additionally, the player is provided with the two single player games (non-tournament games) that pit the player against the game and not other players. As those skilled in the art will appreciate, additional tournament games may be provide to the player or only tournament games are presented to the player on the iVIEW display. Additionally, any number of tournament games and single player games may be presented to the player on the iVIEW display. In another embodiment, different games (tournament or single player games) may be downloaded from backend server to the iVIEW display.

Figure 42:
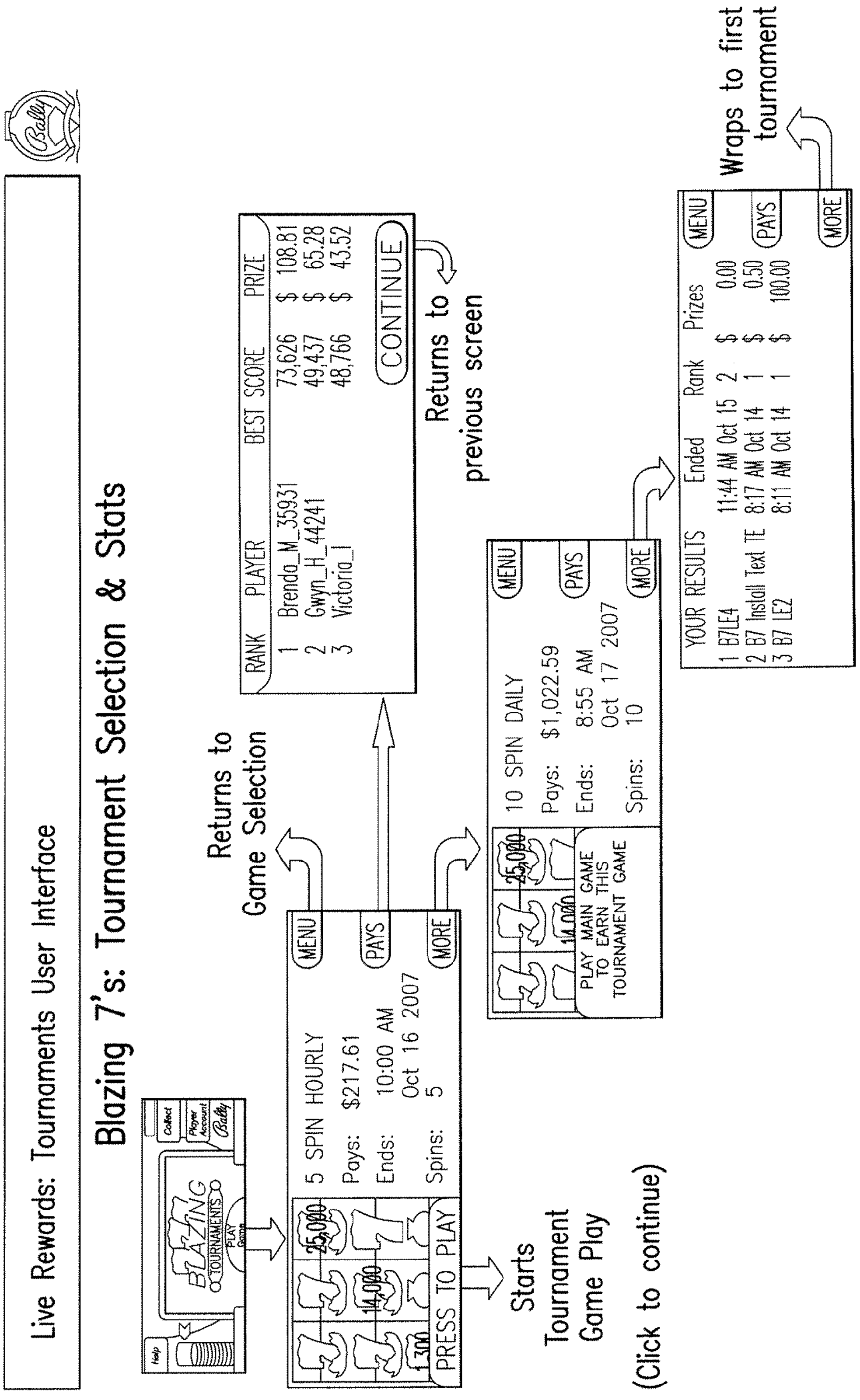

FIG. 42 illustrates a series of screenshots for the Blazing 7's tournament game. This tournament game is presented and played on the iVIEW display. Alternatively, this game may be presented on a secondary display or a dedicate display on the top box of the gaming machine. Play of the Blazing 7's tournament game may be achieved by the following method. A player inserts his player card into the gaming machine and initiates play of a main game, which is not necessarily the same game as the tournament game. The player may also select a tournament game (e.g., Blazing 7's tournament game) that the player desires to play. As the player wagers on the base game, the player earns play points, which are used to earn play of the Blazing 7's tournament game. If the player does not have a sufficient number of play points, the Blazing 7's tournament game (on the iVIEW display) is blocked on the left side of the screen by a graphic. The graphic notifies the player to continue play of the main game in order to earn the right to play this tournament game. According to one method, as play of the main game continues, the graphic will slide down based upon the percentage of play points the player has earned as compared to the cost of the Blazing 7's tournament game. Once the player has earned enough play points to fund this tournament game, the graphic appears as a "Press to Play" button.

As shown in FIG. 42, the iVIEW display also presents tournament information. The tournament information includes the tournament name (e.g., 5 Spin Hourly), the total available prize (e.g., $217.61), the tournament conclusion rule (i.e., tournament ends at a particular time of day or after a certain number of players have played the game), and the score rule (e.g., the number of spins of the Blazing 7's iVIEW tournament game that are used to generate a final score). The "Pays" button on the iVIEW display links to a view the current leader board for the Blazing 7's tournament game. The "More" button links to a view of other types of Blazing 7's tournament games available for to the player. For example other types of Blazing 7's tournament game may be an hourly, daily, or 50 person tournament game. Additionally, if the player has previously played a particular tournament game (e.g., 10 Spin Daily), the "more button" may also present the player's results from previous tournament game. The player's previous results page may include, but is not limited to, the following information: player alias, time tournament ended, rank, and prizes.

Figure 43:
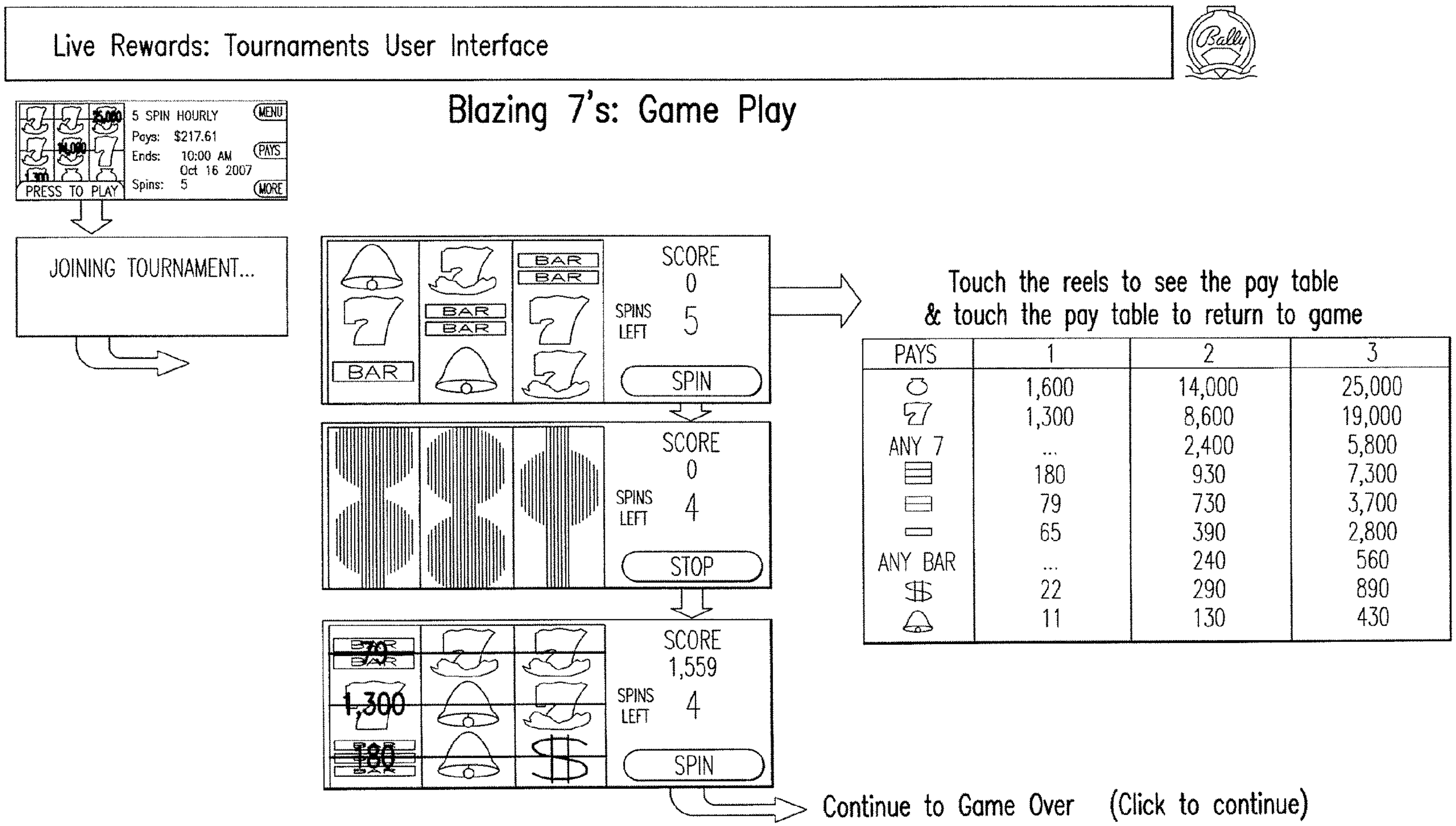

FIG. 43 illustrates a series of screenshots of the Blazing 7's tournament game in progress. The first screenshot shows an intermediate "joining tournament" page after the player presses the "Press to Play" button. At this time, if the tournament is still open, the tournament entry is logged at the server and the Blazing 7's game is shown to the player on the iVIEW display. The player presses the "spin" button a predefined number of times until the "Spins Left" window reads zero. According to one method, the player presses the spin button on the primary game to spin the reels in the Blazing 7's tournament game. Alternatively, the player may press the virtual button on the iVIEW display to spin the reels. In yet another method, the reels are spun automatically. After each spin of the reels for the Blazing 7's tournament game, the player's score is generated and presented to the player. At the conclusion of the game, the final score is presented to the player, and the final score is posted to the tournament server. The final is the cumulative score from any winning combinations for each spin.

According to one embodiment of the tournament game, at any time during play of the tournament game, the player may touch the screen (e.g., touch reels or a pays button (not shown)) to reveal a tournament game paytable. Touching the paytable or a "back" button (not shown) will cause the iVIEW display to revert back to the tournament game.

In yet another embodiment of the tournament game, game play of the tournament game will continue even though the player has removed his player tracking card in the midst of play of the tournament game. The final score is tabulated and posted to the server even though the player has ended his gaming session or removed his player tracking card. As a result, the player is given the best possible change to achieve the highest score for a given tournament entry. After posting the final score to the server, the iVIEW display will revert to an attract mode, and the player's iVIEW tournament game session is closed.

In another embodiment of the tournament game, the player is given the option to automatically play all spins of the tournament game. This relieves the player of the need to initiate spins for the tournament game. As a result, the player is able to continue play of the main game while the tournament game is automatically played.

Figure 44:
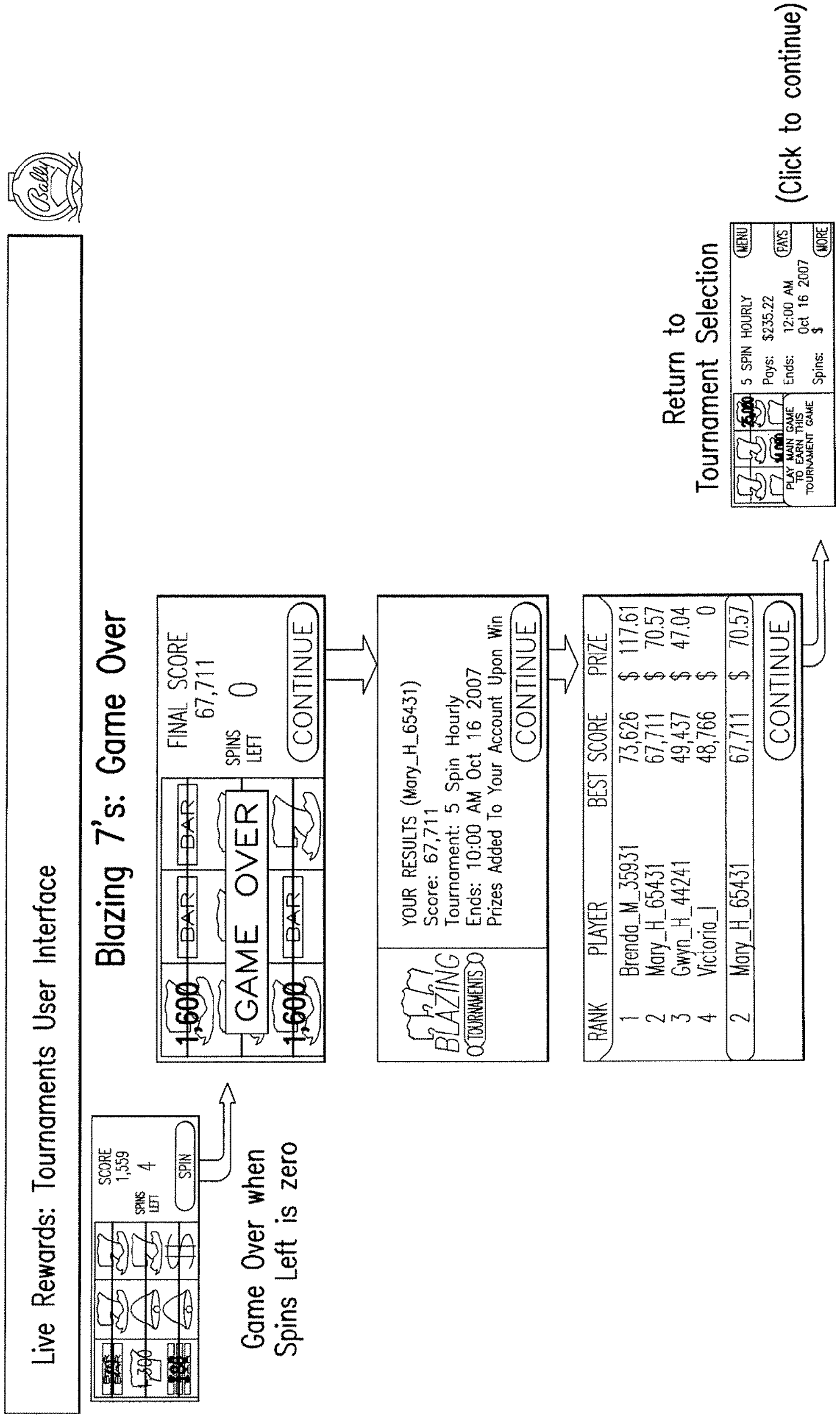

FIG. 44 illustrates a series of screenshots of a "game over" sequence for the Blazing 7's tournament game. The "game over" sequence is initiated when the Spins Left equals zero. According to one embodiment, the player actuates a "continue" button to view the "results" page. Alternatively, the "results" page appears on the iVIEW display a few seconds after the tournament game has ended. The "results" page presents the following information to the player: tournament name; the player's final score; tournament conclusion rule or end time; and a message that the player will be automatically awarded prizes to his player account if the final score is a winning score. According to one embodiment, the current leader board is then displayed on the iVIEW display. In another embodiment, the player is shown the top scores in the tournament, his best score, and the scores of players just above and below their best score entry. By presenting scores near the player's best or final score, the player has the impression that he is competitive with other players even though his score is not a top ranked score. After the "game over" sequence is complete, the player is given the option to choose the next tournament game to play (e.g., the same or different tournament game). In some embodiments, the player is able to replay the same tournament game (so long as the player is eligible) until the tournament concludes. Alternatively, in some embodiments, the tournament game only allows for a limited number of entries by for a particular player card account.

Figure 45:
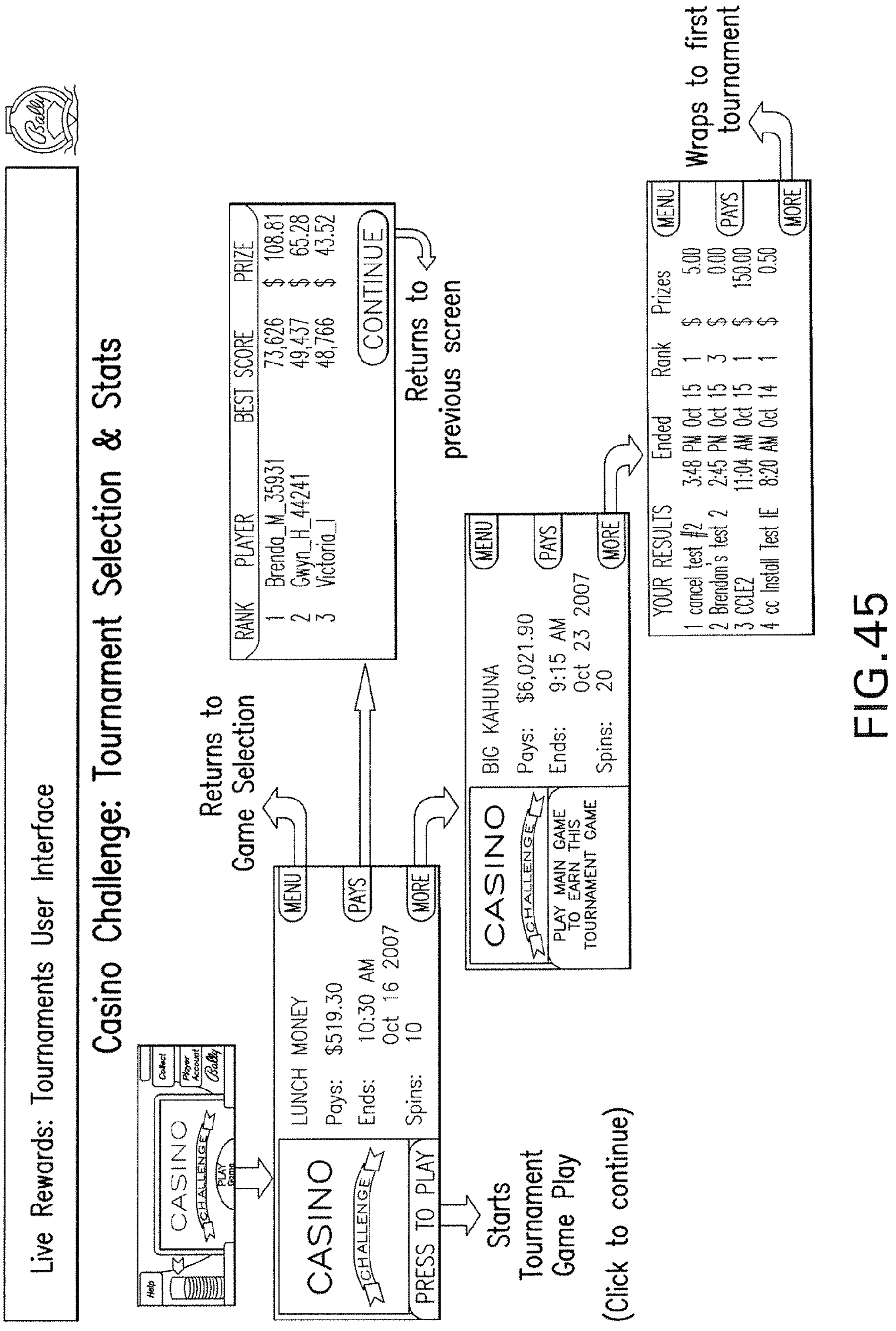

FIG. 45 illustrates a series of screenshots for another embodiment of a tournament game, entitled Casino Challenge that is presented on the iVIEW display. In one embodiment of the Casino Challenge tournament game, base game wagers or wins to determine a player's normalized tournament score. That is, the base game of the gaming machine is reconfigured to operate as a tournament game and will revert back to a normal game once the tournament session has ended. The user interface for the Casino Challenge game is similar to the user interface disclosed for the Blazing 7's tournament game as shown in FIG. 42.

Figure 46:
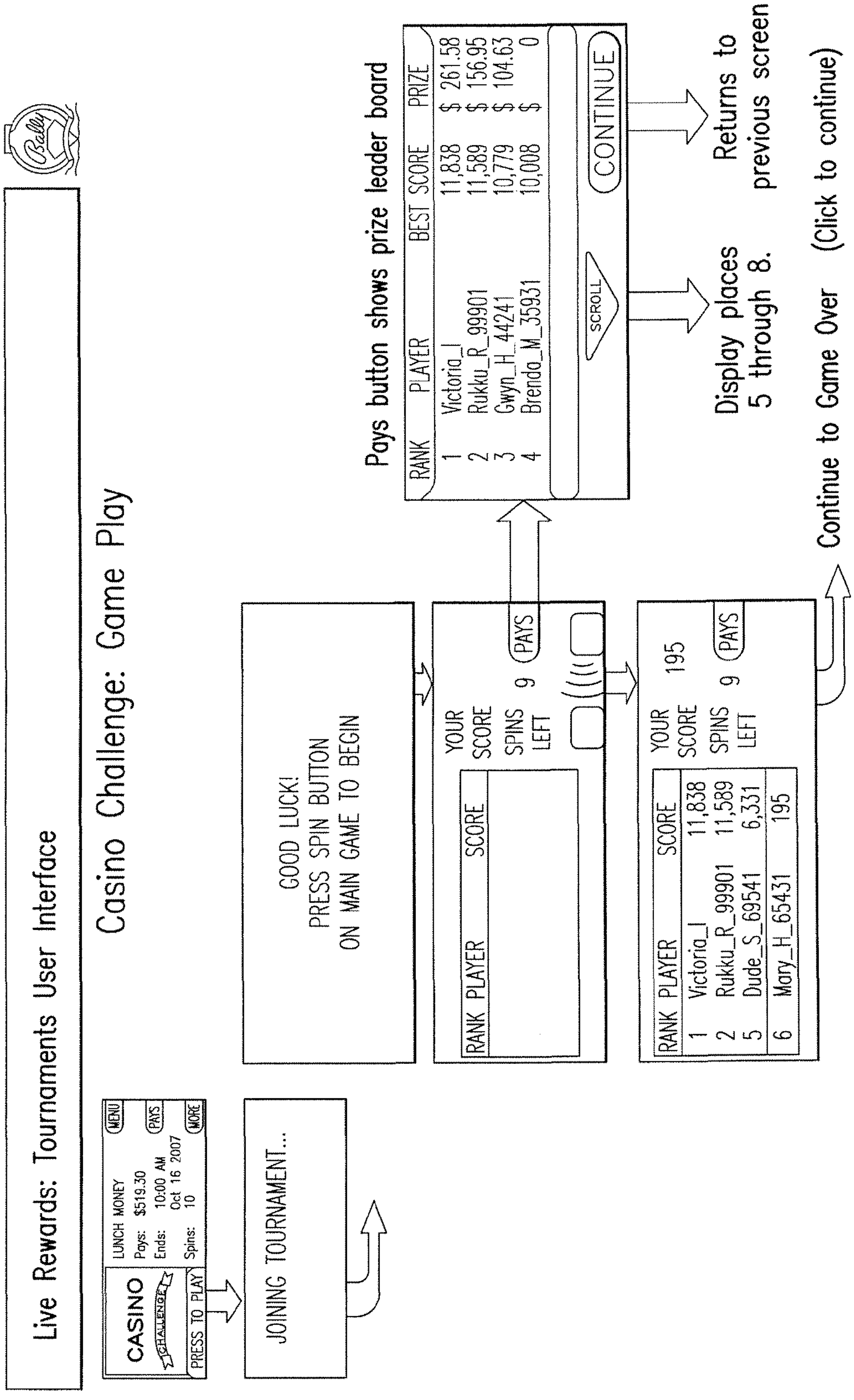
Figure 81:
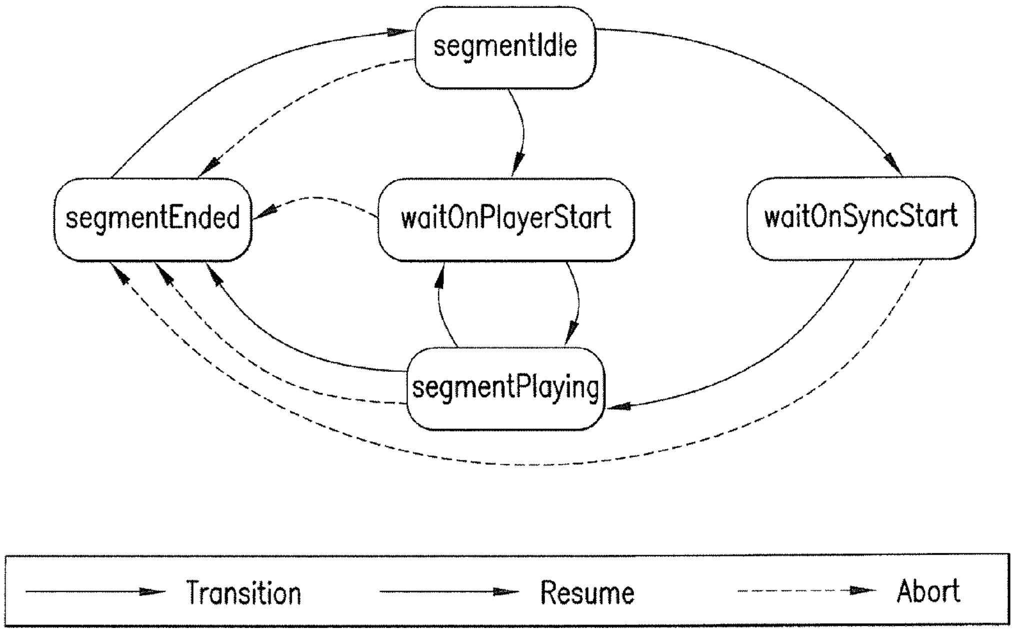

FIG. 46 shows a series of screenshots of the Casino Challenge tournament game on iVIEW display. As shown in FIG. 46, the player has earned enough to play a specific Casino Challenge tournament game and presses the "Press to Play" button. The tournament game request is joined at the tournament server. According to one method, the player initiates play of the tournament game by pressing the "Spin" button on the iVIEW display. Alternatively, game play is initiated by pressing a "spin" button on the primary game to begin the tournament game. According to one embodiment, the IVIEW display presents a leader board, the player's tournament score, the number of base game spins remaining, or the time remaining to play the base game. By selecting the PAYS button on the IVIEW display, the current leader board and potential payout for each of the ranked players is displayed on the IVIEW display. As the player plays the base game in tournament mode, base game information including, but not limited to, base game wagers, wins, and theoretical payout percentages are transmitted to the tournament server in order to calculate a normalized tournament score for the base game. As previously discussed herein, the tournament server includes an algorithm to calculate a normalized tournament score for base game play. The normalized tournament score is transmitted to the IVIEW display for presentation to the player. As shown in FIG. 81, the leader board shows both active players playing the same tournament game on the gaming floor and the final tournament scores that have been posted to the server.

In one embodiment, a player may "take a score" even though the player still has spins remaining in the tournament game. In this event, the tournament score posted to the server is based upon the score at the time the player terminated the tournament game. By prematurely ending the tournament session, a player is not achieving the highest score possible, the player still has a chance to win a tournament prize. In another embodiment, the player may pause the tournament game and resume the game at a later time. In this embodiment, the tournament game is stored and is associated with the player account. At a later time, the tournament game may be recalled and tournament game play is resumed.

In yet another embodiment of the tournament game, game play of the tournament game will continue even though the player has removed his player tracking card in the midst of play of the tournament game. The final score is tabulated and posted to the server even though the player has ended his gaming session or removed his player tracking card. As a result, the player is given the best possible change to achieve the highest score for a given tournament entry. After posting the final score to the server, the iVIEW display will revert to an attract mode, and the player's iVIEW tournament game session is closed.

In another embodiment of the tournament game, the player is given the option to automatically play all spins of the tournament game. This relieves the player of the need to initiate spins for the tournament game. As a result, the player is able to continue play of the main game while the tournament game is automatically played.

Figure 47:
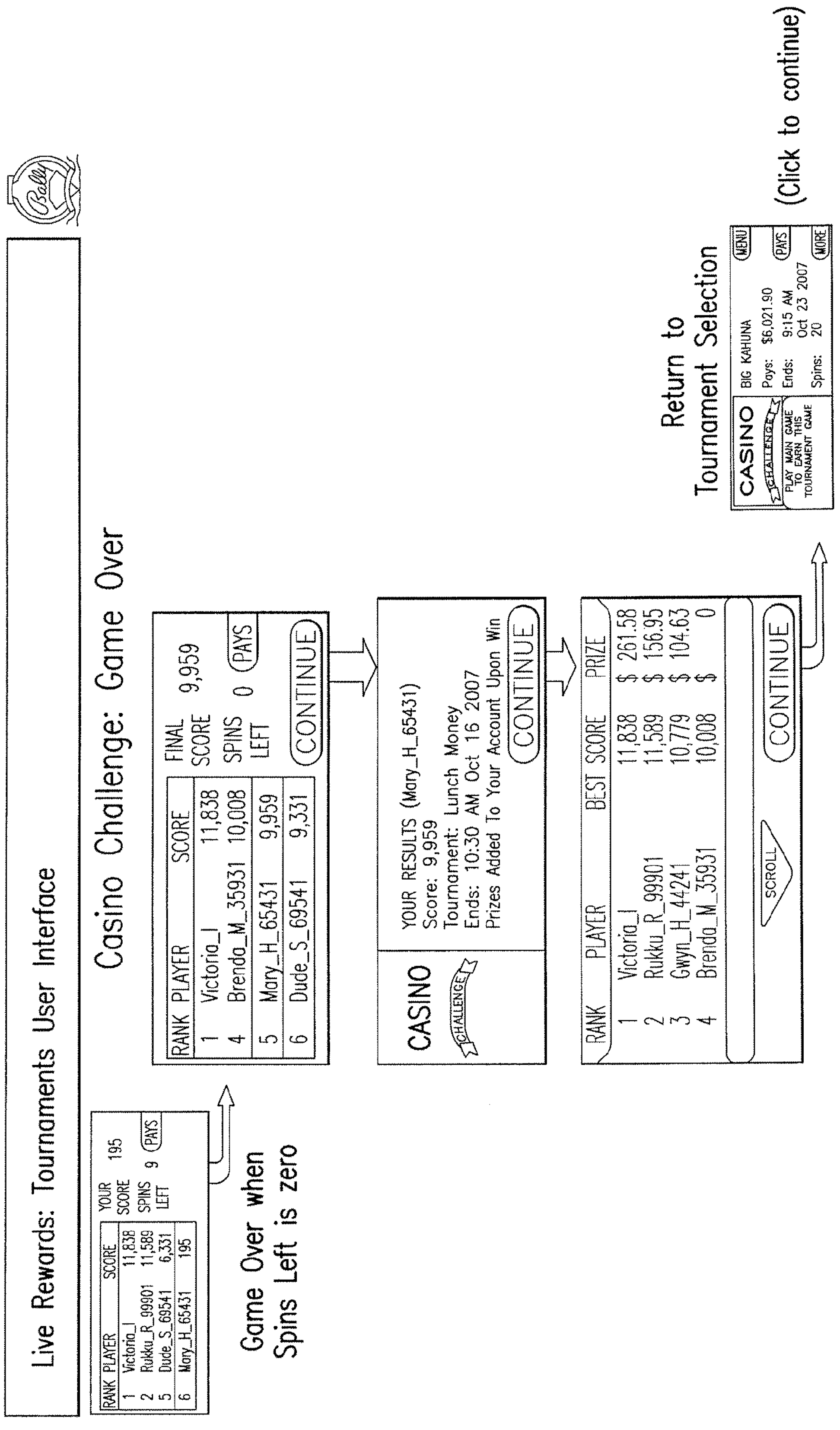

FIG. 47 illustrates a series of screenshots of the "game over" process for the Casino Challenge tournament. In FIG. 47, the player's final score (9,959 points) and ranking (#5) are presented on the IVIEW display. As shown in FIG. 47, the player is shown the scores of the players ranked just before and just after him or herself. Additionally, the top ranked scores are shown on the IVIEW display. In one embodiment, a "results" page presents the following information to the player: tournament name; player's alias; the player's final score; tournament conclusion rule or end time; and a message that the player will be automatically awarded prizes to his player account if the final score is a winning score. If the player's final score is a highly ranked score, the player's alias, final score, and prize may be displayed on tournament signage throughout the property. After the "game over" sequence is complete, the player is given the option to choose the next tournament game to play (e.g., the same or different tournament game. In some embodiments, the player is able to replay the same tournament game (so long as the player is eligible) until the tournament concludes. Alternatively, in some embodiments, the tournament game only allows for a limited number of entries by for a particular player card account.

Figure 48A:
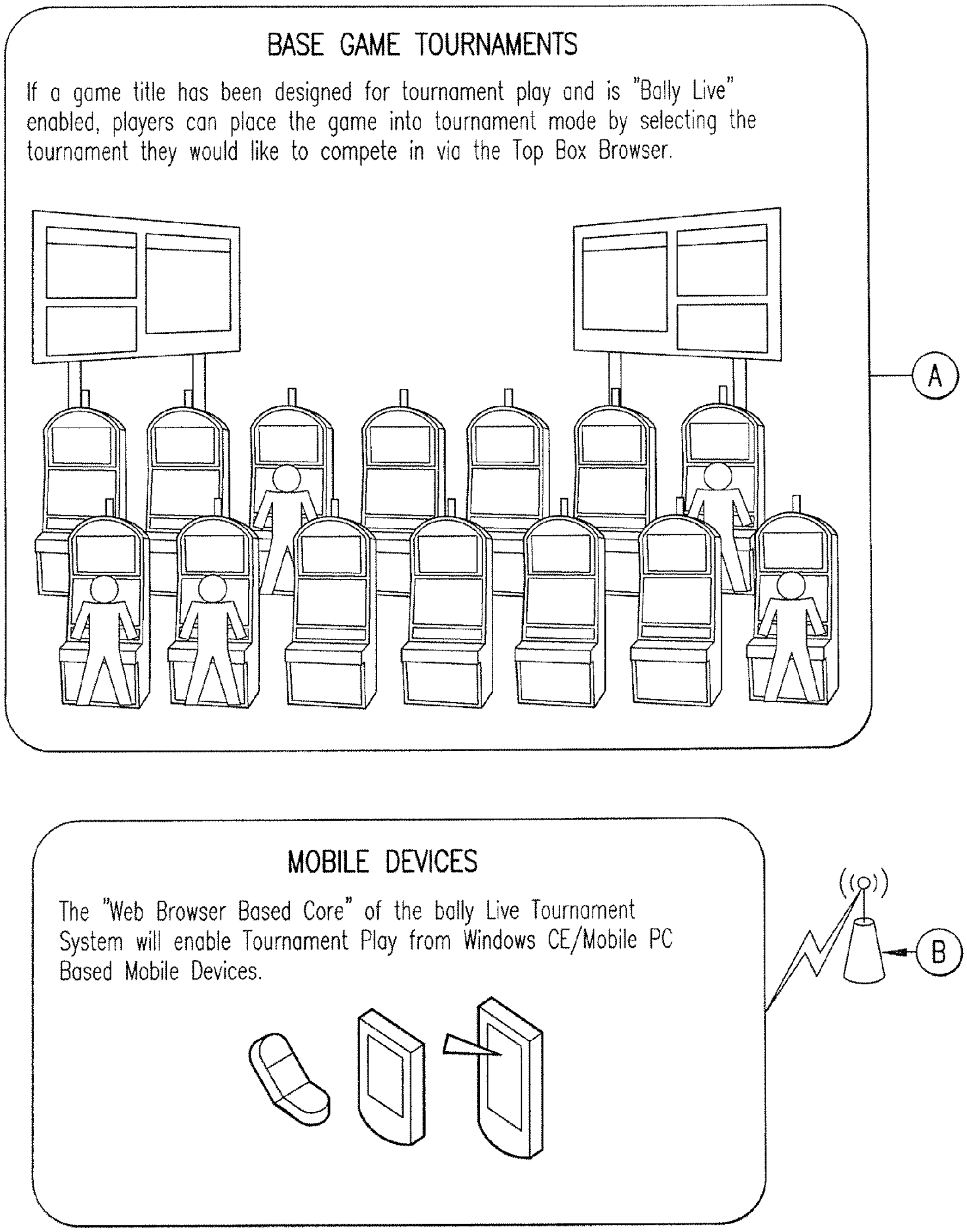
FIGS. 48A-48B are block diagrams of one embodiment of a tournament network.
Figure 48B:
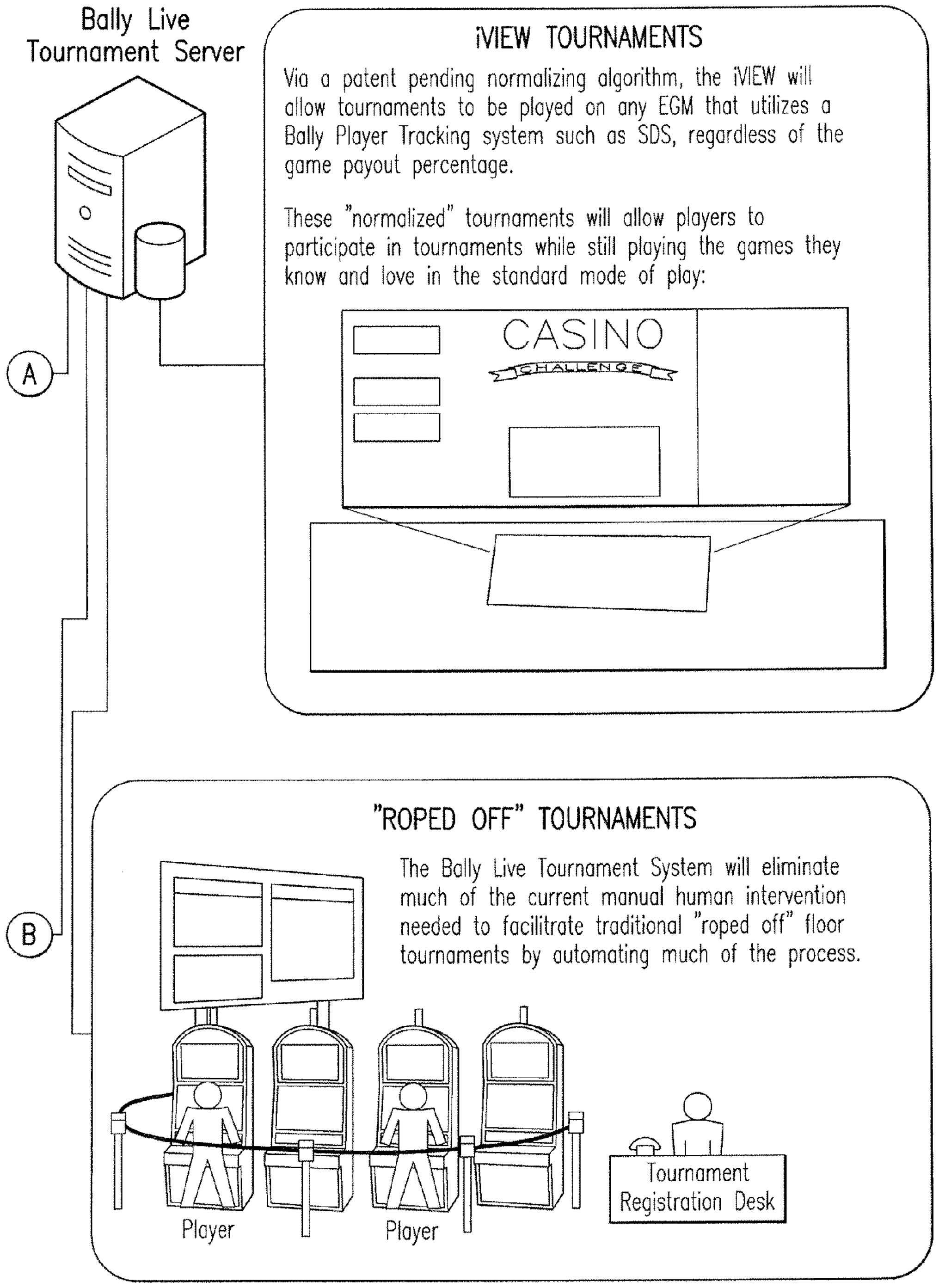

FIGS. 48A-48B represents one embodiment of a tournament gaming system. A tournament server is at the hub of the tournament gaming system. The tournament server is a device independent server that supports a plurality of tournament games. For example, the server runs tournament games on dedicated tournament gaming machines which are roped off from other gaming machines on a casino floor. According to one embodiment, the dedicated machines are Bally Alpha platform gaming machines as disclosed in U.S. Pat. No. 7,278,068, which is hereby incorporated by reference.

Additionally, as shown in FIGS. 48A-48B, the tournament server is able to run tournament games on electronic gaming machines that normally present a base game. The base gaming machine will reconfigure itself to allow for a tournament game to be based off the results of the base game of the gaming machine. These base game tournaments are on-demand because the player may self-initiate a tournament game.

In the base game section of FIGS. 48A-48B, some machines in the bank of gaming machines are in normal mode and some are in tournament mode. The tournament system is capable of allowing a single gaming device to reconfigure into tournament mode for single player. The player is then able to play the tournament and post his tournament score. Once the tournament is completed, the gaming machine is reconfigured back into normal mode. According to one embodiment, a bank or group of gaming machines may be reconfigured at one time into a tournament mode by a casino administrator. Alternately, gaming machines may be individually reconfigured into a tournament mode (e.g., gaming machines are reconfigured as gaming machines become idle or player gaming sessions end).

Furthermore, as shown in FIGS. 48A-48B, the tournament server allows for tournament game play on an iVIEW display. The tournament game is presented and run on the IVIEW display which allows for concurrent play of the base game and the tournament game. Moreover, the tournament server is able to run and manage tournaments for various mobile devices throughout the casino, and the tournament server may run tournaments for web portal based gaming.

Figure 49:
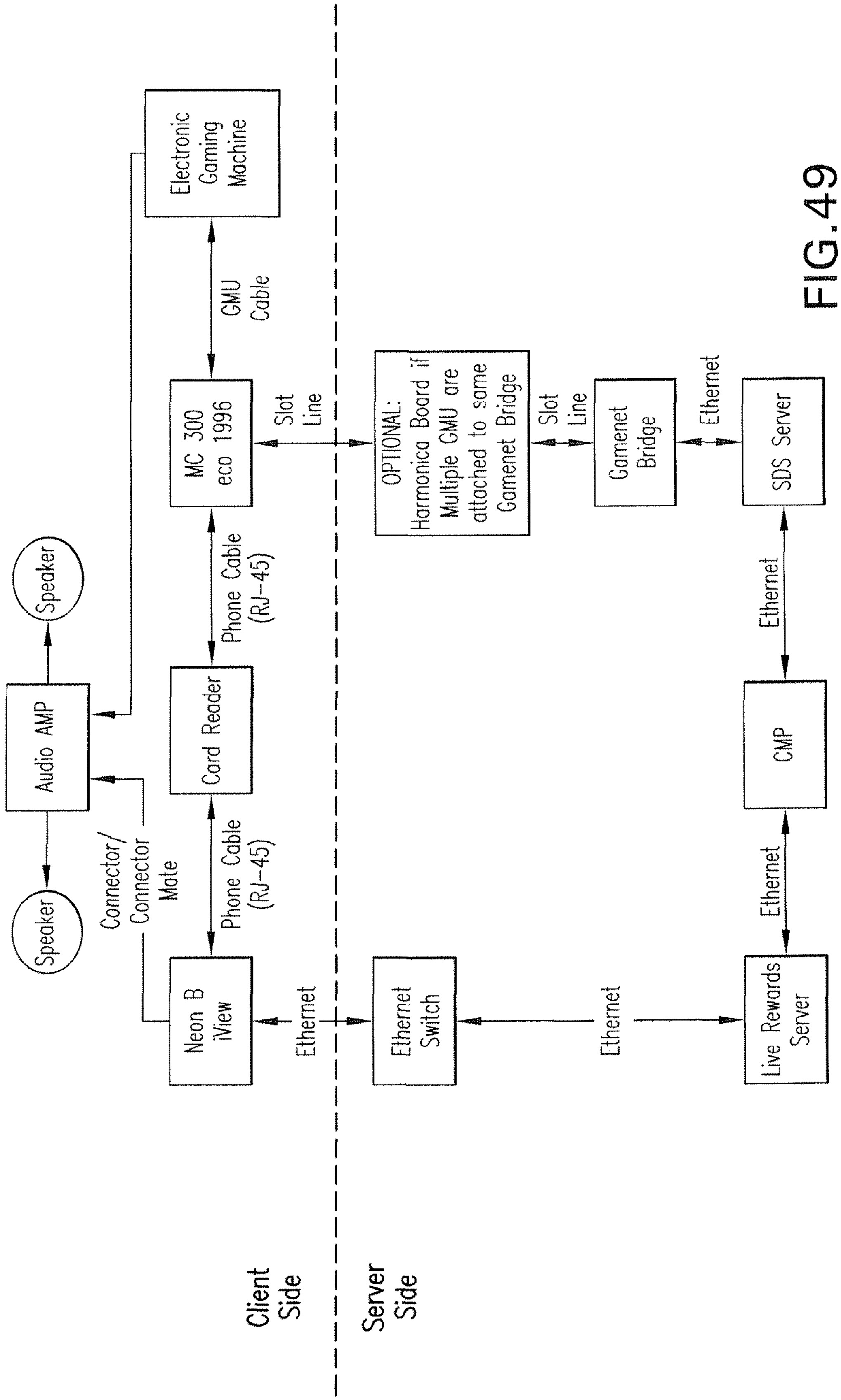
FIG. 49 is a network diagram of one embodiment of a tournament gaming system.

FIG. 49 is a network diagram of one embodiment of the tournament gaming (Live Rewards) system. As shown in FIG. 49, the network diagram illustrates how the client side is configured together with the server side of the system. Additionally, the network diagram illustrates how the slot management system and CMP/CMS systems are linked to the tournament gaming (Live Rewards) server.

FIGS. 50A-50B illustrate the various components for the tournament server (e.g., tournament parts and tournament logic). The components include the basic specifications for various tournament types, a score table, other tournament actions, locations where the tournament score may be posted, tournament actions, rules for other tournaments posting to a particular tournament, tournament sequence after a score is posted, and the end of tournament sequence.

Figure 51A:
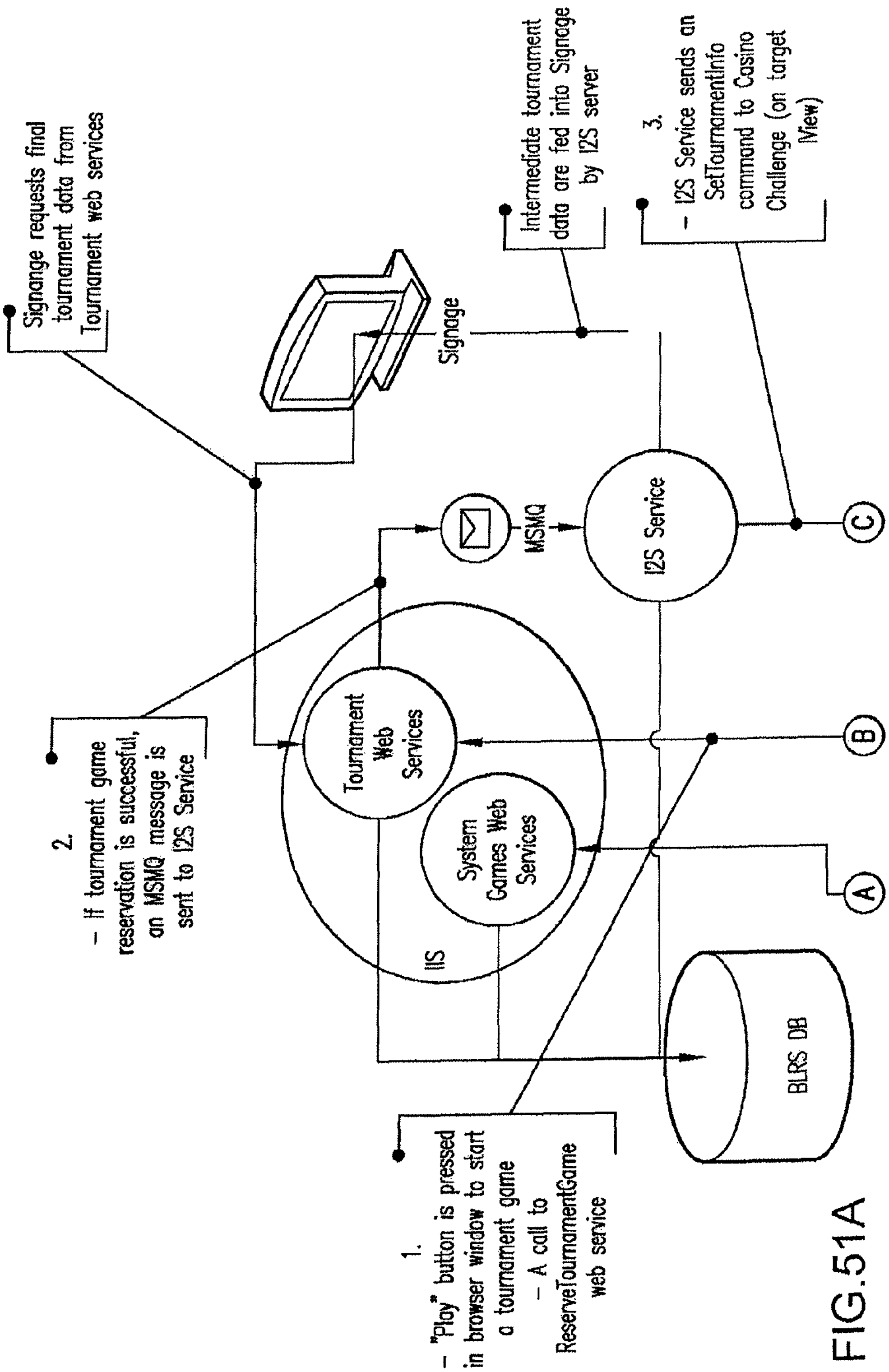
FIGS. 51A-51B illustrate one embodiment of the various hardware components and communication links of a tournament gaming system.
Figure 51B:
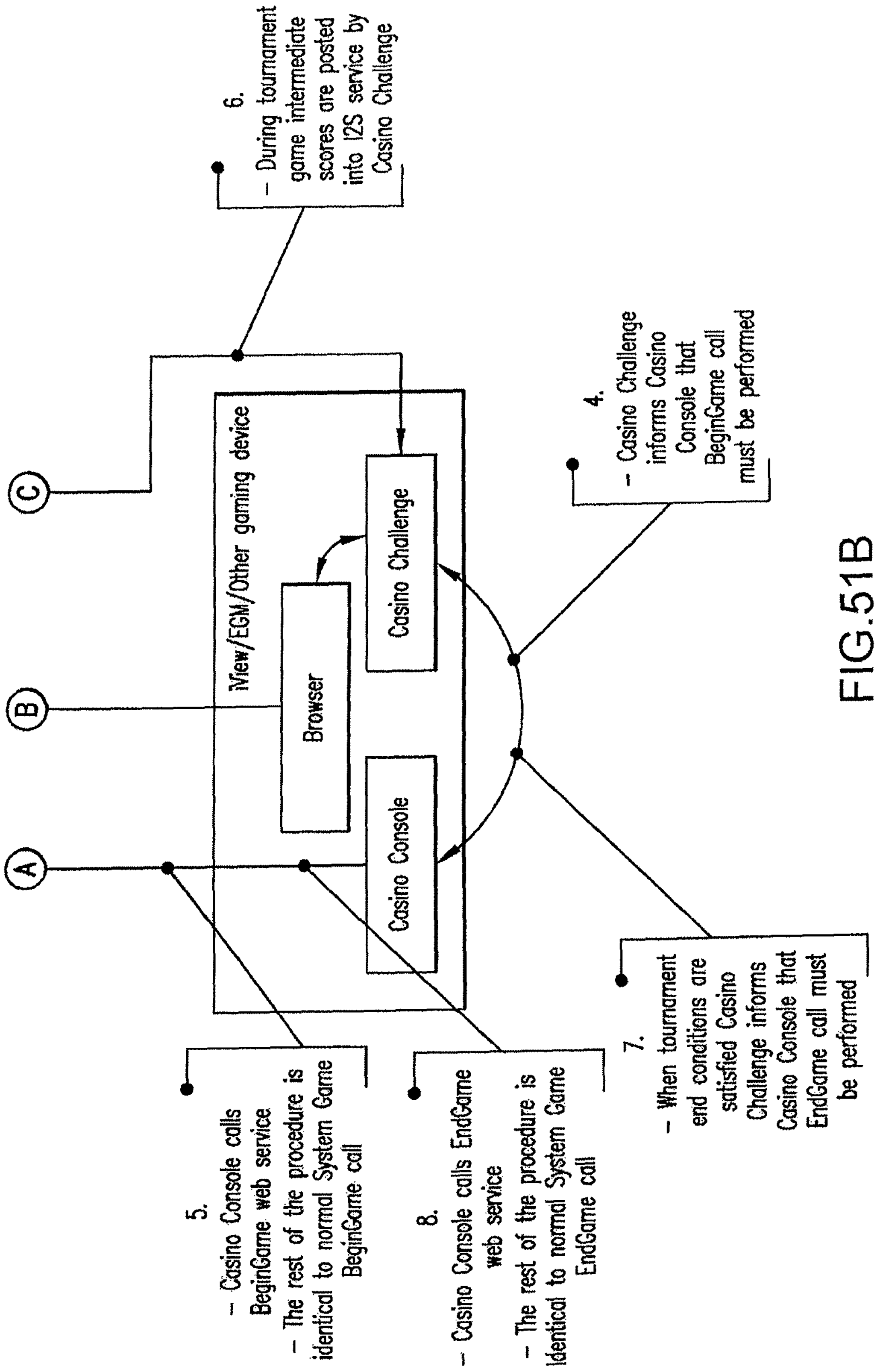

FIGS. 51A-51B show the various hardware components and communication links to an iVIEW display, EGM (electronic gaming machine), the tournament web services, casino signage, and the tournament database. FIG. 51A-51B also illustrate the flow of the "Begin Game" and "End Game" processes. The "Begin Game" process is initiated by a player pressing a "play" button in a browser window on a gaming machine. Steps 2-8 are directed to the various communication processes that occur between the servers, signage, and the gaming device presenting the tournament game.

Figure 52A:
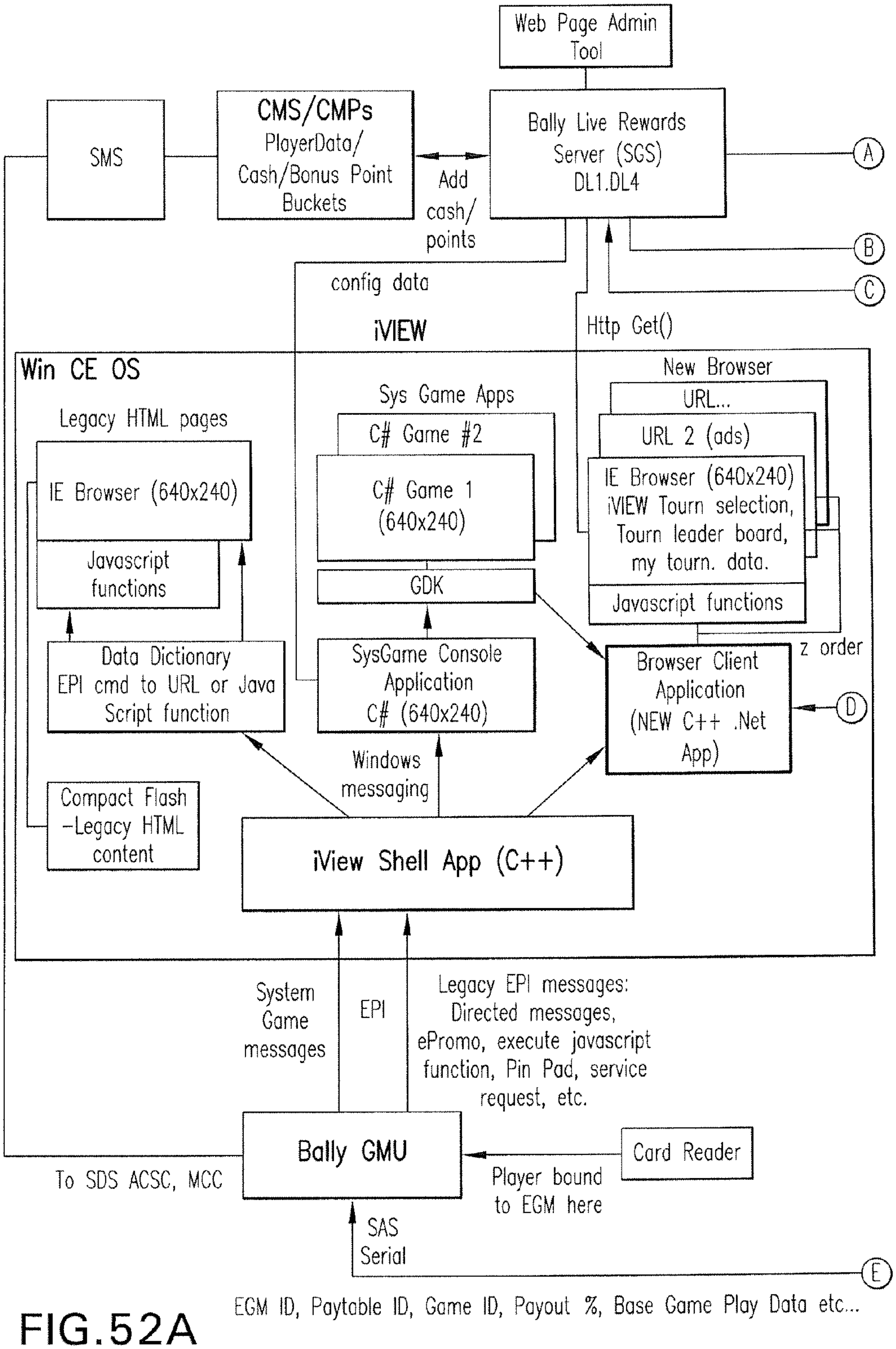
FIGS. 52A-52C illustrate one embodiment of the various protocols used to communicate between the components of a tournament gaming system.
Figure 52B:
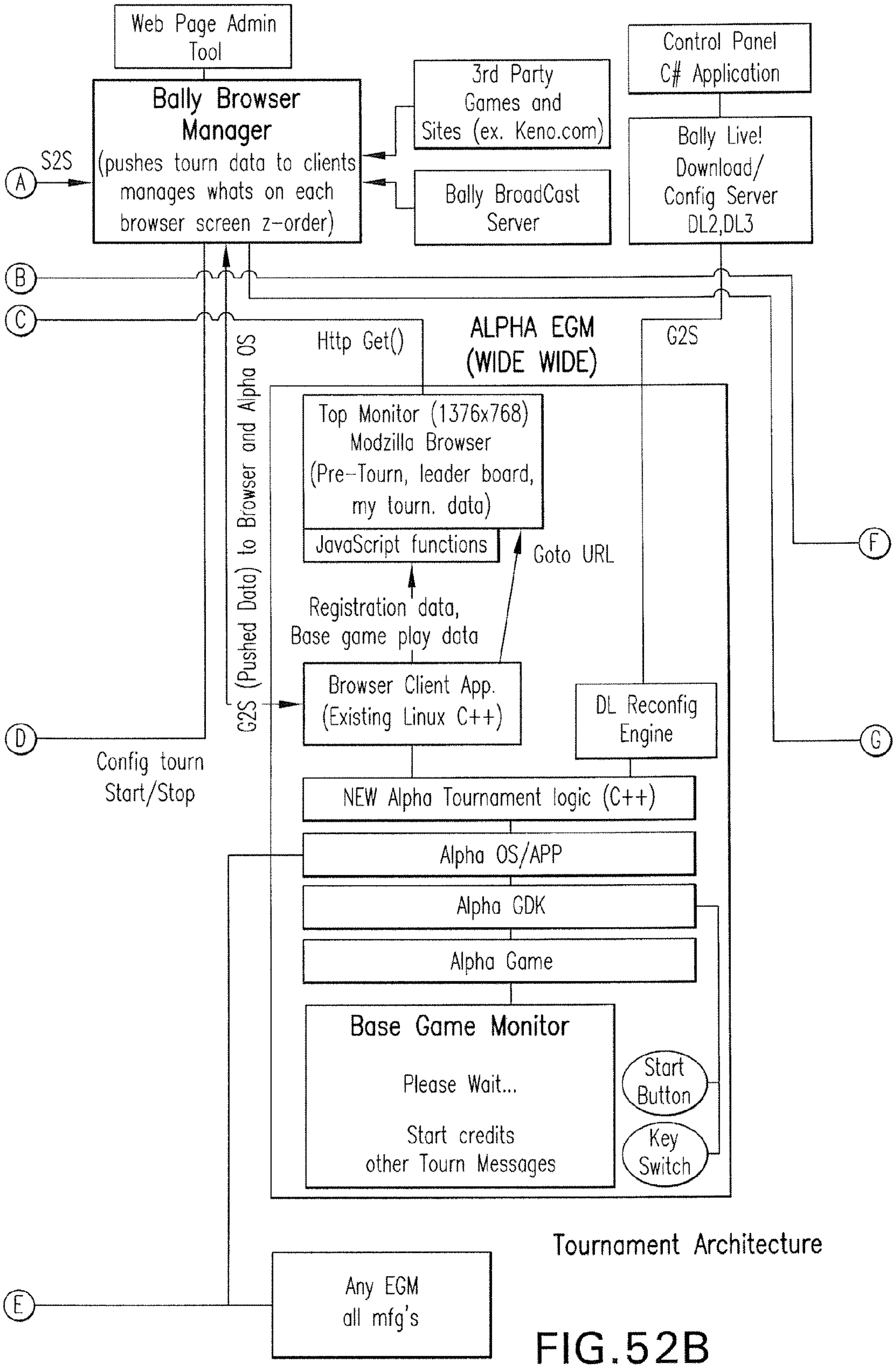
Figure 52C:
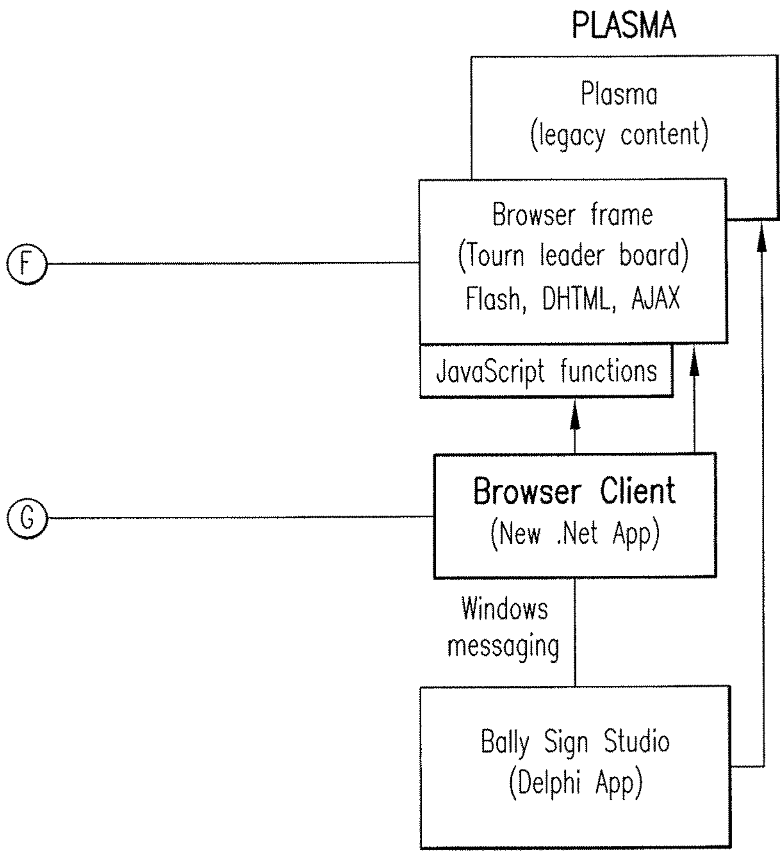
Figure 53A:
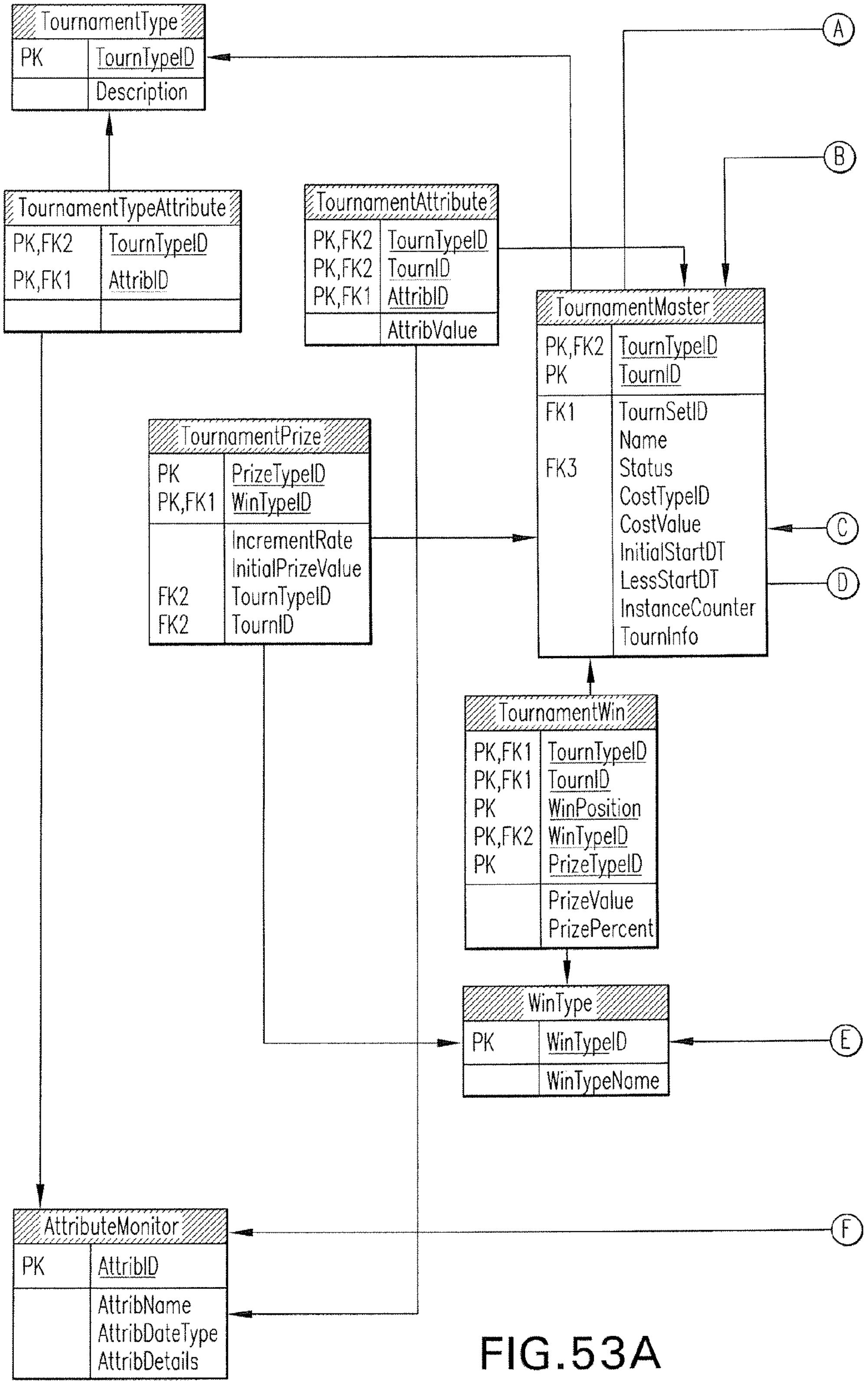
FIGS. 53A-53D is a database schema of one embodiment of a tournament gaming system.
Figure 53B:
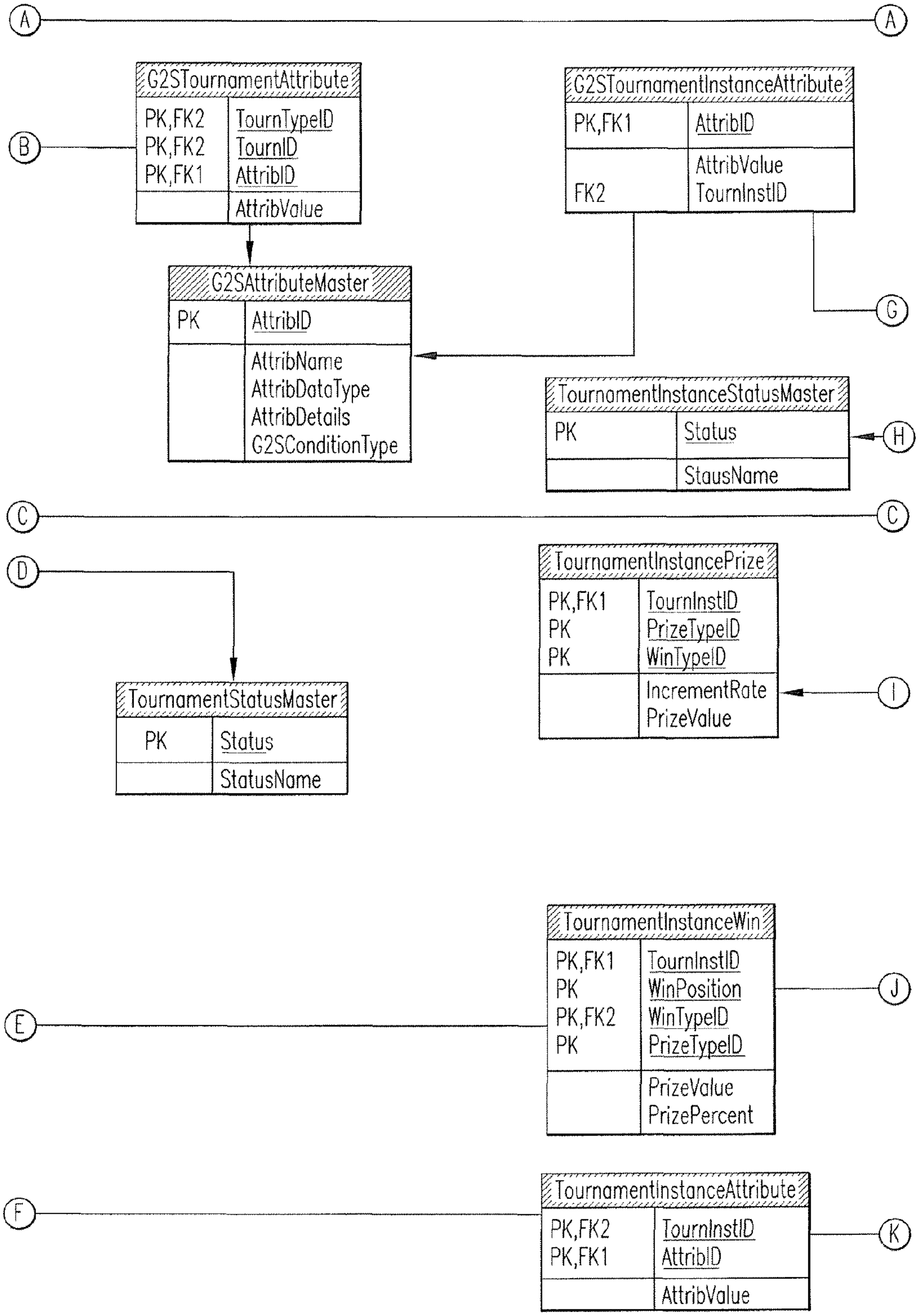
Figure 53C:
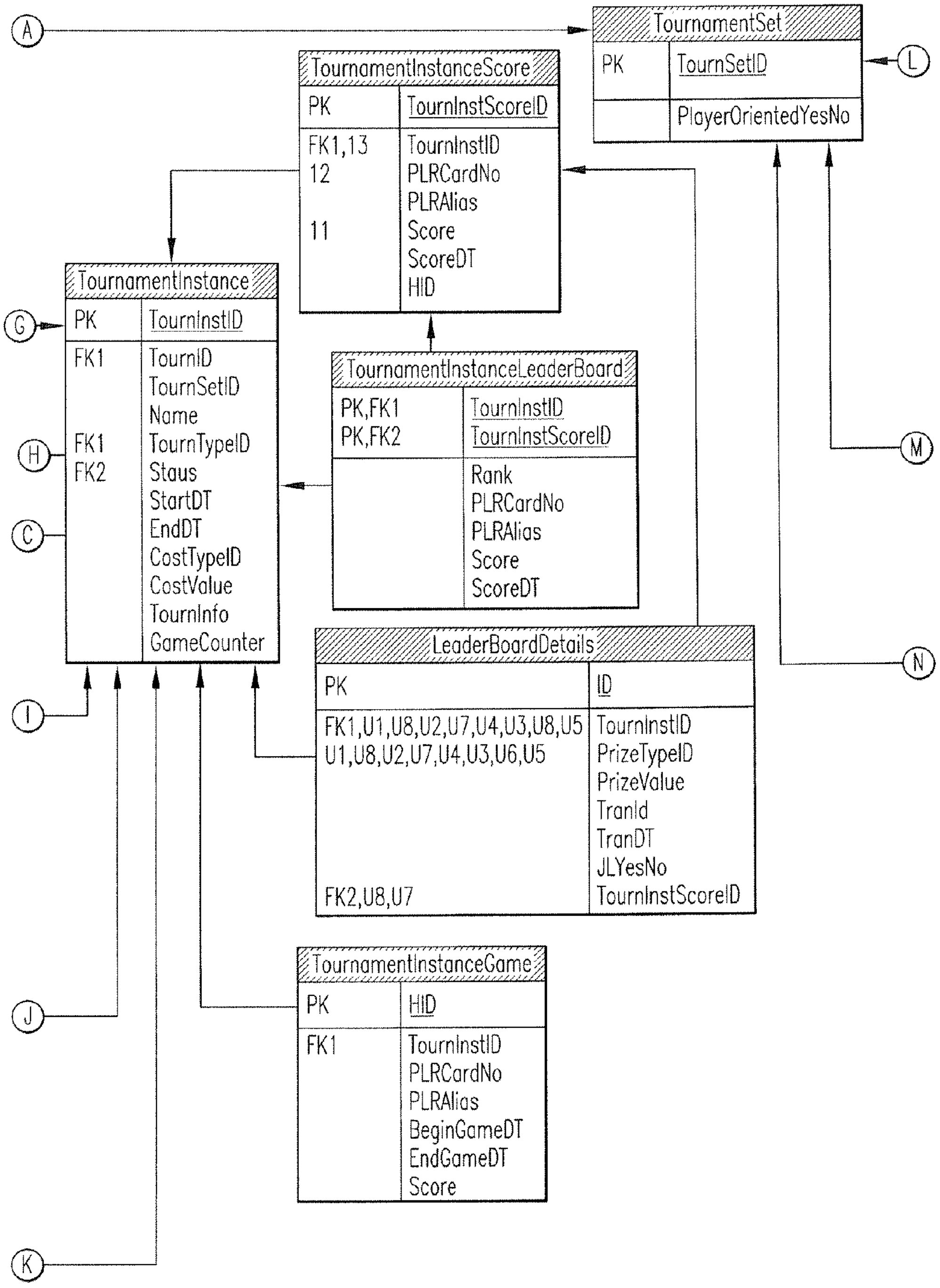
Figure 53D:
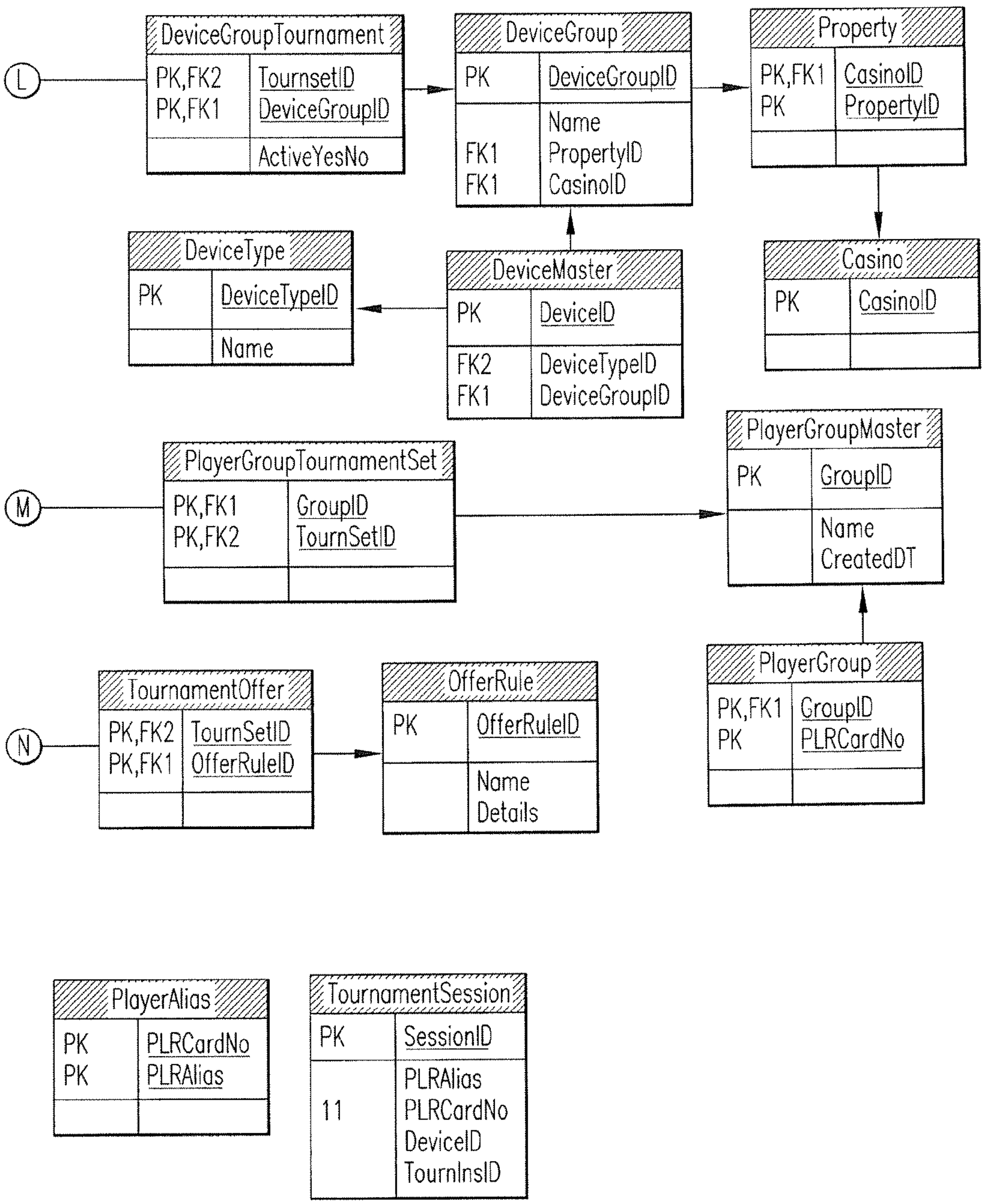

FIGS. 52A-52C illustrate one embodiment of a tournament gaming architecture. Specifically, FIGS. 52A-52C illustrate the communication protocols used between the servers and various components in a gaming machine. As shown in FIG. 52B, a single browser manager can manage browser clients on nearly all platforms on the casino floor including iVIEW, the EGM, the Casino Signage by using a common protocol.

FIGS. 53A-53D illustrate a database schema of the tournament server showing the various tables and associations amongst the various tournament parts.

Figure 54A:
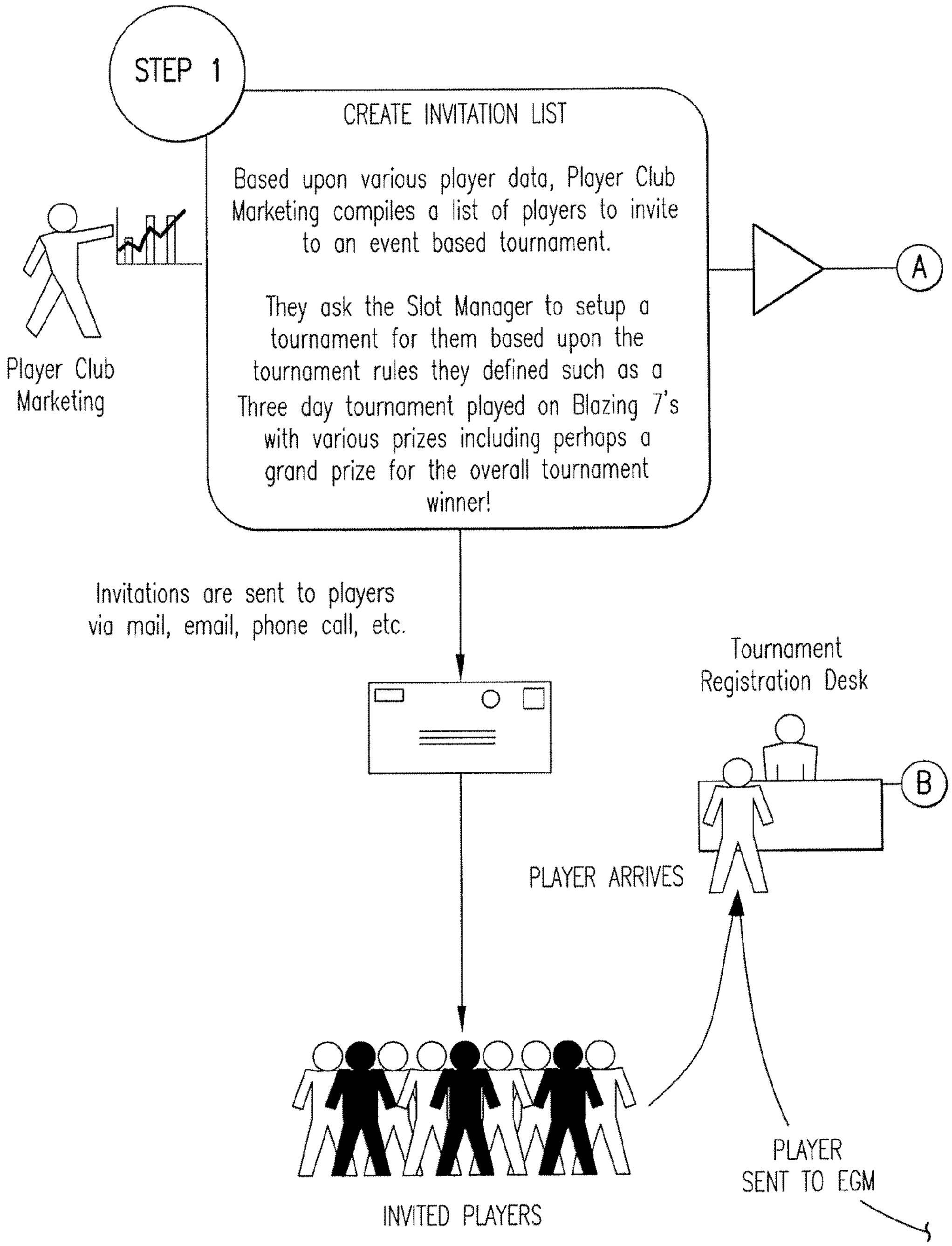
FIGS. 54A-54B are flow diagrams that illustrate the steps performed in the system to conduct a tournament game according to one embodiment.
Figure 54B:
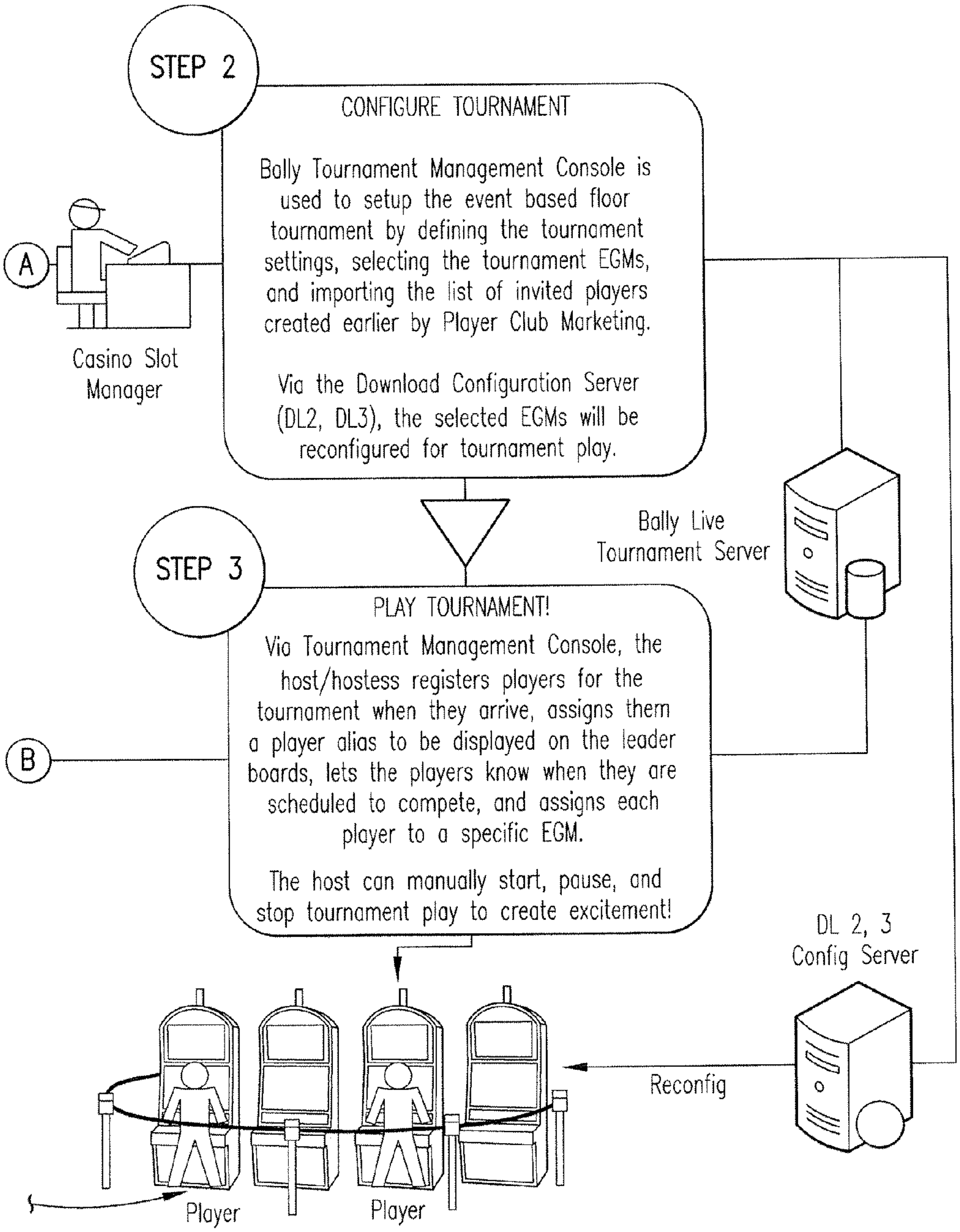

FIGS. 54A-54B are process flow drawings for an event-based floor tournament illustrating the steps to create and run a floor tournament. According to one method, the gaming establishment creates an invitation list of players for the tournament and determines tournament prizes. Invitations to the tournament are sent to players typically through the mail, email, text messaging, instant messaging, or a combination thereof. The tournament is configured at the tournament management console application, and player list is imported into this application. Prior to the scheduled tournament event, an area of the gaming floor including a plurality of gaming machines is roped off. The selected electronic game machines (EGM) are then reconfigured for tournament play by the tournament management console. Arriving players are registered by the tournament host. At this time, the player selects a player alias name of his choosing. Alternately, the player is assigned a player alias. Players are issued a tournament enrolment voucher and are typically notified of a scheduled time to play the tournament game. At the scheduled time, the player is a randomly assigned tournament EGM or the player may select from any available EGM in the tournament bank (i.e., roped off area). The player inserts the tournament enrollment voucher into EGM, which binds the player to the EGM. That is, the player's alias, patron ID, and tournament ID are associated with the EGM. In this scenario where the tournament EGM is randomly assigned to the player, it is at this point that the enrollment voucher is confirmed to match the designated tournament EGM. If there is a mismatch, then the enrollment voucher is returned to the player and the enrollment process is aborted. The player then plays his tournament game to generate a tournament score. The tournament is either a group start for all players this session or the player plays for a specific amount of time or game plays on his/her own. If the tournament is configured for a group start, then the spin button or play buttons on the EGM's are disabled prior to receiving the group start command from the tournament session server. Overhead signage shows the tournament leader board.

Figure 55:
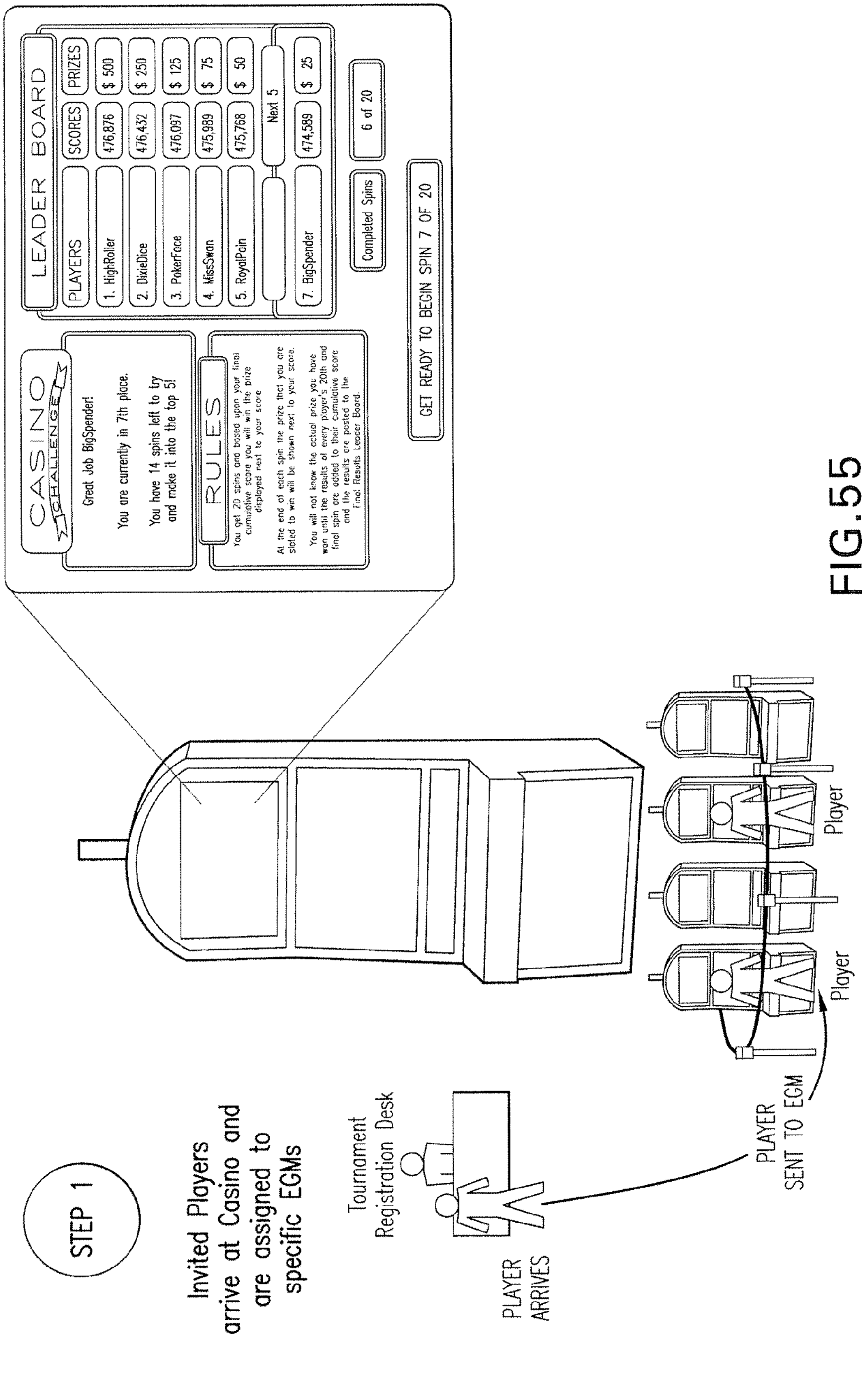
FIGS. 55-57 are flow diagrams that illustrate the steps performed in the system to conduct a tournament game according to one embodiment.

FIG. 55 is a process flow diagram for STEP 1 of FIG. 54A. In one embodiment, invited players are assigned to specific electronic gaming machines (EGMs). In alternate embodiments, a player may randomly select any tournament capable machine on the casino floor. When the player inserts his tournament entry voucher, inserting his player card, or manually enters a tournament entry code into the EGM or a player tracking display, the gaming machine is reconfigured into tournament mode from normal mode. Furthermore, the gaming machine is configured for the specific tournament conditions that are appropriate for the invited player and his tournament ID. The tournament system is capable of associating Player Patron ID, tournament ID, tournament session ID, tournament voucher entry code, unique player alias name. When any one of these variables is sent to the tournament server, the tournament server is capable of instructing a Download and Configuration server to reconfigure the gaming device into the appropriate tournament mode.

Alternately, both conventional and tournament games are installed on the gaming machines. The conventional games are presented for play to any casino patron, and the tournament games are dormant. When the gaming machine receives a reconfiguration message, the tournament games are made available for play and the conventional games are rendered dormant. With this type of gaming device setup, the Tournament protocol between the EGM and the Tournament server has the capability of setting the game ID, conventional game mode, and tournament game mode without having to go through the Download and configuration server.

Figure 56:
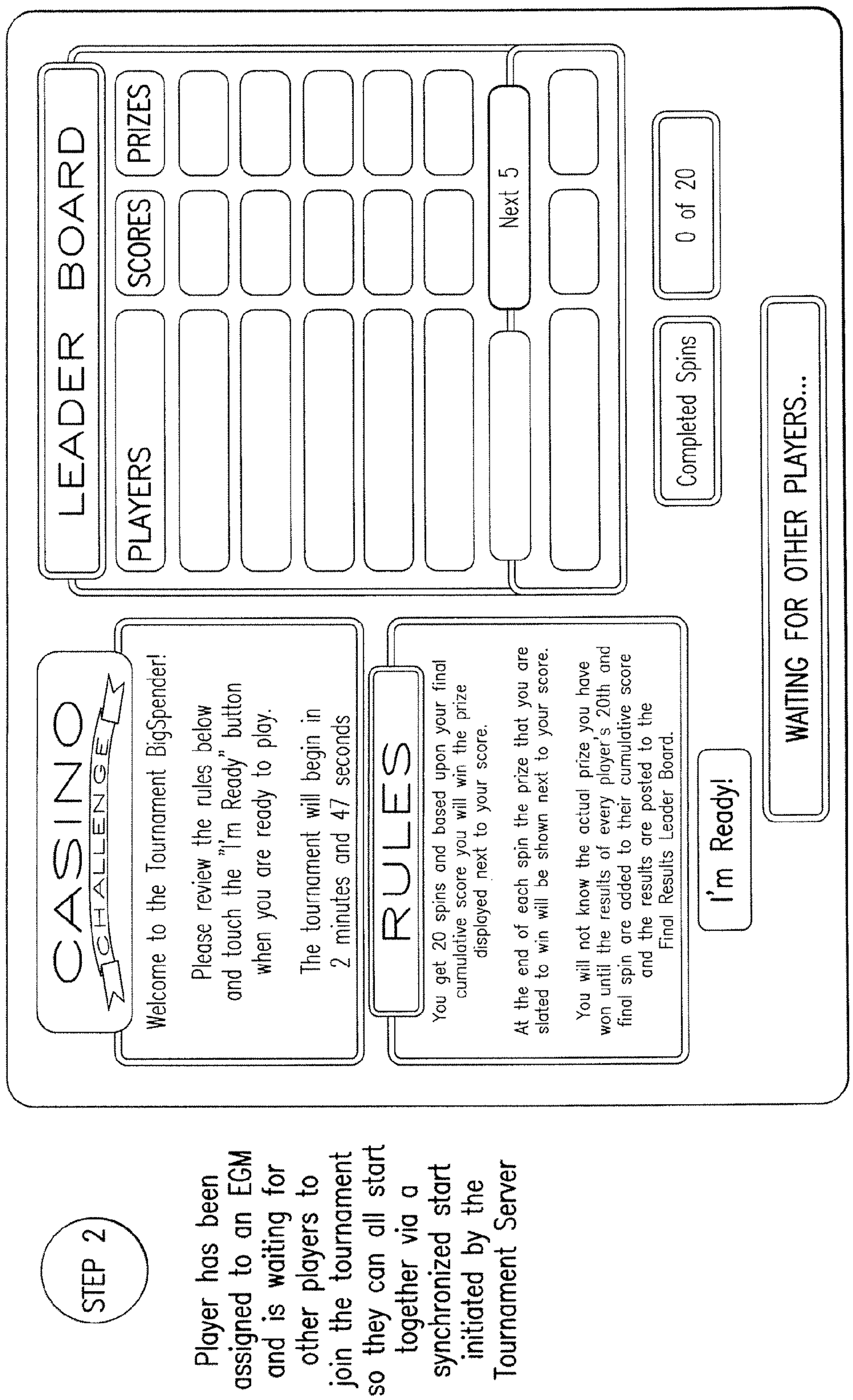

FIG. 56 is a process flow diagram and a screenshot of a top monitor from an EGM for STEP 2 (see FIG. 90) in a floor tournament. The top monitor is configured to display conventional game content or tournament game content when the EGM is reconfigured into tournament mode. According to one embodiment, the top monitor content for tournament mode is driven via a web browser running in the EGM, which shows content from a web server as part of the tournament system.

Figure 90:
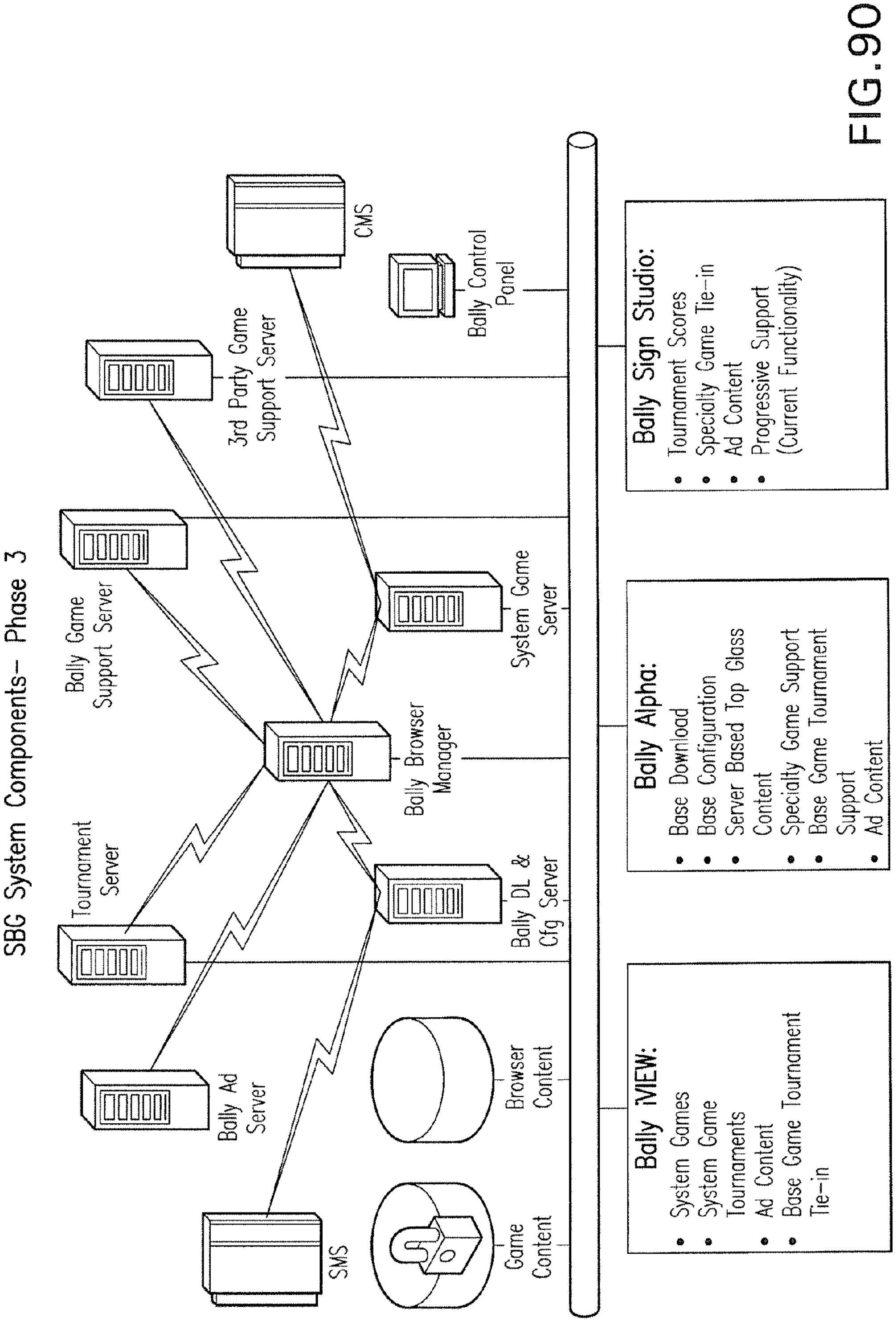
FIG. 90 is a block diagram of the components of a tournament gaming network.

As discussed in FIGS. 90 and 91, the tournament player is bound to an EGM in one of the aforementioned ways. As shown in FIG. 56, the player is shown the rules of the tournament and is instructed to wait for all other players in this tournament session. According to one embodiment, the player is given the option to say that they are ready to play the tournament by pressing a touchscreen button. A message is then sent to the tournament management console thereby notifying casino attendants that the player is ready to play the tournament. Accordingly, the casino attendants may synchronize the start of the tournament for all players.

Figure 57:
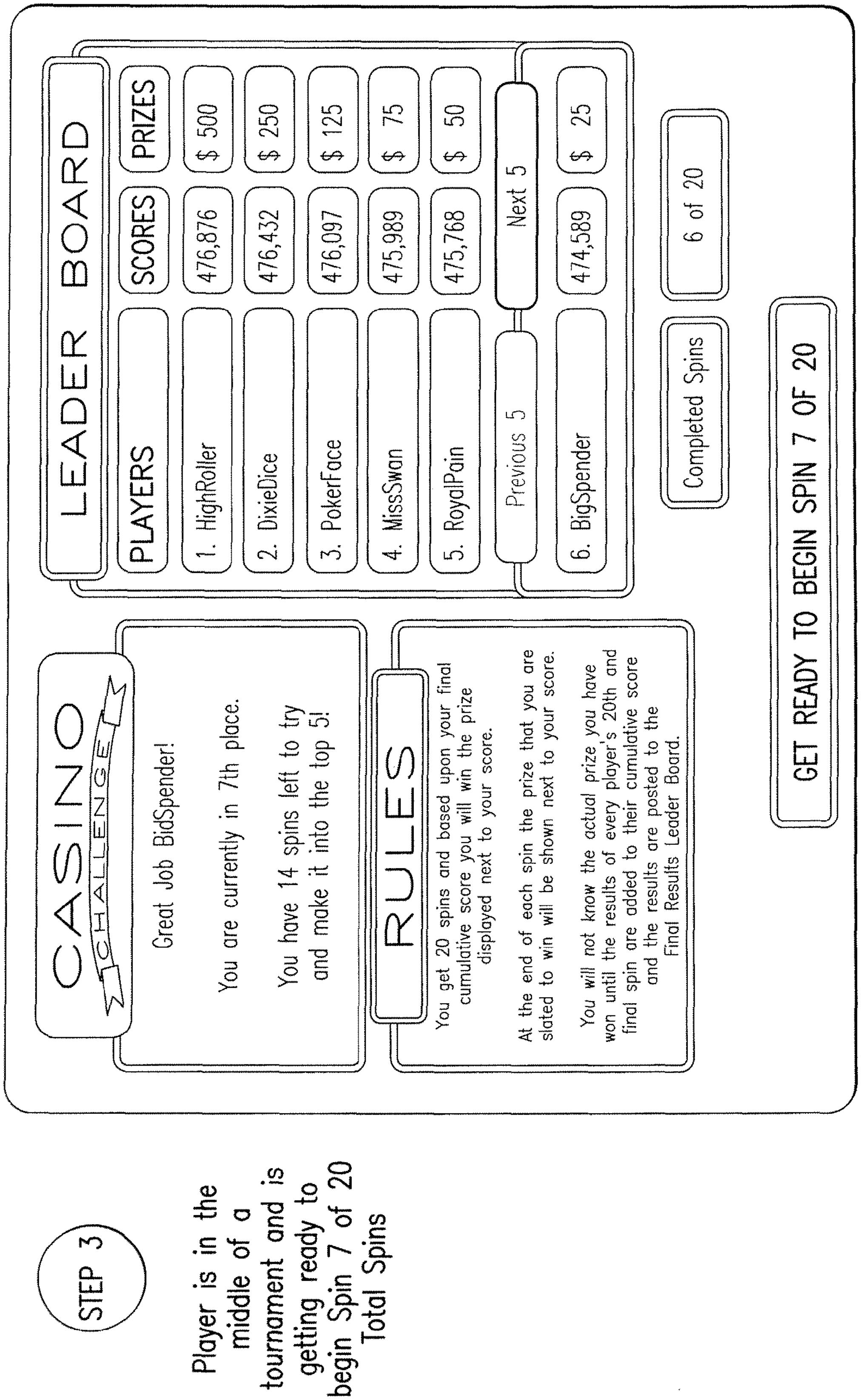

FIG. 57 is a process flow diagram and top monitor EGM screenshot for STEP 3 of a floor tournament. As shown in FIG. 57, the player is in the middle of the tournament play. The current leader board is shown to the player during play. According to one embodiment, this data is shown on the top monitor of the EGM. Alternatively, the data is presented on an IVIEW display, a portion of the main display, or a display separate yet in communication with the EGM. As shown in FIG. 57, the leader board includes the top five players, their, player alias, score, and a prize for each of the top five positions. Additionally, the active player's (BigSpender) score, rank, and prize for the rank position (i.e., $25 for $7^{th}$ place) is also shown. The tournament conclusion rule (i.e., 20 spins) is also shown to the active player. As shown in FIG. 57, the player has 14 spins left to play. In another embodiment, the tournament conclusion rule is (time remaining to play the game). Alternatively, the tournament play continues until one player reaches a specific score or until all other players are eliminated by running out of their initially given tournament credits.

Figure 58:
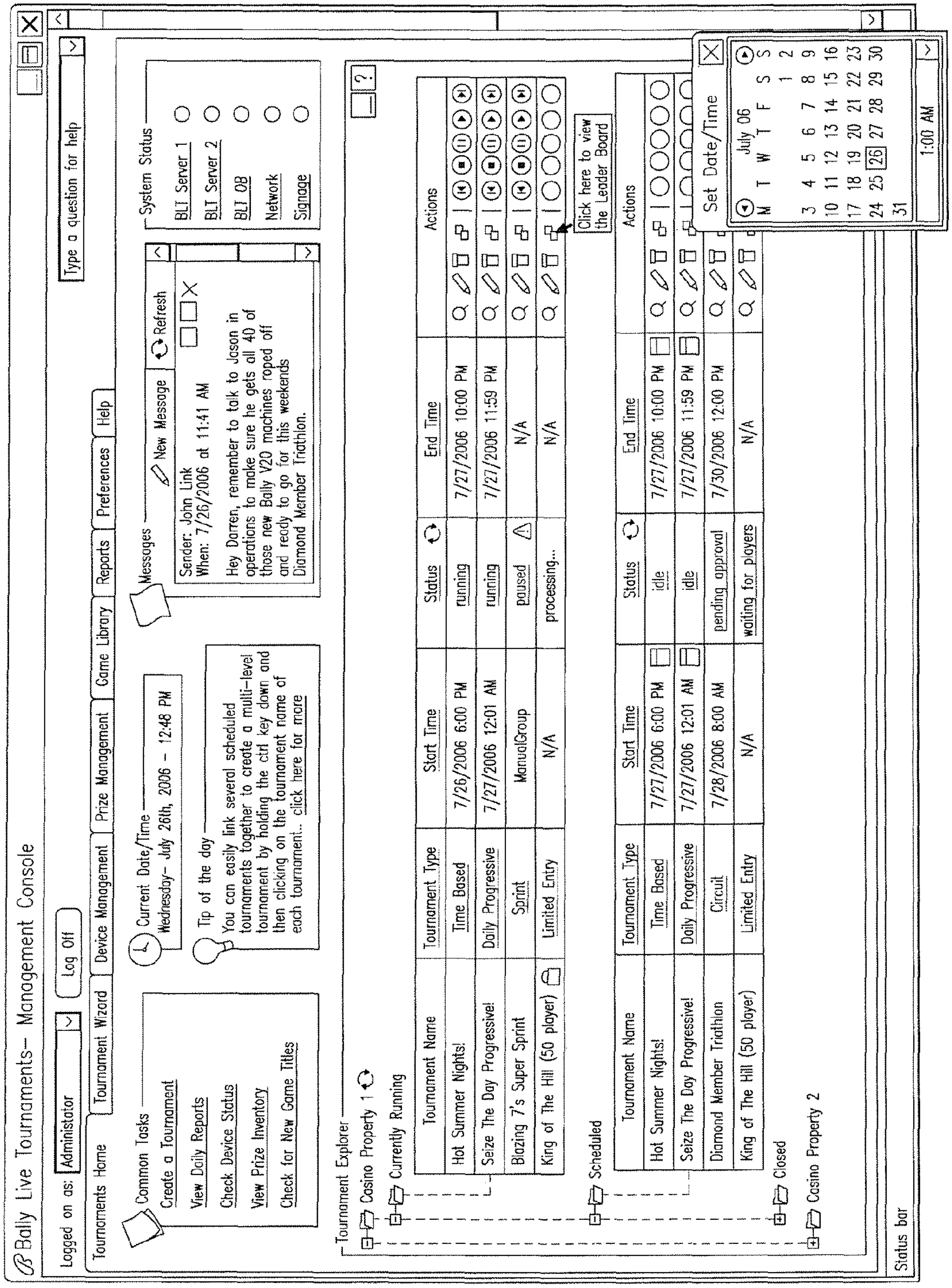
FIG. 58 is a sample screen shot from one embodiment of a tournament management console.

FIG. 58 is a screenshot of one embodiment of the tournament management server. The tournament management server allows a casino administrator to create tournaments, view reports, check on the status of one or more EGMs, view tournament prize inventory, and check for new tournament game titles available for play by querying the download and configuration server. The tournament management server includes a messaging system to enable various tournament staff to communicate with one another. The tournament management server also includes a system status of the various pieces of hardware and software pieces of the tournament system. Additionally, the tournament management server presents the currently running tournaments, scheduled tournaments, and closed tournaments. The tournament management server allows an operator to view and schedule tournaments at multiple casino sites. Each casino site may have its own tournament or a tournament may include two or more casino sites. Each actively running tournament status is shown with a progress indicator. The ability to pause and resume a running tournament is provided by the tournament management server. A tournament Wizard is provided to quickly allow casino personnel to configure new tournaments. EGM devices may also be configured from the interface of tournament management server. Prize management is maintained at the tournament management server.

Figure 59A:
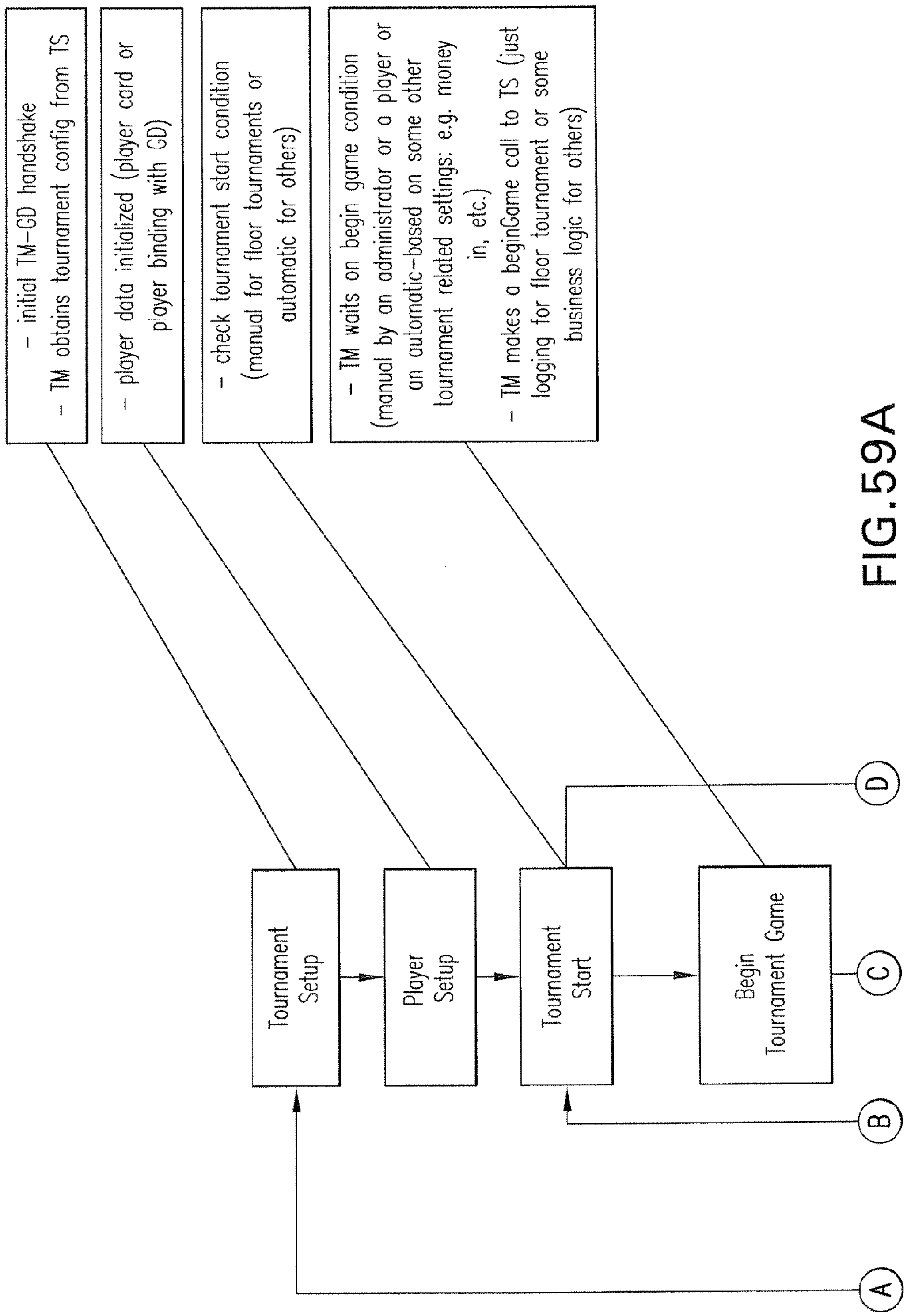
FIGS. 59A-59B are flow diagrams that illustrate the various tournament states for a tournament server.
Figure 59B:
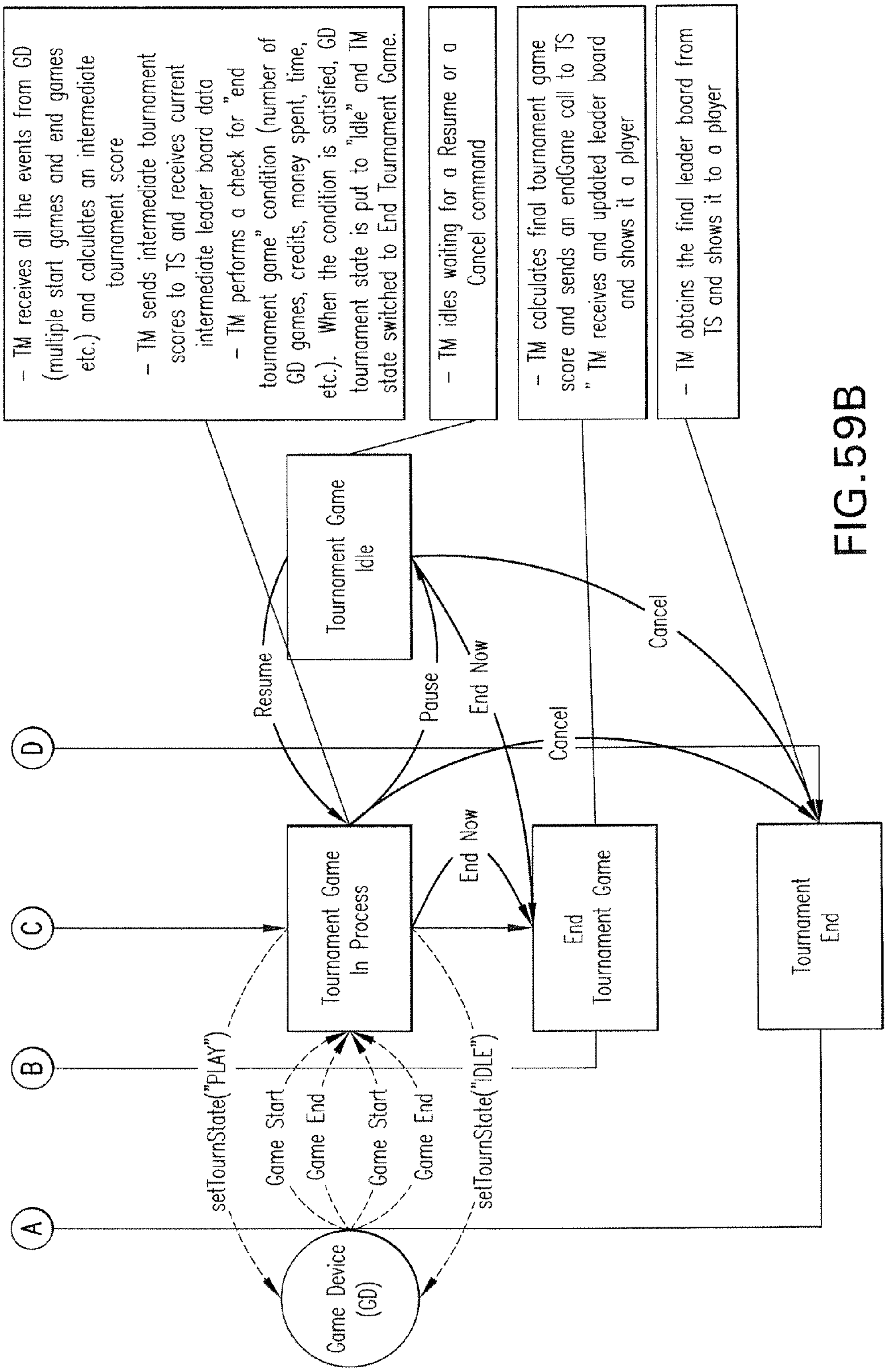

FIGS. 59A-59B illustrate a flowchart of the various Tournament States that exist in the Tournament Magic Server. TOURNAMENT SETUP is the initial tournament magic service to EGM or game device handshake. The Tournament Magic obtains the tournament configuration data from the Tournament Management Server. The PLAYER SETUP is process of player data initialization using the Player card, tournament voucher code, by management console, or other player binding technique with the Game Device. The TOURNAMENT START is determined by checking the tournament start conditions as defined in the G2S tournament Class. Usually, the TOURNAMENT START is a manual group start from a tournament host application. In alternate embodiments, the TOURNAMENT START may be player initiated by pressing the start button or play button on the EGM. The BEGIN TOURNAMENT GAME step is next. The Tournament Game In Process is next. In this step, the Tournament Magic Server receives many base game starts and game send events from various EGM's. The TOURNAMENT GAME IDLE process denotes that the tournament can be paused and resumed by the tournament management system even during the tournament play. The END TOURNAMENT GAME process occurs. Final scores are calculated. The tournament is allowed to begin the next tournament.

Figure 60A:
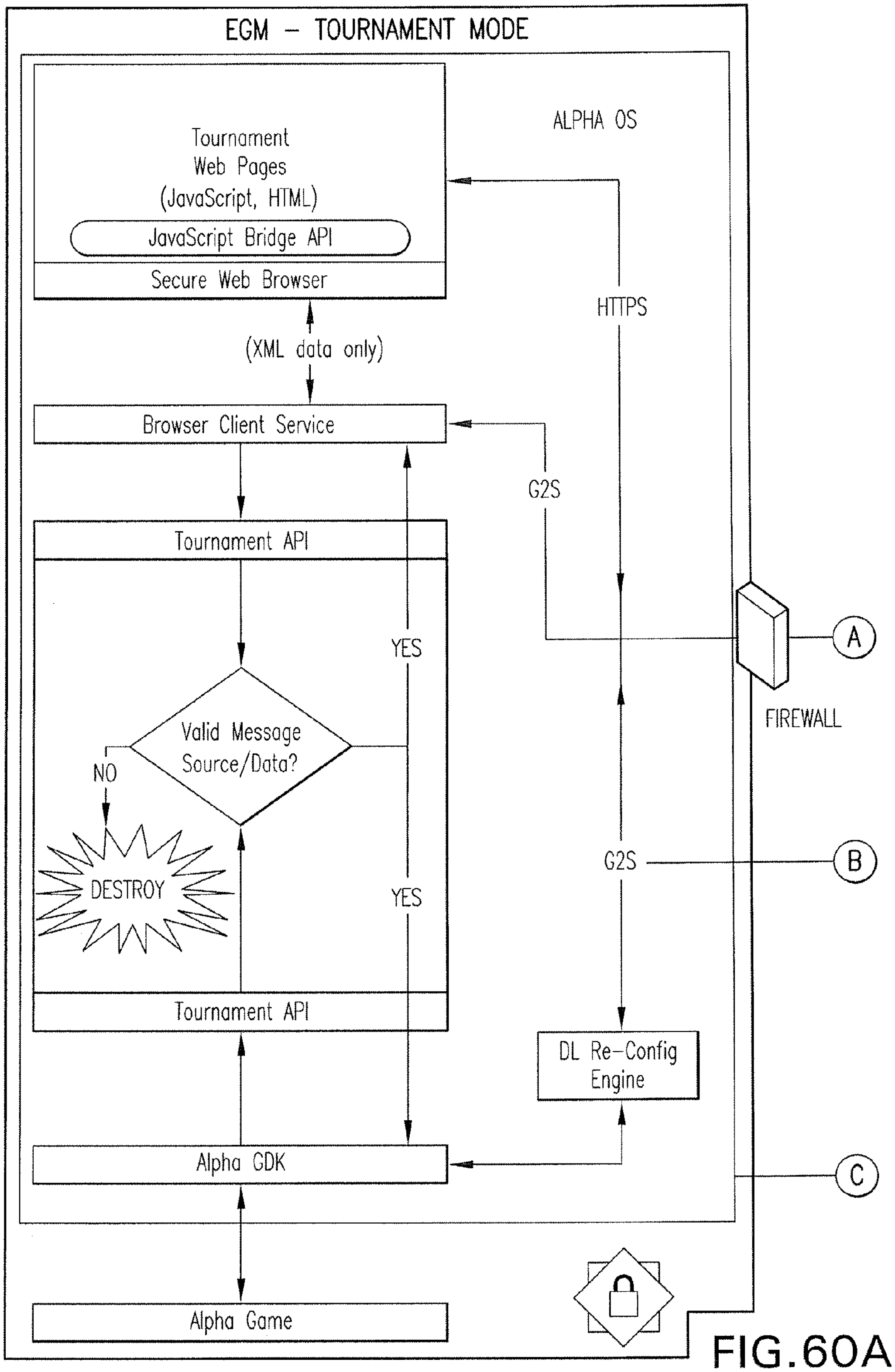
FIGS. 60A-60C are block diagrams of the communication links between a gaming machine and the tournament server during a tournament game.
Figure 60B:
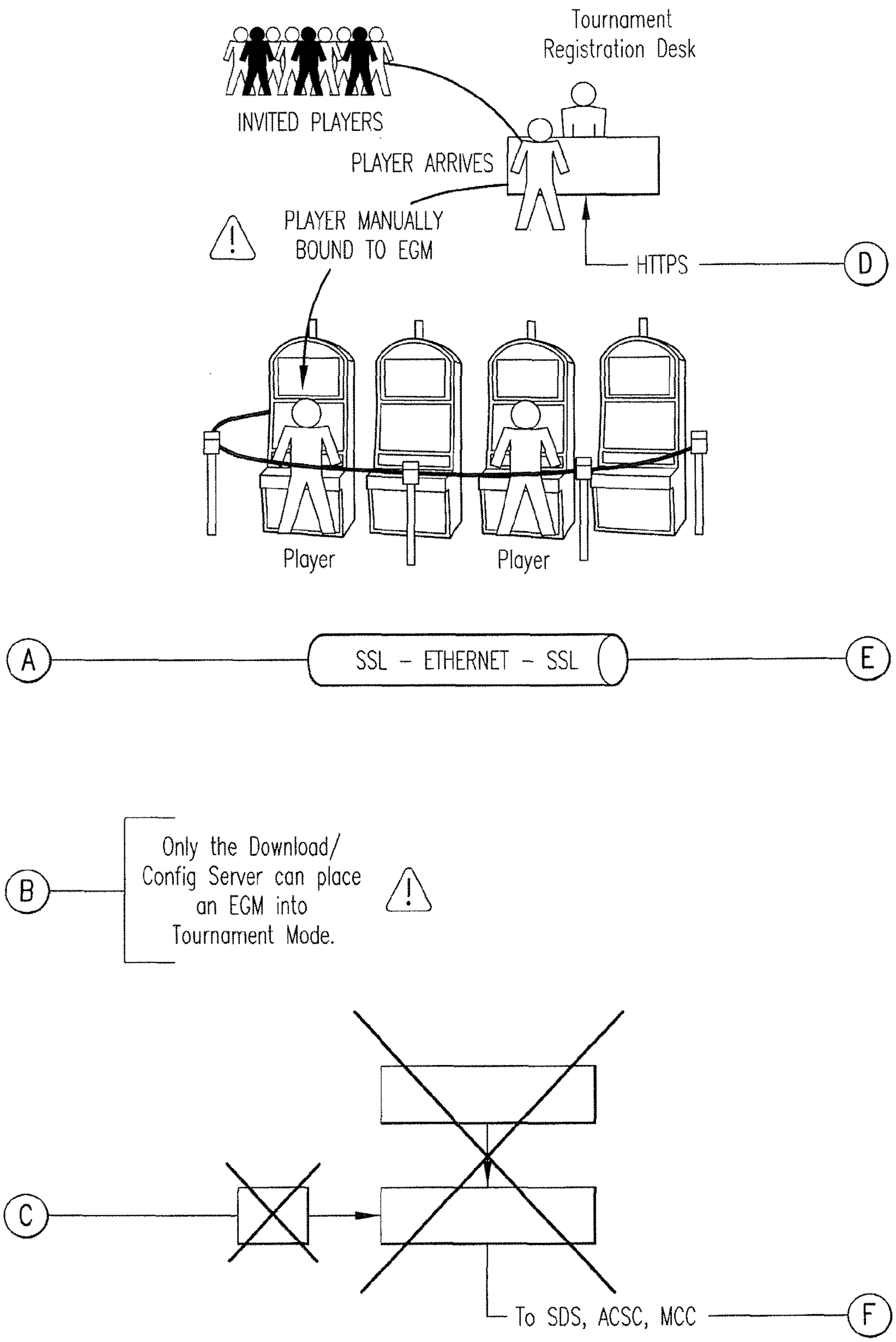
Figure 60C:
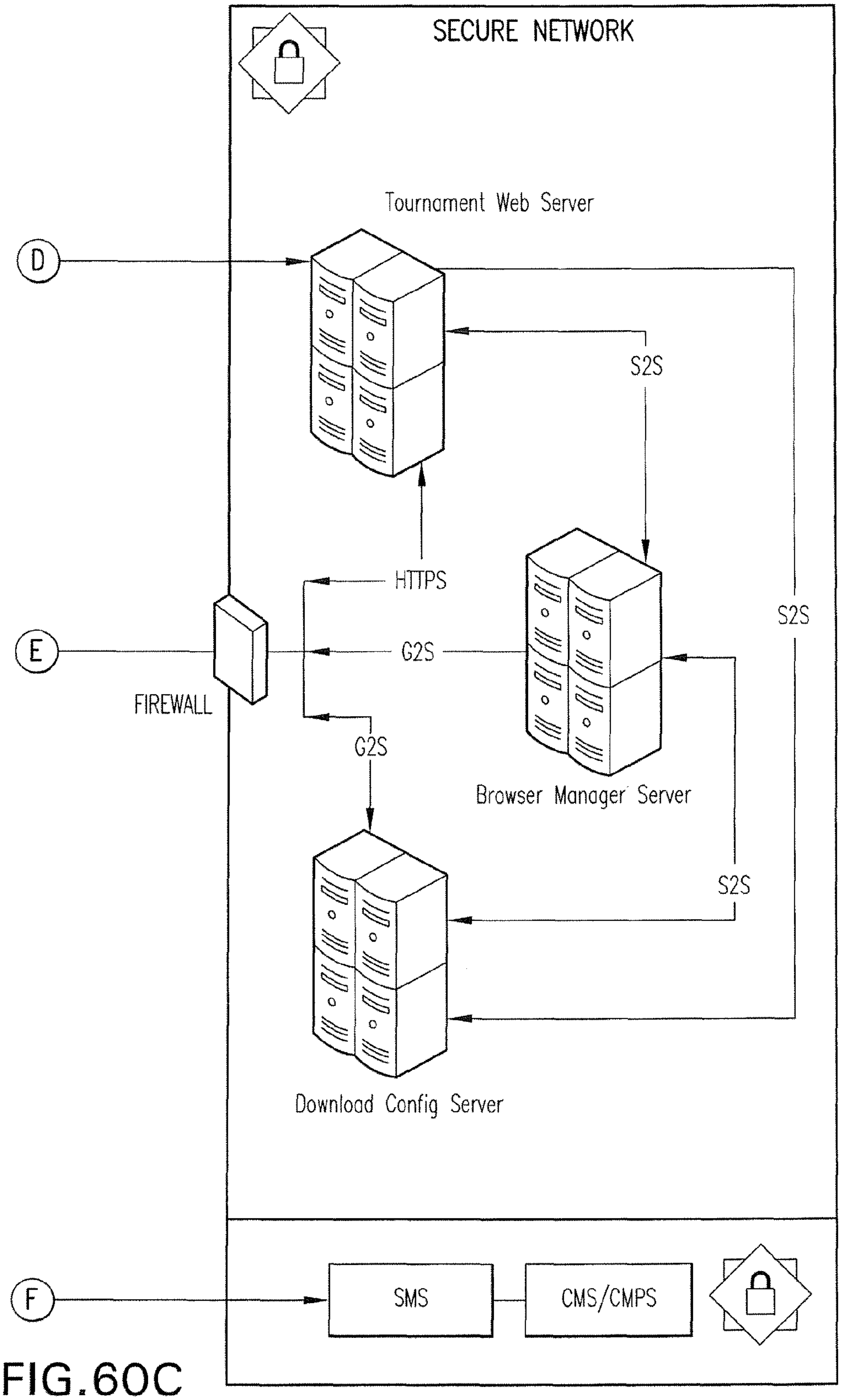

FIGS. 60A-60C illustrate an EGM and its software components in communication with other components in the EGM and in communication with the components in the secure network (e.g., the Secure Tournament Network servers with Tournament Web Servers, Browser Manager Servers, and the Bally Download and Configuration servers). FIG. 97 illustrates how many different servers can talk to separate client side applications and browsers to provide a secure tournament gaming product. Because the EGM has been converted from a conventional game into a tournament game, components such as the card reader are temporarily disabled. The GMU is still operating, but the meters associated with the GMU are static. Rather, tournament meters on the tournament server side are responsible for keeping score. Since the tournament game does not require the use of the GMU, any request for meters from the GMU is the same value during tournament game play. The GMU is left running to identify any tilt conditions (e.g. EGM door has been opened).

Figure 61A:
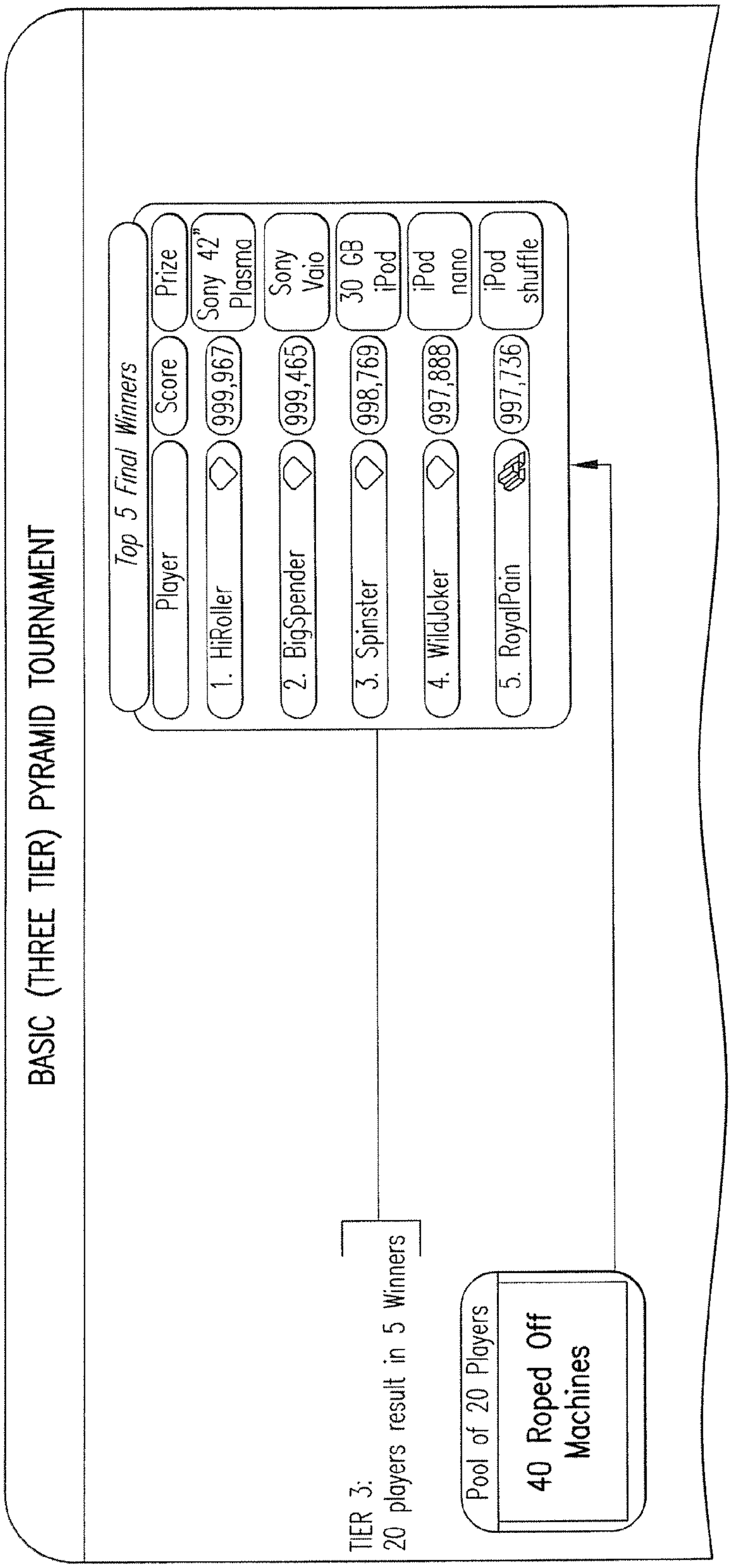
FIGS. 61A-61C illustrate one embodiment of a pyramid tournament game.
Figure 61B:
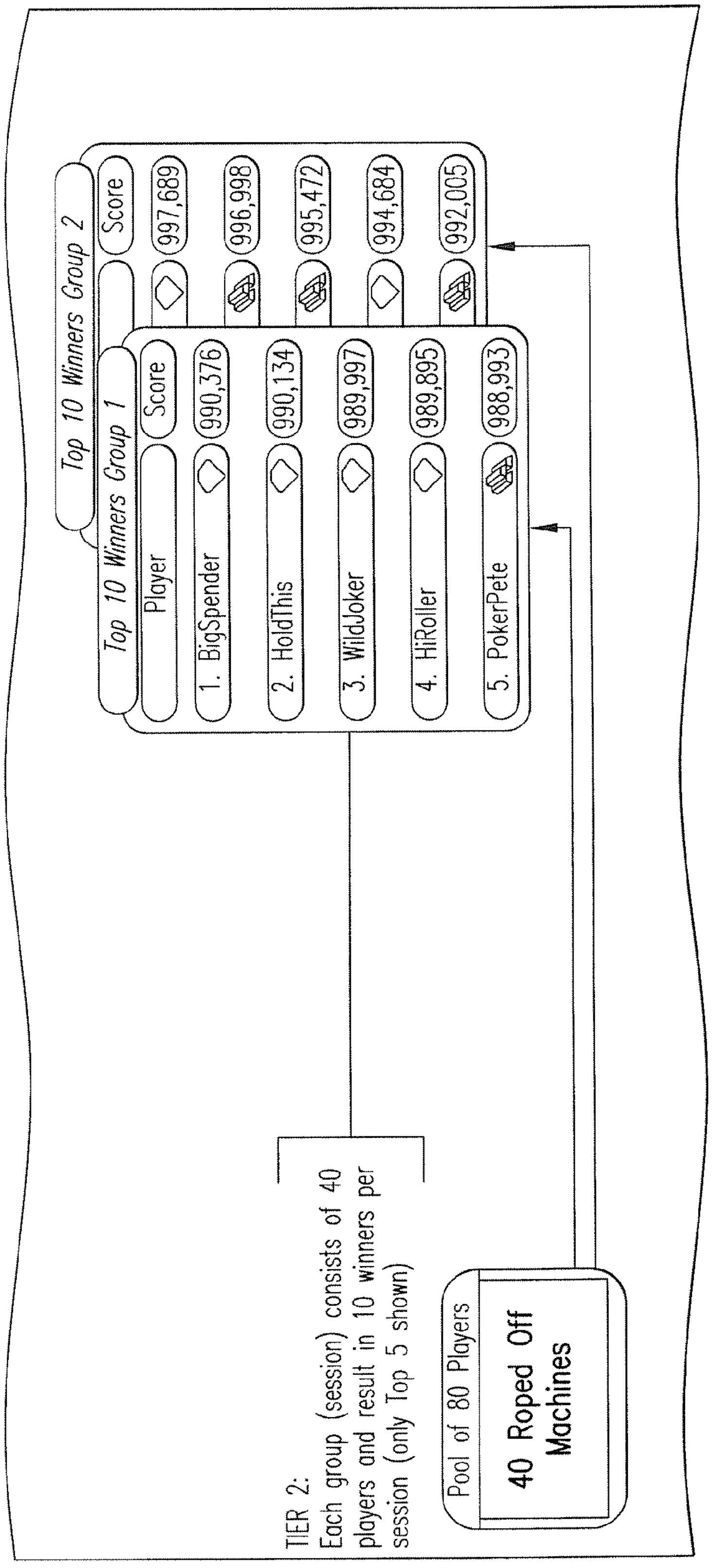
Figure 61C:
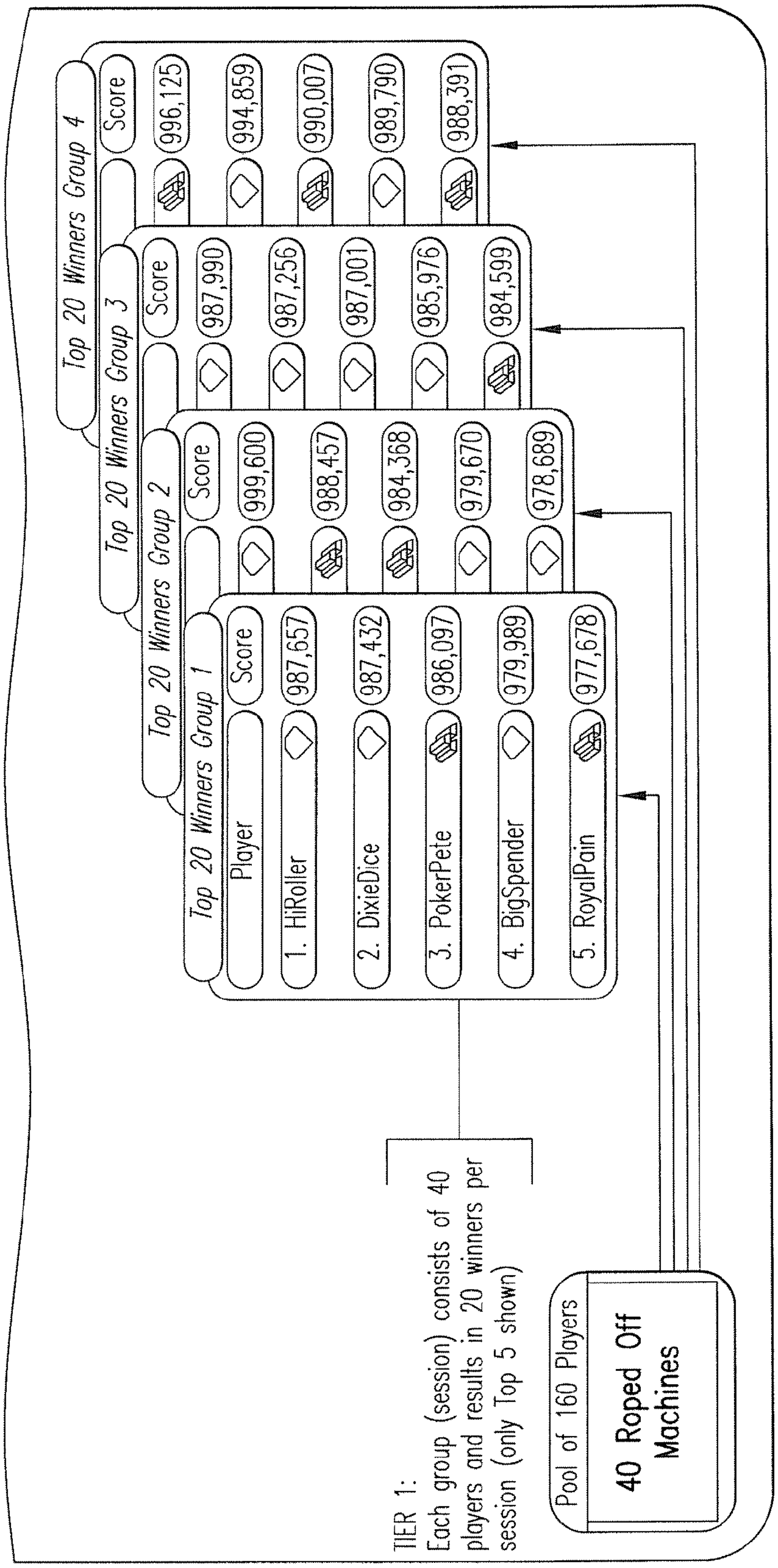

FIGS. 61A-61C are diagrams showing the multi-tier process in a pyramid style tournament In TIER 1, a pool of 160 players play a tournament game in four groups of 40 on 40 roped off gaming machines. The top 20 players from each of the four groups advance to TIER 2. In TIER 2, the pool of 80 players from TIER 1 plays the TIER 2 tournament game. In this example, there are 40 roped off gaming machines thereby requiring two groups of 40 to play the TIER 2 game. The top 10 winners from the two groups then advance to TIER 3. In TIER 3, the winning players from TIER 2 play the tournament game to determine the top 5 winners. As those skilled in the art will appreciate, the number of "roped off" gaming machines, number of TIERS, winners per TIER, total number of players eligible to play the pyramid-style tournament, and number of final winners may be varied from that which is disclosed.

FIG. 62 is a tournament state diagram for one embodiment of the tournament gaming system. The tournament state diagram shows the various states of the game in a tournament mode (e.g., begin game, game in process, and end game) as well as the process of preparing an EGM for a tournament (e.g., preparation state, ready state, start state, in process state, end state and pause state). Additionally, FIG. 62 shows the communication events that occur in the preparation, ready, start, in process, and end states.

Figure 63:
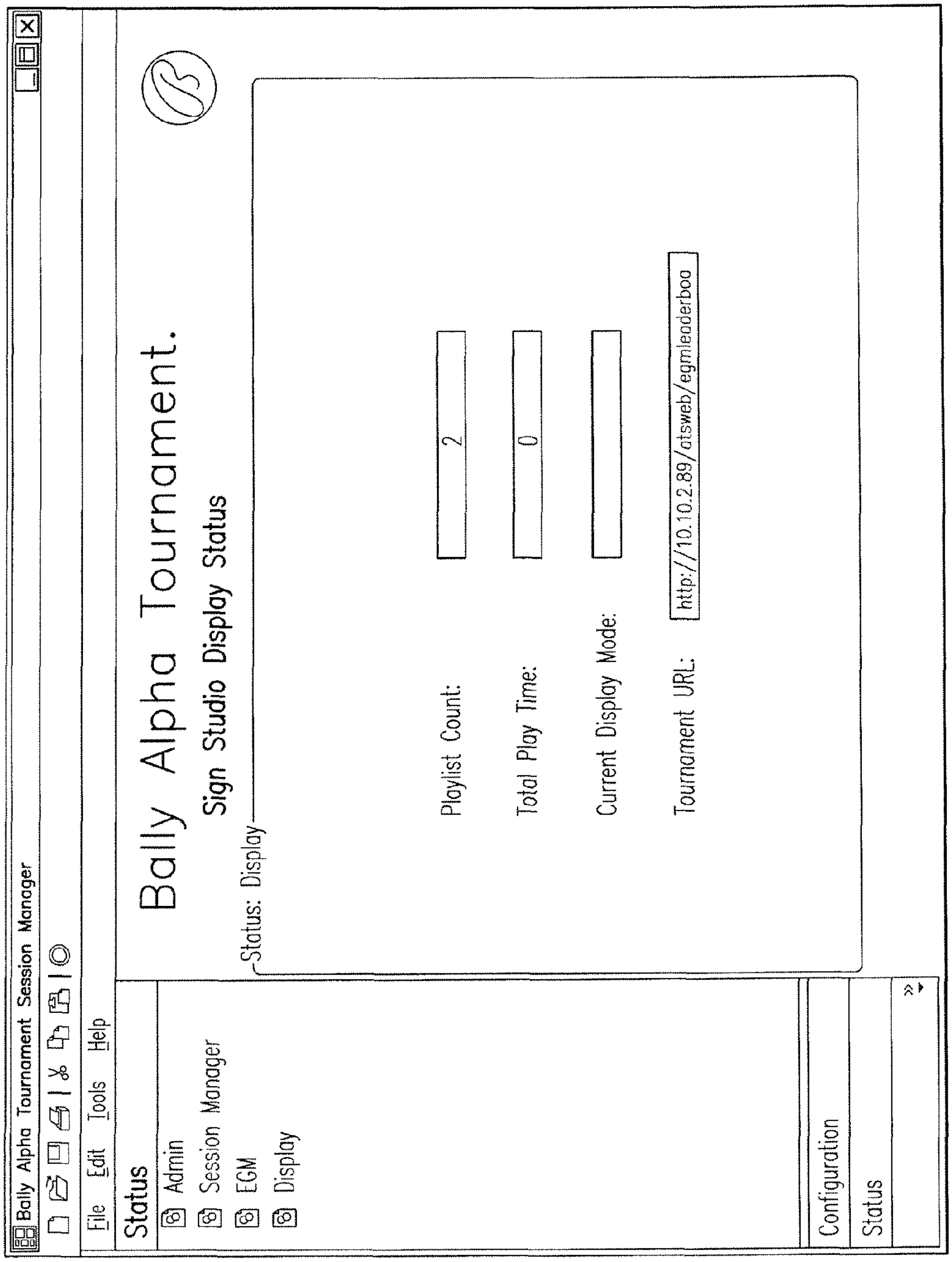
FIGS. 63-70 are sample screen shots from one embodiment of a tournament management console.

FIG. 63 is a screenshot of the Bally Alpha Tournament Session Manager Application (Sign Studio Display Status). This screen allows the overhead LCD signage status to be seen. When the EGM's are reconfigured into tournament mode, the overhead signage above the bank of EGM's is switched from normal signage mode to tournament mode screens. Each phase of the tournament has different screens that are presented to the players. All of the state information is shown on this page. The current Display Mode field shows whether the overhead signage is in one of two modes (normal EGM mode—playlist or Tournament mode). The URL of the Tournament mode content is entered here by casino staff. When the EGM's and the overhead signage are put into tournament mode, the normal SignStudio media is hidden from view and a browser instance is shown. The browser will show the web page at the URL identified in the tournament URL field. This web page is the tournament leader board data and other data relating to running the floor tournament. When the EGM's are taken back to normal mode from tournament mode, the overhead signage returns to the default playlist.

Figure 64:
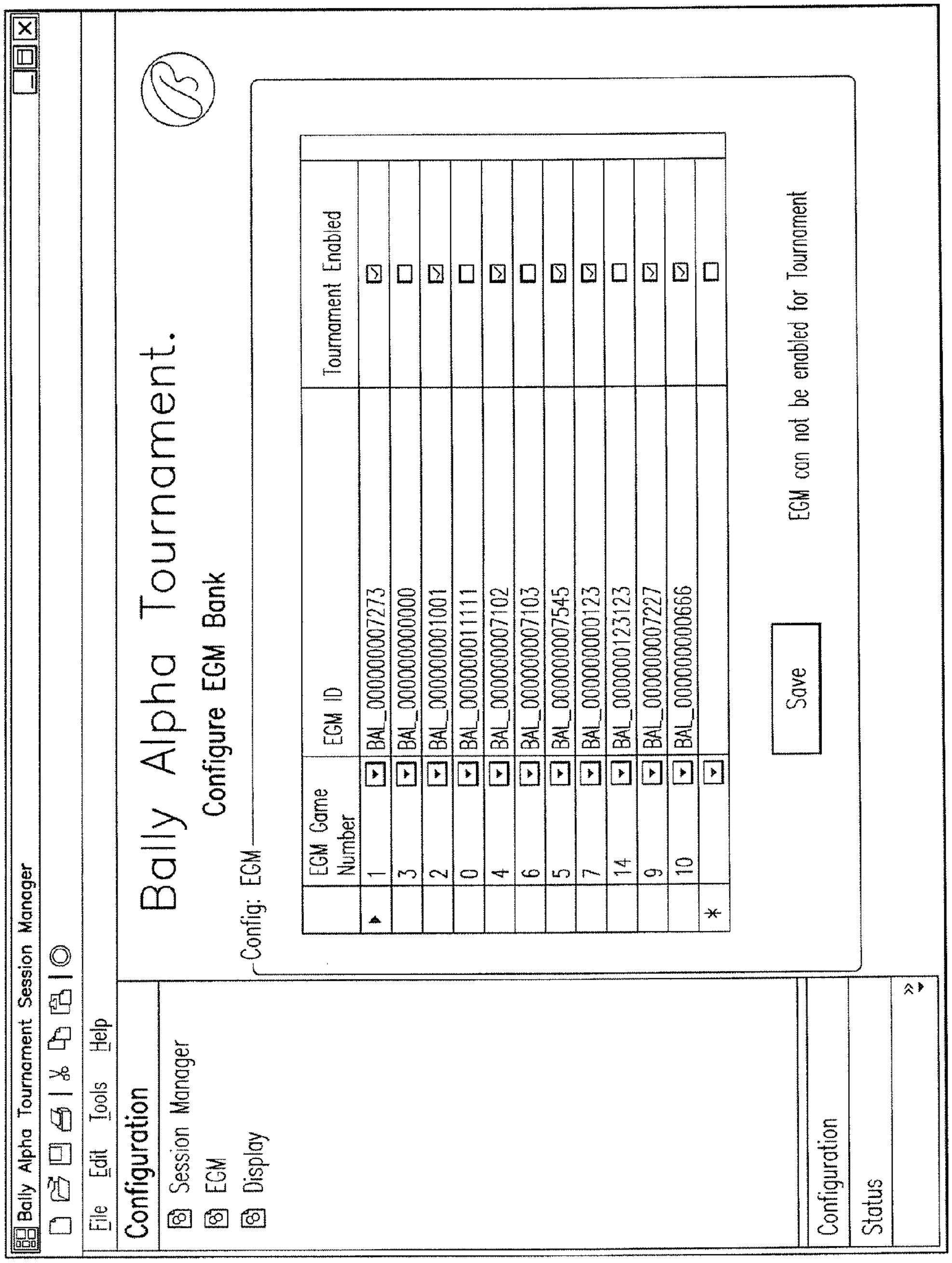

FIG. 64 is a screenshot of the "Configure EGM Bank" page on the Bally Alpha Tournament Session Manager Application. On this page, the EGM's enabled for tournament play are listed (these EGMs have enumerated themselves with the tournament session server). The G2S tournament class has a means for the EGMs to announce to the servers that the EGMs have at least one tournament game available and are capable of being put into tournament mode. At this page, casino personnel implement the change of the EGM into tournament mode. EGM's highlighted in yellow are those machines that cannot be put into tournament mode. These machines may not be put into tournament mode because there may be a communication error, the game is actively being played in normal mode, or the requested tournament pay table and denomination are not available on a specific EGM, the game is in TILT mode, or some other event that prevents this machine from being reconfigured into tournament mode. At this page, the casino personnel are able to see which machines are having a problem going into tournament mode thereby allowing the casino to determine and resolve the problem with the EGM.

Figure 65:
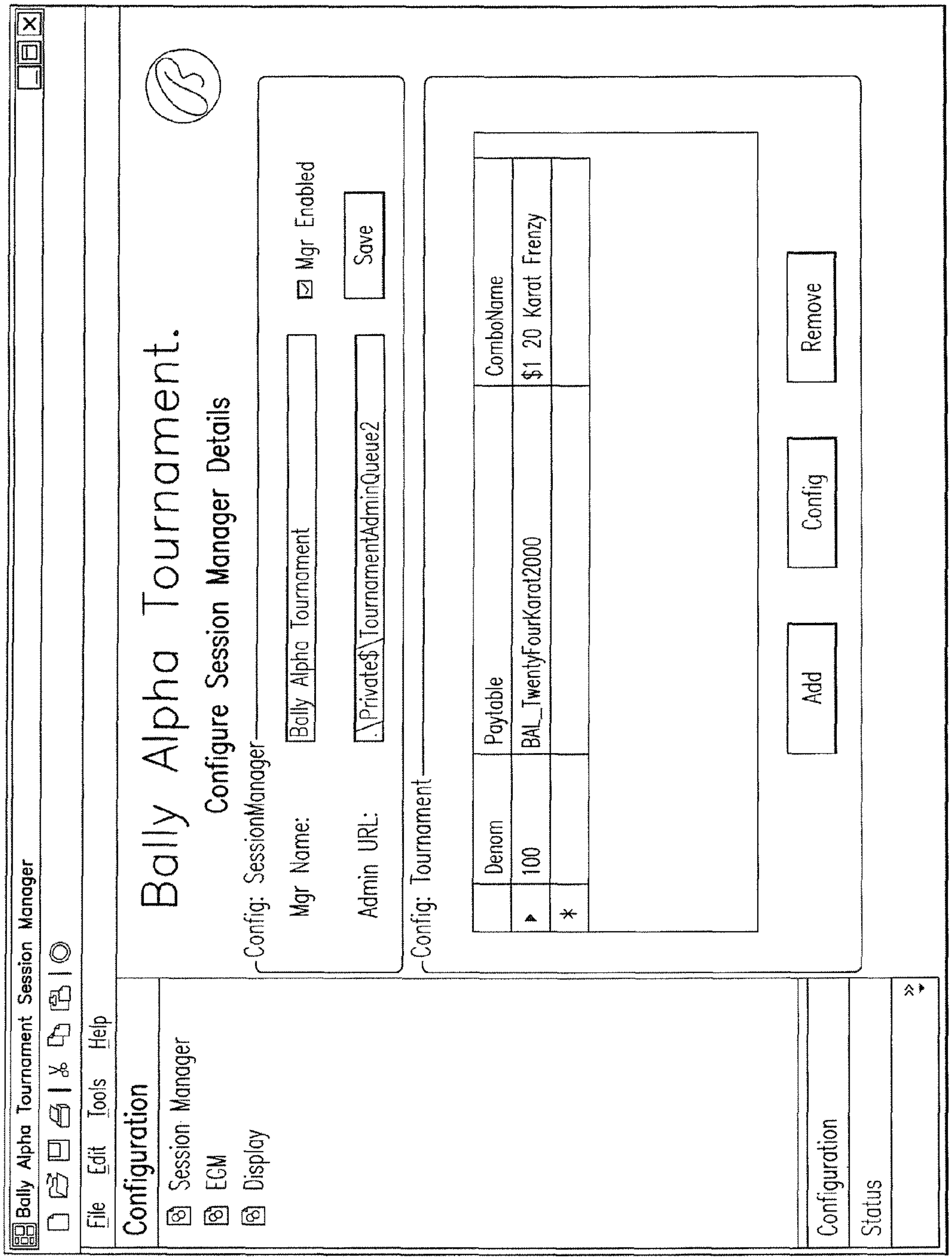

FIG. 65 is a screenshot of a "Configure Session Manager Details" page on the Bally Alpha Tournament Session Manager Application. On this page, specific game combinations, denomination, and Pay table ID, are configured for a tournament session. The data is transmitted to the EGM as part of the EGM's reconfiguration from normal play mode into tournament play mode. This Mgr Name text box allows the casino staff to uniquely name this session manager instance. There may be multiple session manager instances on the casino floor on the same or separate servers. For example there may be two banks of games configured for floor tournaments. One named Blazing 7's Floor Tournament and one named Black and White Floor tournament. These names would be sent to the master tournament administration host application that can view and manage these multiple instances of the tournament session manager application. The Admin URL is a text box for the operator to enter a Master Admin tournament server URL. This field allows the Bally Session manager to know where it will be sending to and receiving data from for its parent Master Admin tournament server URL. The data exchanged between the two servers is typically done using Microsoft MSMQ.

Figure 66:
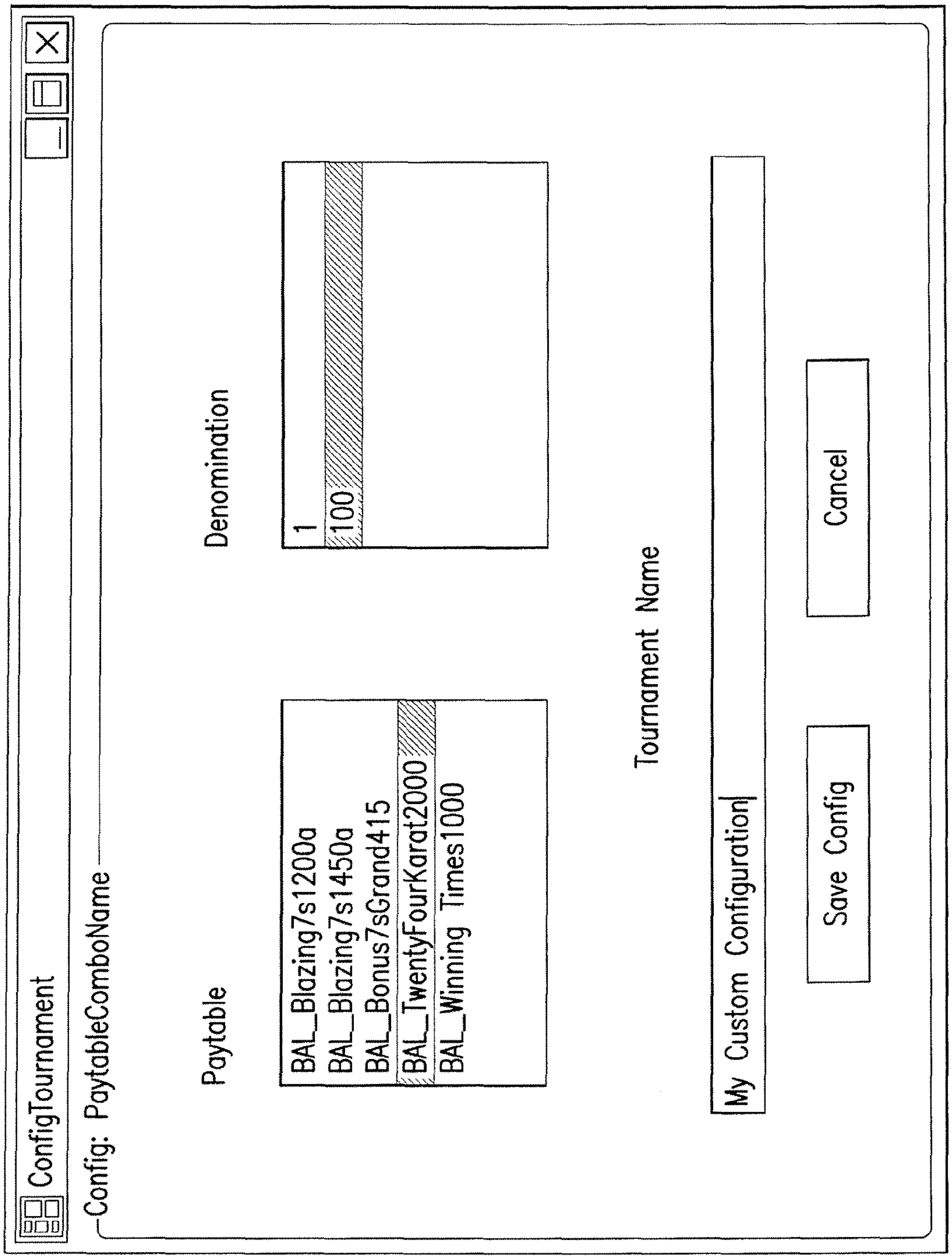

FIG. 66 is a screenshot of a "config" screen after a casino administrator clicks on the "Config" button on the "Configure Session Manager Details" page (as shown in FIG. 65). On this page, a list of all available tournament paytables queried from the EGMs connected to the tournament session manager through the G2S tournament class. Some EGMs may not have one or more of the Paytable (gamecombo's) shown in this list. When a user selects a specific paytable, the denominations available for this specific paytable are shown in the list box under denomination. The casino administrator selects one field from the paytable and denomination list boxes and establishes a tournament name for the selected configuration. The selected name is presented by the Master Tournament Admin Server to identify the paytable and denomination for the floor tournament session. The selected name also allows the details of the specific cabinet configurations (Paytable and denomination) to be hidden from the Master Tournament Admin server.

Figure 67:
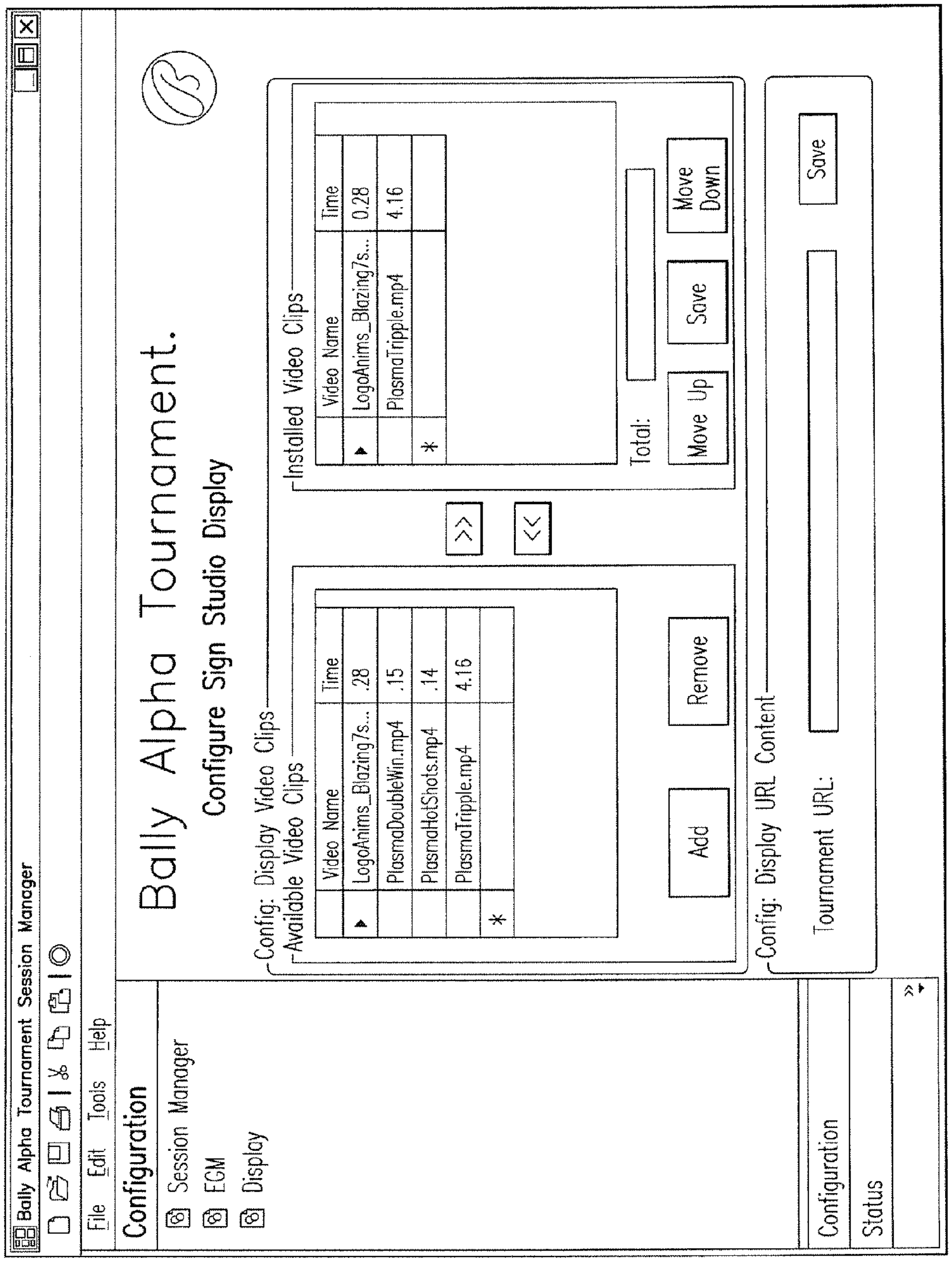

FIG. 67 is a screenshot of the "Configure Sign Studio Display" page on the Bally Alpha Tournament Session Manager Application. This page allows a casino administrator to view the available media content that is displayable on the overhead signage in a gaming establishment. A casino administrator may configure a playlist of media clips (and the order of the media clips) to be displayed on the signage in non-tournament mode. A URL of the tournament web server may also be entered on the "Configure Sign Studio Display." When the signage is placed into tournament mode, a browser is initiated over the media playing in the playlist. The browser is also set to navigate to this URL. This URL may be run at any server in the casino, multiple casinos, the Master Tournament server, the Bally Alpha Tournament Session server, or any other server.

Figure 68:
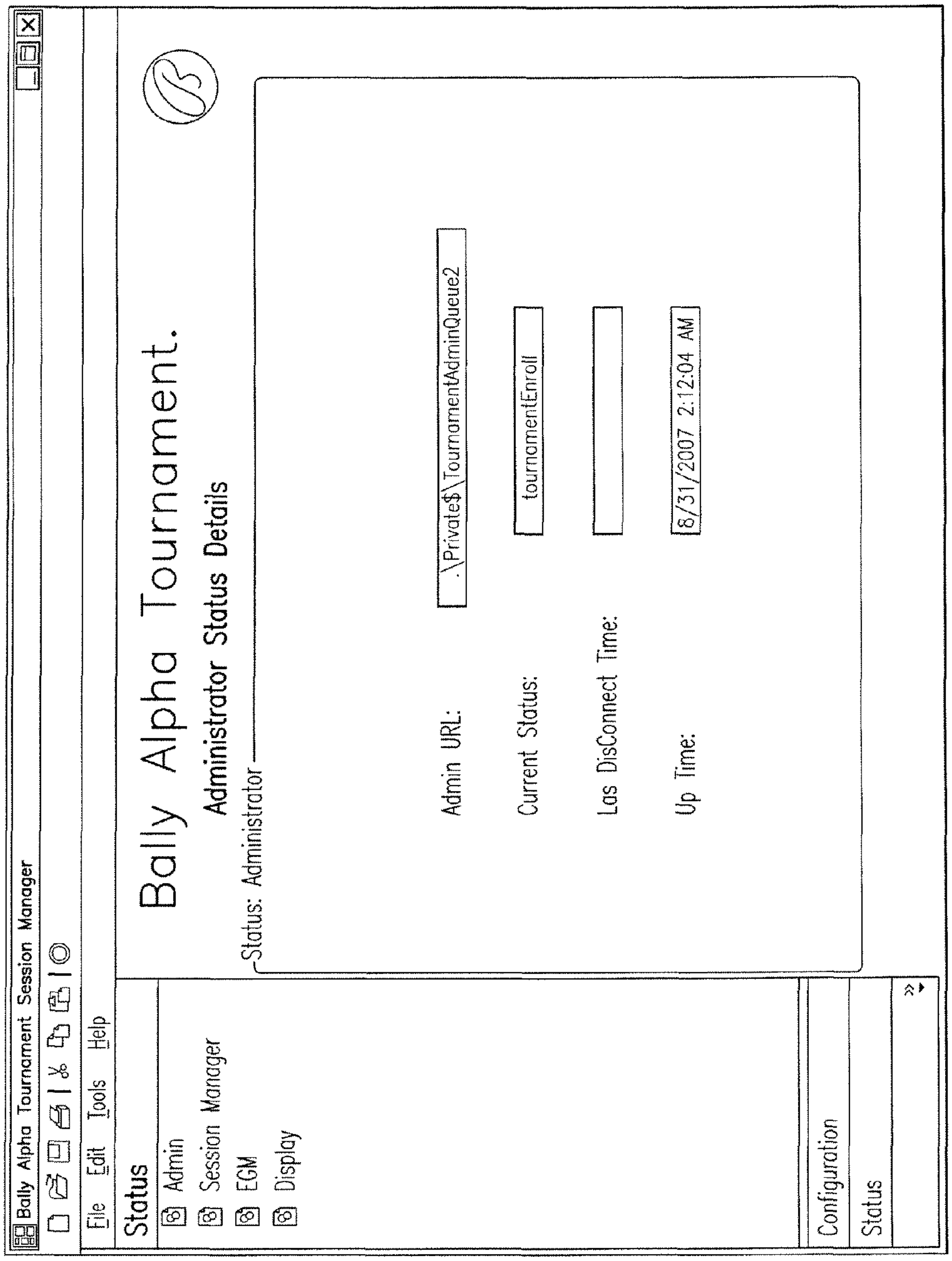

FIG. 68 is a screenshot of the "Administrator Status Details" page on the Bally Alpha Tournament Session Manager Application. The Master Tournament Administration server URL is presented on the "Administrator Status Details" in the Admin URL field. The Current Status field identifies a parameter set from the Master Tournament Admin Server. The last time the Master Tournament Admin Server and the Bally Alpha Tournament Session Manager have communicated is shown. Also, the time that the communication link has been up and running is also displayed on this page. The "Administrator Status Details" page also allows for diagnostics to be shown for the two servers. According to one embodiment, the communication between the Master Tournament Server and the Bally Alpha Tournament Session Manager uses Microsoft MSMQ.

Figure 69:
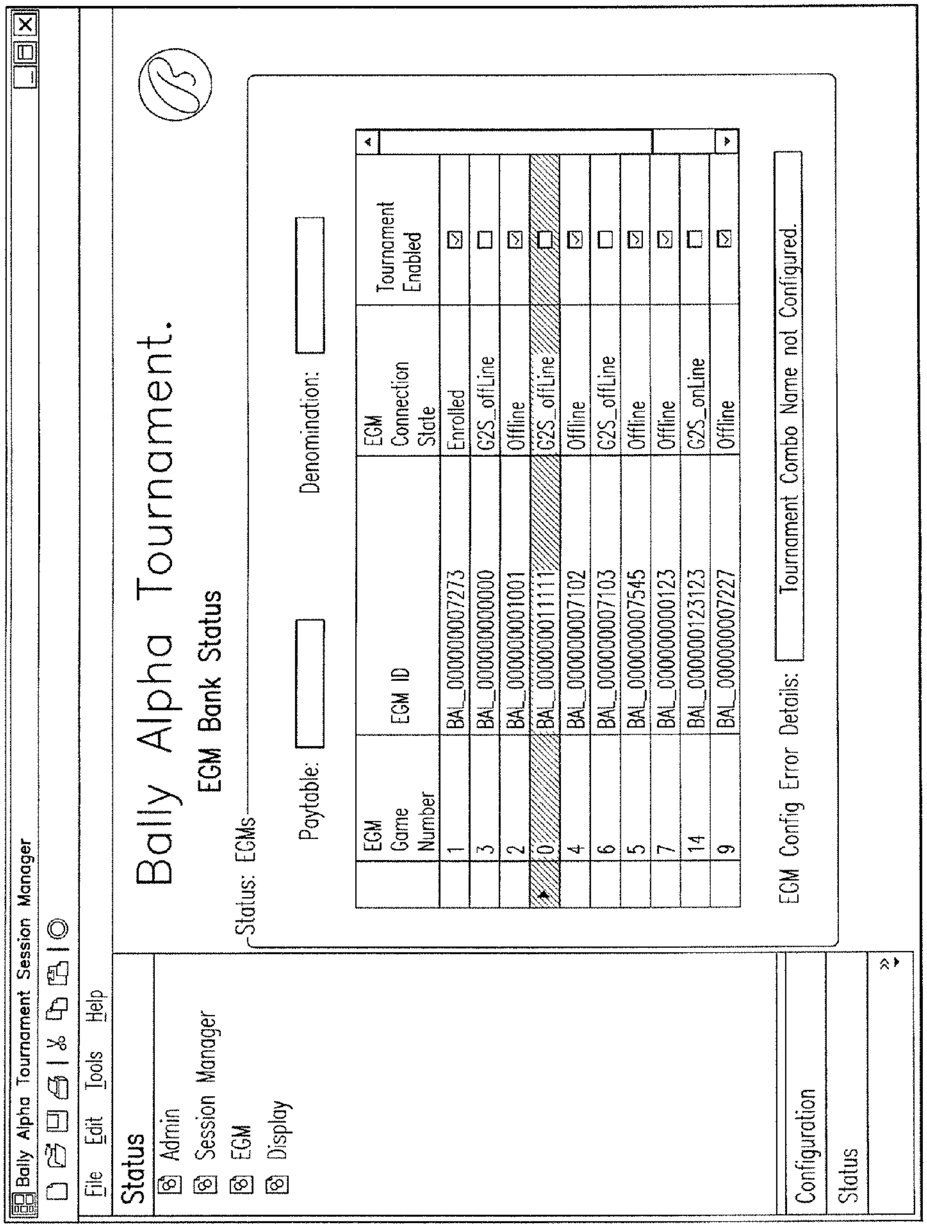

FIG. 69 is a screenshot of the "EGM Bank Status" page on the Bally Alpha Tournament Session Manager Application. The "EGM Bank Status" page includes a status screen for the EGMs that are tournament enabled by selecting a specific paytable and denomination. As shown in FIG. 69, the EGM ID number, EGM ID, EGM connection state, and a "Tournament Enabled" flag is also displayed on the "EGM Bank Status" page. Those EGM that cannot be put into this tournament mode are highlighted or otherwise identified on the screen. For example, as shown in FIG. 69, EGM Game Number 1 is properly reconfigured into tournament mode, and the EGM is enrolled and ready to accept tournament vouchers to bind a specific player to this tournament session. If an EGM that is not tournament enabled, the EGM Config. Error details will show up in the field at the bottom of this page. The error details field provides the casino with the data needed to fix the EGM.

Figure 70:
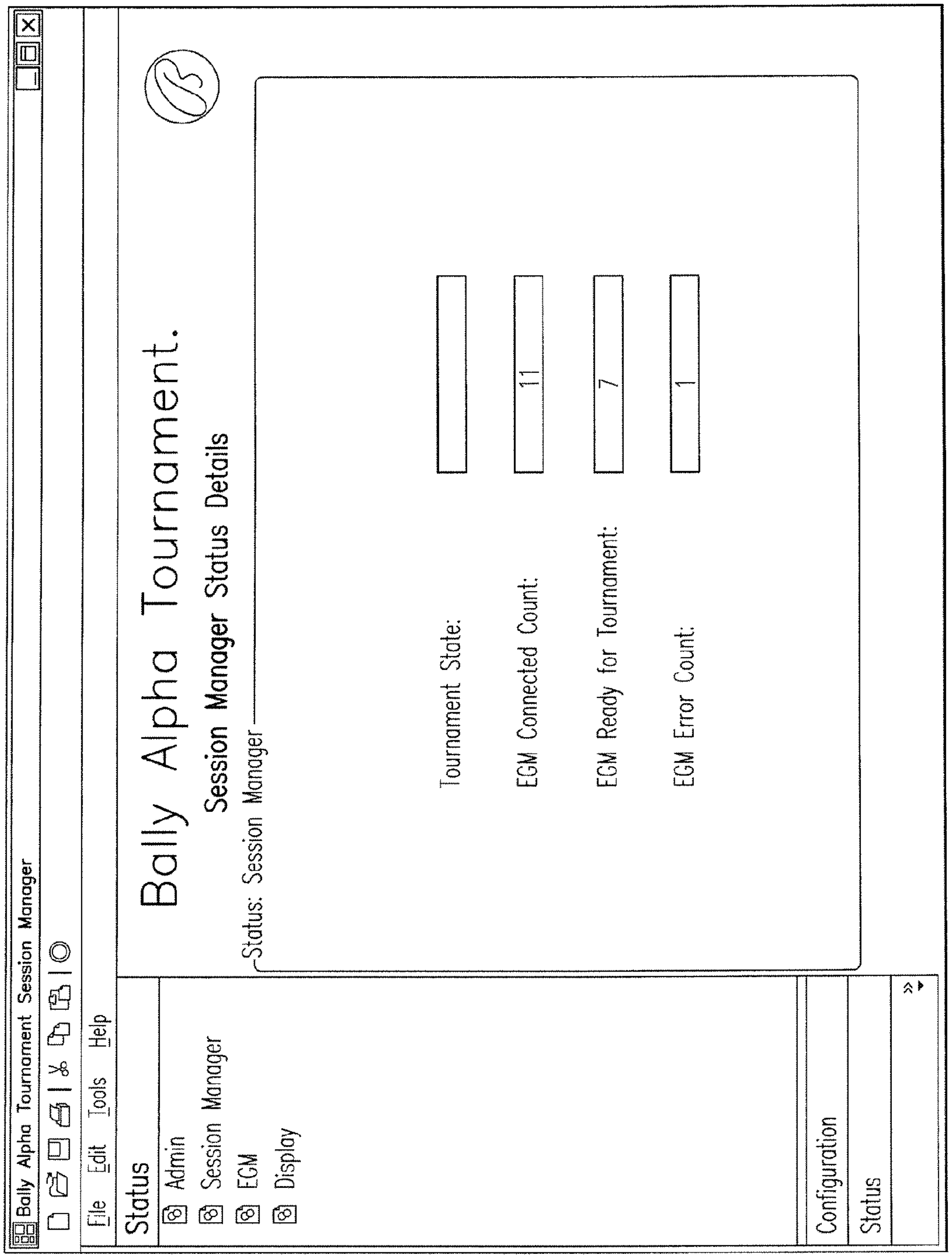

FIG. 70 is a screenshot of the "Session Manager Status Details" page on the Bally Alpha Tournament Session Manager Application. The following information is presented on this page: Current tournament state (Ready for tournament—no errors and ready for tournament voucher); EGM Connected Count field (number of EGMs having good connections to the Bally Alpha Session Manager); EGM Ready for Tournament field (number of EGMs ready for tournament play. These EGMs are properly reconfigured into the desired tournament mode); and EGM Error Count (number of EGMs that have problems being put into tournament mode).

Figure 71:
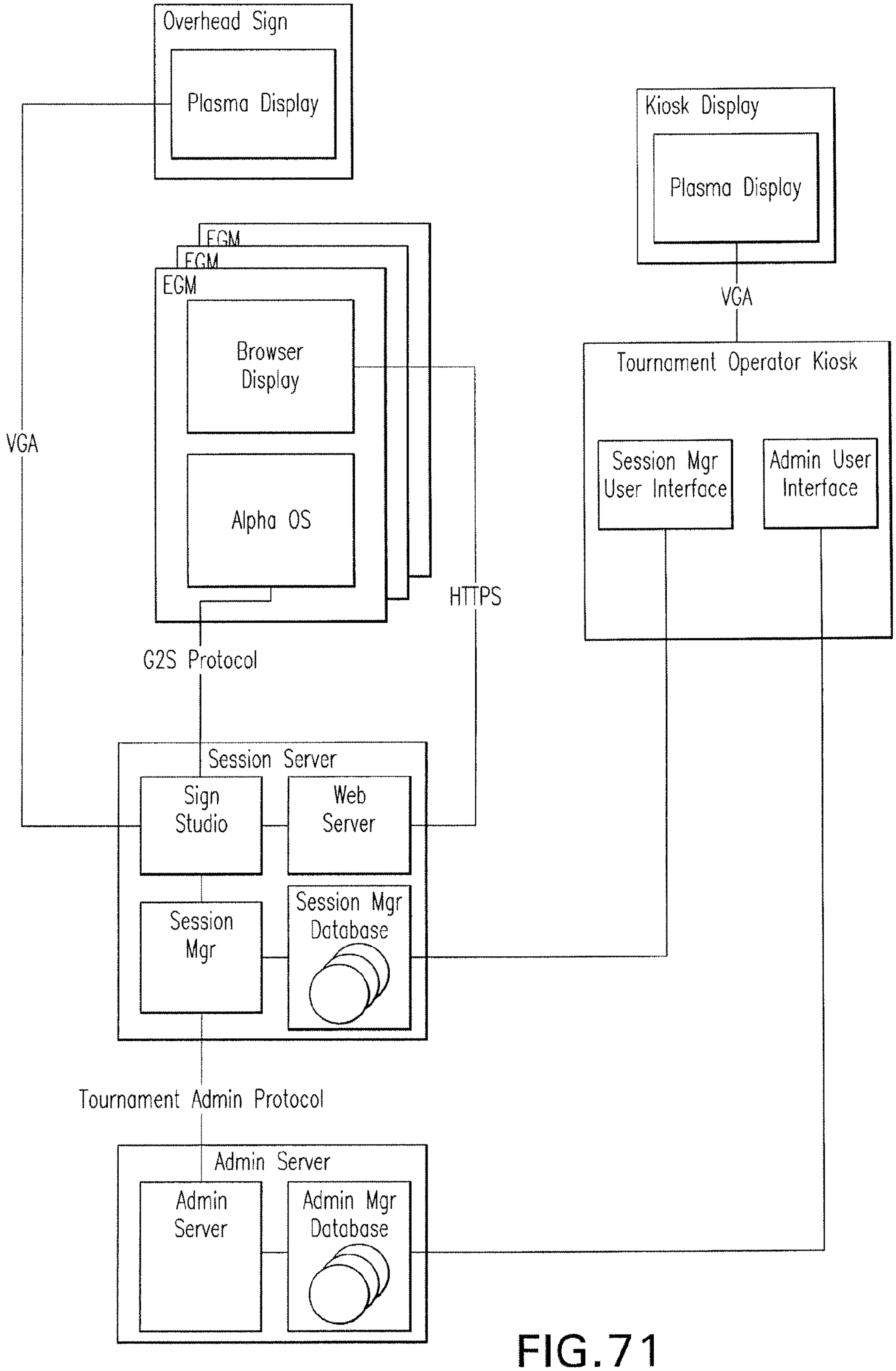
FIG. 71 is a block diagram of one embodiment of a tournament gaming system.

FIG. 71 is a diagram of the various components in one embodiment of the tournament gaming system. The tournament gaming system includes overhead signage (e.g., plasma display or other displays) connected to a sign studio on the session server. The tournament gaming system also includes a plurality of EGMs (each having a browser display for tournament mode) and an operating system (e.g., Bally Alpha platform). The session server includes a sign studio (in communication with the plasma display), web server (in communication with the browser displays on the EGM), session manager (in communication with an Admin server), and a session manager database (in communication with the session manager and the tournament operator kiosk. The tournament operator kiosk includes a session manager user interface and an admin user interface. The tournament operator kiosk is in communication with a kiosk display (e.g., plasma display or other displays). Tournaments are configured and run by casino personnel at the operator kiosk or station. Additionally, player registration may also be conducted at the operator kiosk or station. The Master Tournament Admin Server may have multiple Bally Alpha Tournament Session Servers attached to it running the same or different tournaments all together. The tournament Admin Server may be a Bally product or a $3^{rd}$ party product such as, but not limited to, The Strategy 9 Corporation's Tournament Host Admin Application and server. According to one embodiment, the Sign Studio server may run on the same server hardware as the Session Server. In alternate configurations, the Sign Studio runs on separate hardware that is networked to the Session Server, which results in advanced display performance.

Figure 72:
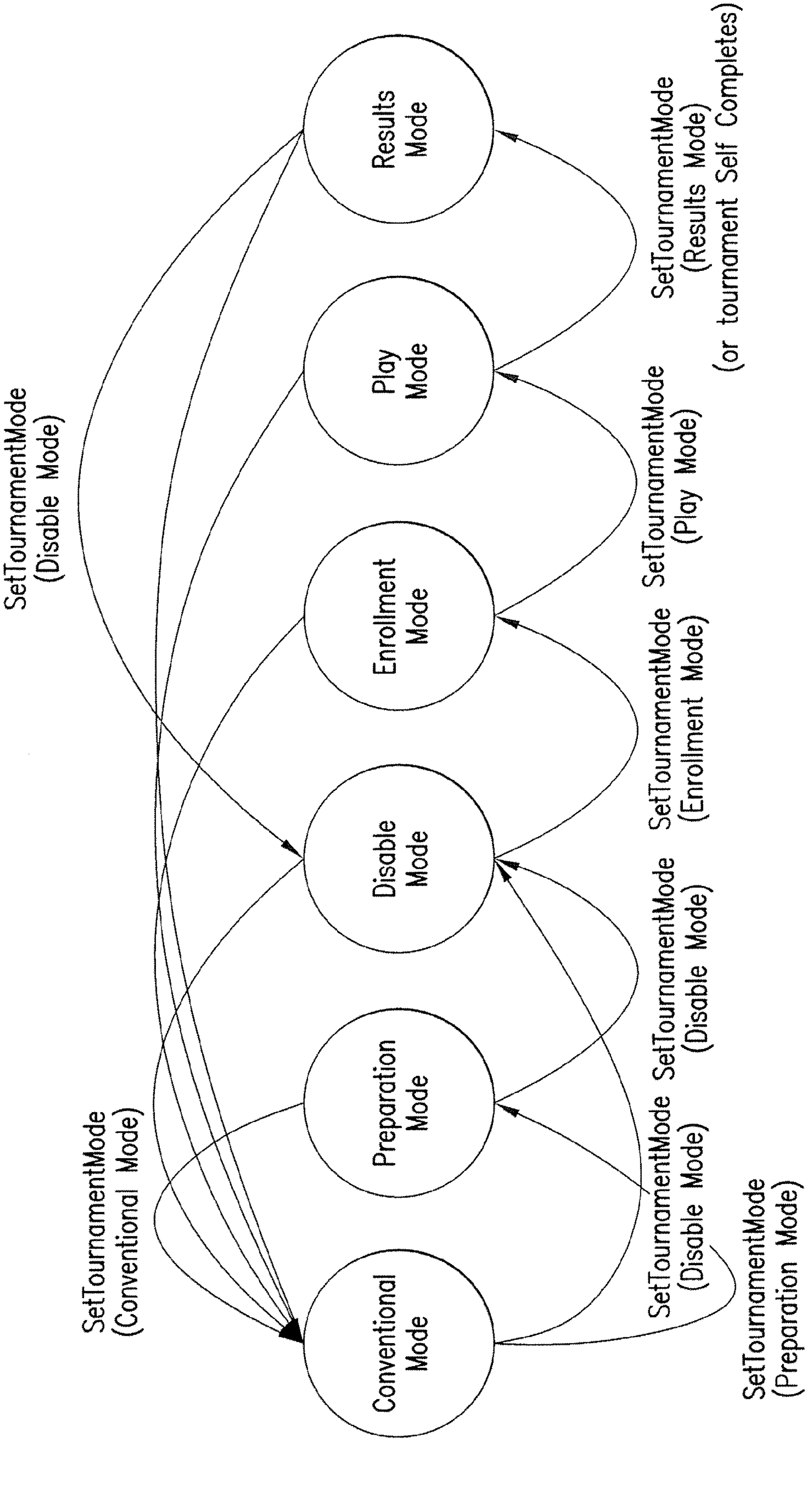
FIG. 72 is a block diagram of the tournament states of a tournament gaming system according to one embodiment.

FIG. 72 is a tournament state diagram that the Session manager uses to advance from one tournament state to the next tournament state. As shown in FIG. 72, the tournament states include conventional mode, preparation mode, disable mode, enrollment mode, play mode, and results mode.

Figure 73:
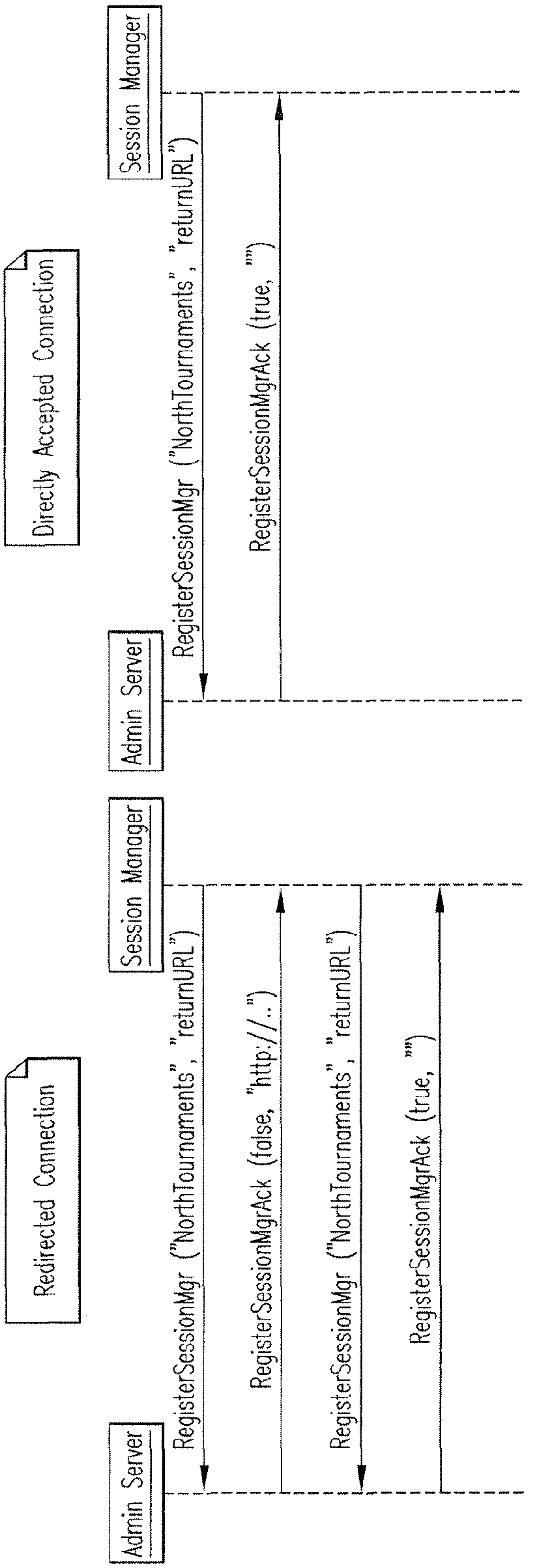
FIG. 73 is a flow diagram between a session manager and a tournament server according to one embodiment.

FIG. 73 is a message flow diagram between the Tournament Session Manger and the Tournament Admin Server for a redirected connection and a directly accepted connection.

Figure 74:
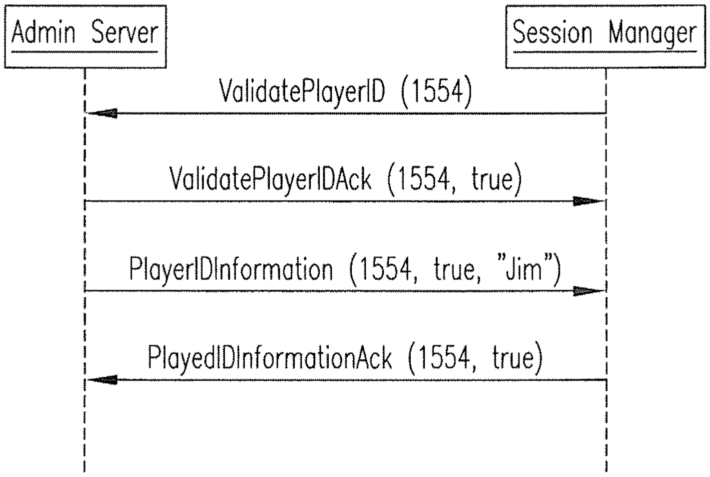
FIG. 74 is a flow diagram between a session manager and a tournament server during a player enrollment sequence according to one embodiment.

FIG. 74 is a message flow diagram between the Tournament Session Manger and the Tournament Admin Server during a player enrollment sequence. The Session manager gets the player ID from either the card reader on the gaming device, a tournament ticket that was inserted into the EGM had a pre-associated PlayerID, or a casino patron ID. Once the player ID is established, the player ID is sent to the Master Admin Server for validation. If the user is authorized to play this session, the Master Admin Server responds with the PlayerID information such as Player Alias. In various embodiments, the PlayerID information is presented on the gaming device display, player tracking display, overhead signage display, leader boards, or a combination thereof.

Figure 75:
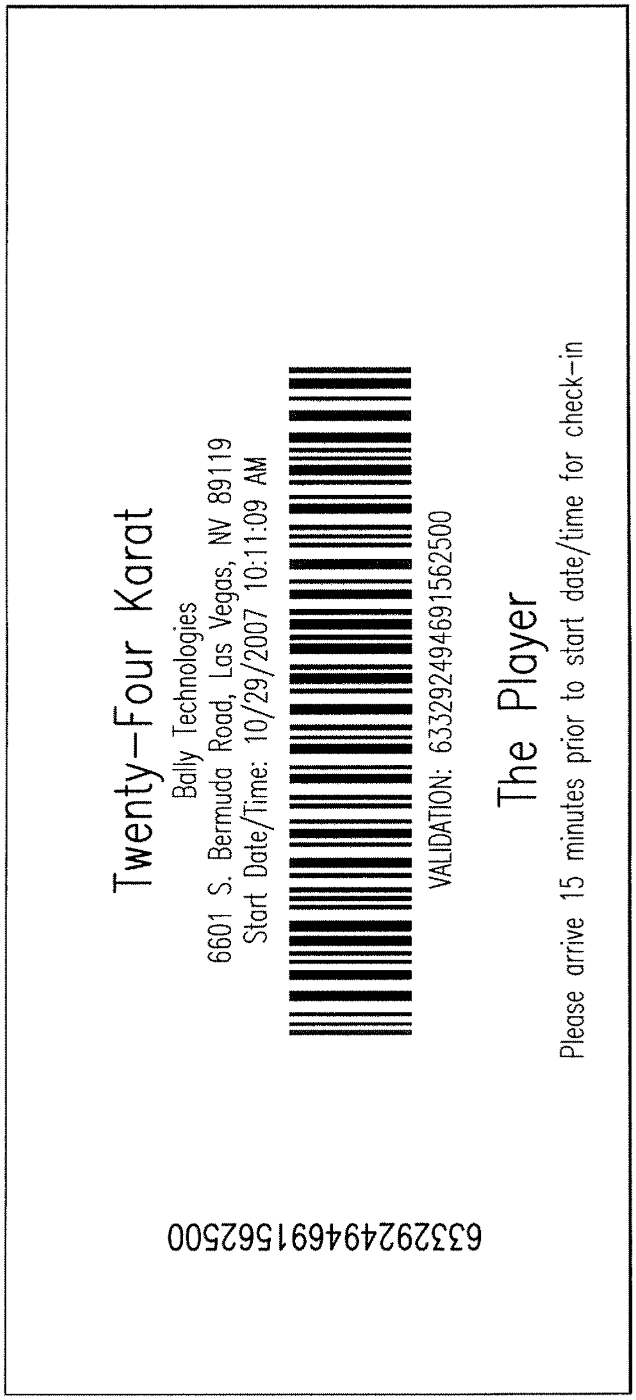
FIG. 75 illustrates one embodiment of a tournament voucher.

FIG. 75 is one embodiment of a tournament entry voucher given to the player by a tournament host. A Tournament host application creates unique vouchers and associates the vouchers with a casino patron ID, tournament ID, and tournament validation code. According to one embodiment, the tournament entry voucher includes instructions such as "Please arrive 15 minutes prior to the start date/time for check-in." As those skilled in the art will appreciate, the tournament voucher may also include additional information or messages such as welcome message or additional instructions.

In order to enroll in a tournament game, the player enters the tournament voucher into the bill/ticket acceptor. Alternatively, the player enters a validation code number into the top box browser by manually entering the number or scanning the barcode on the tournament voucher with a barcode scanner attached to the gaming machine. The gaming device OS determines that the ticket validation code is a tournament voucher (and non-cash voucher), and the validation code is sent to the tournament server for authorization. If the validation code represents a cashless gaming ticket, the validation code is sent to a cash validation server. If a successful response is received from the Tournament server for the validation code, the player's alias (name) is shown on the Gaming device top monitor with the other tournament related data. According to one embodiment, the tournament voucher is not stacked by the bill/ticket acceptor and is reissued to the player.

FIG. 76 is one embodiment of a tournament score receipt voucher that is issued to the player at the conclusion of tournament play. One or more of the following fields may be printed on the receipt voucher: the players score total, player Alias, Game ID number, time/day, and a validation code. According to one embodiment, players are required to present the voucher to collect an award. In another embodiment, the validation code is stored in a central tournament database along with other information such as, but not limited to, the player's ID.

Figure 77:
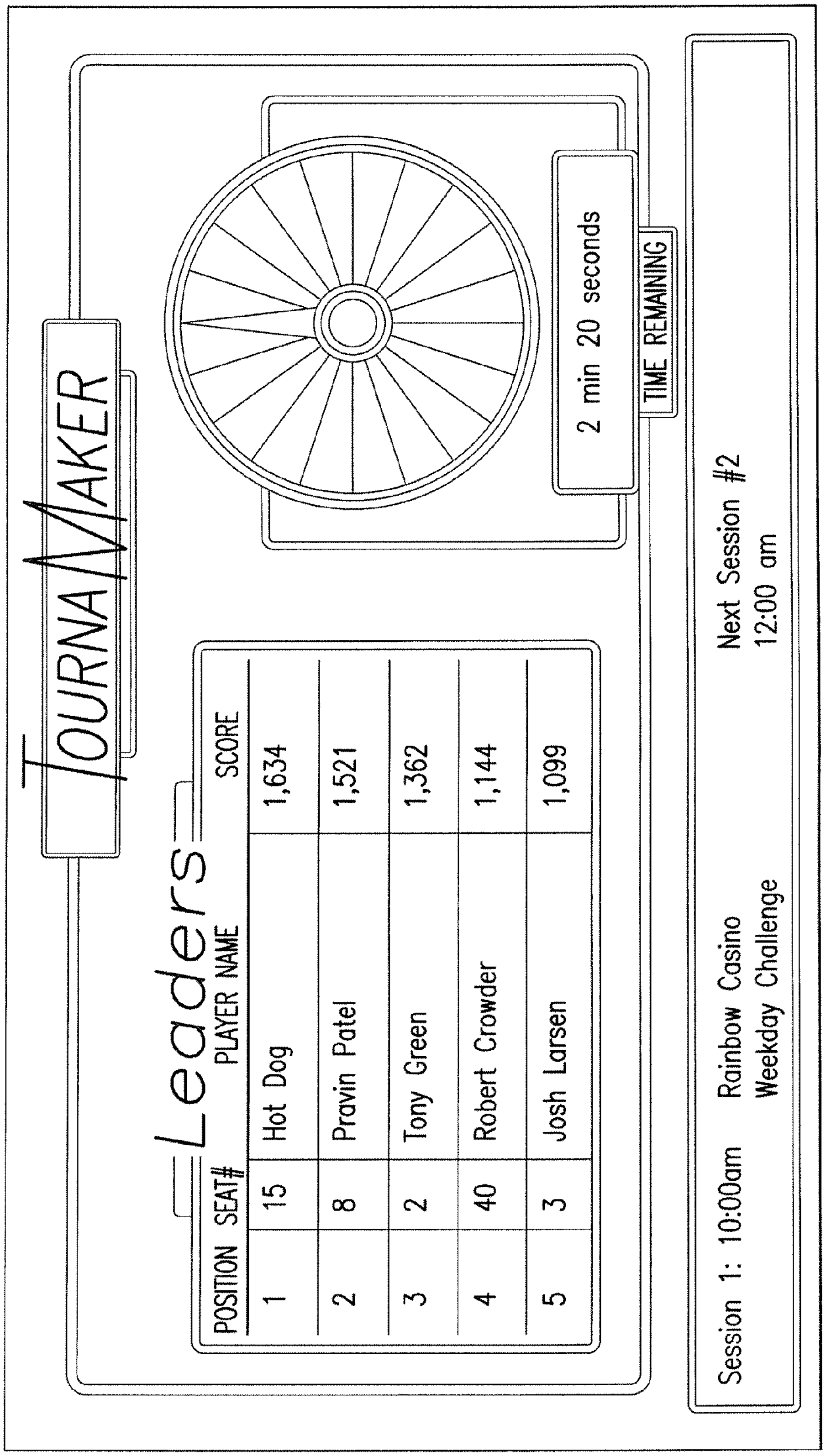
FIG. 77 is a sample screen shot of tournament information presented to a player during an active tournament game.

FIG. 77 is a screenshot of tournament data that is presented to the player on the top box monitor or other display on the gaming machine. The tournament data is presented on the top box monitor after the machine has been configured into tournament mode and a player has inserted his tournament voucher into the gaming device. The tournament data that may be shown to the player includes a Welcome page, a tournament countdown page (time until they can start to play), a screen (e.g., display, animation, leader board, or the like) shown during the tournament, and a screen shown at the conclusion of tournament play.

FIG. 77 illustrates a screenshot that may be shown during tournament play. As shown in FIG. 77, the top box monitor displays a current leader board, EGM seat # for each rank, player alias name for each rank, the tournament score for each rank, Session number, tournament title, and casino ID information. Additionally, the top box monitor displays a tournament start time and next session start time. As shown in FIG. 77, an analog representation of a clock is presented on the right hand side of the top box monitor to represent the time before a tournament starts or the time remaining to play the tournament game.

Figure 78:
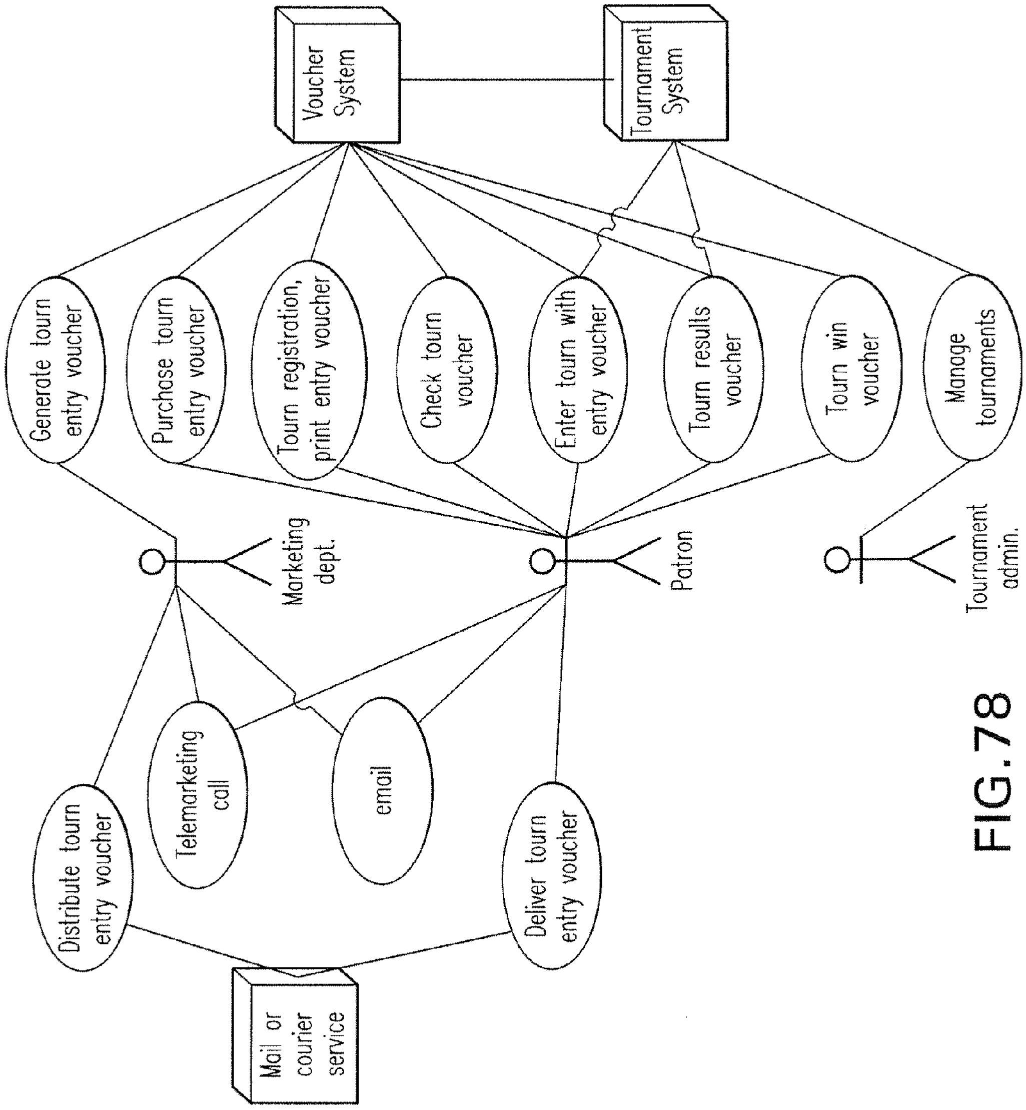
FIG. 78 is a block diagram of one embodiment of a tournament gaming system using tournament vouchers.

FIG. 78 illustrates the use cases for the tournament activity including the generation, delivery, and use of tournament related vouchers. The following outline provides a brief description of the various activities related to a tournament entry voucher received in the mail:

Marketing Tournament Entry Voucher Via Mail

1. Tournament creation: upon request from the marketing department, the tournament administrator creates a promotional or marketing funded tournament identifier and defines the period of availability, the prize, the eligible machine parameters, etc.
2. Tournament entry vouchers generated: the marketing department is informed of the tournament identifier and associates it with a list of eligible patrons from the marketing database. The vouchers are generated with unique validation numbers, which are distinctly unique from cash vouchers, promotional vouchers, or any other bar-coded ticket applications.
3. Delivery preparation: tournament entry vouchers are stuffed into addressed envelopes or otherwise prepared for delivery.
4. Delivery acceptance: the patron receives delivery of the tournament entry voucher.
5. Tournament contest begins: before the tournament contest begins, the state of the tournament is pending. At the starting period of the tournament contest, the status of all vouchers associated with the tournament identifier is set to the ready state.
6. Entry voucher status check: the patron arrives at the casino and checks the validity of the tournament entry voucher by inserting it into a kiosk or presenting it to casino personnel. The validity of the voucher is displayed to the patron on the kiosk or confirmed by casino personnel. Additionally, the status of the associated tournament contest is available.
7. Tournament session begins: the patron inserts the tournament entry voucher into a specified tournament capable EGM. The voucher system validates the voucher, informs the tournament system of the event, triggering the tournament system to switch the EGM to tournament mode and begins the tournament session.
8. Tournament play: the patron plays the tournament game cycles on the EGM until the session is completed. During the play, the EGM and the tournament system track the progress of the tournament session.
9. Tournament session completes: at the end of the tournament session the tournament system communicates with the voucher system to generate a tournament results voucher. The tournament system updates its database by associating the voucher validation number with the results of the tournament session.
10. Tournament contest completes: the state of the tournament contest is changed to completed and the winners are determined by analyzing the tournament session results in the database.
11. Results voucher status check: when the patron checks the status of the tournament results voucher, he will be informed of his ranking within the tournament contest. In the event that the results correspond to a winning tournament session, the system will generate a tournament win voucher that is redeemable for the appropriate cash or prize.

The following outline provides a brief description of the various activities related to a tournament entry voucher purchased by a patron:

Tournament Entry Voucher Purchased by Patron

1. Tournament creation: the tournament administrator creates an entry fee funded tournament identifier and defines the entry price, minimum and maximum participants, period of availability, the prize, the eligible machine parameters, etc.
2. Tournament entry vouchers purchased: the kiosk or casino personnel specify the tournament id to purchase and generates a tournament entry voucher. The vouchers are generated with unique validation numbers, which are distinctly unique from cash vouchers, promotional vouchers, or any other bar-coded ticket applications.
3. Tournament contest begins: before the tournament contest begins, the state of the tournament is pending. At the starting period of the tournament contest, the status of all vouchers associated with the tournament identifier is set to the ready state.
4. Entry voucher status check: the patron checks the validity of the tournament entry voucher by inserting it into a kiosk or presenting it to casino personnel. The validity of the voucher is displayed to the patron on the kiosk or confirmed by casino personnel. Additionally, the status of the associated tournament contest is available.
5. Tournament session begins: the patron inserts the tournament entry voucher into a specified tournament capable EGM. The voucher system validates the voucher, informs the tournament system of the event, triggering the tournament system to switch the EGM to tournament mode and begins the tournament session.
6. Tournament play: the patron plays the tournament game cycles on the EGM until the session is completed. During the play, the EGM and the tournament system track the progress of the tournament session.
7. Tournament session completes: at the end of the tournament session the tournament system communicates with the voucher system to generate a tournament results voucher. The tournament system updates its database by associating the voucher validation number with the results of the tournament session.
8. Tournament contest completes: the state of the tournament contest is changed to completed and the winners are determined by analyzing the tournament session results in the database.
9. Results voucher status check: when the patron checks the status of the tournament results voucher, he will be informed of his ranking within the tournament contest. In the event that the results correspond to a winning tournament session, the system will generate a tournament win voucher that is redeemable for the appropriate cash or prize.

Figure 79:
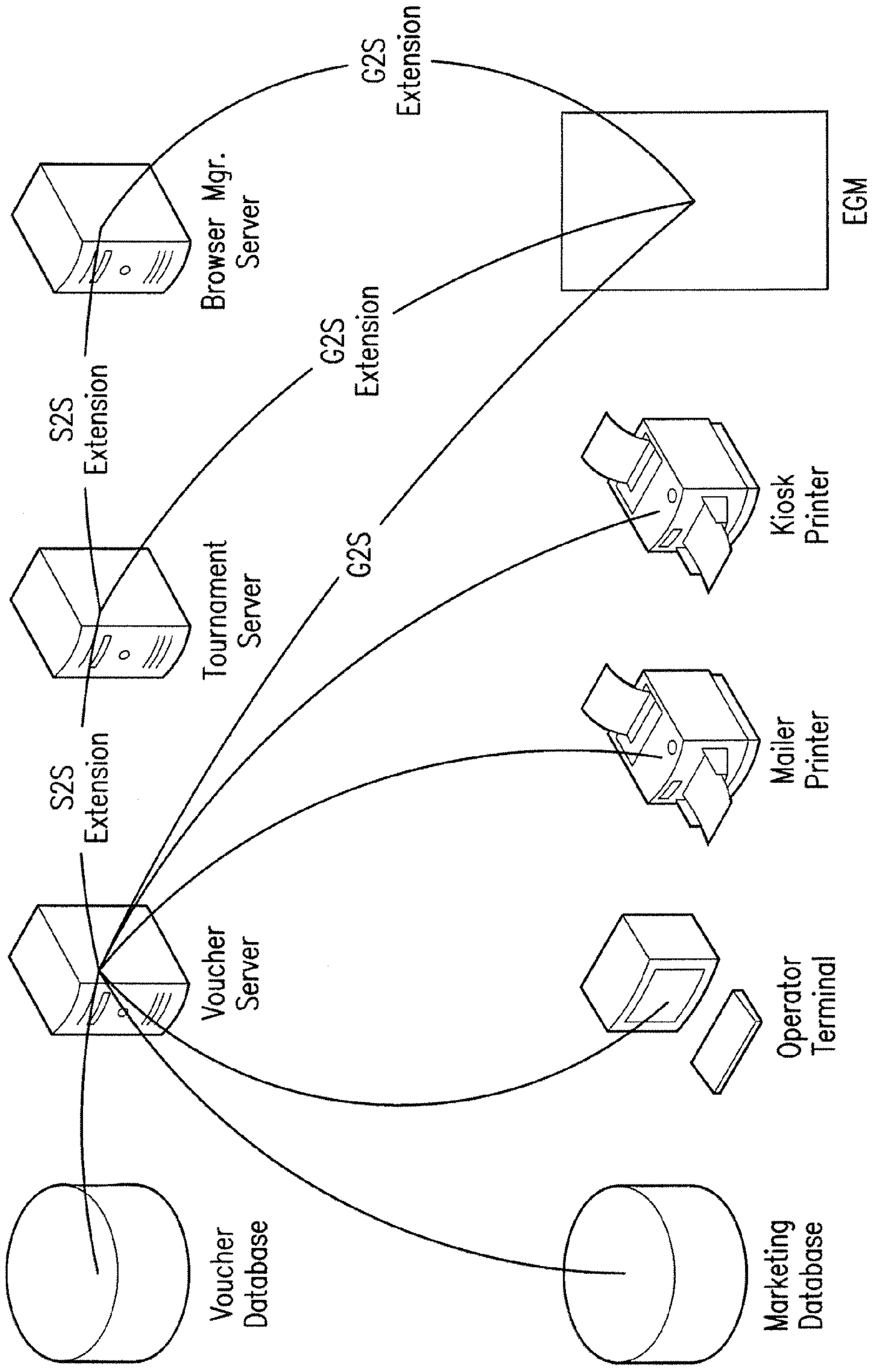
FIG. 79 is a block diagram of the components of a tournament gaming system using tournament vouchers.

FIG. 79 is a diagram that illustrates the relevant network participants in a voucher-driven tournament scenario. As shown in FIG. 79, a voucher server is in communication with a voucher database, marketing database, operator terminal, mailer printer, kiosk printer, and an EGM. The voucher server is in communication with a tournament server via a S2S (server to server) extension, and the tournament server is in communication with a browser manager server via a S2S extension. As shown in FIG. 79, the browser server is also in communication with the EGM.

Figure 80:
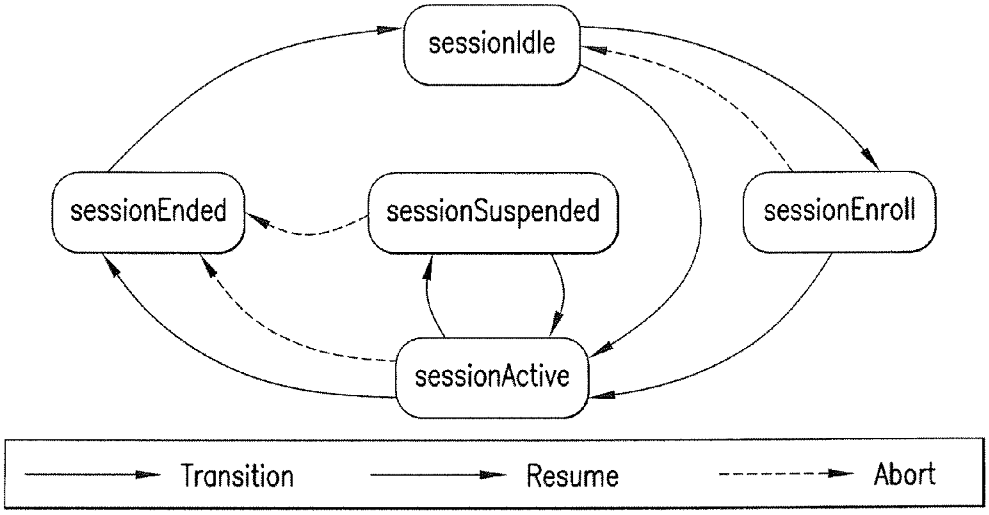
FIGS. 80-81 are flow diagrams of the tournament states of one embodiment of a tournament gaming system.

FIG. 80 is a tournament state diagram. The tournament sessions are controlled via a tournament sessionState that includes well-defined transitions. The tournament sessionState transitions included sessionEnded, sessionSuspended, sessionActive, sessionEnroll, and sessionIdle.

FIG. 81 is a diagram of a tournament segmentState. The tournament segmentState is a sub-state of the tournament sessionState, effectively providing detailed information about the segment while the tournament sessionState is 'sessionActive.' In the event that the tournament is suspended, the segmentState continues to reflect the state of the segment immediately before the suspension. If the segmentState is 'segmentPlaying' when the tournament resumes from suspension, then the segmentState will be forced to 'waitOnPlayerStart'. This causes the player to resume the segment from the point which the tournament session was suspended. All other segmentStates are unaffected when the tournament session resumes from suspension. When a tournament session is aborted, the segmentState will be forced to segmentEnded.

Figure 82:
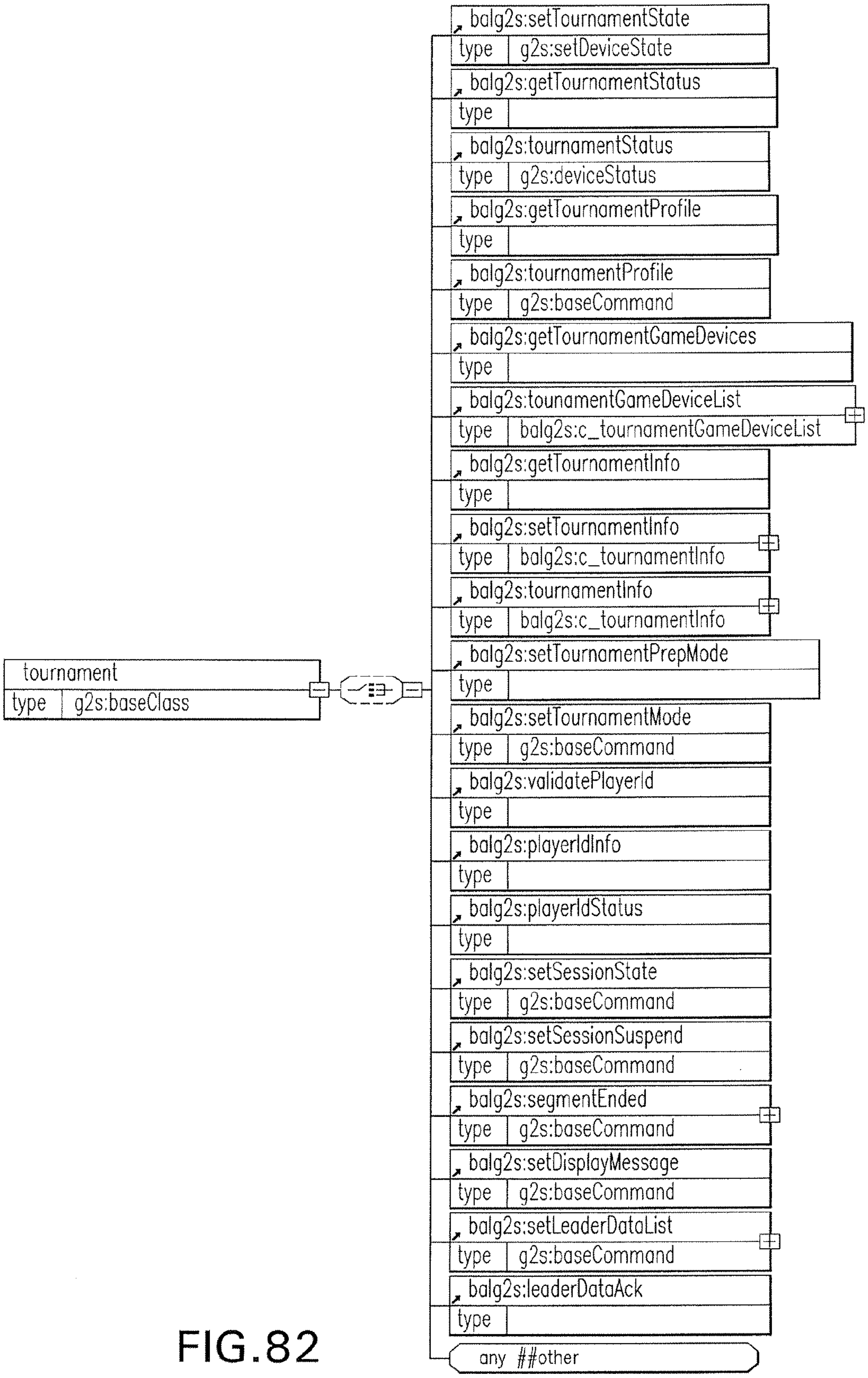
FIGS. 82-83 are diagrams showing a command structure of one embodiment of a tournament gaming system.

FIG. 82 is a diagram showing the command structure of the Bally G2S tournament class. These are the commands available in the software class to support Bally Alpha Gaming machine floor tournaments.

Figure 83:
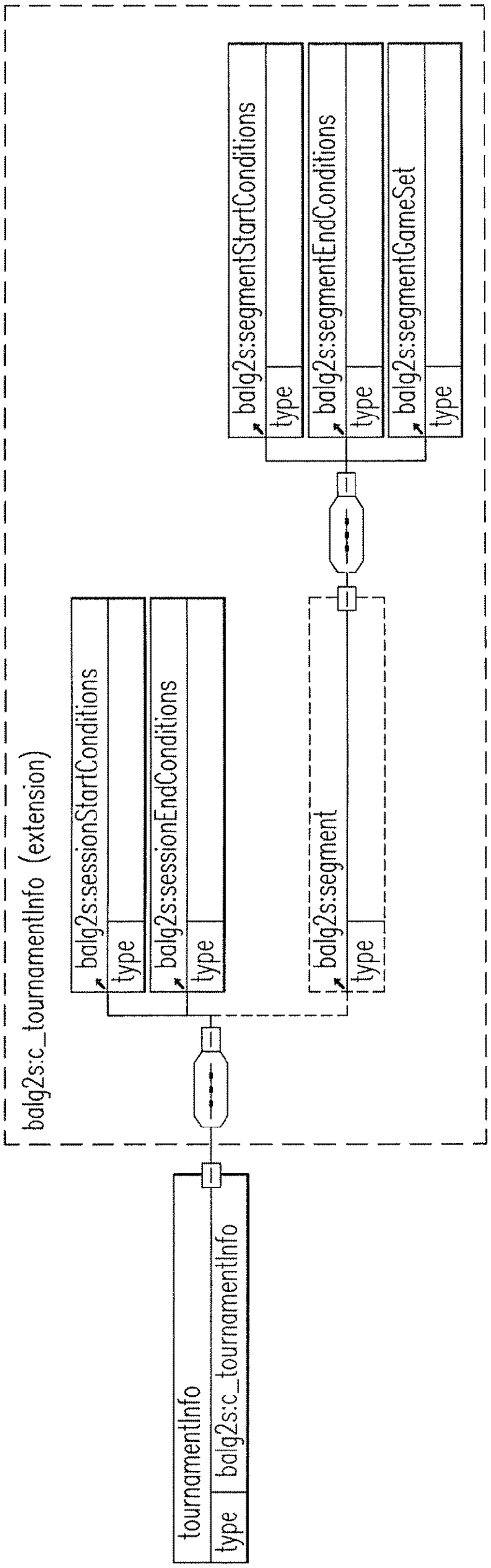

FIG. 83 is a diagram showing the tournamentInfo command of the Bally G2S tournament class. The tournamentInfo command is used by an EGM to send the tournament session configuration data to a host. The tournamentInfo command is sent in response to the setTournamentInfo and getTournamentInfo commands. According to one embodiment, multi-segment tournaments may be configured on the tournament system thereby providing maximum flexibility to configure any combination of tournament game themes into single tournament session.

Figure 84:
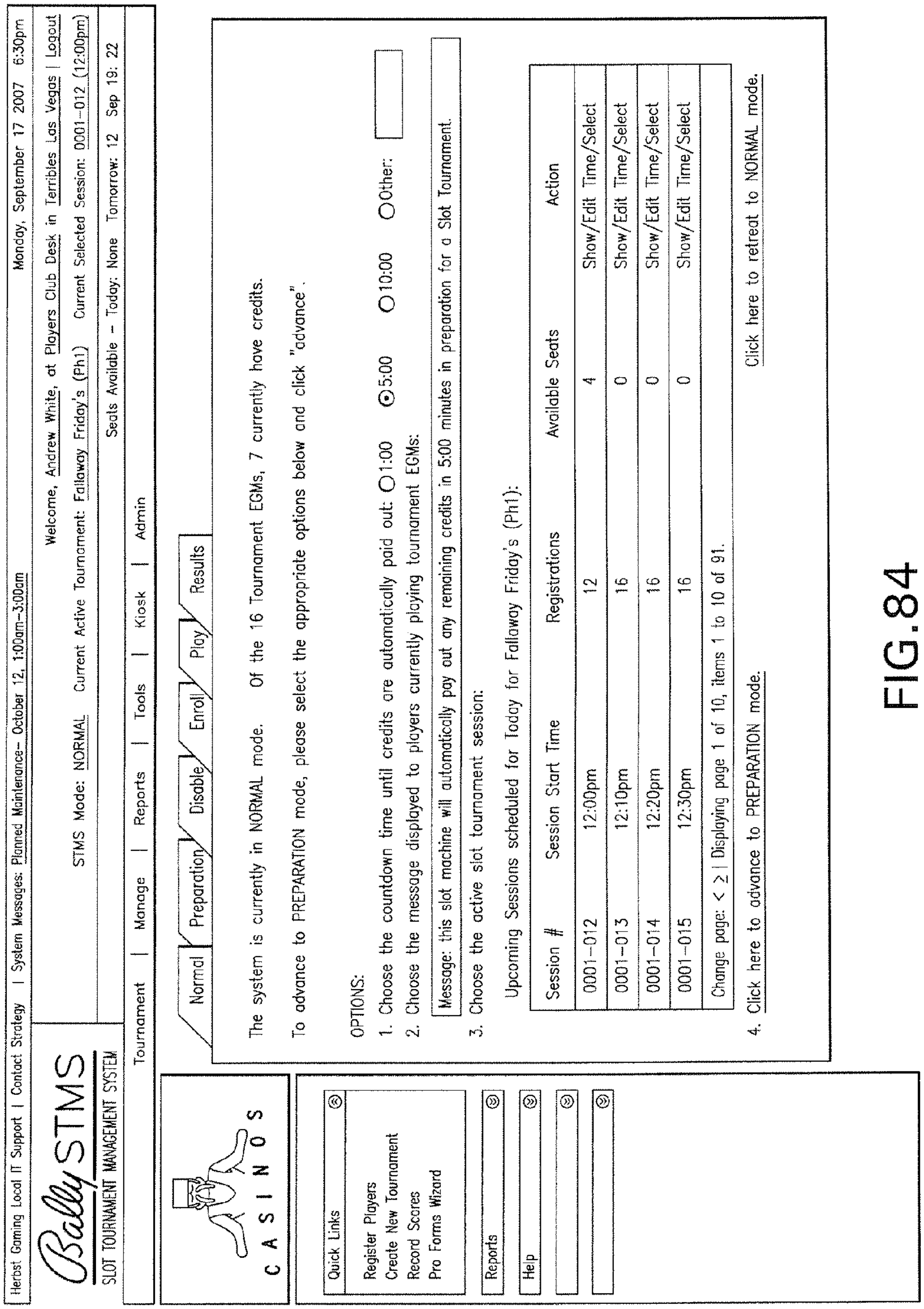
FIGS. 84-88 are sample screen shots of a tournament management console for one embodiment of a tournament gaming system.

FIG. 84 is a screenshot of the "normal" mode page on the master Tournament Management Interface. This screenshot is displayed to the casino administrator when the associated EGMs on a casino floor are in a non-tournament mode.

Figure 85:
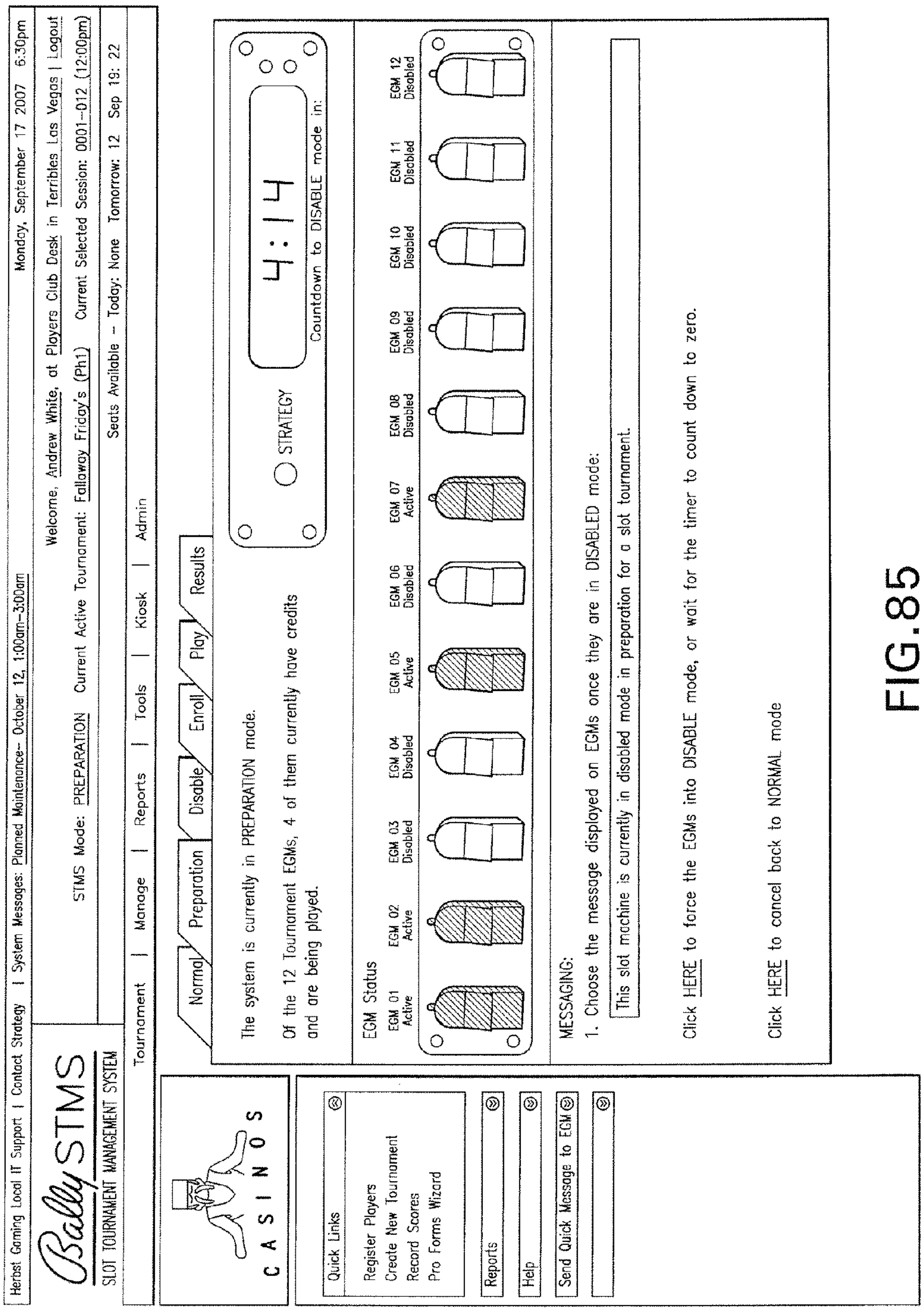

FIG. 85 is a screenshot of the "preparation" page on the master Tournament Management Interface. On the "preparation" page, the EGMs are prepared for tournament mode. A countdown to the reconfiguration of the EGMs is also shown on the "preparation" page. Also, the "preparation" page shows the EGM's with active gaming machines and the number of machines with credits being played. This screen is allows the gaming devices to be disabled (i.e., unable to present normal mode game) while some gaming machines are still being played by patrons. Optionally, the EGM's may be forced to disable and go into tournament mode. According to one embodiment, forcing an EGM to display will cause the EGM to cashout any credits and disable the EGM's peripherals including the Bill/Ticket acceptor. Optionally, a notification message may be sent to (and presented on) the EGMs once the EGMs are disabled and turned into tournament mode.

Figure 86:
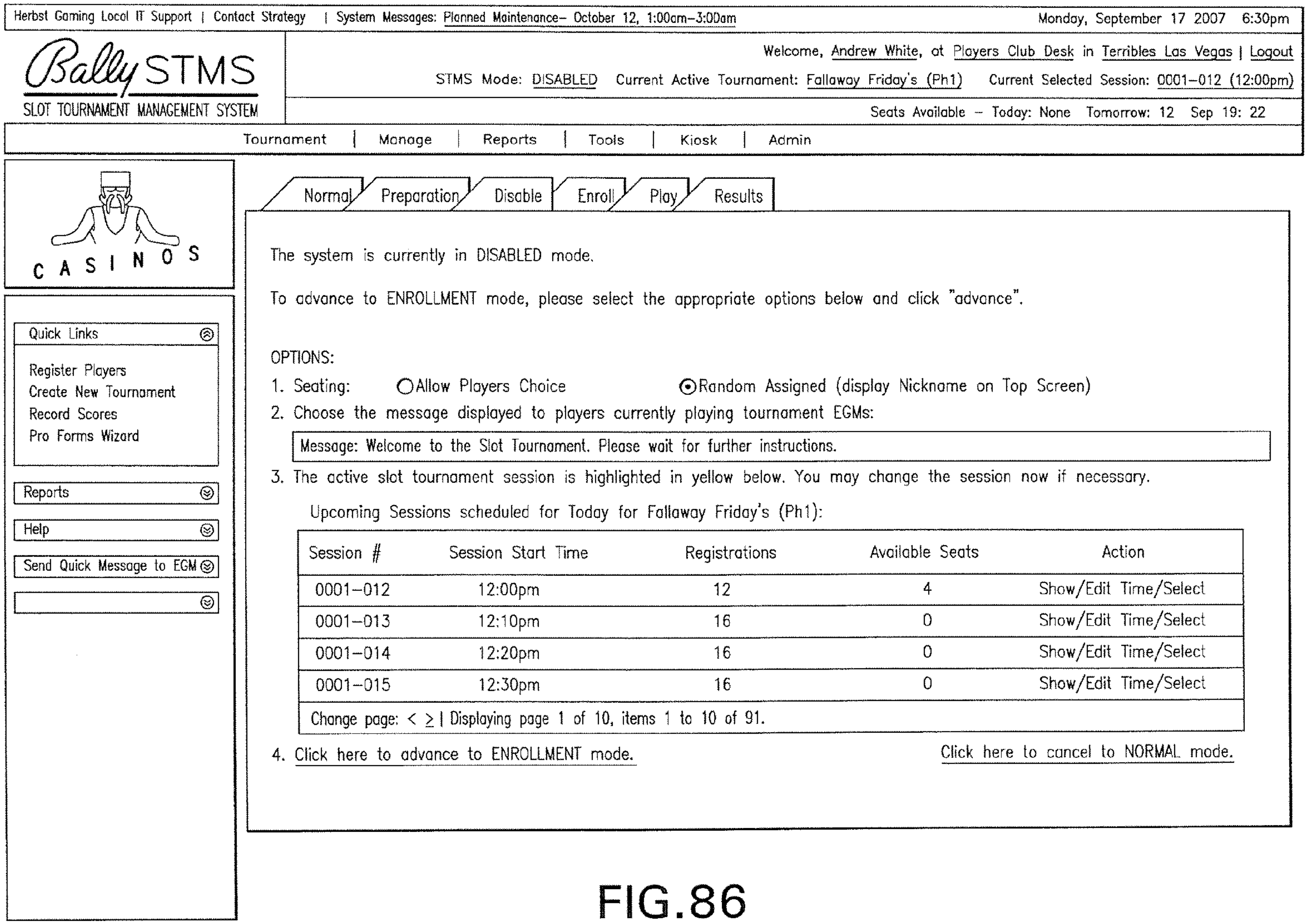

FIG. 86 is a screenshot of the "disable" page on the master Tournament Management Interface. The "disable" page allows the EGMs to be randomly assigned to various players for a tournament. Alternatively, the EGMs may be configured to allow a player's choice of EGM. Additionally, a message that is presented on the EGM may be created on the "disable" page. For example, the message may be instructions to the player prior to the start of the tournament. Additionally, a list of tournaments is also displayed on the "disable" page. From this page, the listed tournaments maybe edited, selected, or displayed.

Figure 87:
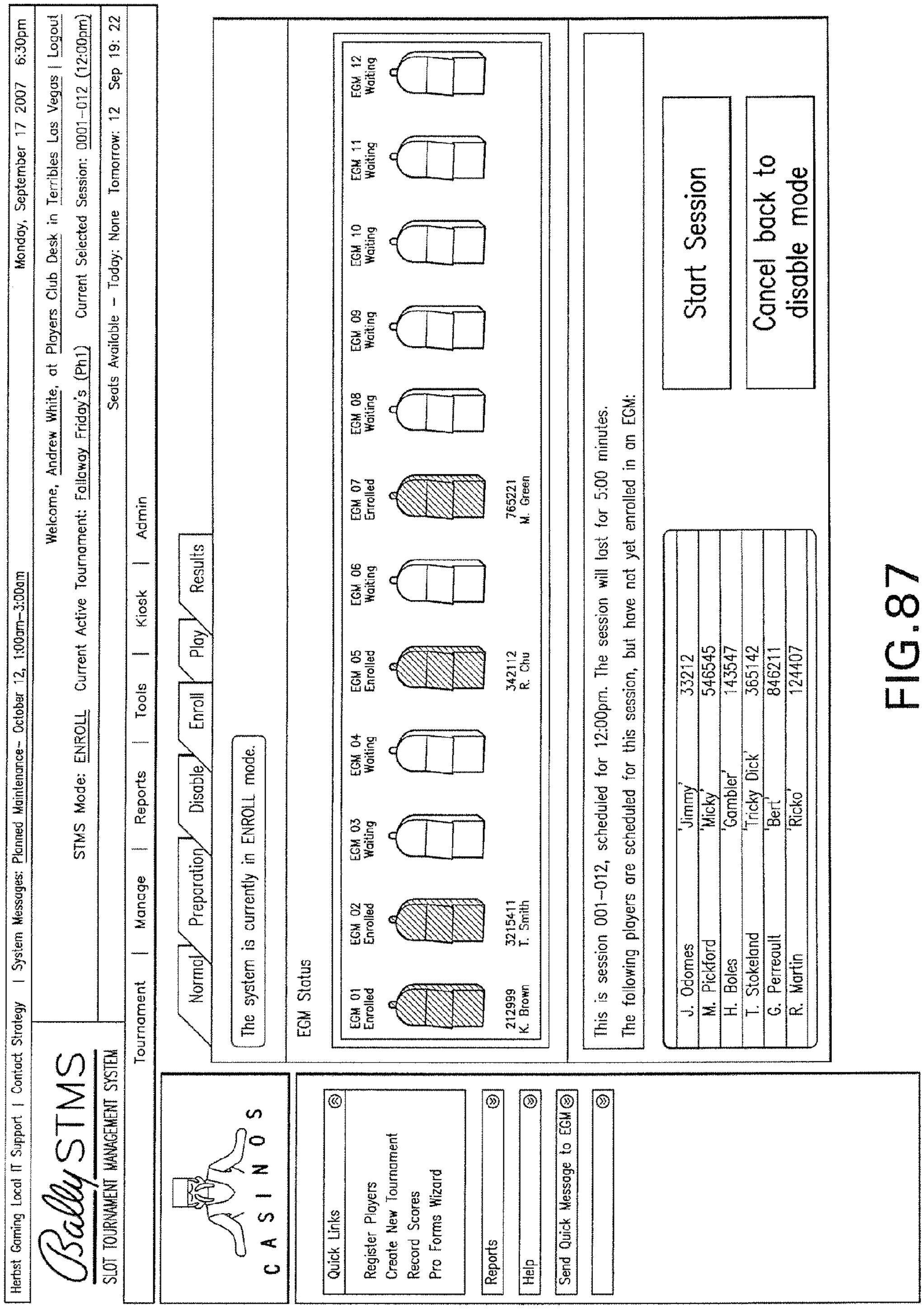

FIG. 87 is a screenshot of the "Enroll" page on the master Tournament Management Interface. The "Enroll" page allows the tournament enabled machines to be enrolled by specific players on the various gaming machines. The players' names or aliases appear on each EGM as they are assigned to the player. The "Enroll" page also present information such as the session start time, duration of the tournament session, and the list of players eligible for the session and not yet enrolled. Additionally, the tournament administrator may register players on the "Enroll" page. As shown in FIG. 87, the tournament game play is permitted on the "Start Session" button is activated. Once the "Start Session" button is actuated, each EGM is sent a "Start Tournament" command to activate the "play" or "spin" button on the EGM. Accordingly, the players may begin play of the tournament and begin accumulating their tournament score.

Figure 88:
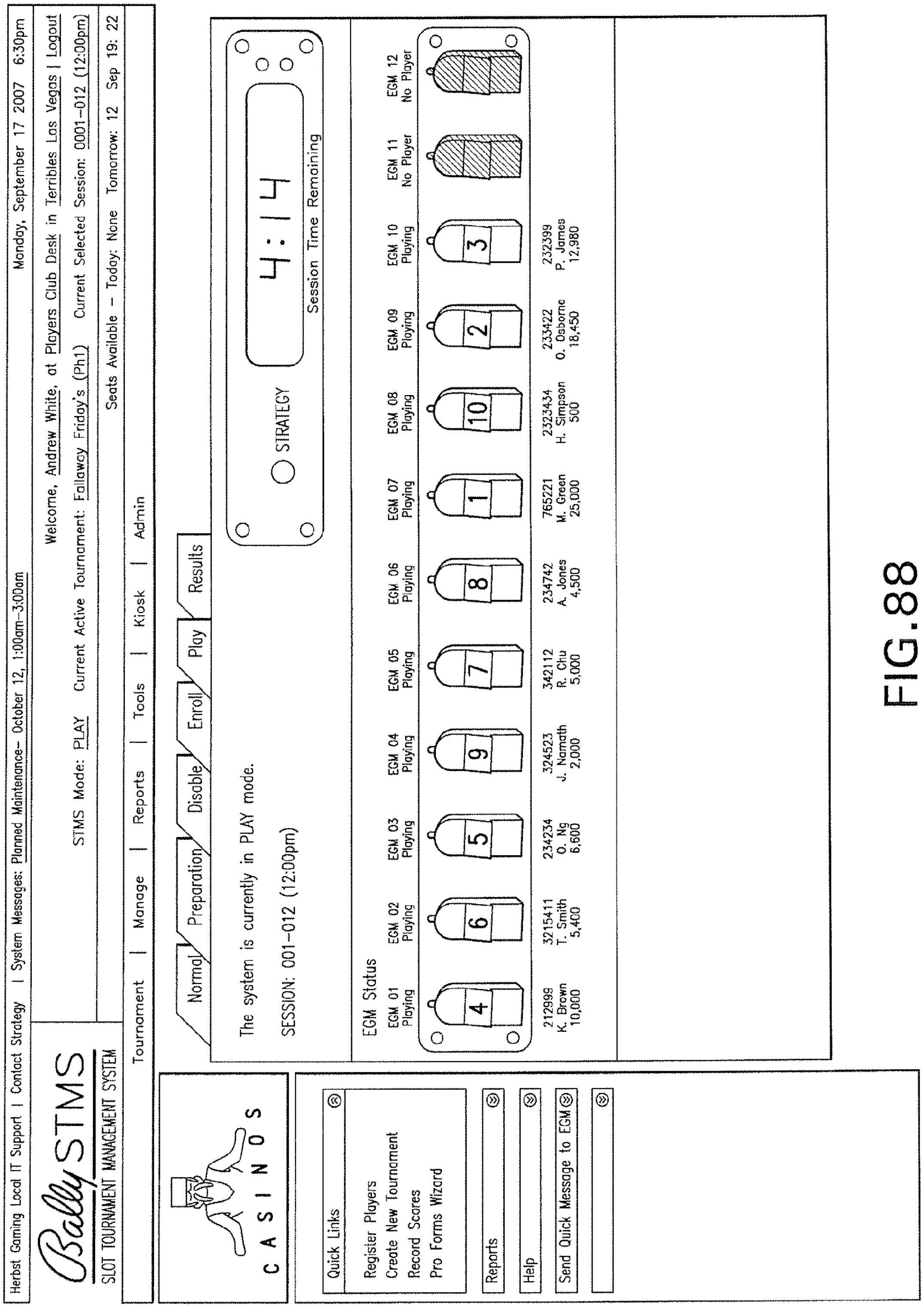

FIG. 88 is a screenshot of the "Play" page on the master Tournament Management Interface. The "Play" page provides the tournament host with the tournament scores as the tournament progresses. As shown in FIG. 88, the status of each EGM (playing or no player) is presented on the "play" page. Additionally, the rank, player name, player ID, and player score is also presented with each EGM. For example, EGM 07 is being played, in rank position 1 with a score 25,000. EGM 07 is being played by M. Green having a casino patron ID of 765221. As shown in FIG. 88, the time remaining in the tournament session is also provided on the "play" page. With this information, casino personnel may announce the time remaining over a public address system. Additionally, the tournament status and leader board may also be presented on other casino web portals and/or overhead signage in communication with the tournament server.

Figure 89:
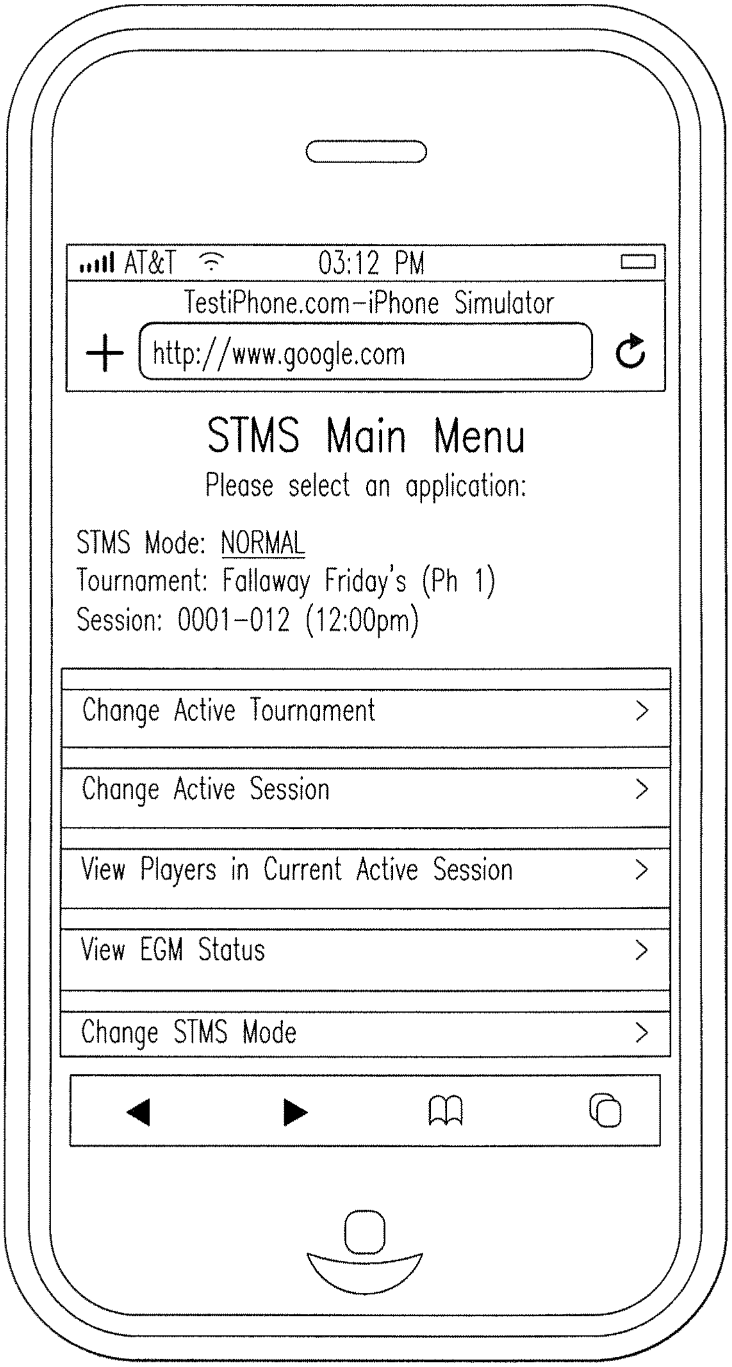
FIG. 89 is a sample screen shot of a tournament management interface presented on a handheld device.

FIG. 89 illustrates an APPLE IPHONE running the Tournament Management Interface. As those skilled in the art will appreciate, any similar handheld device may be used. The handheld device may be carried by casino personnel to administer and run the floor tournaments. The application data may be web page driven content or a dedicated application installed on the IPHONE with connections provided to the master tournament server.

FIG. 90 illustrates a Server Based Gaming network architecture that supports tournament gaming on a casino floor. The network supports both Bally Alpha gaming machines, Bally iVIEW gaming machines, as well as Bally Sign Studio (which controls tournament-related signage). The network includes game content, browser content, download and configuration server, system game server, control panel (backend user interface), browser manager, Slot Management Servers (SMS), Casino Management Servers (CMS), advertisement servers, tournament server, game support server, third party support servers. The Bally Browser manager supports tournament and non-tournament related data shown on the Bally Alpha gaming machines, Bally iVIEWs, and signage throughout the casino property.

One of ordinary skill in the art will appreciate that not all tournament gaming systems and gaming devices have all these components and may have other components in addition to, or in lieu of those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming device-enabled method for enabling tournament gaming, the gaming device-enabled method comprising:

providing a tournament server that is connected to a physical game network;

providing a plurality of gaming devices that are connected to the tournament server via the physical game network, each gaming device including a first display on which a base game is presented using a first processor and a secondary display on which a tournament game is presented using a second processor;

incrementing, using the tournament server, tournament entry points based on a predetermined percentage of a player's wager for base game play on the first display of each gaming device;

determining, using the tournament server, locations of active and eligible players for an on-demand tournament game;

on an eligible gaming device of the plurality of gaining devices at which an active and eligible player is playing, presenting, using the tournament server, the player with two or more tournament games for play, wherein the player selects multiple tournament games from the two or more tournament games for immediate initiation of tournament game play on demand on the second display of the eligible gaming device, and wherein the tournament games are separate from the base game on the first display of the eligible gaming device;

initiating the tournament games, using the second processor on the eligible gaming device, selected by the player on the secondary display of the eligible gaming device, the secondary display using the second processor that is separate and distinct from the first processor of the eligible gaming device; and receiving player input on the eligible gaming device to automatically play the tournament games on the secondary display of the eligible gaming device.

2. The method of claim 1, further comprising automatically finishing play of the tournament games after play of the base game has ended or after removal of a player tracking card.

3. The method of claim 1, further comprising transmitting a final score of the tournament games to the tournament server.

4. The method of claim 1, further comprising presenting a final score of the tournament games on a tournament display.

5. The method of claim 1, further comprising receiving player input to establish a player alias after receiving a player tracking card at the gaming device.

6. A gaming device-enabled method for enabling tournament gaming, the gaming device-enabled method comprising:

providing a tournament server that is connected to a physical game network;

providing a plurality of gaming devices that are connected to the tournament server via the physical game network, each gaming device including a first display on which a base game is presented using a first processor and a secondary display on which a tournament game is presented using a second processor;

incrementing, using the tournament server, tournament entry points based on a predetermined percentage of a player's wager for base game play on the first display of each gaming device;

determining, using the tournament server, locations of active and eligible players for an on-demand tournament game;

on an eligible gaming device of the plurality of gaming devices at which an active and eligible player is playing, presenting, using the tournament server, the player with two or more tournament games for play, wherein the player selects multiple tournament games from the two or more tournament games for immediate initiation of tournament game play on demand on the second display of the eligible gaming device, and wherein the tournament games are separate from the base game on the first display of the eligible gaming device; initiating the tournament games using the second processor on the eligible gaming device in response to player input; and receiving player input on the eligible gaming device continuing play of base game play on the first display of the eligible gaming device, using the first processor, while the tournament games are concurrently played on the secondary display of the eligible gaming device, the secondary display using the second processor that is separate and distinct from the first processor of the eligible gaming device.

7. The method of claim 6, further comprising:

receiving player input to establish one or more additional player aliases, thereby creating multiple aliases for the player; and receiving player input selecting a player alias from multiple player aliases to be used with a gaming session.

8. The method of claim 6, further comprising transmitting a final score of the tournament games to the tournament server.

9. The method of claim 6, further comprising:

presenting a final score of the tournament games on the gaming device; and displaying the final score of the tournament games and a player alias on a leader board that is presented on a tournament display, wherein the tournament display is separate and distinct from the gaming device.

10. The method of claim 6, further comprising presenting an award corresponding to each winning position on the leader board.

11. The method of claim 6, further comprising receiving player input to automatically play the tournament games.

12. The method of claim 6, further comprising automatically finishing play of the tournament games after play of the base game has ended or after removal of the player tracking card.

13. A gaming device-enabled method of presenting a tournament game, the gaming device-enabled method comprising:

providing a tournament server that is connected to a physical game network;

providing a plurality of gaming devices that are connected to the tournament server via the physical game network, each gaming device including a first display on which a base game is presented using a first processor and a secondary display on which a tournament game is presented using a second processor;

initiating play of a base game, using the first processor, on the first display of at least one of the plurality of the gaming devices;

determining, using the tournament server, locations of active and eligible players for an on-demand tournament game;

on an eligible gaming device of the plurality of gaming devices at which an active and eligible player is playing, prompting, using the second processor, a player to select multiple tournament games for play from two or more available tournament games on the second display of the eligible gaming device, wherein the player selects multiple tournament games from the two or more tournament games for immediate initiation of tournament game play on demand on the second display of the eligible gaming device, and wherein the tournament games are separate from the base game on the first display eligible gaming device; and on the eligible gaming device, presenting, using the second processor, the tournament games on a secondary display of the eligible gaming device in response to player input, wherein the tournament games are playable simultaneously on the second display of the gaming device while the base game is played on the first display of the gaming device.

14. The method of claim 13, further comprising transmitting a player's score for the tournament games to the tournament server.

15. The method of claim 14, further comprising:

distributing the player's score from the tournament server to one or more tournament displays; and displaying the player's score on one or more tournament displays.

16. The method of claim 13, further comprising presenting an award corresponding to each winning position of the tournament games.

17. The method of claim 13, wherein player eligibility is based on player account information received from the player.

18. The method of claim 13, wherein a player velocity is calculated based upon game play of the player, and wherein the determined player velocity is shown to the player on a velocity meter.

19. The method of claim 18, wherein the player velocity is calculated based upon games per unit of time, money per unit of time, maximum bets per unit of time, or combinations thereof.

* * * * *

UNITED STATES PATENT AND TRADEMARK OFFICE

CERTIFICATE OF CORRECTION

PATENT NO. : 9,033,786 B2
APPLICATION NO. : 13/937640
DATED : May 19, 2015
INVENTOR(S) : Bryan M. Kelly et al.

It is certified that error appears in the above-identified patent and that said Letters Patent is hereby corrected as shown below:

Specification

Column 2, In line 18, delete “of”

Column 10, In line 23, replace “of” with --if--

Column 16, In line 59, delete “s” from “scores”

Column 17, In line 53, add --s-- to “grouping”

Column 17, In line 53, delete “s” from “takes”

Column 17, In line 58, delete “s” from “wins”

Column 17, In line 67, add --.-- after “score”

Column 18, In line 62, add --.-- after “like”

Column 18, In line 63, add --s-- to “use”

Column 22, In line 57, after “632,” replace “of” with --if--

Column 23, In line 57, replace “had” with --has--

Column 29, In line 8, replace “pin” with --PIN--

Column 38, In line 46, delete “s” from “components”

Column 39, In line 39, after “allow” delete “a”

Column 39, In line 40, after “access” insert --to--

Column 39, In line 54, after “field” delete “is”

Signed and Sealed this
Tenth Day of May, 2016

Michelle K. Lee

Michelle K. Lee
*Director of the United States Patent and Trademark Office*

Column 39, In line 67, after “field” delete “is”

Column 40, In line 1, delete “s” from “games”

Column 40, In line 54, insert space after “radio”

Column 45, In line 11, after “games” replace “are” with --is--

Column 47, In line 7, replace “Seven” with --7--

Column 47, In line 12, add --d-- to “provide”

Column 47, In line 21, add --d-- to “dedicate”

Column 50, In line 4, after “game” insert --)--

Column 50, In line 10, delete “s” from “represents”

Column 53, In line 30, replace “97” with --60C--

Column 58, In line 33, replace “id” with --ID--

Column 59, In line 57, after “screen” delete “is”

Column 60, In line 17, add --s-- to “present”

Claims

Column 61, In line 29, replace “gaining” with --gaming--